US005684696A

United States Patent [19]
Rao et al.

[11] Patent Number: 5,684,696
[45] Date of Patent: Nov. 4, 1997

[54] SYSTEM AND METHOD FOR ENABLING AN AUTONOMOUS VEHICLE TO TRACK A DESIRED PATH

[75] Inventors: Prithvi N. Rao; Dong Hun Shin; William L. Whittaker, all of Pittsburgh, Pa.; Karl W. Kleimenhagen, Peoria, Ill.; Sanjiv J. Singh, Pittsburgh, Pa.; Carl A. Kemner, Peoria Heights, Ill.; Walter J. Bradbury, Peoria, Ill.; Craig L. Koehrsen, Peoria, Ill.; Joel L. Peterson, Peoria, Ill.; Larry E. Schmidt, Peoria, Ill.; Lonnie J. Devier, Pittsburgh, Pa.

[73] Assignee: Caterpillar Inc., Peoria, Ill.

[21] Appl. No.: 432,563

[22] Filed: May 1, 1995

Related U.S. Application Data

[62] Division of Ser. No. 487,980, Feb. 5, 1990, Pat. No. 5,610,815.

[51] Int. Cl.$^6$ .................................................. G06F 165/00
[52] U.S. Cl. ......................... 364/424.029; 364/444.2; 364/449.1; 318/587
[58] Field of Search ................. 364/424.02, 424.027, 364/424.029, 424.031, 444.1, 444.2, 449.1; 180/167, 168, 169; 318/580, 587

[56] References Cited

U.S. PATENT DOCUMENTS

| 4,309,758 | 1/1982 | Halsall et al. ............... 364/424.02 |
| 4,709,195 | 11/1987 | Hellekson et al. ............... 318/254 |
| 4,727,492 | 2/1988 | Reeve et al. ............... 364/424.02 |
| 4,772,832 | 9/1988 | Okazaki et al. ............... 318/587 |
| 4,786,164 | 11/1988 | Kawata ............... 356/4 |
| 4,809,178 | 2/1989 | Ninomiya et al. ............... 364/443 |
| 4,821,192 | 4/1989 | Taivalkoski et al. ............... 364/424.02 |
| 4,849,731 | 7/1989 | Melocik ............... 340/435 |
| 4,986,384 | 1/1991 | Okamoto et al. ............... 180/167 |
| 5,172,315 | 12/1992 | Asanuma et al. ............... 364/424.02 |
| 5,229,941 | 7/1993 | Hattori ............... 364/424.02 |

FOREIGN PATENT DOCUMENTS

| 0146428 | 6/1985 | European Pat. Off. |
| 0181012 | 5/1986 | European Pat. Off. |
| 0309293 | 3/1989 | European Pat. Off. |
| 0341889 | 11/1989 | European Pat. Off. |
| 2554612 | 5/1985 | France |
| 3912353 | 11/1989 | Germany |
| 1-79679 | 3/1989 | Japan |
| WO 87/07056 | 11/1987 | WIPO |

OTHER PUBLICATIONS

Bose, "GPS/PLRS Aided Inertial Land Navigation System Performance," *IEEE Plans '86 Position Location and Navigation Symposium*, Nov. 4–7, 1986, Las Vegas, pp. 496–504.

Conway et al., "Tele–Autonomous Systems: Methods and Architectures For Intermingling Autonomous and Telerobotic Technology," *Proceedings 1987 IEEE International Conference on Robotics and Automation, Journal of Robotics and Automation*, Mar. 31–Apr. 3, 1987, Raleigh, vol. 2, pp. 1121–1130.

De Menthon, "A Zero Bank Algorithm for Inverse Perspective of a Road from a Single Image," *Proceedings 1987 IEEE International Conference on Robotics & Automation*, Mar. 31–Apr. 2, 1987, pp. 1444–1449.

(List continued on next page.)

*Primary Examiner*—Collin W. Park
*Attorney, Agent, or Firm*—Sterne, Kessler, Goldstein & Fox

[57] ABSTRACT

A system and method for enabling an autonomous vehicle to track a desired path plans a continuous path to return to the desired path when the vehicle deviates from the desired path. The continuous path is determined based on the vehicle's position, the desired path, and a lookahead distance. The lookahead distance is the distance on the desired path within which the continuous path and the desired path converge. The lookahead distance may vary as a function of vehicle speed. In one embodiment of the present invention, the continuous path is determined as a quintic polynomial.

21 Claims, 89 Drawing Sheets

OTHER PUBLICATIONS

Dickinson et al., "An Expert Vision System for Autonomous Land Vehicle road Following," *Proceedings PR'88, The Computer Society Conference on Computer Vision and Pattern Recognition*, Jun. 5–9, 1988, pp. 826–831.

Isik et al., "Pilot Level of a Hierarchical Controller for an Unmanned Mobile Robot," *IEEE Journal of Rootics and Automation*, vol. 4, No. 3, Jun. 1988, New York, pp. 241–255.

Kuan et al., "Autonomous Vehicle Road Following," *IEEE Transactions on Pattern Analysis & Machine Intelligence*, vol. 10, No. 5, Sep., 1988, New York, pp. 648–658.

Le Moigne, "Domain–Dependent Reasoning for Visual Navigation of Roadways," *IEEE Journal of Robotics & Automation*, vol. 4, No. 4, Aug., 1988, New York, pp. 419–427.

Schuhman et al., "Applicability of an Augmented GPS for Navigation in the International Airspace System," *Proceedings of the IEEE*, No. 11, Nov., 1989, pp. 1709–1727.

"A Locomotion Control System for Mobile Robots" by Jun'ichi Iijima, Yutaka Kanayama, Shin'ichi Yuta –Japan, No Date.

"A New Laboratory Facility for Measuring Vehicle Parameters Affecting Understeer and Brake Steer" Nedley/Wilson (SAE 1972).

"Evaluation and Time–Scaling of Trajectories for Wheeled Mobile Robots" by Timothy Graettinger/Bruce Krogh, Carnegie Mellon Univ, No Date.

"Integrated Path Planning and Dynamic Steering Control for Autonomous Vehicles" by Bruce Krogh/Charles Thorpe (1985 IEEE).

"Linear and non–linear steady state vehicle handling" by J.C. Dixon, Open University, Buckinghamshire (Proc Instn Mech Engr), 1988.

"Personal Kinematic Modeling for Feedback Control of an Omni–Directional Wheeled Mobile Robot"; Patrick Muir/Charles Neuman, 1987.

"Satisficing Feedback Strategies for Local Navigation of Autonomous Mobile Robots" by Dal Feng (Carnegie Mellon 1989).

"Supervisory Control of a Multilegged Robot" by David Orin Int'l. Journal of Robotics Research (1982).

"The Influence of Vehicle Design Parameters on Characteristic Speed and Understeer" by Thomas Bundorf (SAE 1967).

"Three Models of Preview Control" by Thomas Sheridan (IEEE Transactions on Human Factors in Electronics) Jun. 1966.

"Introduction to Robotics Mechanics & Control" by John J. Craig, pp. 200–203, 1988.

"Process Control Systems" (Application Design Adjustment) by F. G. Shinskey, pp. 218–229, 1967.

"The International Symposium and Exposition on Robots" by R. A. Jarvis, pp. 314–327, (Proceedings of Phillip McKerrow), 1979.

IEE Int'l Symposium on Intell. Control, "A Cognitive Preview Control Strategy for Unmanned Vehicle Steering and Cruise Guidance", pp. 122–128, 1987.

Translations of the ASME (Jun.'79), "Optimal Digital State Vector Feed back Controller with Integral & Preview Actions" by Tomizuka/Rosenthal.

Verification of Translation by Midori Motooka, "Automatic Steering Control System" by Shigehiro Yamamoto, pp. 1–11, 1987.

Verification of Translation by Midori Motooka, "Control System for Unattended Transporting Vehicle" by Junichi Watanabe, pp. 1–23, 1983.

GPS Constellation

100

(O) : acceptable
(x) : not acceptable
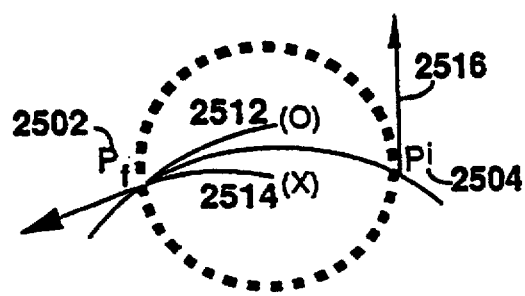
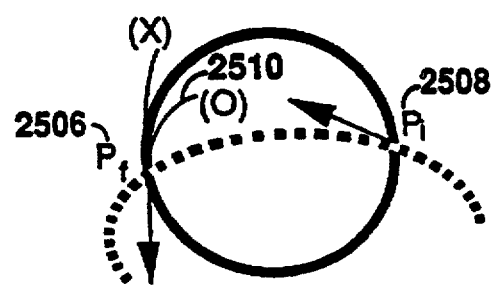
Fig 25

2900

Navigator Data Flow Summary

The purpose of this summary is to list all of the data flows defined in the Navigator Architecture. Where the flow is defined, whether it is control or data, how it is used and what it is made up of is listed in this summary. A list of abreviations used in this list is included at the end of the list.

| Data Flow | Title (DFD diagram) | Ctrl/ Data | Flow Direction |
|---|---|---|---|
| 502 | Host Cmds and Queries (NI(2))<br>= {follow path n I set scan speed I set speed limit I start tracking I restart tracking I shutdown} | C | Host -> NI |
| 504 | Replies to Host (NI(2))<br>= {navigator status summary I VPS Packet I Exception Condition n I ACK I Nack I Invalid command/query } | D | NI -> Host |
| 3604 | Supervisor Instr. (NI(2))<br>= {FOLLOW_PATH n I SPEED_LIMIT I START_TRACKING I RESTART_TRACKING ISHUTDOWN} | C | NI ->TC |
| 3658 | Navigator Status (NI(2))<br>= {21 + 37 + 69 + 71 + 84} | D | /Nav.Status/ -> NI |
| 432 | Position Data (Context (0))<br>= {VPS packet} | D | VPS -> PE |
| 3702 | CK Status (OD(2))<br>= {RUNNING I WAINTING I SLOW I STOP} | C | CC ->/NavStatus/ |
| 3704 | Obs. det. Instr. (ALL(1))<br>= {38 + 39 + 42} | C | SUPER -> OD |
| 416 | Scanner Data (CONTEXT(0)) | D | Scanner -> SIO |
| 3638 | Safe_Dis (OD(2)) | D | CC -> /Safe_Dis/ -> SP |
| 3636 | Min (MaxSpeeds) (VC (2))<br>= min { 18 & 25 & 29 } (not implemented) | D | /MaxSpeed/ -> SP |
| 3628 | Path Man Inst. (PM (2))<br>{ INIT_TASK I START_TASK I STOP -TASK } | C | TC -> PM |

Fig 37A

| Data Flow | Title (DFD diagram) | Ctrl/ Data | Flow Direction |
|---|---|---|---|
| 3614 | Vehicle Control (VC(2)) = { ACK I NACK } | C | SP -> TC |
| 3612 | Veh. Ctrl. Instr. (VC(2)) = { INIT_TASK I START_TASK I stop _TASK I STOP_VEH } | C | TC -> SP |
| 3650 | Position Est. Instr. (PE(2)) = {INIT-TASK I START_TASK I STOP_TASK } | C | TC -> PE |
| 3660 | Vehicle Path (PM(2)) = { n Path Postures } | D | PM ->/Path Buf/ |
| 3612 | Exception Veh. Cmd (VC(2)) = { STOP_VEH } | C | EC -> SP |
| 3644 | Speed Limit (Path Manager) (PM(2)) | D | PM ->/MaxSpeed/ |
| 432 | VPS Control (PE(2)) (not implemented) | C | PE -> VPS |
| 416 | Scanner Ctrl (OD(2)) = {Scanner Motor Amp Instructions} (not implemented) | C | SC -> Scanner |
| 4102 | Obs det Status (ALL(1)) = {6+85+86} | D | OD ->/NavStatus/ |
| 420 | Vehicle Commands (VC(2)) | C | SP -> Vehicle |
| 3622 | Path Data (PM(2)) = { n Path Postures} | D | /Path Store/ -> PM |
| 3642 | Valid VPS Packet (PE(2)) = {VPS data} | D | PE -> /Pos Buff/ |
| 3654 | Speed Limit (Task Ctrl) (TC(2)) | D | TC -> /MaxSpeed/ |

Fig 37B

| Data Flow | Title (DFD diagram) | Ctrl/Data | Flow Direction |
|---|---|---|---|
| 3612 | Supervisor Resp. (ALL(1))<br>= (87 + 61) | C | SUPER -> NI |
| 3626 | Path Manager Resp. (PM(2))<br>= ( ACK I NACK ) | C | PM -> TC |
| 4104 | Speed Limit (Obs. Det.) (OD(2)) | D | CC ->/MaxSpeed/ |
| 3648 | PE Response (PE(2))<br>= ( ACK I NACK ) | C | PE -> TC |
| 3606 | Obs. Det. Resp. (ALL(1))<br>= ( 40 + 41 + 43 ) | C | OD -> SUPER |
| 3706 | Scan Done (OD(2))<br>= ( SDAT_AVAILABLE ) | C | SIO -> CC |
| 3616 | Veh. Ctrl. Status (VC(2))<br>= ( WAITING I RUNNING ) | D | SP->/NavStatus/ |
| 3708 | Clear Chk Instr. (OD(2))<br>= ( START_TASK I INIT_TASK I STOP_TASK ) | C | TC -> CC |
| 3710 | Scan Ctrl Instr. (OD(2))<br>= ( START_TASK I INIT_TASK I STOP_TASK ) | C | TC -> SC |
| 3712 | Scan Ctrl Resp. (OD(2))<br>= ( ACK I NACK ) (not implemented) | C | SC -> TC |
| 3714 | Clearance Chk. Resp. (OD(2)) | C | CC -> TC |
| 3616 | Scan I/O Instr. (OD(2))<br>(not implemented yet) | C | TC -> SIO |
| 3718 | Scan I/O Resp. (OD(2))<br>= ( ACK I NACK ) | | |
| 3720 | Tagged Scans (OD(2))<br>= ( 8 + Scan Number ) | D | SIO -> /Scan Buf/ |

Fig 37C

| Data Flow | Title (DFD diagram) | Ctrl/ Data | Flow Direction |
|---|---|---|---|
| 3614 | Tracking Exception (VC(2)) = {VEH_OFF_PATH I PARAM_OO_BOUNDS I PDAT_NEXIST I SDAT_NEXIST I PBUF_EMPTY I PBUFF_INSUFFICIENT I VEH_TOO_FAST I TRACK_HEAD_ERR I VEH_NOT_CONN I VPS_NOT_READY I VPS_NOT_REC I SKIPPED_SCAN I PBUF_EMPTY} | C | SP -> EC |
| 3722 | Collision Avoid. Except. (OD(2)) = {BAD_ANGLE I PDAT_NEXIST I SDAT_NEXIST I PBUFF_INSUFFICIENT I VEH_OFF_PATH I VEH_TOO_FAST I TRACK_HEAD_ERR} | C | CC -> EC |
| 3724 | Obstacle Det Except (ALL(1)) = {52+56+57} | C | OD -> SUPER |
| 3726 | Scan Ctrl Except (OD(2)) = {LASER_FAULT} (not implemented) | C | SC -> EC |
| 3728 | Scan I/O Exception (OD(2)) = {LASER_FAULT} | C | SIO -> EC |
| 3730 | Exceptions (EC(2)) = {51+52+53+57+127+130} | C | EC -> NI |
| 3732 | PE Status (PE(2)) = {WAITING I RUNNING} | D | PE ->/NavStatus/ |
| 3618 | PM Status (PM(2)) = {WAITING I RUNNING} | D | PM ->/NavStatus/ |
| 3662 | Supervisor Status (TC(2)) = {WAITING I RUNNING} | D | TC ->/NavStatus/ |
| 3734 | Scan I/O Status (OD(2)) = {WAITING I RUNNING} | D | SIO ->/NavStatus/ |
| 3736 | Scan Ctrl Status (OD(2)) = {WAITING I RUNNING} | D | SC ->/NavStatus/ |
| 3732 | Supervisor Status (TC(2)) = {ACK I NACK} | C | TC -> NI |
| 3636 | PM Exception (PM(2)) | C | PM -> EC |

Fig 37D

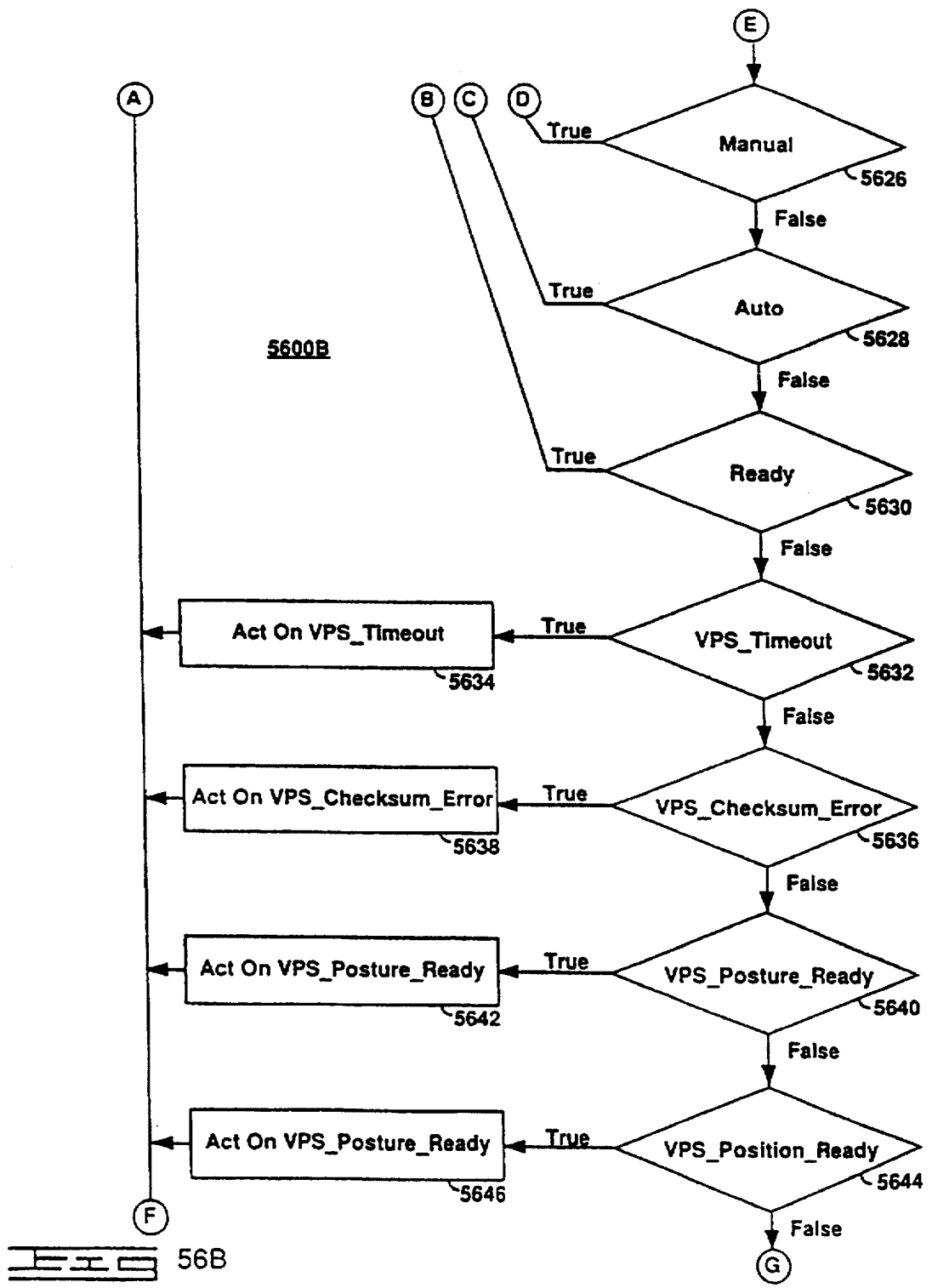

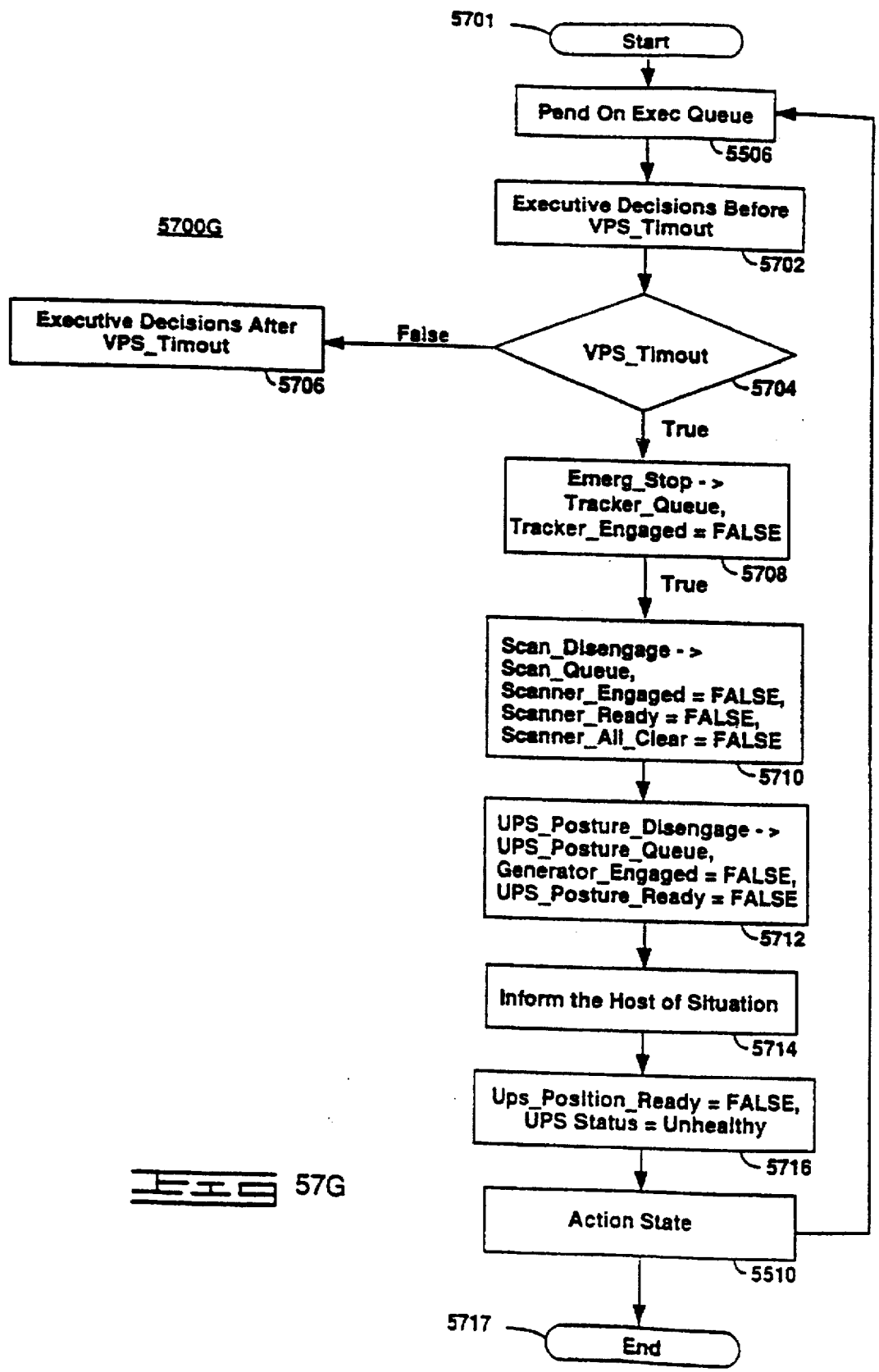

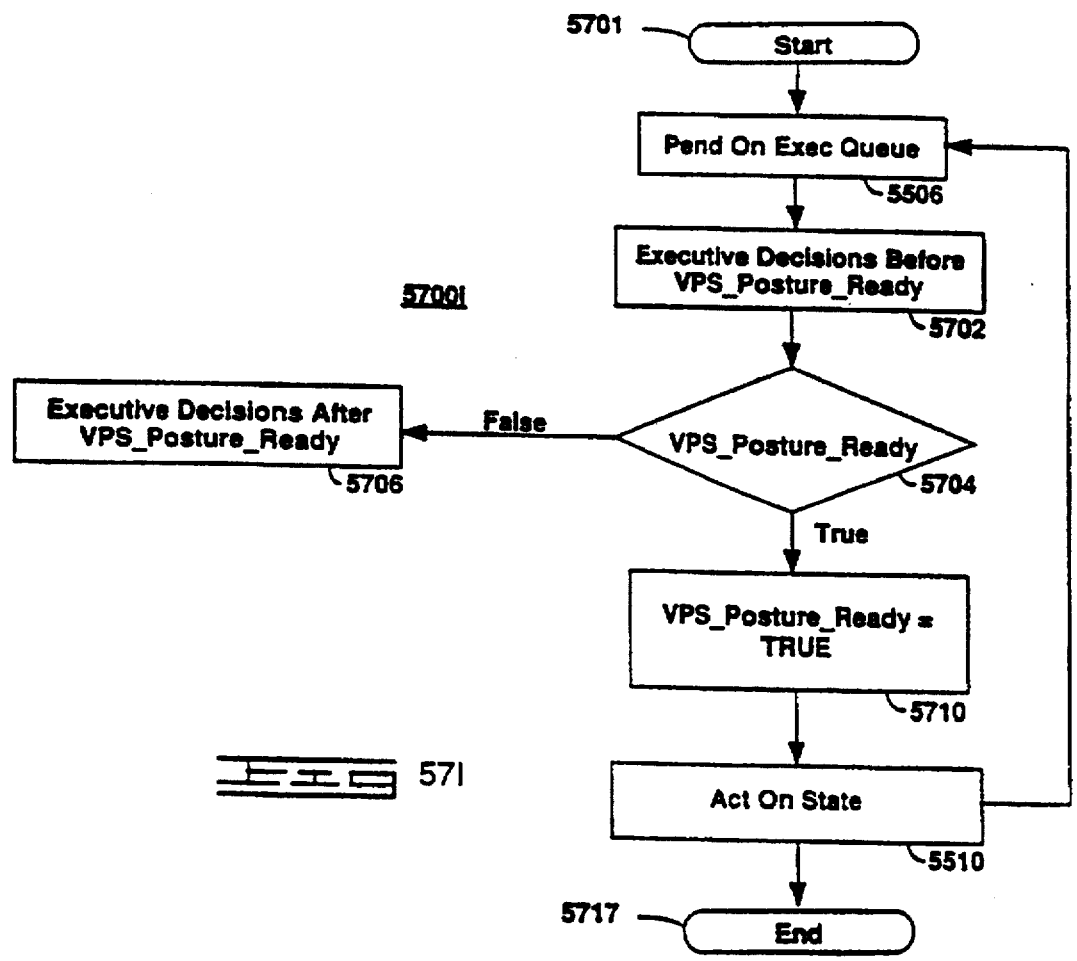

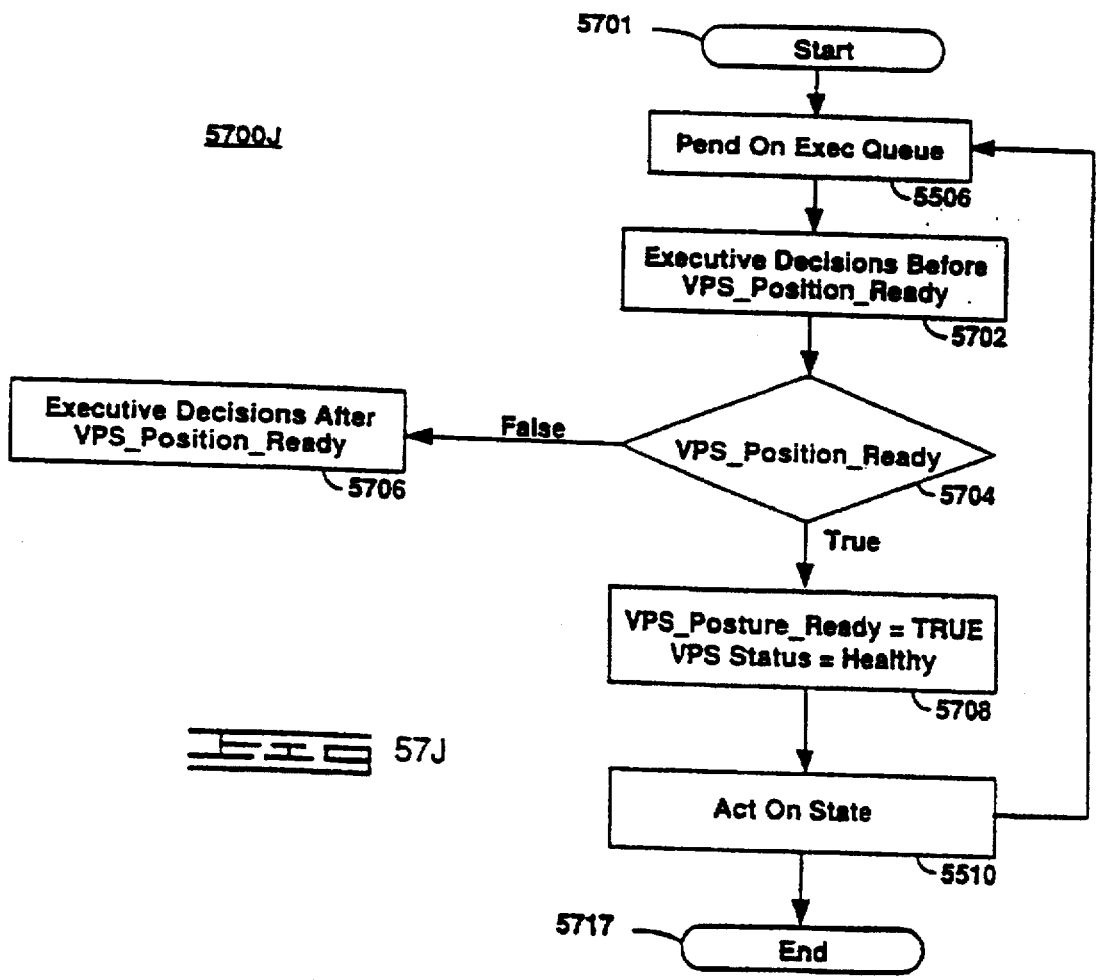

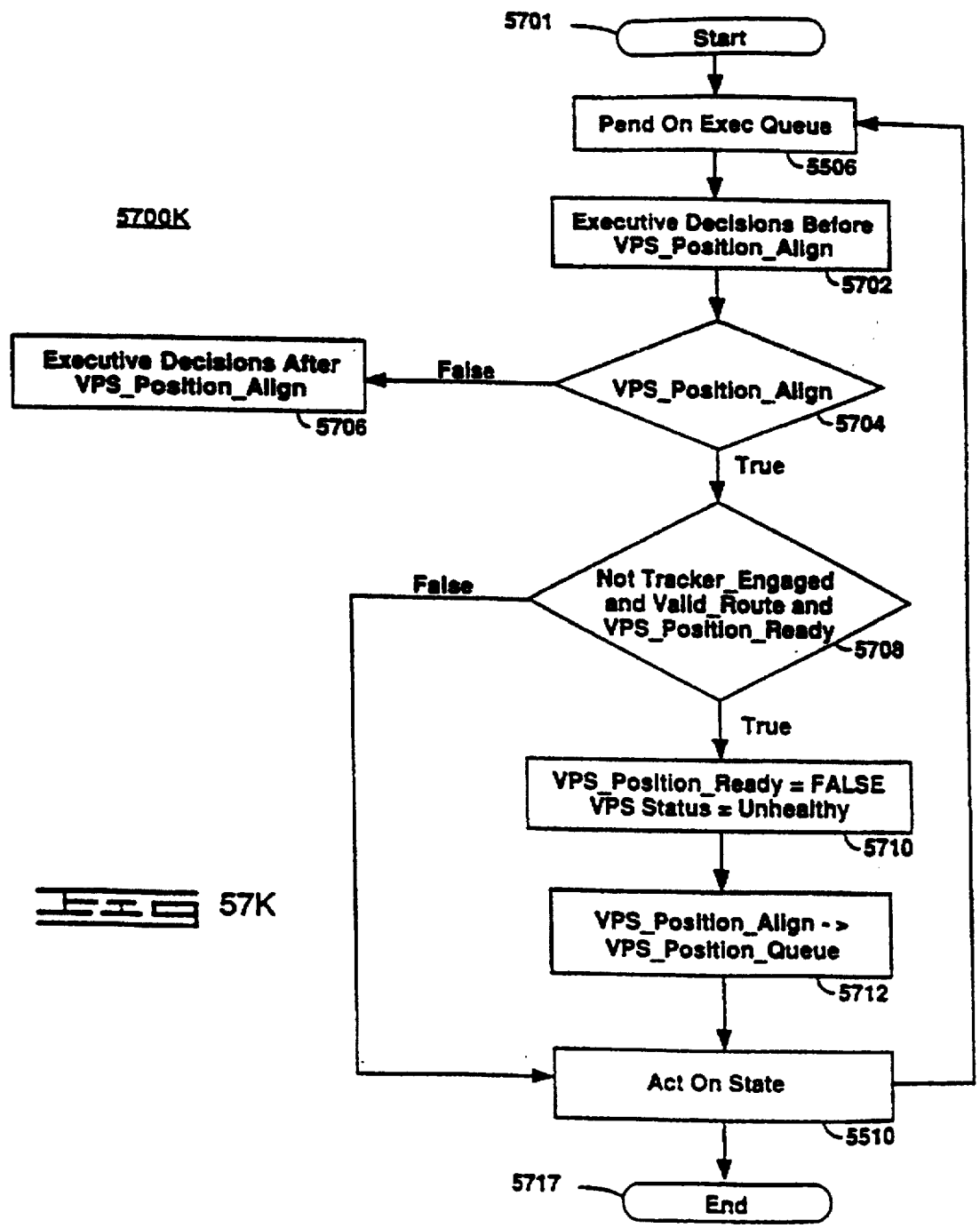

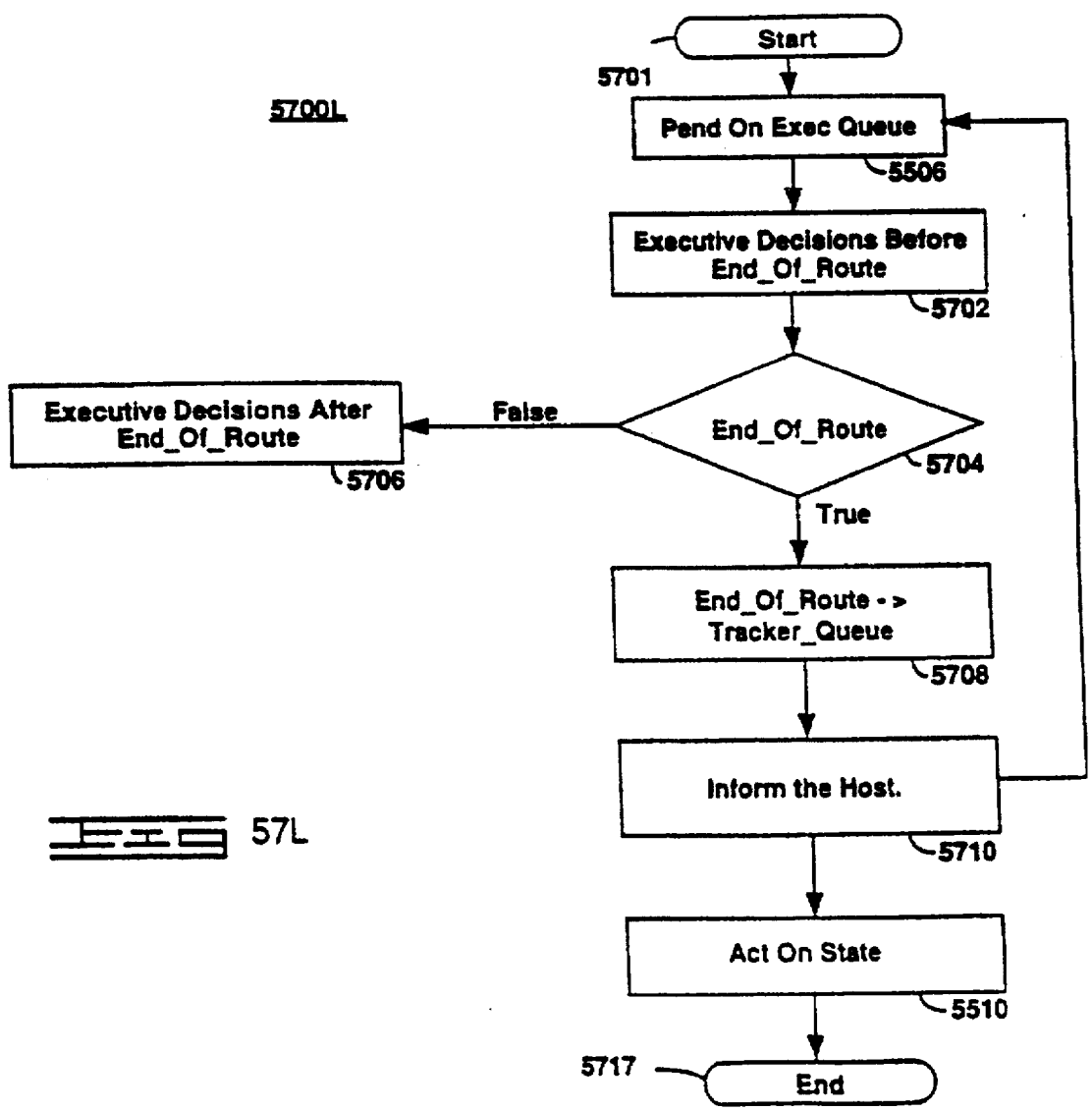

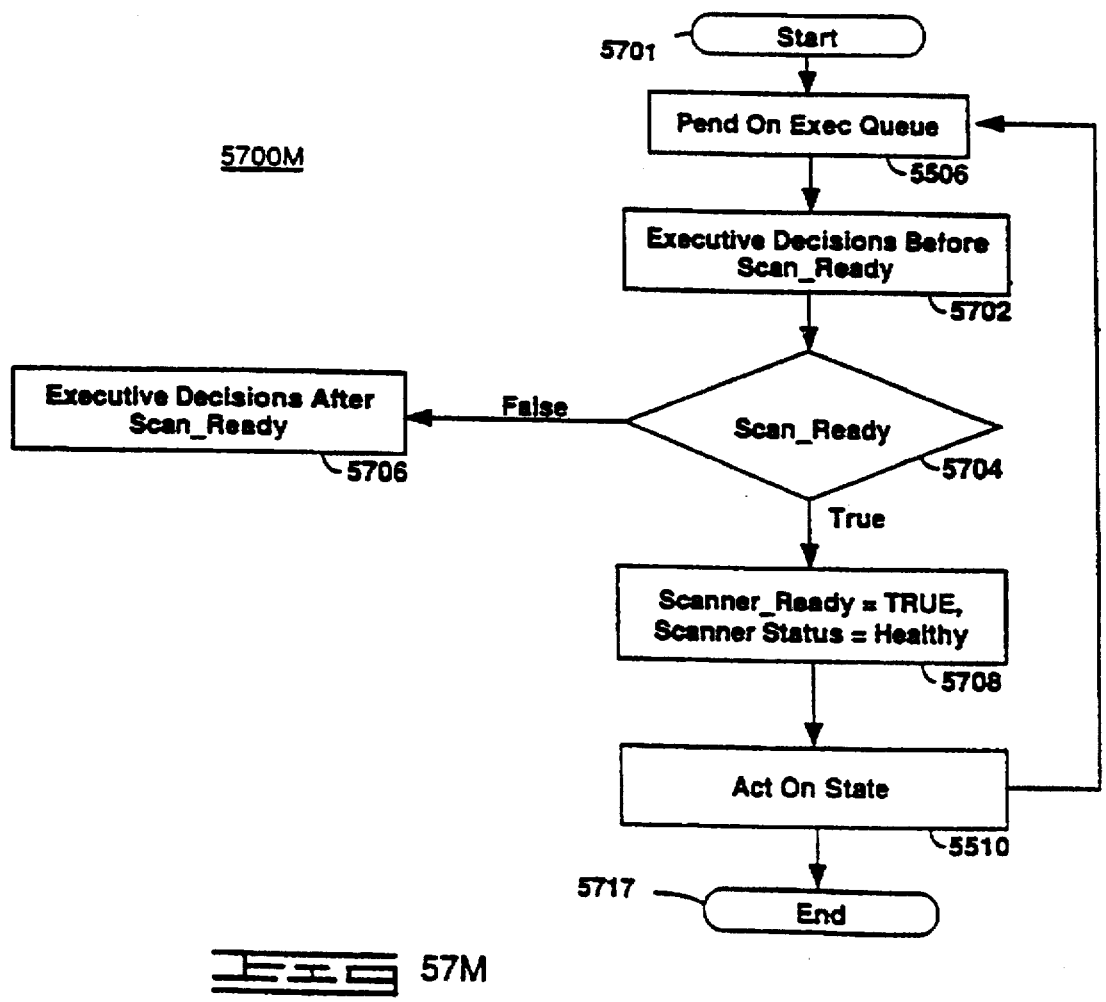

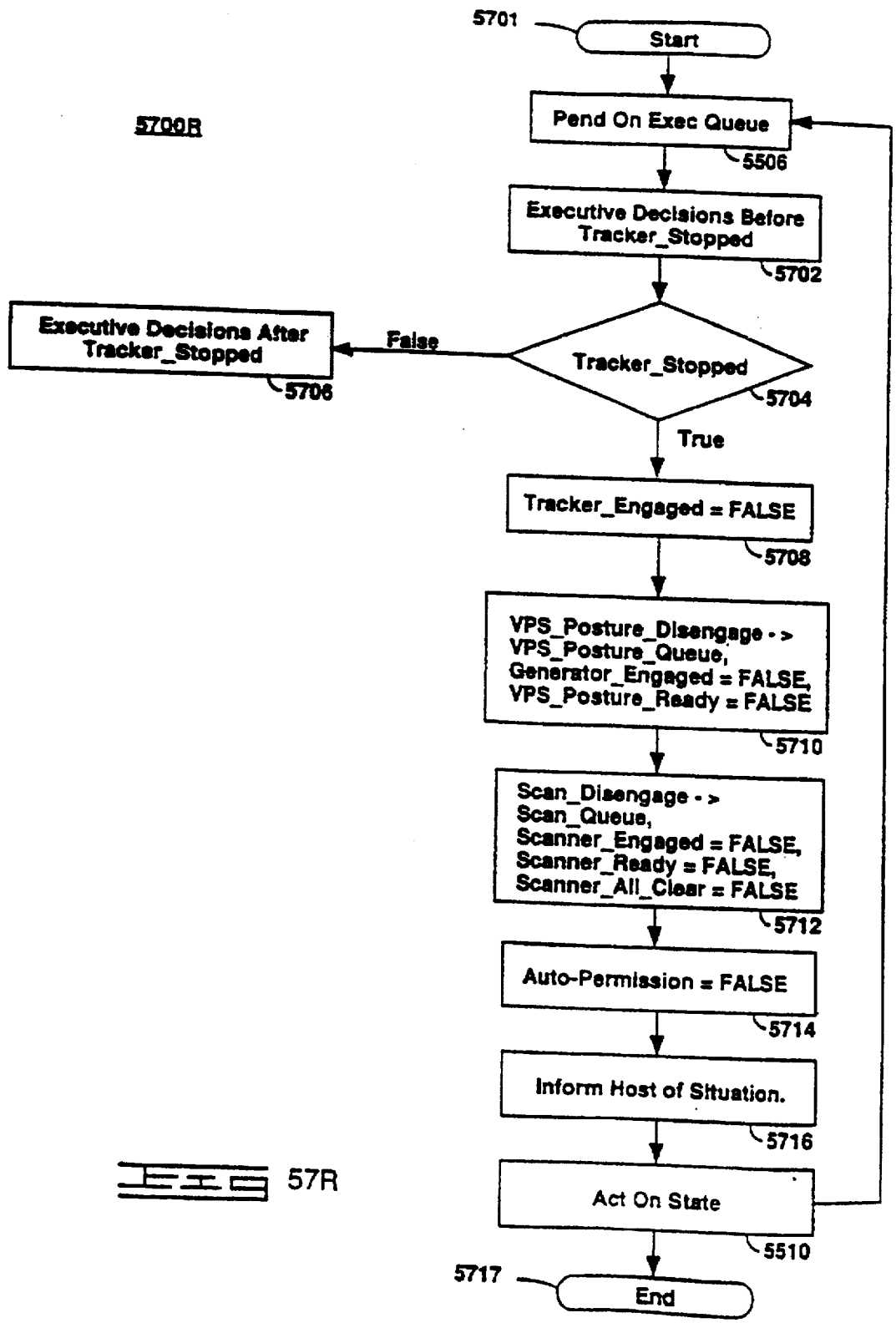

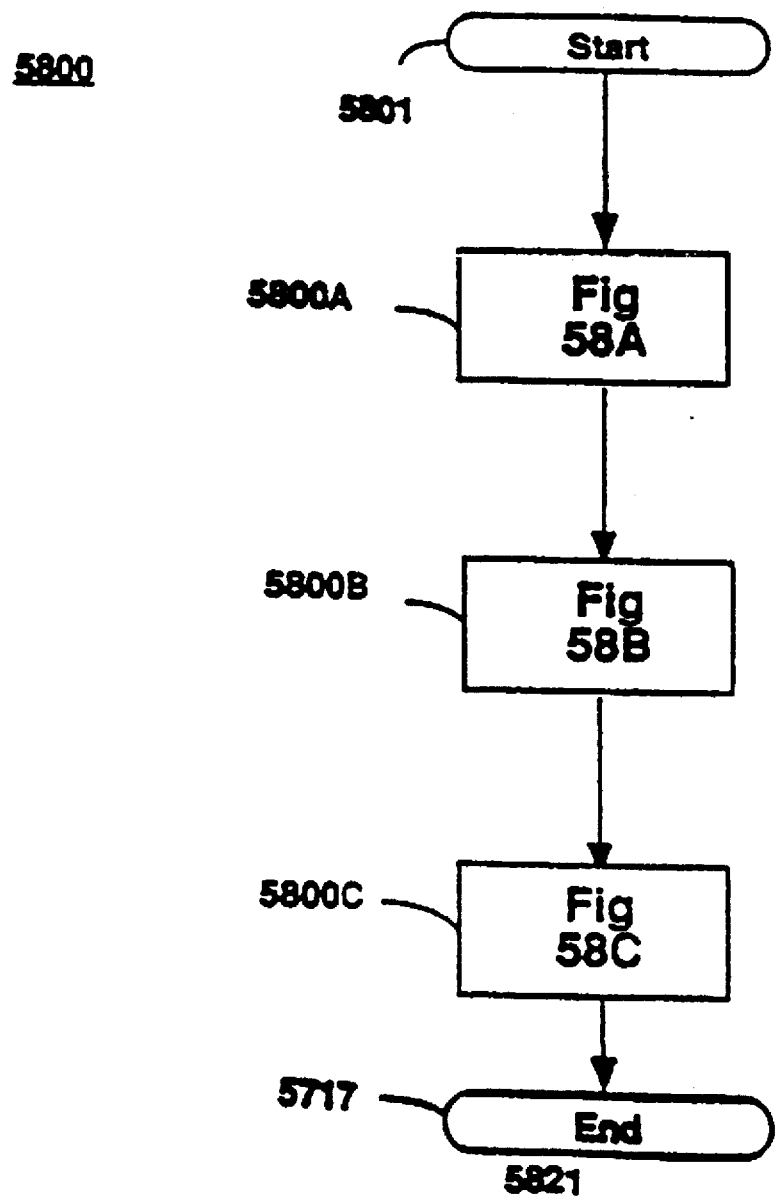

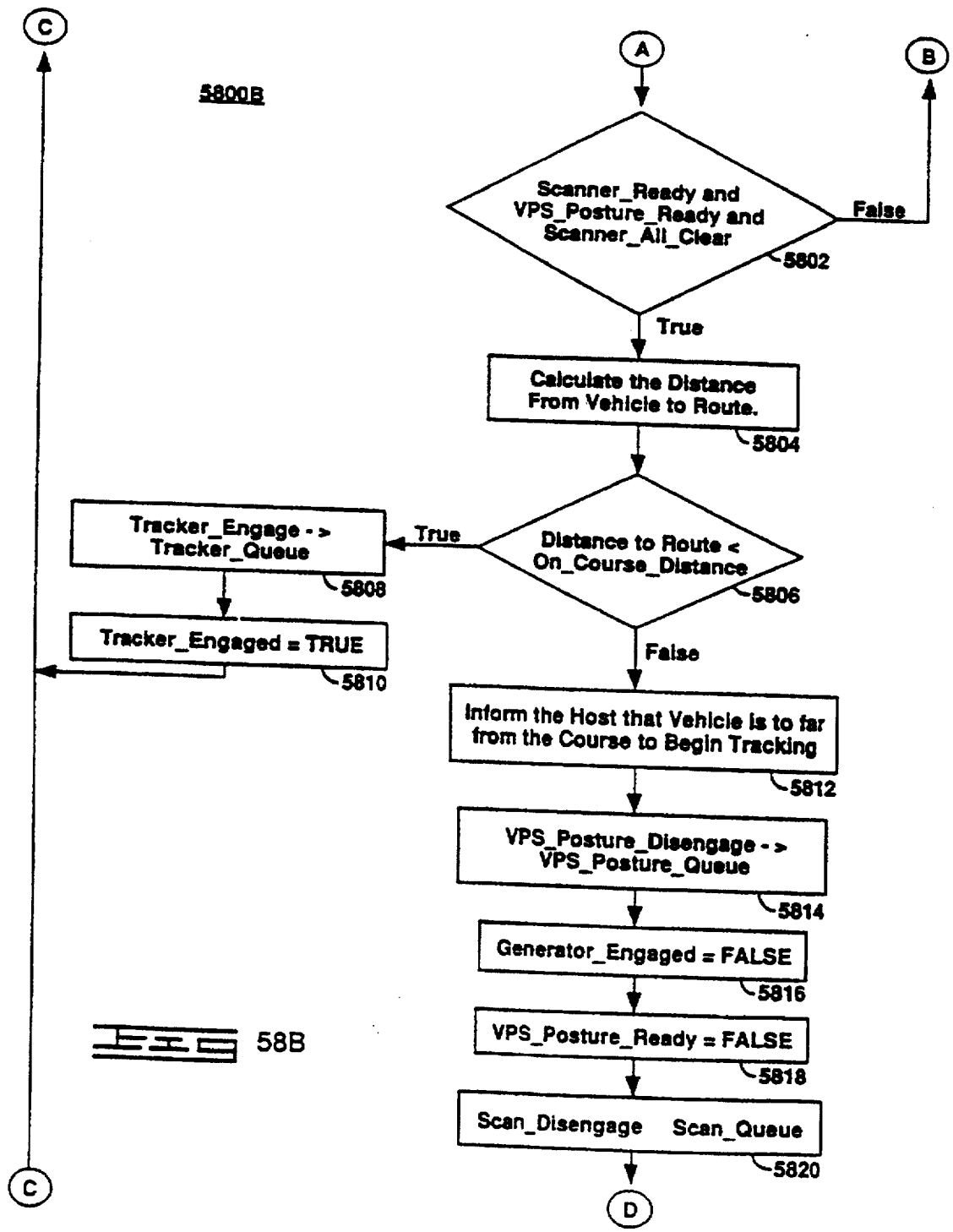

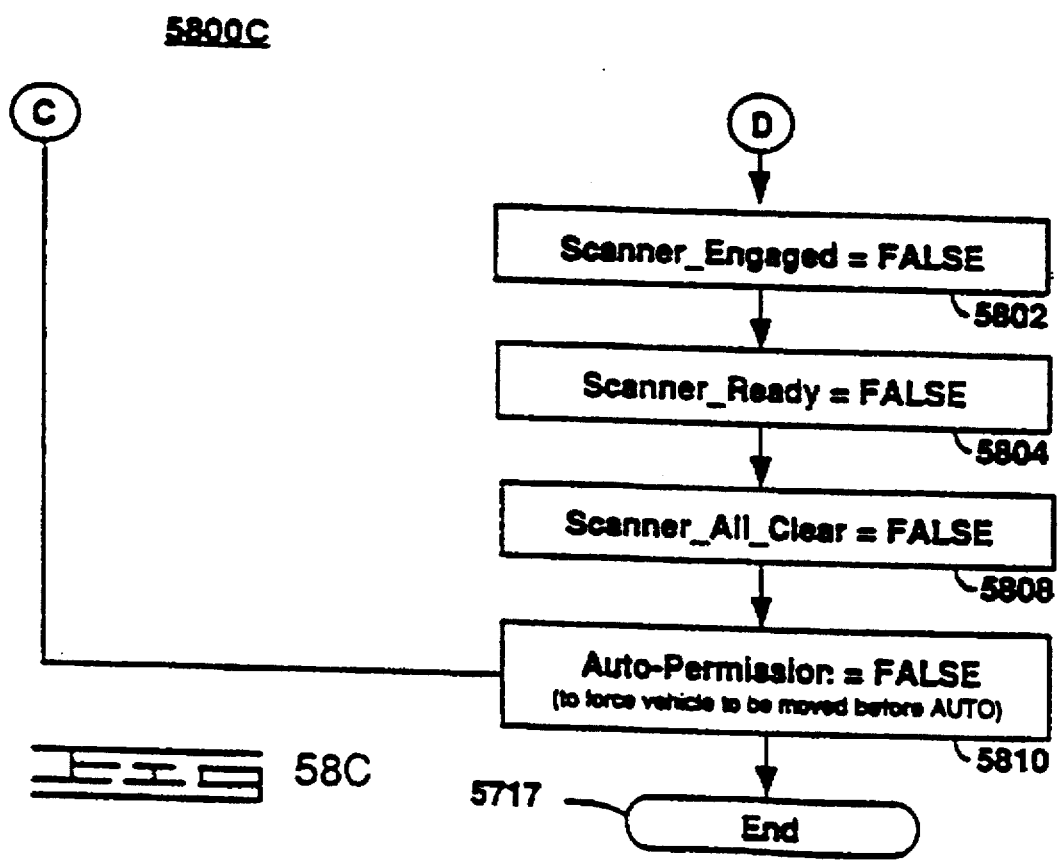

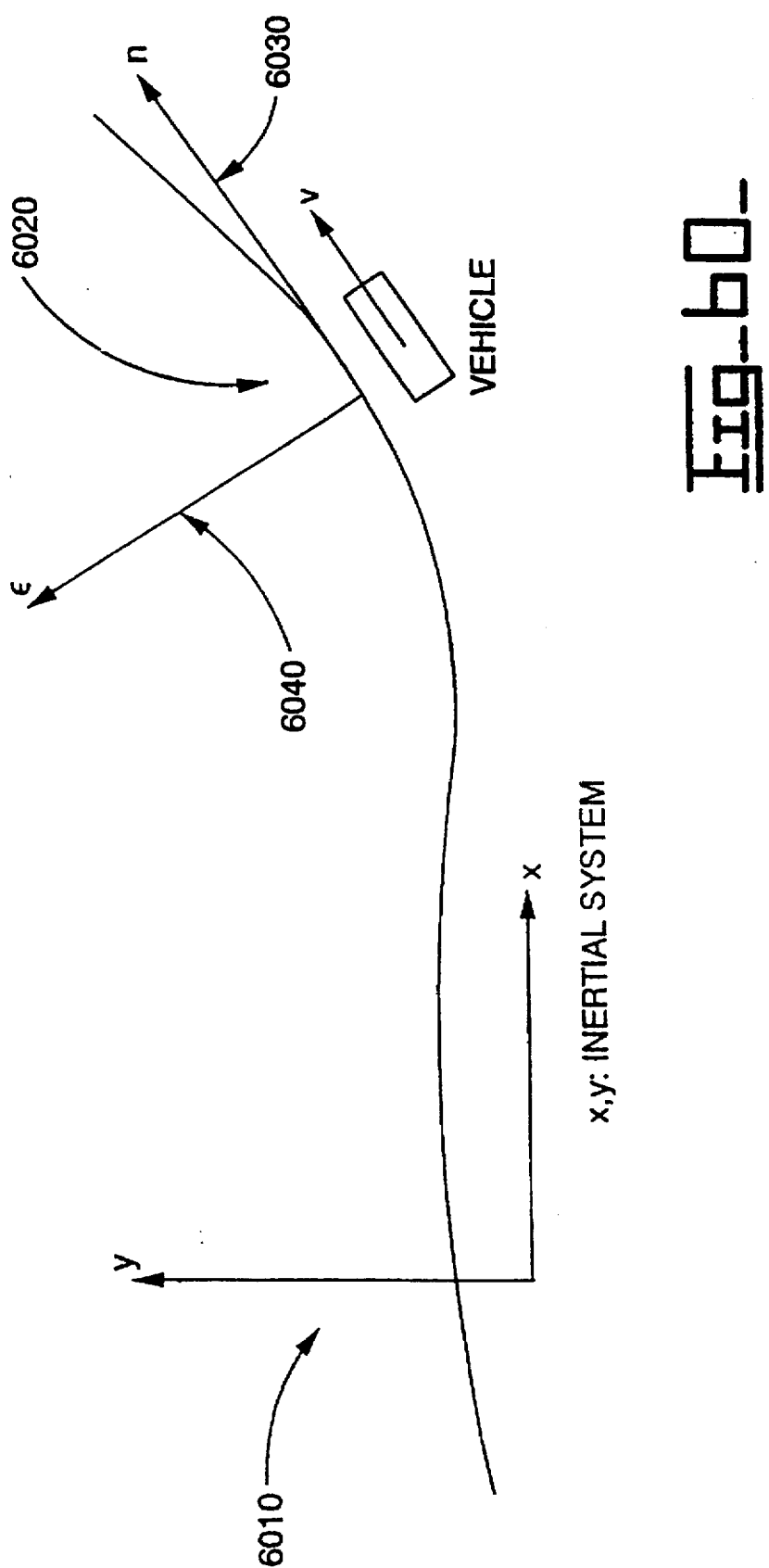
Fig-60-

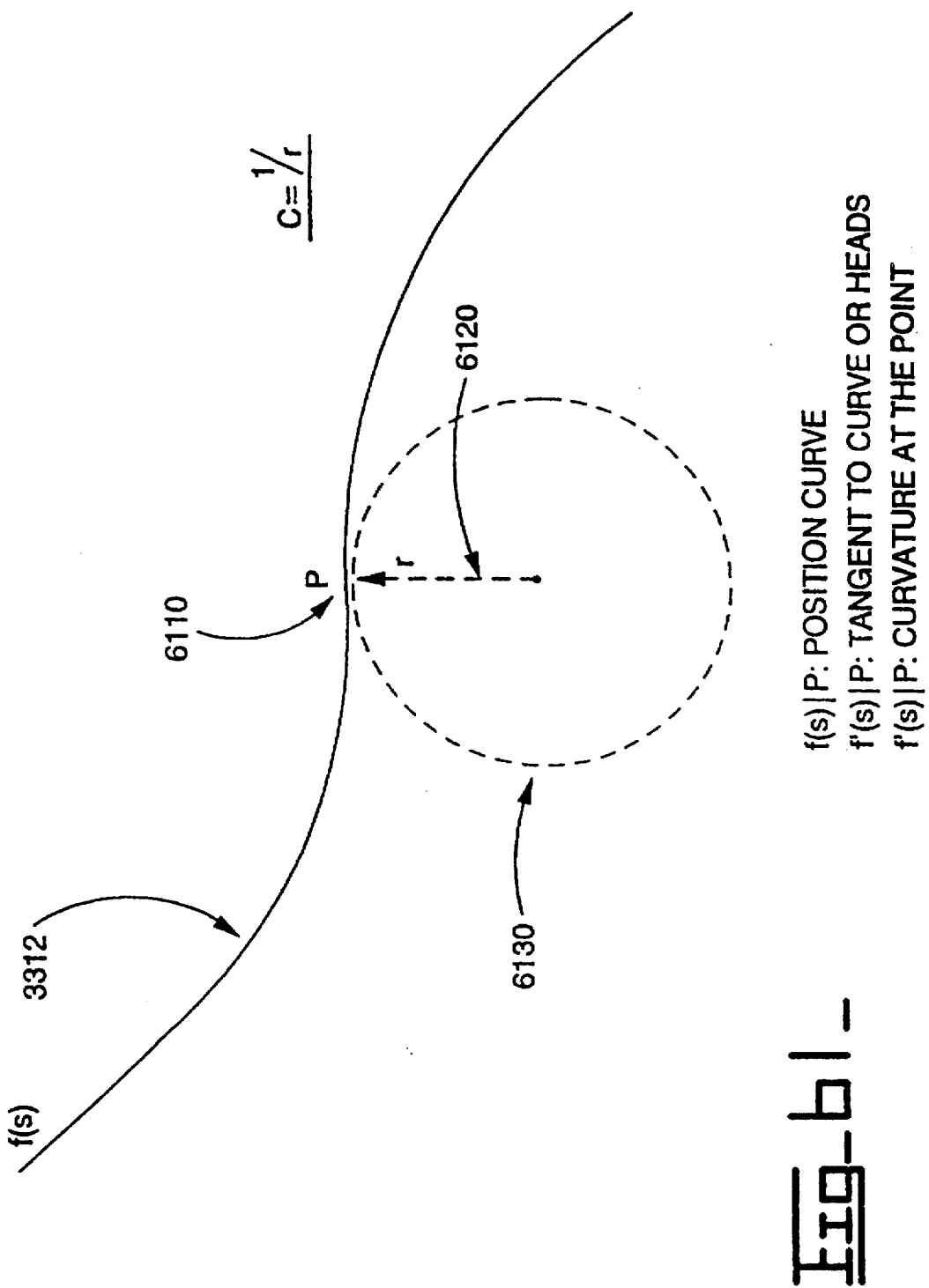

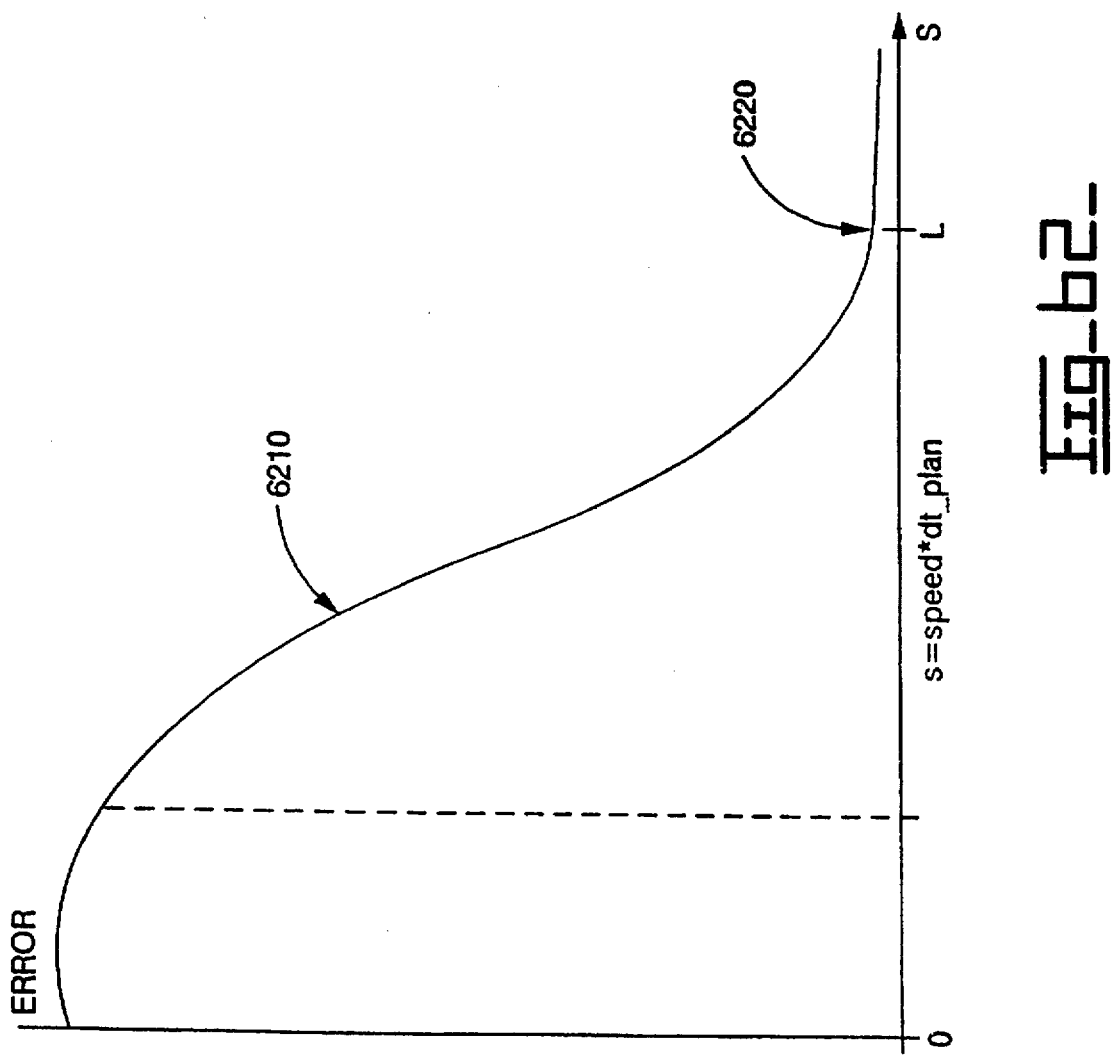

SYSTEM AND METHOD FOR ENABLING AN AUTONOMOUS VEHICLE TO TRACK A DESIRED PATH

This is a divisional application of application Ser. No. 07/487,980, filed Feb. 5, 1990, now U.S. Pat. No. 5,610,815.

BACKGROUND OF THE INVENTION

1. Field of the Invention

This invention relates to systems, which as used herein may include apparatus and/or methods, for determining terrestrial position information, and to systems for navigating an autonomous vehicle.

2. Related Art

There is presently under development a terrestrial position determining system, referred to as the global positioning system (GPS), designated NAVSTAR by the U.S. Government. In this system, a multitude of orbiting satellites will be used to determine the terrestrial position of receivers on the Earth. In the planned system, there will be eight orbiting satellites in each of three sets of orbits, 21 satellites on line and three spares, for a total of 24 satellites. The three sets of orbits will have mutually orthogonal planes relative to the Earth. The orbits are neither polar orbits nor equatorial orbits, however. The satellites will be in 12-hour orbits. The position of each satellite at all times will be precisely known. The longitude, latitude, and altitude with respect to the center of the Earth, of a receiver at any point close to Earth at the time of transmission, will be calculated by determining the propagation time of transmissions from at least four of the satellites to the receiver. The more satellites used the better. A current constraint on the number of satellites is that the currently available receiver only has five channels.

Energy on a single carrier frequency from all of the satellites is transduced by the receiver at a point close to Earth. The satellites from which the energy originated are identified by modulating the carrier transmitted from each satellite with pseudorandom type signals. In one mode, referred to as the coarse/acquisition (C/A) mode, the pseudorandom signal is a gold code sequence having a chip rate of 1.023 MHz; there are 1.023 chips in each gold code sequence, such that the sequence is repeated once every millisecond (the chipping rate of a pseudorandom sequence is the rate at which the individual pulses in the sequence are derived and therefore is equal to the code repetition rate divided by the number of members in the code; one pulse of the noise code is referred to as a chip).

The 1.023 MHz gold code sequence chip rate enables the position of the receiver responsive to the signals transmitted from four of the satellites to be determined to an accuracy of approximately 60 to 300 meters.

There is a second mode, referred to as the precise or protected (P) mode, wherein pseudorandom codes with chip rates of 10.23 MHz are transmitted with sequences that are extremely long, so that the sequences repeat no more than once per week. In the P mode, the position of the receiver can be determined to an accuracy of approximately 16 to 30 meters. However, the P mode requires Government classified information about how the receiver is programed and is intended for use only by authorized receivers. Hence, civilian and/or military receivers that are apt to be obtained by unauthorized users are not responsive to the P mode.

To enable the receivers to separate the C/A signals received from the different satellites, the receiver includes a plurality of different locally derived gold code sources, each of which corresponds with the gold code sequence transmitted from one of the satellites in the field of the receiver. The locally derived and the transmitted gold code sequences are cross correlated with each other over one millisecond, gold code sequence intervals. The phase of the locally derived gold code sequences vary on a chip-by-chip basis, and then within a chip, until the maximum cross correlation function is obtained. Since the cross correlation for two gold code sequences having a length of 1,023 bits is approximately 16 times as great as the cross correlation function of any of the other combinations of gold code sequences, it is relatively easy to lock the locally derived gold code sequence onto the same gold code sequence that was transmitted by one of the satellites.

The gold code sequences from at least four of the satellites in the field of view of the receiver are separated in this manner by using a single channel that is sequentially responsive to each of the locally derived gold code sequences or by using parallel channels that are simultaneously responsive to the different gold code sequences. After four locally derived gold code sequences are locked in phase with the gold code sequences received from four satellites in the field of view of the receiver, the position of the receiver can be determined to an accuracy of approximately 60 to 300 meters.

The approximately 60 to 300 meter accuracy of GPS is determined by (1) the number of satellites transmitting signals to which the receiver is effectively responsive, (2) the variable amplitudes of the received signals, and (3) the magnitude of the cross correlation peaks between the received signals from the different satellites.

In response to reception of multiple pseudorange noise (PRN) signals, there is a common time interval for some of the codes to likely cause a degradation in time of arrival measurements of each received PRN due to the cross correlations between the received signals. The time of arrival measurement for each PRN is made by determining the time of a peak amplitude of the cross correlation between the received composite signal and a local gold code sequence that is identical to one of the transmitted PRN. When random noise is superimposed on a received PRN, increasing the averaging time of the cross correlation between the signal and a local PRN sequence decreases the average noise contribution to the time of arrival error. However, because the cross correlation errors between the received PRN's are periodic, increasing the averaging time increases both signal and the cross correlation value between the received PRN's alike and time of arrival errors are not reduced.

In addition to the GPS, it is known in the field to use inertial systems to obtain user position estimates. Such an inertial reference unit (IRU) obtains specific-force measurements from accelerometers in a reference coordinate frame which is stabilized by gyroscopes. An IRU may be of the laser or mechanical type. In an unaided inertial navigation system, the accelerometer measured specific force (corrected for the effects of the Earth's gravity) is integrated in a navigation equation to produce the user's position and velocity.

The IRU instrument measurements may be specified in a different rectangular coordinate frame than the reference navigation frame, depending on the platform implementation. The most commonly used reference navigation frame for near Earth navigation is the local-level frame (east-north-vertical). For a gimballed, local level-north seeking IRU, the gyros and accelerometers are mounted on a platform which is torqued to maintain the platform level and azimuth pointing to the north. For a gimballed, local-level azimuth-wander IRU, on the other hand, the platform is maintained level but is not torqued about the vertical axis.

In a strap down mechanization of the IRU, on the other hand, the accelerometers and gyros are directly mounted on the vehicle body. They measure the linear and angular motion of the vehicle relative to inertial space, expressed in vehicle coordinates. It is, therefore, necessary in a strap down mechanization, to first compute numerically the attitude of the vehicle to the referenced navigation frame, and then use the computed attitude to transform the accelerometer measurements into the reference frame. After the accelerometer data of a strap down IRU have been resolved into the reference frame, the solution of the IRU navigation equations is identical in both the gimballed and strap down implementation.

In the strap down IRU implementation, the attitude computations, required to resolve accelerometer measurements, are carried out at a high rate. They suffer from numerical errors because of the limited computer word size and throughput availability. These computation errors depend on the frequency response of the sensor loop, data rate, and resolution and magnitude of the sensor output at the sampling time. There are significant benefits to a strap down IRU mechanization over a gimballed platform implementation. The potential to realize size and cost reduction in the IRU makes consideration of strap down systems attractive for both military and commercial applications.

The IRU navigation performance is primarily limited by its sensor error sources. Uncertainties in gyro drift and accelerometers bias, scale factor and IRU alignment angles are some of the significant error sources which effect the accuracy of the inertial navigator. Typically, these error sources cause errors in the estimates of user position, velocity and attitude, which accumulate with time on a mission and are, to some extent, user dynamics dependent.

To support a requirement of very accurate navigation, high precision gyros and accelerometers are required, which increase the complexity and costs of the vehicle.

Rudimentary autonomous, meaning unmanned or machine controlled, vehicle navigation is also known in the field.

Systems exist which rely on vision based positioning. For instance, vision based positioning is used in the Martin Marietta Autonomous Land Vehicle, as described in "Obstacle Avoidance Perception Processing for the Autonomous Land Vehicle," by R. Terry Dunlay, IEEE, CH2555-1/88/0000/0912S01.00, 1988. (See also "A Curvature-based Scheme for Improving Road Vehicle Guidance by computer Vision," by E. D. Dickmanns and A. Zapp, as reported at *SPIE's Cambridge Symposium on Optical and Optoelectronic Engineering*, Oct. 26–31, 1986.)

Some of these vision based positioning systems may use fixed lines or markings on, for instance, a factory floor, to navigate from point to point. Others may involve complex pattern recognition hardware and software. Other systems may navigate by keeping track of their position relative to a known starting point by measuring the distance they have travelled and the direction from the starting point. These measuring type systems are known as "dead-reckoning" systems.

Such navigation systems suffer from numerous drawbacks and limitations. For instance, if the system cannot recognize where it is, looses track of where it has been, or miscalculates its starting point, it will become unable to accurately reach its goal. Because errors in position accumulate in such systems, they may require frequent, time consuming initializations. Such systems may require patterns and markers be placed along their route, which is also time consuming and costly, and limits their usefulness to small, controlled areas.

SUMMARY OF THE INVENTION

The present invention is an integrated vehicle positioning and navigation system which, as used throughout, means apparatus, method or a combination of both apparatus and method. The present invention overcomes many of the limitations present in conventional technology in the fields of positioning and navigation, and thereby provides for highly accurate and autonomous positioning and navigation of a vehicle.

In the present invention, the conventional capabilities of the IRU (Inertial Reference Unit) and the GPS (Global Positioning System) have been both combined, and greatly enhanced, in a cost-effective manner to provide autonomous vehicle capability. In doing so, the present invention uses many novel and inventive systems, apparatus, methods and techniques which allow for a superior positioning capability, and flexible autonomous navigational capability.

In the present invention, the vehicle positioning and navigation system achieves some of its advantages by using a novel and enhanced combination of three independent subsystems to determine position. These are: GPS (Global Positioning System) satellites, an inertial reference system, and the vehicle odometer. These three independent subsystems produce positioning data which may then be combined by a novel Kalman filter so that an output stream of positioning data of improved accuracy may be produced at a much faster rate (approximately 20 Hz).

The present invention also provides for increased positioning accuracy by providing novel systems for compensating for noise and errors in positioning data.

The present invention also provides for anti-spoofing, that is detecting and correcting intentionally false positioning data transmitted by the satellite positioning system.

The present invention also includes novel satellite position prediction systems, further enhancing the accuracy and performance of the positioning system.

This superior positioning data capability of the present invention, is used to aid the autonomous vehicle navigation system of the present invention. The navigation system of the present invention, provides for highly accurate vehicle path-tracking on predetermined, or dynamically determined, vehicle paths.

The present invention includes novel systems for determining paths or roads for an autonomous vehicle to follow at a work site, both dynamically during operation and/or in advance. It includes systems for efficiently storing and accessing these paths. And it includes systems for accurately tracking these paths. The present invention also possesses the capability to travel autonomously without pre-set paths from beginning to ending points.

The present invention contemplates a totally autonomous work site, where numerous autonomous vehicles and equipment may operate with minimal human supervision. This reduces labor costs. This also makes the present invention suitable for hazardous or remote work sites, such as at the site of a nuclear accident, for example.

The present invention provides the capability for monitoring of vehicle and equipment control and mechanical systems, such as oil, air, and/or hydraulic pressures and temperatures. It provides for the indicating of a problem in any one of its systems, and for the scheduling of regular and emergency maintenance.

The present invention also provides for efficient scheduling of work and dispatching of vehicles and equipment at an autonomous work site, for instance, by providing a host processing system at a base station.

The host processing system coordinates various positioning and navigation tasks. It also acts as the supervisory interface between the autonomous system and its human managers.

A preferred embodiment or "best mode" of the present invention, would be in an autonomous mining vehicle, such as is used for hauling ore, at a mining site. However, it is noted that it is contemplated that the present invention may be implemented in other vehicles performing other tasks. Examples are, for instance, in other types of heavy equipment for mining or construction, or in other totally different types of vehicles, such as farm tractors or automobiles.

The present invention includes novel systems for ensuring safe operation of a manned or unmanned autonomous vehicle. These may be embodied in manual override features, failsafe features, error checking features, supervisory features, obstacle detection and avoidance, and redundancy features.

The vehicle positioning and navigation system of the present invention includes systems which provide for a hierarchy of control such that manual control when asserted takes precedence as a safety feature.

The vehicle positioning and navigation system of the present invention includes systems which provide for a safe failure mode. This insures that should a system or subsystem malfunction, or drift unacceptably out of calibration, the system will detect this condition and bring the vehicle to a stop. The brake system, as an example, is designed with the parking brakes normally set. Any failure or loss of power will result in the brakes being returned to their normal set mode, stopping the vehicle in the shortest distance possible.

The vehicle positioning and navigation system of the present invention includes systems which provide for error checking to detect, for instance, garbled messages, or out-of-limit commands, which may indicate system malfunction.

The vehicle positioning and navigation system of the present invention includes systems which monitor and supervise the operation of other systems and subsystems to assure proper and safe operation. This may include checking actual performance against a multi-state model of ideal performance of the vehicle and its systems.

The vehicle positioning and navigation system of the present invention includes systems for detecting obstacles in the vehicle path and enabling the vehicle to successfully avoid colliding with those obstacles, thereafter returning to the path. Such obstacles may be fallen rocks, people, other vehicles, and so on.

The present invention also includes novel scanning systems for use in detecting obstacles. These may include scanner systems designed around laser, sonar, radar, or other electromagnetic or acoustical wave apparatus.

The vehicle positioning and navigation system of the present invention includes redundancy of functional units, as backup and/or as checks on the system operation.

The navigation portion of the present invention provides control flexibility by providing for at least three modes of operation. These modes include a manual mode, a remote control or "tele" mode, and a fully autonomous mode. The "tele" mode may be over a remote radio, or cable, with the controlled vehicle in the line of sight of the "tele" operator. There is also a transitional or intermediate "ready" mode, used when going between certain other modes.

The present invention, in providing these modes, also provides for on-board, tele, and host displays for status and control information and manipulation.

The present invention also includes novel vehicle control sub-systems, including speed control, steering control, and shutdown systems.

The present invention is able to achieve some of its advantages by providing for vehicle control which serves to decouple speed and steering control so that they may be controlled separately. This simplifies the problems that may be associated with accurate path tracking, for instance.

The present invention also includes a novel global memory structure for communicating data between plural processing units, or tasks, and/or processors. This communication structure enables real-time, multi-tasking control of vehicle navigation.

A better appreciation of these and other advantages and features of the present invention, as well as how the present invention realizes them, will be gained from the following detailed description and drawings of the various embodiments, and from the claims.

BRIEF DESCRIPTION OF THE DRAWINGS

The present invention is better understood by reference to the following drawings in conjunction with the accompanying text.

FIG. 25 is a diagrammatical representation of how the sign of the last clothoid segment is determined.

FIGS. 37(A)-(D) are navigator data flow summaries.

FIGS. 56(A)-(D) together form a flowchart of the executive decisions block in detail.

FIG. 58 is an illustration of how FIGS. 58(A)-(C) relate.

FIGS. 58(A)-(C) are parts of a flowchart showing the "act on state" block of the executive flowchart in more detail.

FIG. 60 is a diagram illustrating the relationship between an inertial coordinate system and a new coordinate system centered at the vehicle.

FIG. 61 is a diagram illustrating the relationship between a path and the radius of curvature of the path.

FIG. 62 is a diagram illustrating error versus speed.

DETAILED DESCRIPTION OF THE PREFERRED EMBODIMENT

Table of Contents

Figure 1:
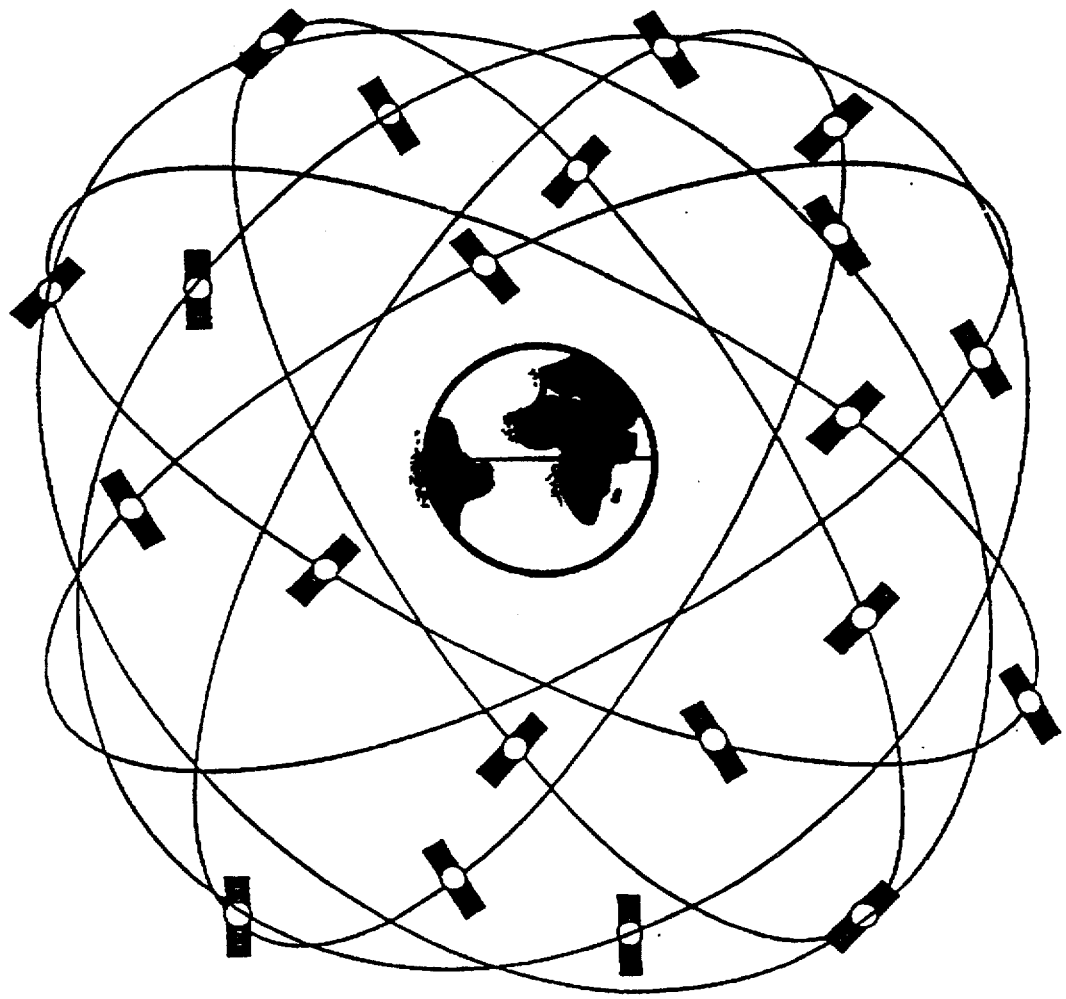
FIG. 1 is a diagrammatic view of the GPS satellites in 6 orbital planes.

I. General Overview
II. Vehicle Positioning System (VPS)
  A. Overview
  B. Global Positioning System (GPS)
    1. GPS Space Segment
    2. GPS System Operation
  C. Motion Positioning System (MPS)
  D. VPS System Architecture
  E. Base Station
  F. Satellite Based Accuracy Improvements
    1. Constellation Effects
    2. Differential Correction Techniques
      a. Original Bias Technique
      b. Parabolic Bias Technique
      c. Base Residuals as Bias Technique
  G. Satellite Position Predictor
  H. Weighted Path History
  I. Anti-Spoofing J. Surveying
K. Graphic Representations
III. Navigation
  A. Overview
  B. Route Planning/Path Generation
    1. Introduction
      a. Clothoid Path Segments
      b. Modeling A Vehicle Path
      c. Clothoid Curves
      d. Generation of a Posture Continuous Path
        (1) Existing Methods
        (2) Path generation from sequence of points
        (3) Clothoid Replanning Paths
        (4) Summary
        (5) B-splines
    2. Route Creation and Storage
      a. Introduction
      b. Route Definition
      c. Navigator Route Usage
    3. Posture Generation
  C. Path Tracking
    1. Introduction
    2. Considerations
      a. Global position feed back
      b. Separate steering and driving control
    3. Embodiments
      a. Tracking Control Structure
      b. Quintic Method
      c. Latency and slow systems
      d. Vehicle-Ground Interaction (VGI)
      e. Sensing and Actuation Timing
      f. Look-ahead
      g. Optimal Control Method
      h. Conclusion
  D. Obstacle Handling
    1. Introduction
    2. Detection of Obstacles
      a. Clearance checking
      b. Filtering and edge detection
      c. Obstacle extraction
        (1) Finding the road
        (2) Modeling road height
        (3) Thresholding
        (4) Blob extraction
        (5) Applications
    3. Avoidance of Obstacles
    4. Return to Path
    5. Scanner System
      a. Introduction
      b. Laser scanner
      c. Scanner system interface
      d. Scanner system buffer circuit
  E. Vehicle Controlling Systems
    1. Introduction
    2. Vehicle Manager (modes)
      a. Ready mode
      b. Tele mode
      c. Manual mode
      d. Autonomous mode
    3. Speed Control
    4. Steering Control
      a. Steering Model
      b. Path Representation
      c. Posture Definition
      d. Position Information
      e. VPS Short Definition
      f. Steering Method
    5. Monitor/Auxiliary
    6. Safety System
      a. Introduction
      b. Shutdown Control
    7. Architectures
  F. Functional Descriptions/Methods
    1. The NAVIGATOR
      a. MAIN
      b. MONITOR_VEH STATUS
      c. SCANNER
      d. CONSOLE and CONSOLE_PARSER
      e. GET_DIRECTIVES
      f. MSG_TO_HOST
      g. VPS_POSITION
      h. VPS_POSTURE
      i. TRACKER
      j. NAVIGATOR Shared (Global) Memory
      k. Flow Charts I. General Overview In the following description of the present invention, and throughout the specification, the term "system" is used for shorthand purposes to mean apparatus, method, or a combination of both apparatus and method.

Autonomous is used herein in its conventional sense. It indicates operation which is either completely automatic or substantially automatic, that is, without significant human involvement in the operation. An autonomous vehicle will generally be unmanned, that is without a human pilot or co-pilot. However, an autonomous vehicle may be driven or otherwise operated automatically, and have one or more human passengers.

The task of guiding an autonomous vehicle along a prescribed path requires that one accurately knows the current position of the vehicle. Once the current position is known, one can command the vehicle to proceed to its next destination.

For a truly autonomous vehicle to be practical, very accurate position information is required. In the past, it was not believed possible to obtain this nearly absolute position information without using a prohibitively large number of reference points. All positioning was done relative to the last reference point using inertial navigation or dead reckoning.

Using the systems of the present invention, we are able to obtain the nearly absolute position information required for a truly autonomously navigated vehicle. This led us to the development of simpler, more reliable vehicle controllers and related systems as well.

The development and implementation of the GPS (global positioning system) was a necessary and vital link which allowed us to develop our inventive systems to obtain more accurate position information. The GPS satellite position information, significantly enhanced through our inventive techniques, is combined and filtered with IRU (Inertial Reference Unit) inertial navigation information, and vehicle odometer information, according to one aspect of the present invention, resulting in a highly accurate system for determining position and effecting navigation.

The present invention includes both positioning and navigation systems, apparatus, methods and techniques which, when integrated together, provide for the highly accurate transportation of unmanned vehicles.

The navigation system of the present invention, using the highly accurate position information obtained from the positioning system, is able to provide for accurate navigation between points along pre-established or dynamically generated paths.

The present invention makes use of various models or conceptual representations to generate and follows these paths. For example, lines and arcs may be used to establish paths between objective points the vehicle is to obtain. B-splines or clothoid curves may be used to model the actual path the vehicle is to navigate. Using modelling or representational techniques provides for enhanced data communication, storage and handling efficiencies. It allows for simplification of supervisory tasks by providing a hierarchy of control and communication such that the higher the level of control, the simpler the task, and the more compact the commands.

At the base station, where GPS positioning data is also received from the satellites, a host processing system provides for the highest level of control of the navigation system. The host handles scheduling and dispatching of vehicles with much the same results as a human dispatcher would achieve. The host thereby determines the work cycle of each vehicle.

The host commands each of the vehicles to proceed from a current position to another position taking a specified route in order that they effect their work goals. The host specifies the routes by name, and not by listing each point along the route. Each vehicle has an on-board system which looks up the named route and translates the named route into a set of nodes and segments along the route, using, for example, the models or representations discussed above to connect the nodes.

The on-board system also provides for controlling the vehicle systems, such as brakes, steering, and engine and transmission, to effect the necessary physical acts required to move, stop, and steer the vehicle. These may be designed to be retro-fitted onto existing vehicles, such as the Caterpillar, Inc. 785 off-highway truck, for instance.

The on-board system also checks actual position against desired position and corrects vehicle control to stay on route. The system may run multi-state models to enhance this checking capability. The system also checks for errors or failures of the system and vehicle components. If detected, the system provides for failsafe shutdown, bringing the vehicle to a stop.

The on-board navigation system provides for different modes of control. These include (1) a fully autonomous mode, where navigation of the vehicle is automatically handled by the on-board system; (2) a tele or remote control mode, where a remote human operator may control the direction and motion, and so on, of the vehicle; and (3) a manual mode, where a human operator sitting in the cab can take control of the vehicle and drive it manually.

In the autonomous mode, obstacle detection is critical, and is provided for in the navigation system of the present invention. Boulders, animals, people, trees, or other obstructions may enter the path of a vehicle unexpectedly. The on-board system is capable of detecting these, and either stopping, or plotting a path around the obstruction, to return to its original route when it is safe.

Accurately tracking the desired route is another function of the on-board navigational system. System function and architecture has been designed for real time tracking of the path at speeds up to approximately 30 mph. safely.

As an introduction to the next section, "POSITIONING," recall that the vehicle positioning system (VPS) of the present invention is a positioning system based on the incorporation of Inertial Reference Unit (IRU) Data, Odometer Data and Global Positioning System (GPS) Data.

The VPS incorporates these three subsystems with extensive innovative methodology to create a high accurate position determination system for moving or stationary vehicles, or any point on the Earth.

The GPS comprises a space segment and a land or atmospheric based processing system. The space segment includes 24 special purpose satellites (not yet fully implemented) which are being launched and operated by the U.S. Government. These satellites continually transmit data to the Earth that can be read by a GPS receiver. The GPS receiver is part of a processing system which produces an estimate of the vehicle position based on the transmitted data.

When multiple satellites are in view, the GPS receiver can read each satellite's navigation messages and determine position based on known triangulation methods. The accuracy of the process is in part dependent on how many satellites are in view. The IRU comprises laser gyroscopes and accelerometers which produce position, velocity, roll, pitch and yaw data. The IRU combines this information into an estimate of vehicle position. The odometer produces data on distance travel that is incorporated with the IRU data.

A base station provides a geographic proximate reference point and reads the data transmitted by each satellite. Using the transmitted data, the base station makes improvements inaccuracy on the estimate of the vehicle position.

The present invention includes a method to predict the position of any satellite at the current time or any future time. Using that information, the GPS receiver can determine the optimum satellite constellation.

The present invention also includes a method for reducing vehicle "wandering" by using the path history of the vehicle to statistically determine the accuracy of future estimates of position.

The present invention also includes numerous methods for determining how accurate the data transmitted from the satellite is. Included in these methods are techniques to compensate for data with error.

II. Positioning

A. Overview

Referring now to FIGS. 7 through 11, the present invention includes a Vehicle Positioning System (VPS) 1000 which is a highly accurate position determination system. The VPS incorporates three subsystems and extensive innovative methodology to create an unsurpassed position determination system for moving or stationary vehicles 310.

The VPS includes global positioning system (GPS) 700 and a motion positioning system (MPS) 900 including an inertial reference unit (IRU) 904, and an odometer 902 which have been enhanced and combined to produce a highly effective position determining system. The GPS 700 comprises a space segment and a land or atmospheric (for example, one located on an aircraft) based processing system. The space segment includes 24 special purpose satellites (not yet fully implemented; see FIG. 1) which are being launched and operated by the U.S. Government. These satellites constantly transmit data to the Earth that is read by a GPS receiver 706.

The GPS receiver 706 is part of a GPS processing system 700 which produces an estimate of the vehicle position based on the transmitted data. The vehicle's estimated position is transmitted to a VPS main processor 1004.

When multiple satellites are in view (see FIG. 3), the GPS receiver 706 can read each of their navigation messages and compute the position of the antenna 702 using triangulation methods. The accuracy of the process is in part dependent on how many satellites are in view. Each satellite in view increases the accuracy of the process.

The IRU 904 comprises laser gyroscopes and accelerometers which produce position, velocity, roll, pitch, and yaw data. The IRU 904 combines this information into an estimate of the vehicle position. The odometer 902 produces distance traveled. The data from the IRU 904 and the odometer 902 are also transmitted to the VPS main processor 1004.

The VPS main processor 1004 combines the data from the MPS 900 (the IRU 904 and the odometer 902) with the estimated position from the GPS processing system 700 to produce a more accurate position.

Figure 3:
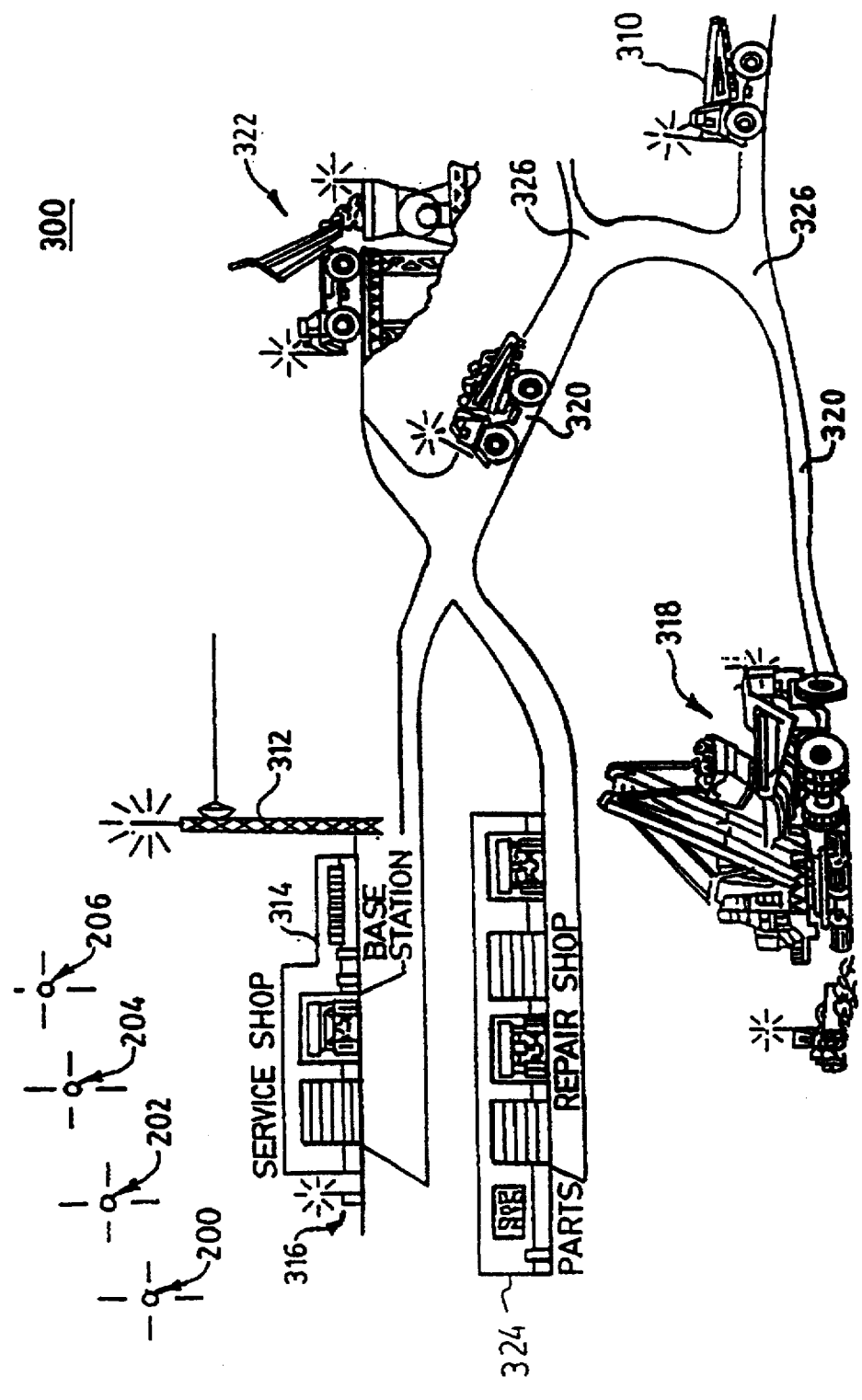
FIG. 3 is a diagrammatic view of a typical autonomous work site in which the present invention is practiced.

Referring now to FIG. 3, a base station 314 provides a geographic proximate reference point for the VPS 1000. The base station 314 includes its own GPS receiver 706 for reading the data transmitted by the satellites. Using the transmitted data, the base station 314 allows the VPS 1000 to make satellite based accuracy improvements on the estimated of the vehicle position.

Figure 18:
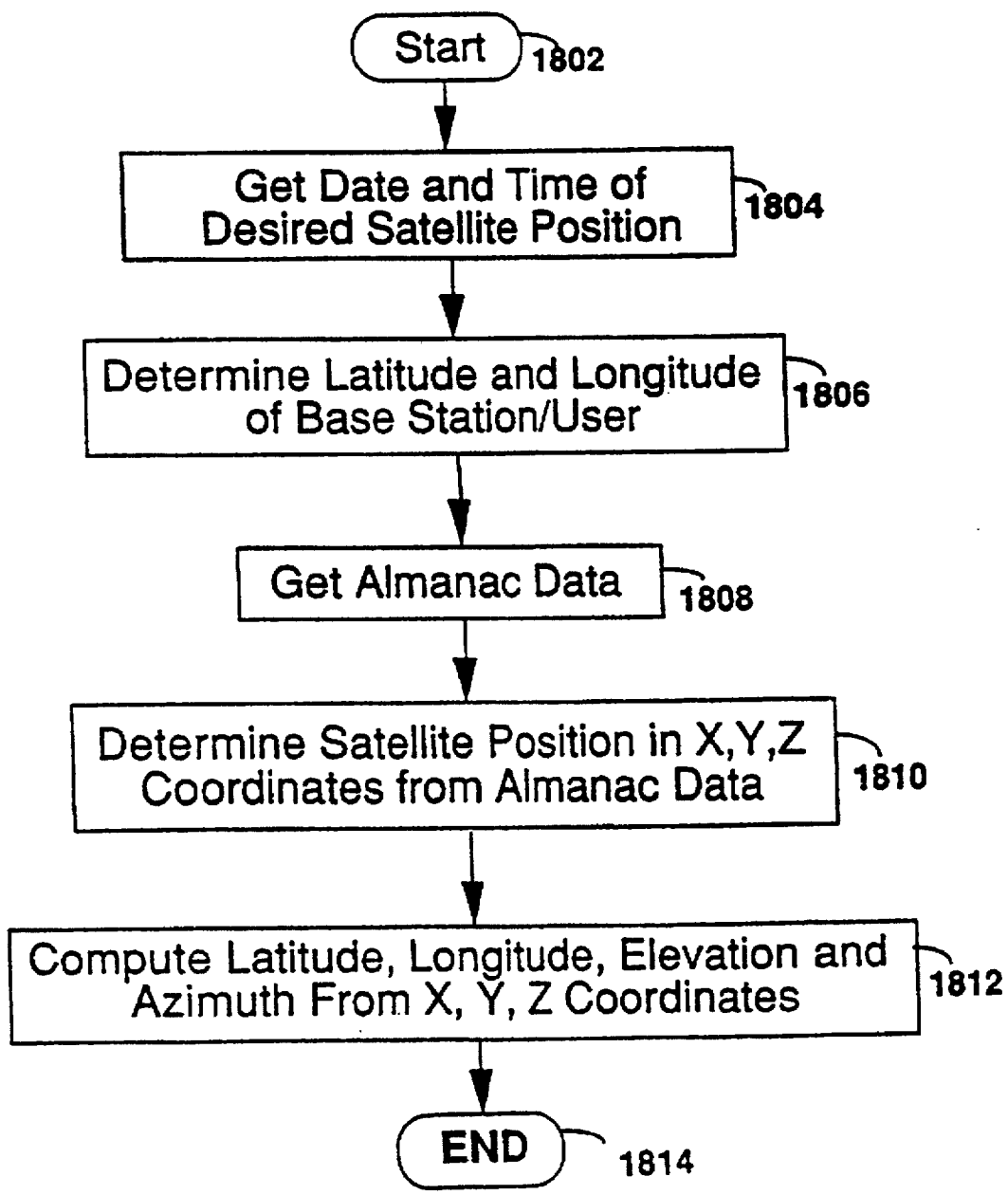
FIG. 18 is a flowchart of the method for Satellite Position Prediction.

The present invention includes a method (as shown in the flowchart of FIG. 18) to predict the position of any satellite at the current time or any future time. Given an estimate of the position of the GPS antenna 702, the GPS receiver 706 can predict which satellites it will be able to read at any time. Using that information, the GPS receiver 706 can determine the optimum satellite constellation.

The present invention also includes a method for reducing vehicle "wandering" and spurious position computations. In this method, the path history of the vehicle is used to statistically determine the accuracy of future estimates.

The present invention also includes a method for determining if the data received from the satellites is valid. The GPS receiver 706 determines the distance from the satellite to the GPS receiver 706 based on the data being transmitted by each satellite. The GPS receiver 706 compares this determined distance with an expected distance based on the time and an estimated position. If the distances are within a given range, then the data from satellites is assumed to be valid. Otherwise, the data is adjusted such that the determined distance between the satellite and the GPS receiver is within the given range.

B. Global Positioning System (GPS)

1. GPS Space Segment

As shown in FIG. 1, 24 man-made electronic satellites which make up the global positioning system (GPS) are planned for deployment by the early 1990s. As currently envisioned, the satellites will orbit the Earth at an altitude of approximately 10,900 miles and encircle the globe twice a day. With this conventional GPS system, it will be possible to determine terrestrial position within 15 meters in any weather, any time, and most areas of the Earth.

As of the date of the filing of this application, there are known to be seven experimental GPS satellites in orbit, and several manufacturers that are building GPS receivers. Until additional satellites are deployed and operational, there are only two windows each day when three or more satellites are available for position tracking. The location of these satellites (and all others once deployed) is very predictable and can be plotted in terms of elevation and azimuth.

Reference is again made to FIG. 1 of the drawings wherein the configuration of the fully operational GPS system is schematically illustrated. Twenty-four (twenty-one operational, three spare) medium orbiting satellites in six sets of orbits continuously transmit unique identifying signals on a common carrier frequency.

Each of the 24 satellites transmits a unique navigation signal which can be used to determine the terrestrial position of an Earth antenna sensitive to the signal. The navigation signal is comprised of a data bit stream which is modulated with a pseudo-random type binary code which biphase modulates the carrier frequency.

In the coarse acquisition (C/A) mode, each satellite has an established unique pseudo-random code, which is a gold code sequence having a length of 1,023 chips that repeats itself once every millisecond. To facilitate separation of different satellite's signals, the gold code sequence for each satellite has a low correlation with the gold code sequence from the other satellites.

In the carrier mode, the data transmitted by the satellites is encoded on the carrier frequency in a manner similar to the C/A code. In the carrier mode, more data can be encoded and therefore more precise position computations can be made.

A GPS receiver can decode a navigation signal whose gold code sequence highly correlates to an identical gold code sequence generated by the GPS receiver. The separation of the different satellite's signals from a common carrier is based on cross correlation of the signal with the locally generated gold code sequences, on a chip by chip basis, and then within a chip, until the maximum cross correlation value is obtained; the gold code sequence which maximizes this value can be used to extract the navigation data which is used in determining position of the receiving antenna.

Figure 2:
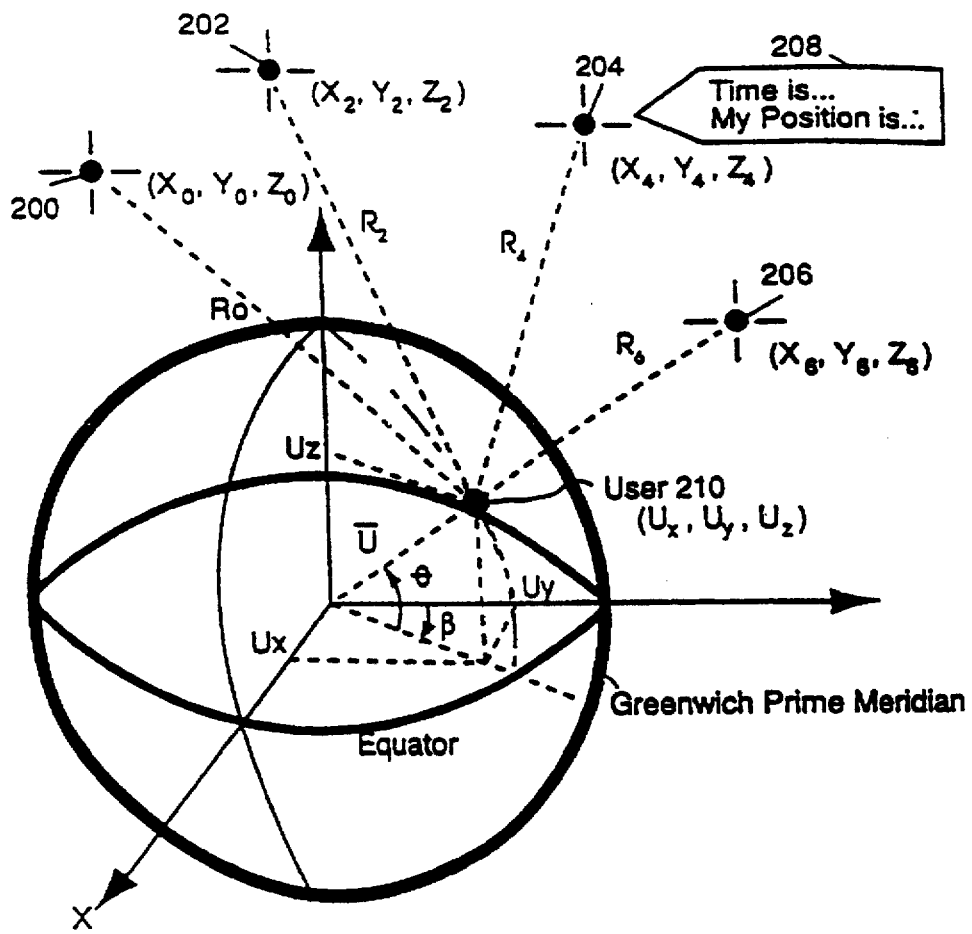
FIG. 2 is a diagrammatic view illustrating the GPS navigation equations.

Turning now to FIG. 2, a diagrammatic representation of the GPS in operation is shown. Four satellites 200, 202, 204, 206 comprise the current group (constellation) of satellites in the view of the Earth antenna (user 210).

As is shown in the description block 208, each satellite is transmitting a navigation signal that includes timing (GPS time) and ephemeris (satellite position) data. Using the navigation equations 212, which are well-known in the art, and the timing and ephemeris data from the navigation signal, the position of the user 210 can be determined.

2. GPS System Operation

Figure 6:
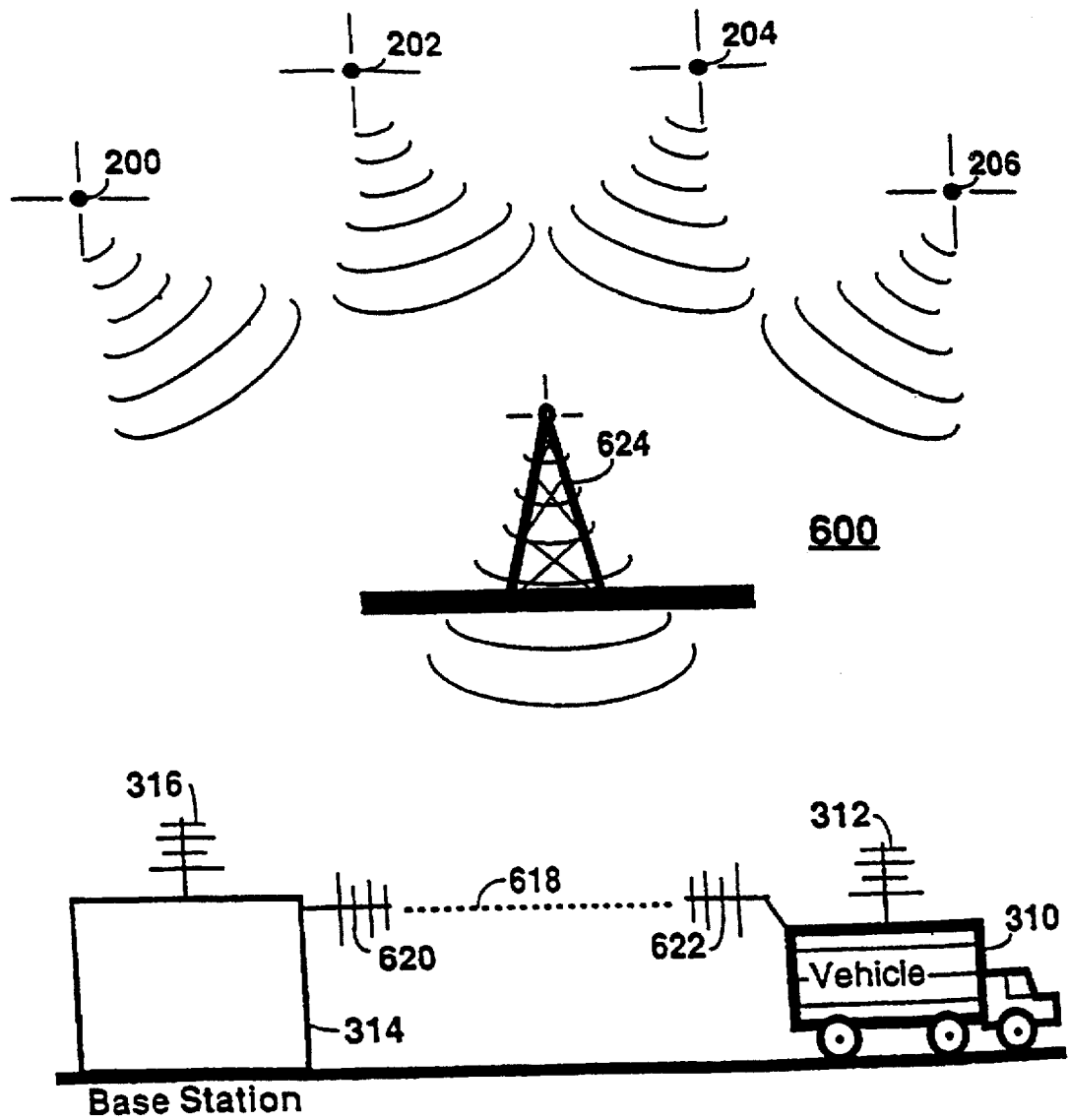
FIG. 6 is a diagrammatic representation of the operation of a Global Positioning System (GPS), including a satellite constellation, A pseudolite, the base station and a vehicle.

Turning now to FIG. 6, a representative GPS system is shown in operation. Four GPS satellites 200, 202, 204 and 206 are transmitting navigation signals in which satellite position (ephemeris) data and transmission time data are encoded. Both a vehicle 310 and a base station 314 are receiving these signals from each of these satellites on their respective GPS antennas 312 and 316. In a preferred embodiment, both the C/A code and the carrier frequency are received at GPS antennas 312 and 316 for processing.

In addition to the four GPS satellites shown in the FIG. 6, a radio transmitter 624 is also depicted. This radio transmitter 624 is commonly known as a pseudolite. These pseudolites, in one embodiment of the present invention, can be strategically placed around the perimeter of a mine pit and emulate the GPS satellites as shown in FIG. 6. This arrangement can be extremely useful in situations such as a mine pit or mine shaft, in which mining vehicles may be out of view of one or more of the GPS satellites, because of topographic features such as high mine pit walls. These ground based pseudolites provide additional ranging signals and can thus improve availability and accuracy of the positioning capability in the present invention.

The pseudolites are synchronized to the GPS satellites and have a signal structure that while may be different are compatible with the GPS satellites. Note that when ranging to pseudolites, the ranging error does not include selective availability nor ionospheric errors. However, other errors must be accounted for such as tropospheric, pseudolite clock error and multipath errors.

In a deep pit surface mining operation, the view of the sky is limited by the walls of the mine and an inadequate number of satellites may be in view for position determination. In such a case in the present invention, one or more pseudolites would be placed on the rim of the mine and used with a vehicle with the visible satellites to obtain accurate vehicle position.

Transmission channel 618 represents the electromagnetic communications channel linking the base station 314 and the vehicle 310. The transmission channel 618 is used to transfer data between the base station 314 and the vehicle 310. This transmission channel 618 is established by data-radios 620 and 622 which are transmitter/receivers.

The data-radios 620 and 622 are located at the base station 314 and vehicle 310 respectively, and are responsible for transferring various data between the base station 314 and the vehicle 310. The type of data transferred will be discussed further below. No physical medium (for example, copper wire, optical fiber) is necessary to conduct the transmission of data.

A radio transmitter/receiver which functions appropriately with the present invention can be found in the art. Such a preferred radio transmitter/receiver is commercially available from Dataradio Ltd. of Montreal, Canada, Model Number DR-4800BZ.

Figure 7:
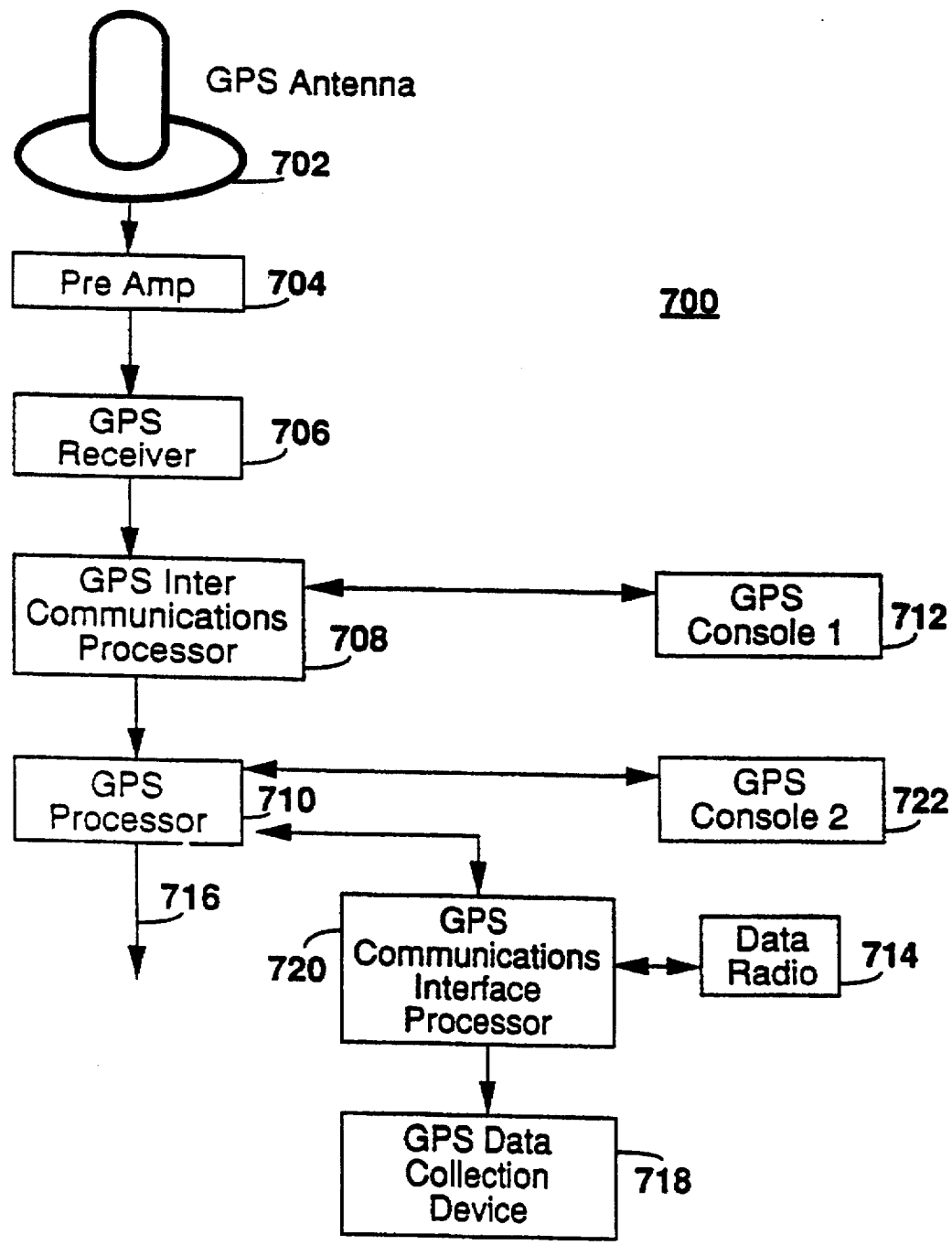
FIG. 7 is a block diagram representing the GPS Processing System.

Turning now to FIG. 7, a preferred embodiment of a GPS processing system 700 is shown. The GPS processing system 700 on the vehicle 310 includes a GPS antenna 702. In a preferred embodiment, the GPS antenna 702 is receptive to the radio spectrum of electro-magnetic radiation. However, the present invention contemplates reception of any signal by which GPS satellites might encode the navigation data.

An antenna receptive to the radio spectrum used by GPS satellites which functions satisfactorily with the present invention can be found in the art. Such a preferred antenna is commercially available from Chu Associates Inc. of Littleton, Mass., Model #CA3224.

The GPS antenna 702 is coupled to a pre-amplifier 704 so that the signals received at the GPS antenna 702 can be transmitted to the pre-amplifier 704. The present invention contemplates any method by which the GPS antenna 702 can be satisfactorily coupled to the pre-amplifier 704. Further, as will be noted at numerous places below, all devices in the GPS processing system 700, MPS processing system 900 and VPS processing system 1000 are coupled. The present invention contemplates any method by which these devices can be satisfactorily coupled.

Such coupling methods may include for example, electronic, optic, and sound methods as well as any others not expressly described herein. In a preferred embodiment, the coupling method used is electronic and adheres to any one of numerous industry standard interfaces.

The pre-amplifier 704 amplifies the signal received from the GPS antenna 702 so that the signals can be processed (decoded). The present invention contemplates any method by which the received signals can be amplified.

A pre-amplifier which functions satisfactorily with the present invention can be found in the art. Such a preferred pre-amplifier is commercially available from Stanford Telecommunications Inc. (STel) of Santa Clara, Calif., Model Number 5300, Series GPS RF/IF.

The pre-amplifier 704 is coupled to a GPS receiver 706. The GPS receiver 706 decodes and processes the navigation message sent from the satellites in the view of the GPS antenna 702. During this processing, the GPS receiver 706 computes the latitude, longitude, and altitude of all satellites in the particular constellation being viewed. The GPS receiver 706 also computes pseudoranges, which are estimates of the distances between the satellites in the currently viewed constellation and the GPS antenna 702. In a preferred embodiment, the GPS receiver 706 can process, in parallel, pseudoranges for all satellites in view.

In a preferred embodiment of the present invention, the GPS receiver 706 produces this data when four or more satellites are visible. In a preferred embodiment of the present invention, the GPS processing system 700 can compute a position having an accuracy of approximately 25 meters when an optimal constellation of 4 satellites is in view. In another preferred embodiment of the present invention, the GPS processing system 700 can compute a position having an accuracy of approximately 15 meters when an optimal constellation of 5 satellites is in view. An optimal constellation is one in which the relative positions of the satellites in space affords superior triangulation capability, triangulation technology being well known in the art.

In a preferred embodiment of the present invention, the GPS receiver 706 encodes in the outputted position data the number of satellites currently being viewed for each position computation made. In cases in which the number of satellites viewed for a series of position computations is four, the VPS weighted combiner 1204 (see FIG. 12 and discussion) uses only the first position computation received in the series. All subsequent position computations in the series are ignored by the VPS weighted combiner 1204. The VPS weighted combiner 1204 acts in this manner because position computations derived from four satellites are less accurate than nominally acceptable.

A receiver that functions satisfactorily in the present invention can be found in the art. Such a receiver is commercially available from Stanford Telecommunications Inc., Model Number 5305-NSL.

The GPS receiver 706 is coupled to a GPS inter communication processor 708. The GPS inter communication processor 708 is also coupled to a GPS processor 710 and a GPS Console 1 712. The GPS inter communication processor 708 coordinates data exchange between these three devices. Specifically, The GPS inter communication processor 708 receives pseudorange data from the GPS receiver 706 which it passes on to the GPS processor 710. The GPS inter communication processor 708 also relays status information regarding the GPS receiver 706 and the GPS processor 710 to the GPS Console 1 712.

An inter communication processor that functions satisfactorily with the present invention can be found in the art. Such a preferred inter communication processor is commercially available from Motorola Computer Inc. of Cupertino, Calif., Model Number 68000.

Figure 8:
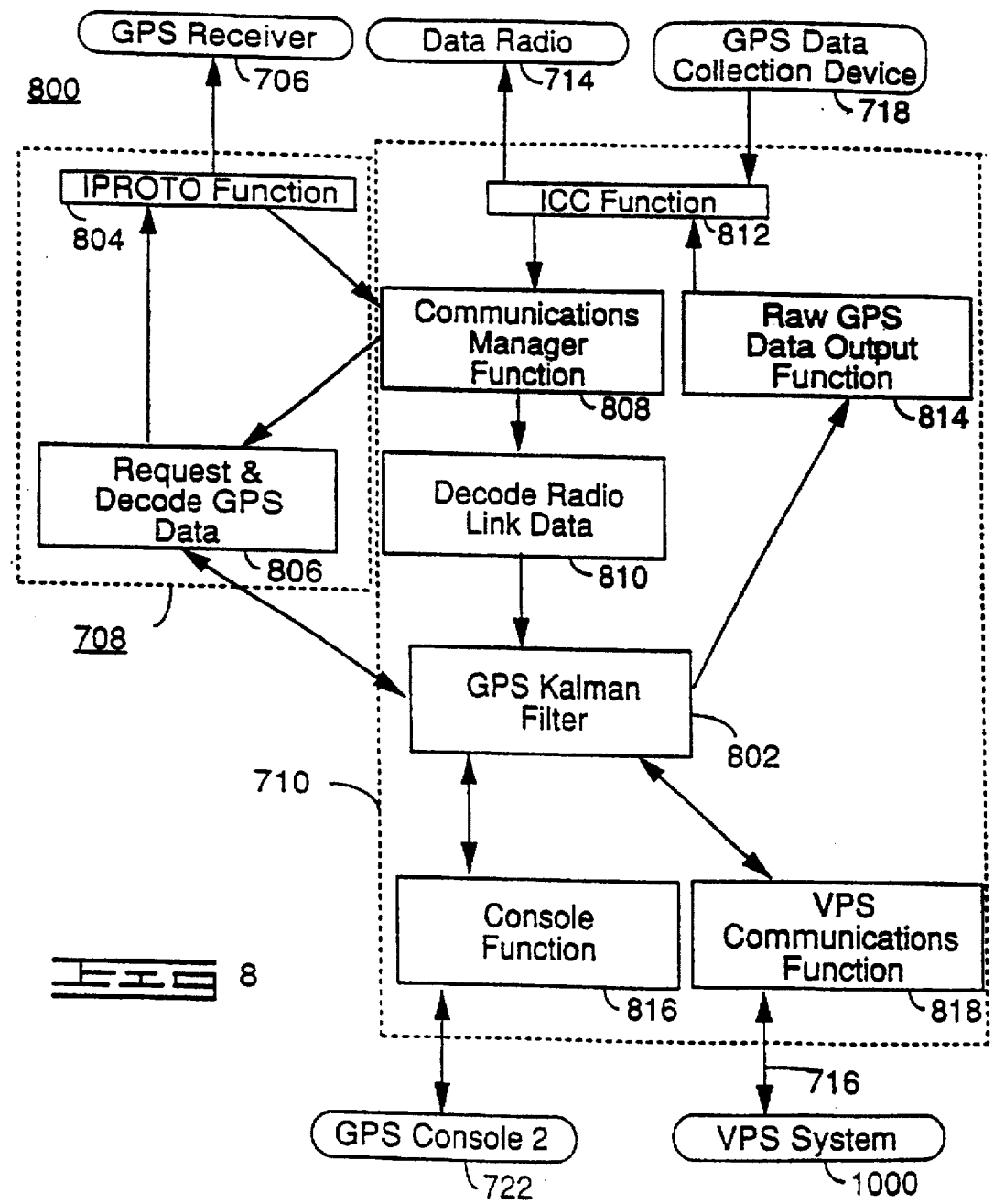
FIG. 8 is a flow diagram illustrating communications in one embodiment of the GPS Processing System of FIG. 7.

The GPS processor 710 is passed the satellite location and pseudorange data from the GPS inter communication processor 708. Turning now to FIG. 8, the operation of the GPS processor is depicted. The GPS processor 710 uses methods to process this data including a GPS kalman filter 802 (see FIG. 8) which filters out noise buried in the pseudorange data, including ionospheric, clock, and receiver noise. The GPS kalman filter 802 also reads biases (discussed further below) transmitted by the base station 314 to the GPS processor 710.

Processor hardware that functions satisfactorily with the present invention as the GPS processor 710 can be found in the art. Such hardware is commercially available from Motorola Computer Inc., Model Number 68020. The software in the GPS processor 710, in a preferred embodiment, functions in the following way.

In a preferred embodiment, this GPS kalman filter 802 is semi-adaptive and therefore automatically modifies its threshold of acceptable data perturbations, depending on the velocity of the vehicle 310. This optimizes system response and accuracy of the present invention as follows.

Generally, when the vehicle 310 increases velocity by a specified amount, the GPS kalman filter 802 will raise its acceptable noise threshold. Similarly, when the vehicle 310 decreases its velocity by a specified amount the GPS kalman filter 802 will lower its acceptable noise threshold. This automatic optimization technique of the present invention provides the highest degree of accuracy under both moving and stationery conditions.

In the best mode of the present invention, the threshold of the GPS kalman filter 802 does not vary continuously in minute discreet intervals. Rather, the intervals are larger and, therefore, less accurate than a continuously varying filter. However, the kalman filter 802 of the present invention is easy to implement, less costly and requires less computation time than a continuously varying filter. However, such a continuously varying filter could be used.

The GPS kalman filter 802 must be given an initial value from the user at system start-up. From this value, and data collected by the GPS receiver 706, the GPS kalman filter 802 extrapolates the current state (which includes position and velocities for northing, easting and altitude) to the new "expected" position. This extrapolated position is combined with new GPS data (an update) to produce the a current state. The way the data is utilized is dependent on an a priori saved file called a control file (not shown). This file will determine (1) how much noise the system is allowed to have, (2) how fast the system should respond, (3) what are the initial guesses for position and velocity, (4) how far off the system can be before a system reset occurs, (5) how many bad measurements are allowed, and/or (6) how much time is allotted between measurements.

The GPS processor 710 then computes position, velocity, and time using the filtered data and biases. However, the GPS processor 710 discards the computed velocity datum when the C/A code rather than the carrier is processed by the GPS receiver 706 because experimentation has shown that this datum is not accurate.

Velocity data derived from the carrier frequency is not discarded because it is much more accurate than the C/A code velocity data. The computed position and time data (and velocity data if derived from the carrier frequency) are encoded on GPS Signal 716 and sent on to the VPS main processor 1004 shown on FIG. 10.

In a preferred embodiment of the present invention, the GPS processor 710 reads both of these codes depending on the availability of each. Unlike data transmitted using the C/A code, the carrier frequency data transmitted by the satellite is available from the GPS receiver 706 at approximately 50 hz (not approximately 2 hz.) This increased speed allows the present invention to produce more precise position determinations with less error.

A preferred embodiment of other functions of the GPS processor 710 is shown in FIG. 8. However, the present invention contemplates any method by which data transmitted by GPS satellites can be processed. As shown at a block 816, a console function controls the operation of the GPS console 2. This console function regulates the operation of the GPS kalman filter 802 by providing the user interface into the filter.

The VPS communications function shown at a block 818, controls the outputs of the GPS kalman filter 802 which are directed to the VPS system 1000. At a block 806, it is shown that the GPS kalman filter 802 requests and decodes data from the GPS receiver 706, which data is routed through an IPROTO function shown at a block 804. The IPROTO function is not a function of the GPS processor, as indicated on FIG. 8 by the dashed line. Rather, the IPROTO function resides on the GPS inter communications processor 708 and executes tasks associated with the GPS inter communications processor 708. An IPROTO function that operates satisfactorily with the present invention can be found in the art. One model is commercially available from Xycom Inc., model number XVME-081.

As shown at a block 810 the data transmitted over the transmission channel 618 is decoded and transmitted into the GPS kalman filter 802. The communications manager function shown at a block 808, coordinates the incoming data from the IPROTO function. The communications manger function 808 also coordinates data received from an ICC function which is shown in a block 812. The ICC function 812 exchanges data with the data-radio 714 and the GPS data collection device 718 as shown.

The GPS console 1 712, is well known in the art. Many types of devices are commercially available which provide the desired function. One such device is commercially available from Digital Equipment Corporation of Maynard, Mass., Model Number VT220. The GPS Console 1 712 displays processor activity data regarding GPS inter communication processor 708, and GPS processor 710.

The GPS processor 710 is coupled to a GPS Console 2 722 and a GPS communications interface processor 720. The GPS console 2 722, is well known in the art. Many types of devices are commercially available which provide the desired console function. One such device is commercially available from Digital Equipment Corporation of Maynard, Mass., Model Number VT220. The GPS console 2 722 provides the user interface from which the GPS processor 710 can be activated and monitored.

The GPS communications interface processor 720 is coupled to a data-radio 714 and a GPS data collection device 718. The GPS communications interface processor 720 coordinates data exchange between the GPS processor 710 and both the data-radio 714 and the GPS data collection device 718. A communications interface processor which functions appropriately can be found in the art. A preferred communications interface processor is commercially available from Motorola Computer Inc., Model Number MVME331.

The data-radio 714 communicates information from the GPS processor 710 (through the GPS communications interface processor 720) to a similar data-radio 620 located at the base station 314 (see FIG. 6). In a preferred embodiment, the data-radio 714 communicates synchronously at 9600 baud. These data-radios provide periodic updates on the amount of bias (as detected by the base station 314) are transmitted to the vehicle 310 at a rate of twice a second. Base station 314 computed bias will be discussed further below.

The GPS data collection device 718 can be any of numerous common electronic processing and storage devices such as a desktop computer. The International Business Machines Corporation (IBM) PC available from IBM of Boca Raton, Fla., can be used.

C. Motion Positioning System (MPS)

In a preferred embodiment, the present invention also includes the combination of inertial reference unit (IRU) 904 and odometer 902 components. These together with a processing device 906 comprise the motion positioning system (MPS) 900. IRUs and odometers are well known in the field, and are commercially available from Honeywell Inc. of Minneapolis, Minn., Model Number H61050-SR01, and from Caterpillar Inc. of Peoria, Ill., Part Number 7T6337 respectively.

Figure 9:
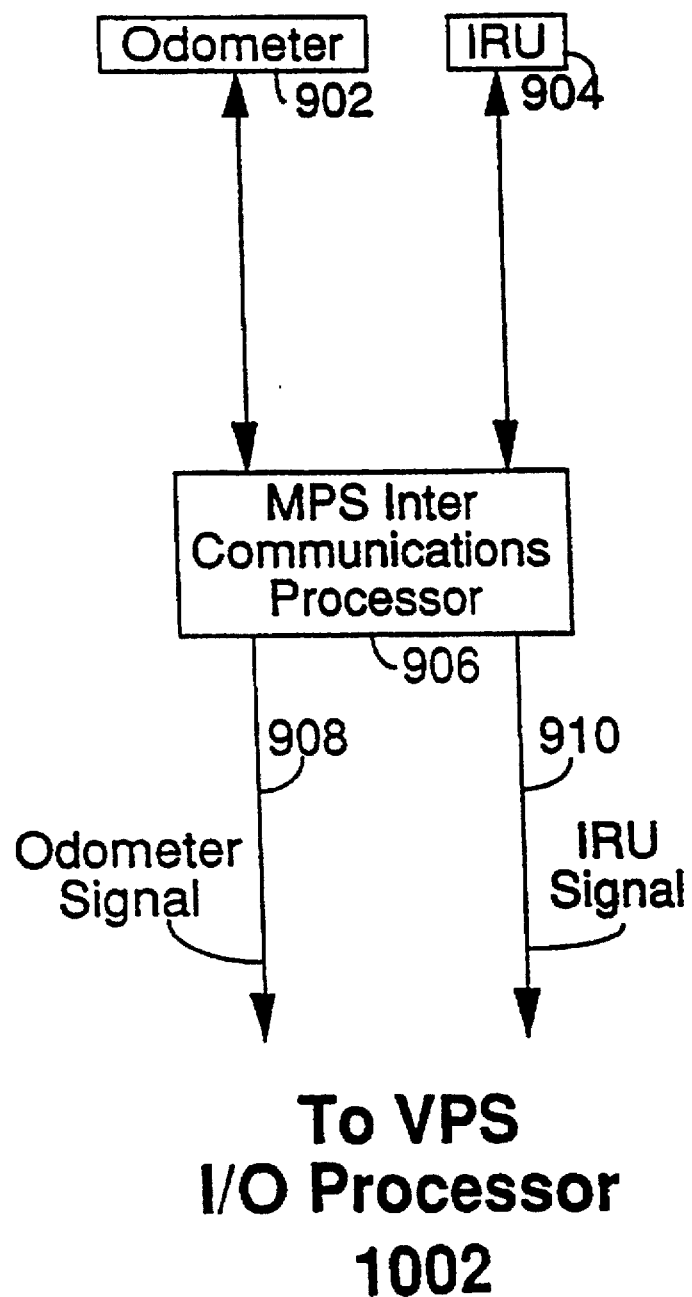
FIG. 9 is a block diagram illustrating the Motion Positioning System (MPS) including the Inertial Reference Unit and the Odometer.

Turning now to FIG. 9, a preferred embodiment of the motion positioning system 900 is depicted. A Vehicle odometer 902 and an IRU 904 are coupled to the MPS inter communications processor 906.

The IRU 904 comprises laser gyroscopes and accelerometers of known design. An IRU which can satisfactorily be used in the present invention is a replica of the system used by Boeing 767 aircrafts to determine position, except that the system used in the present invention has been modified to account for the lesser dynamics (for example, velocity) that the vehicles of the present invention will be exhibiting compared to that of a 767 aircraft.

In a preferred embodiment, the IRU 904 outputs position, velocity, roll, pitch, and yaw data at rates of 50 hz (fifty (50) times a second); the vehicle odometer 902 outputs distance traveled at 20 hz.

The laser gyroscopes of the IRU 904, in order to function properly, must be given an estimate of vehicle latitude, longitude and altitude. Using this data as a baseline position estimate, the gyroscopes then use a predefined calibration in conjunction with forces associated with the rotation of the earth to determine an estimate of the vehicle's current position.

This information is then combined by the IRU 904 with data acquired by the IRU 904 accelerometers to produce a more accurate estimate of the current vehicle position. The combined IRU 904 data and the vehicle odometer 902 data are transmitted to the MPS inter communications processor 906.

The MPS inter communications processor 906 forwards the IRU and odometer data on to the VPS I/O processor 1002 (see FIG. 10), as shown at signals 910 and 908, respectively.

An inter communications processor that functions satisfactorily with the present invention can be found in the art. Such a preferred inter communications processor is commercially available from Motorola Computer Inc., Model Number 68000.

The present invention contemplates any method by which the signals 716, 908 and 910 can be received by the VPS I/O processor 1002 from the GPS system 700 and MPS system 900 and forwarded on to the VPS main processor 1004. An I/O processor which functions satisfactorily with the present invention can be found in the art. Such an I/O processor is commercially available from Motorola Computer Inc., Model Number 68020.

D. Vehicle Positioning System (VPS) Architecture

Figure 10:
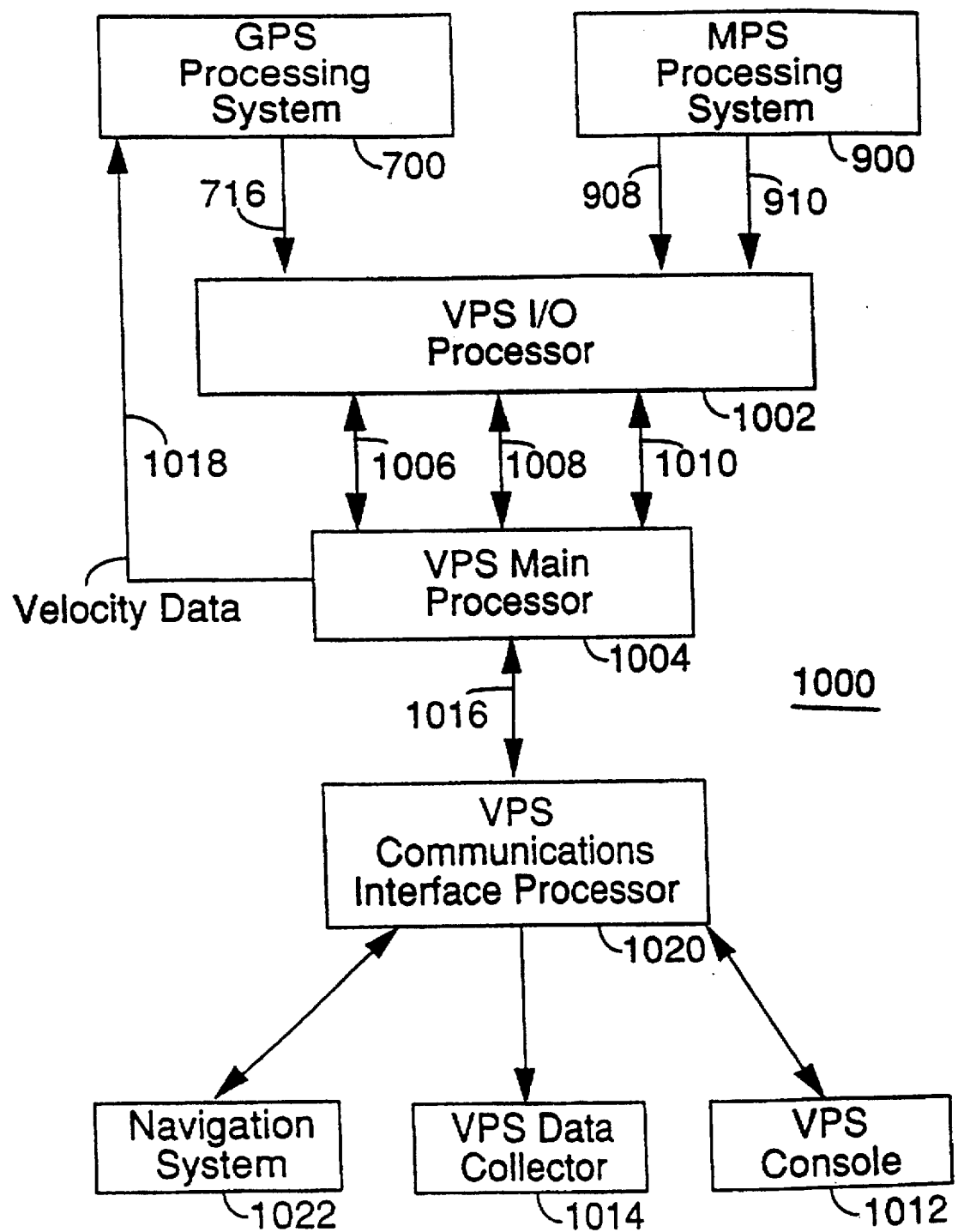
FIG. 10 is a block diagram illustrating one embodiment of the VPS System Architecture.
Figure 11:
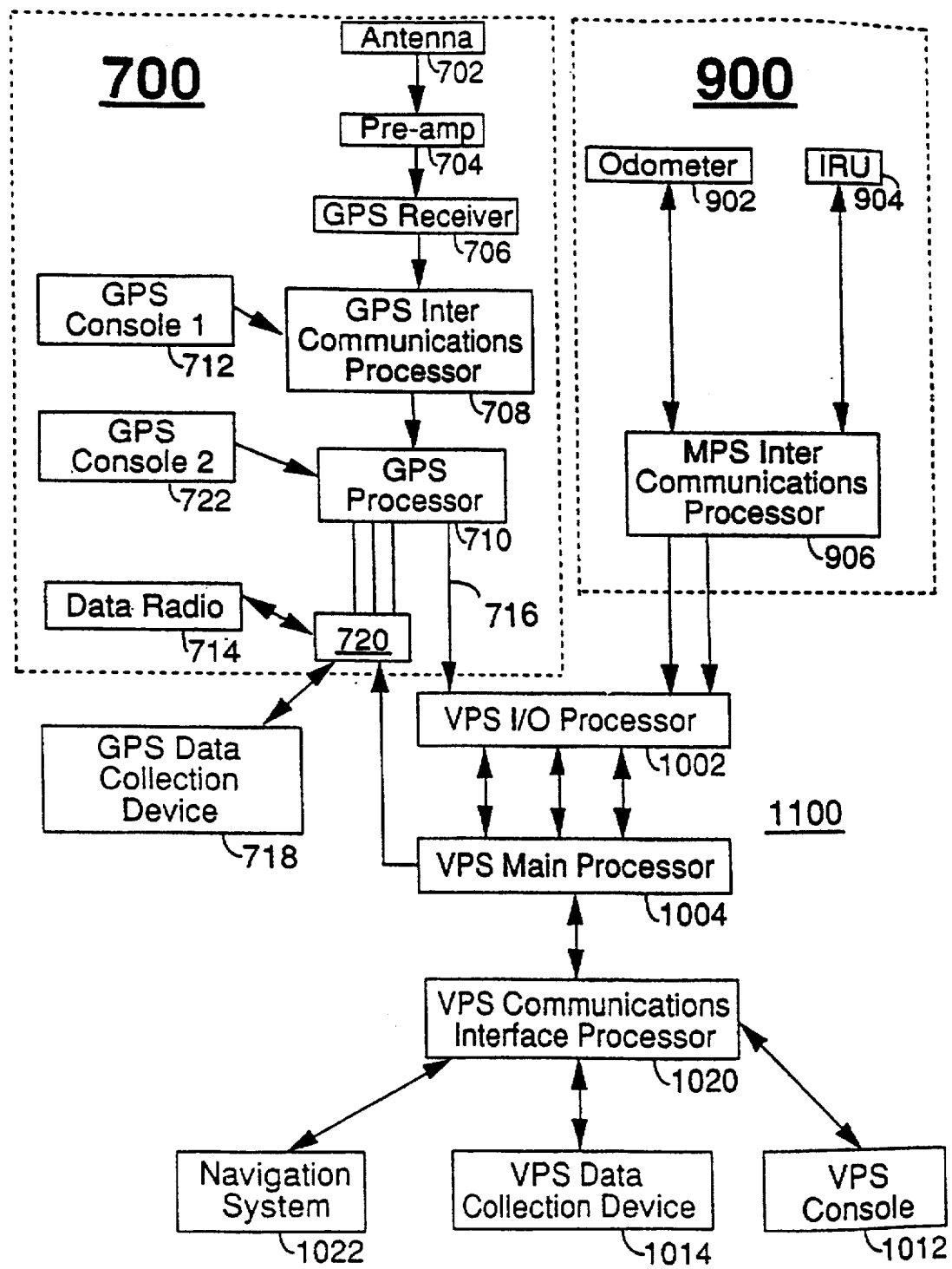
FIG. 11 is a detailed block diagram of the embodiment of the VPS System Architecture of FIG. 10.

Turning now to FIG. 10, a preferred embodiment of the VPS system architecture 1000 is depicted. FIG. 11 shows a diagram of the same VPS system architecture 1000, with the GPS processing system 700 and MPS processing system 900 in detail.

GPS processing system 700 and MPS processing system 900 are independently coupled to the VPS I/O processor 1002. Because they are independent, the failure of one of the systems will not cause the other to become inoperative. Thus, if the GPS processing system 700 is not operative, data will still be collected and processed by the MPS processing system 900 and the VPS 1000. GPS processing system 700 and MPS processing system 900 transmit signals 716, 908, 910 to the VPS I/O processor 1002, as shown. These signals contain position, velocity, time, pitch, roll, yaw, and distance data (see FIGS. 7 and 9 and associated discussions).

The VPS I/O processor 1002 is coupled to the VPS main processor 1004. The VPS I/O processor 1002 transmits signals 1006, 1008, and 1010 to the VPS main processor 1004, as shown. These signals contain the GPS, IRU and odometer data noted above.

Figure 12:
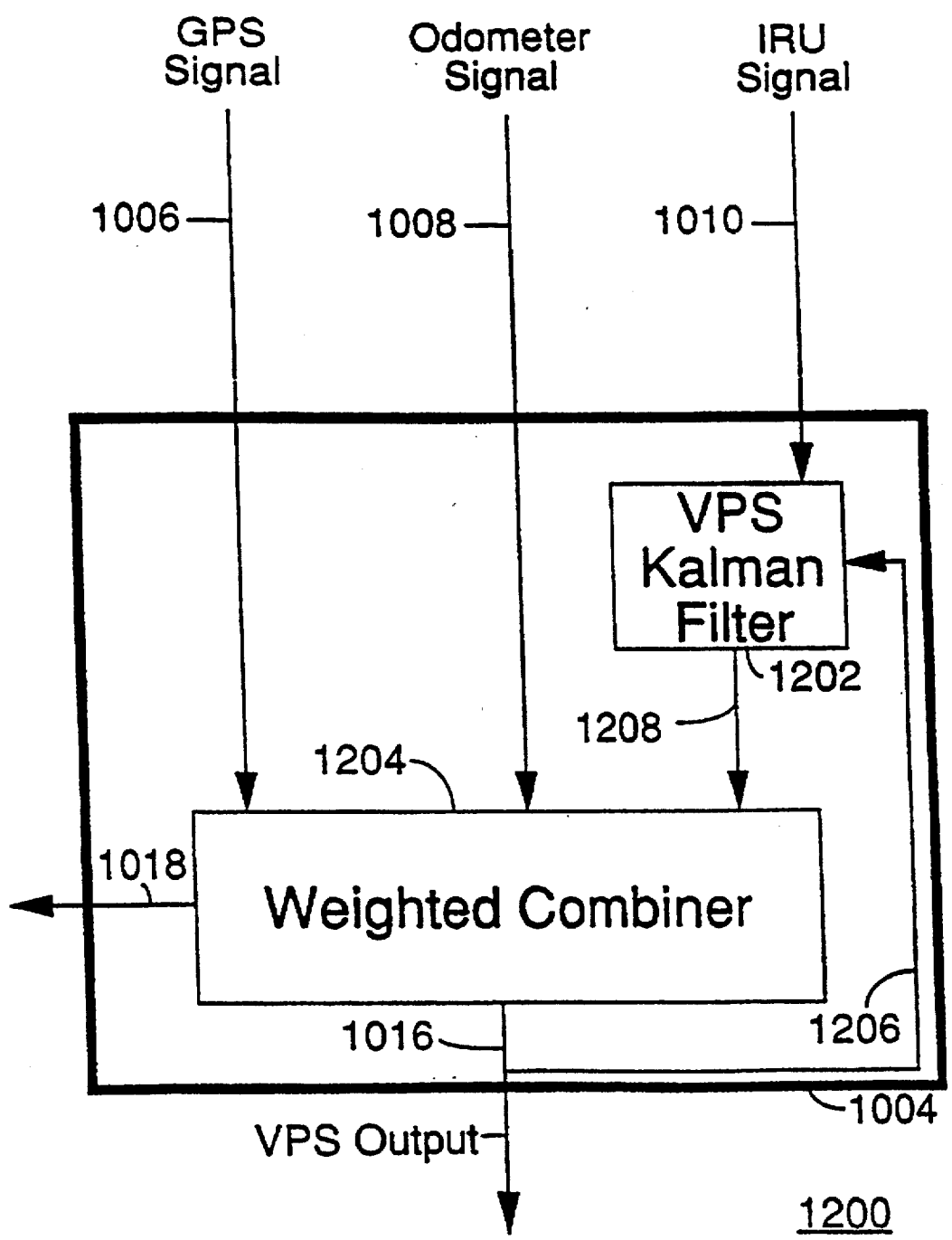
FIG. 12 is a block diagram of one embodiment of the VPS Main Processor of FIG. 10 showing the VPS Kalman Filter and the Weighted Combiner.

Turning now to FIG. 12, a preferred embodiment of the operation of the VPS main processor 1004 is depicted. As shown, the GPS signal 1006, and the odometer signal 1008 are transmitted into a weighted combiner 1204. The IRU signal 1010 is transmitted into a VPS kalman filter 1202. In a preferred embodiment, the GPS signal 1006 is transmitted at a rate of 2 Hz.; the Odometer signal 1008 is transmitted at a rate of 20 hz.; the IRU signal 1010 is transmitted at a rate of 50 hz.

The VPS kalman filter 1202 processes the IRU signal 1010 and filters extraneous noise from the data. The VPS kalman filter 1202 also receives a signal from the weighted combiner 1204, as shown, which is used to reset the VPS kalman filter with new position information.

The weighted combiner 1204 processes the signals and gives a predetermined weighing factor to each datum based on the estimated accuracy of data gathering technique used. Thus, in the best mode of the present invention, the position component of the GPS signal 1006 is weighted heavier than the position component of the IRU signal 1010. This is because GPS position determination is inherently more accurate than IRU position determination.

However, velocity can be more accurately determined by the IRU, and therefore the IRU velocity component is weighted heavier than the GPS velocity component in the best mode of the invention.

The weighted combiner 1204 produces two outputs. One output contains all computed data and is sent to two locations: as shown at an arrow 1206, to the VPS kalman filter 1202; and as shown at the arrow 1016, out of the VPS main processor 1004. The second output shown at the arrow 1018 contains only velocity data and is sent out of the VPS main processor 1004 to the GPS processing system 700. The output shown at the arrow 1016 contains GPS time, position, velocity, yaw, pitch, and roll data and is transmitted at a rate of 20 hz.

The present invention contemplates any method by which the signals 1006, 1008, and 1010 can be processed at the VPS main processor 1004 in accordance with the above noted process steps. Processor hardware that functions satisfactorily with the present invention as the VPS main processor can be found in the art. Such hardware is commercially available from Motorola Computer Inc., Model Number 68020. The software in the VPS main processor 1004, in a preferred embodiment, functions as described above.

Referring now back to FIG. 10, the VPS main processor 1004 is coupled to a VPS communications interface processor 1020.

A communications interface processor which functions satisfactorily with the present invention can be found in the art. One preferred model is commercially available from Motorola Computer Inc., Model Number MVME331.

In a preferred embodiment, the VPS communications interface processor 1020 is coupled to, and routes the data contained in Output 1016 (at 20 hz.) to, three different devices: (1) a VPS console 1012, (2) a data collection device 1014, and (3) a navigation system 1022.

The VPS console 1012 is well known in the art, and is commercially available from Digital Equipment Corporation, of Minneapolis, Minn., Model Number VT220. This VPS console 1012 is used to display the current status of the VPS main processor 1004.

The VPS data collection device 1014 can be any of numerous common electronic processing and storage devices such as a desktop computer. The Macintosh computer available from Apple Computer of Cupertino, Calif., can be used successfully.

The navigation system 1022 comprises the features associated with the navigational capabilities of the present invention. The VPS system 1000 transmits its final data regarding vehicle position etc. to the navigation system 1022 at this point.

E. Base Station

Referring back to FIG. 7, the present invention includes GPS components at the base station 314 that are identical to those which comprise the GPS processing system 700 (as shown on FIG. 7). The purpose of the base station 314 is to (1) monitor the operation of the vehicles, (2) provide a known terrestrial reference location from which biases can be produced, and (3) provide information to the vehicles when necessary, over a high-speed data transmission channel 618.

In a preferred embodiment of the present invention, the base station 314 will be located within close proximity to the vehicle 310, preferably within 20 miles. This will provide for effective radio communication between the base station 314 and the vehicle 310 over the transmission channel 618. It will also provide an accurate reference point for comparing satellite transmissions received by the vehicle 310 with those received by the base station 314.

A geographically proximate reference point is needed in order to compute accurate biases. Biases are, in effect, the common mode noise that exists inherently in the GPS system. Once computed at the base station 314, these biases are then sent to the vehicle 310 using the data-radios 714 (as shown in FIG. 7). The biases are computed using various methods which are discussed further below.

In a preferred embodiment of the present invention, a host processing system 402 is located at the base station 314 to coordinate the autonomous activities and interface the VPS system 1000 with human supervisors.

F. Satellite Based Accuracy Improvements

The present invention improves the position determining accuracy of the vehicle positioning system 1000 capability through a number of differential techniques. These techniques are designed to remove errors (noise) from the pseudoranges that are calculated by the GPS receiver 706. The removal of this noise results in more precise position determination.

In a preferred embodiment, the base station 314 GPS processing system 700 is responsible for executing these differential techniques. The term "differential" is used because the base station 314 and the vehicle 310 use independent but virtually identical GPS Systems 700. Because the base station 314 is stationary and its absolute position is known, it serves as a reference point from to measure electronic interference (noise) and other error inducing phenomena.

1. Constellation Effects

Figure 13:
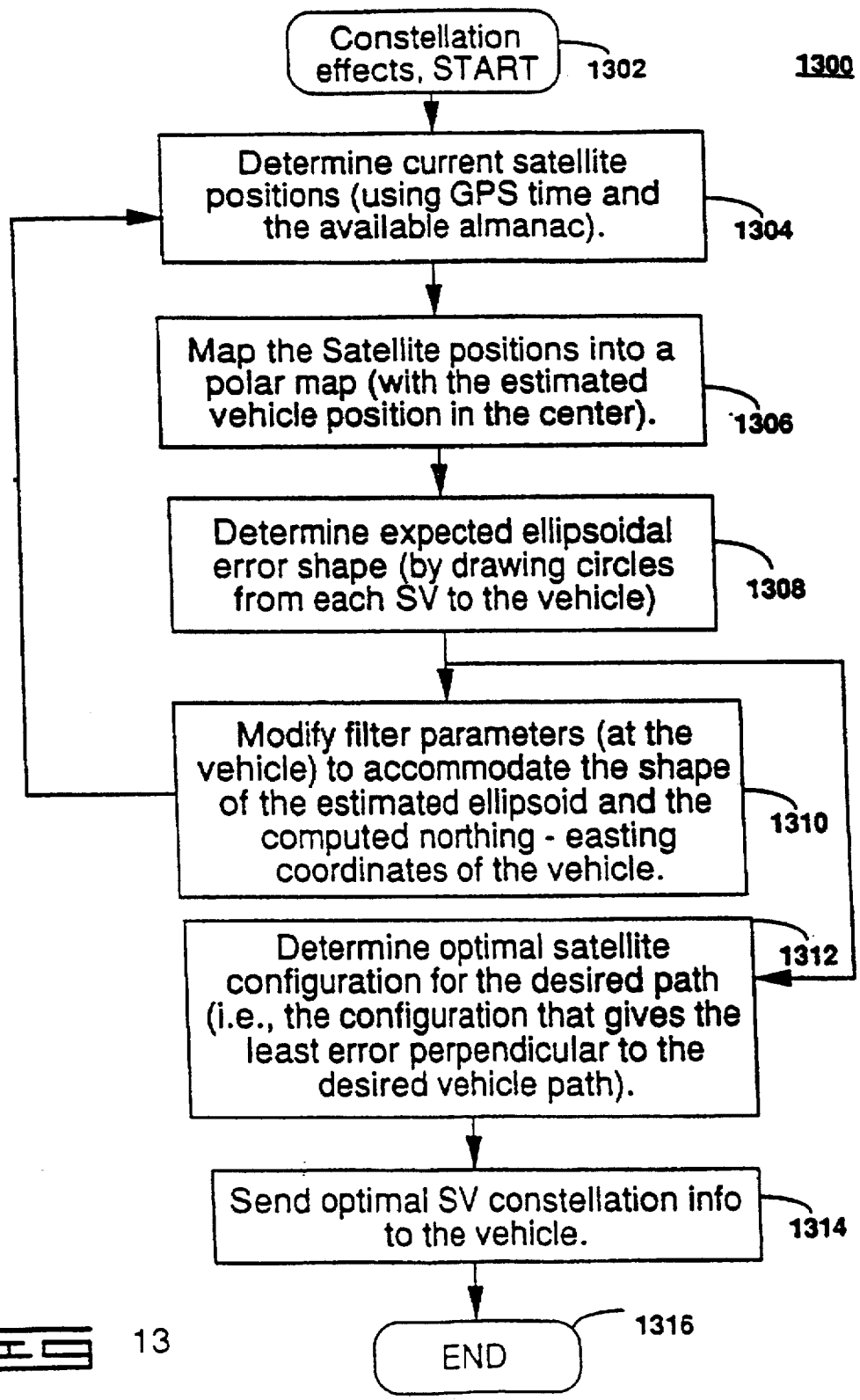
FIG. 13 is a flowchart of the Constellation Effects Method for improving position accuracy.

FIG. 13 depicts a flowchart which show the steps required to make the best use of the satellite constellations which are in view of the GPS antenna 702. For a given vehicle 310, there may be numerous satellites in view of which only a subset will form a particular constellation. The constellation effects flowchart 1300, describes how the optimal constellation can be chosen depending on the satellites currently in view, and the desired path that the vehicle 310 is taking.

The beginning of the constellation effects flowchart 1300 is shown at a block 1302. The first step in the flowchart is shown at block 1304. The positions of each satellite in view of the GPS antenna 702 the satellites positions are computed using almanac data and GPS time. Almanac data refers to previously recorded data which stores GPS satellites' positions at specific times during the day. Because the operators of the GPS satellites know the course and track across the sky that the satellites take, this information is available.

Figure 14:
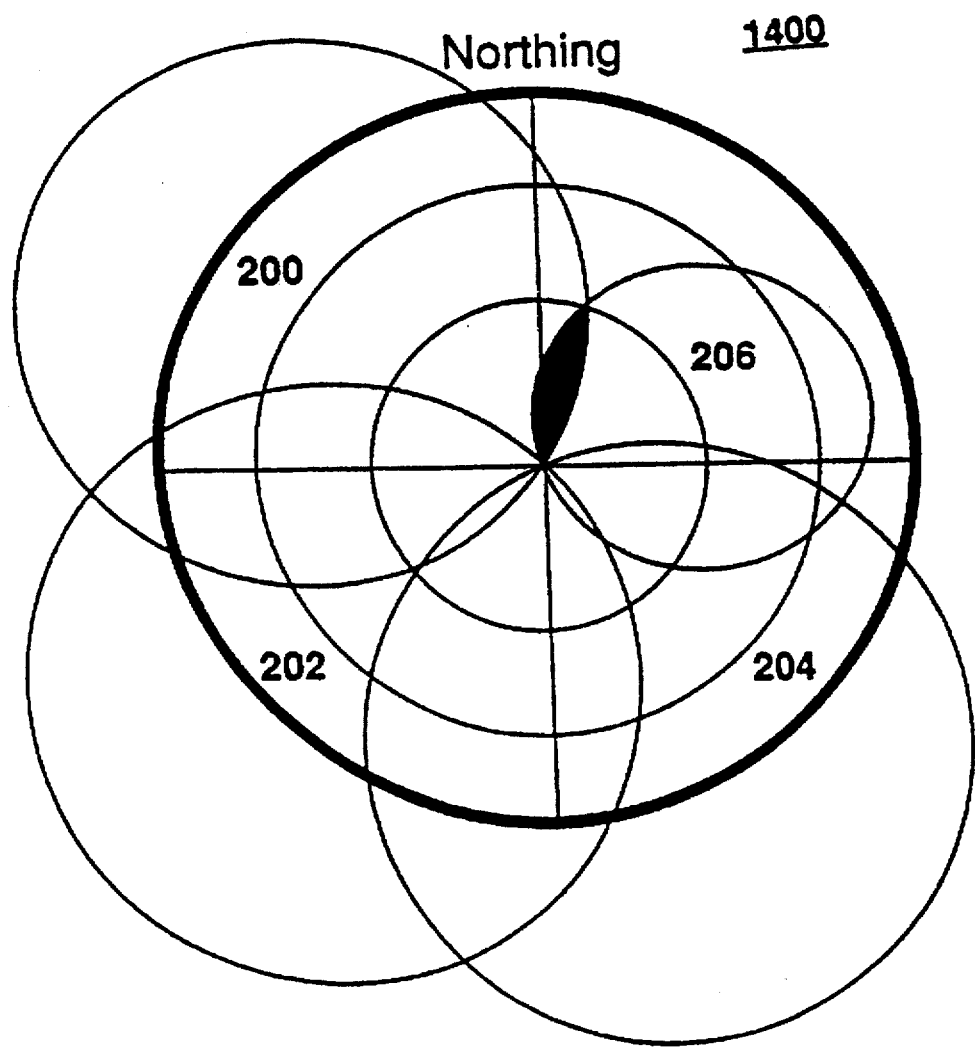
FIG. 14 is a polar plot illustrating the computed pseudo ranges from a four satellite constellation.

The positions of the satellites are represented by polar coordinates which correspond to azimuth and elevation from the base station 314. Once these satellite positions have been determined, the satellites are then mapped into a polar map with the estimated vehicle position in the center of the map. This polar map is illustrated in FIG. 14. As shown in FIG. 14, four satellites 200, 202, 204, and 206 are depicted. As shown in the next block 1308, circles are drawn around each of the satellites so that the circles form an intersection at the center of the polar map as shown in FIG. 14. The error input position determination can be shown as the inner section of the circles, which resemble an ellipsoid.

An important parameter in the ellipsoid representation is the ratio between the semi-major and semi-minor access of the ellipsoid, called the geometric ratio of access factor (GRAF). This factor is used along with the angle of the major access to compute a weighing factor, which in effect assists the GPS system 700 to compute a more accurate position. This is done by modifying the GPS kalman filter 802 in the vehicle GPS processing system 700 to accommodate the shape of the estimated ellipsoid and the computed northing-easting coordinates of the vehicle, as shown at a block 1310 and FIG. 14.

As shown at a block 1312, these steps are taken with respect to all possible constellations in view of the GPS antenna 702. After all possible satellite constellations have been computed and plotted, the optimal satellite constellation for the desired vehicle path is determined as shown at a block 1312. The optimal constellation will be one that gives the least error perpendicular to the desired vehicle path as shown at a block 1312. As shown at a block 1314, the optimal satellite constellation data is transmitted to the vehicle 310 over the data radio 714.

2. Differential Correction Techniques a. Original Bias Technique

Figure 15:
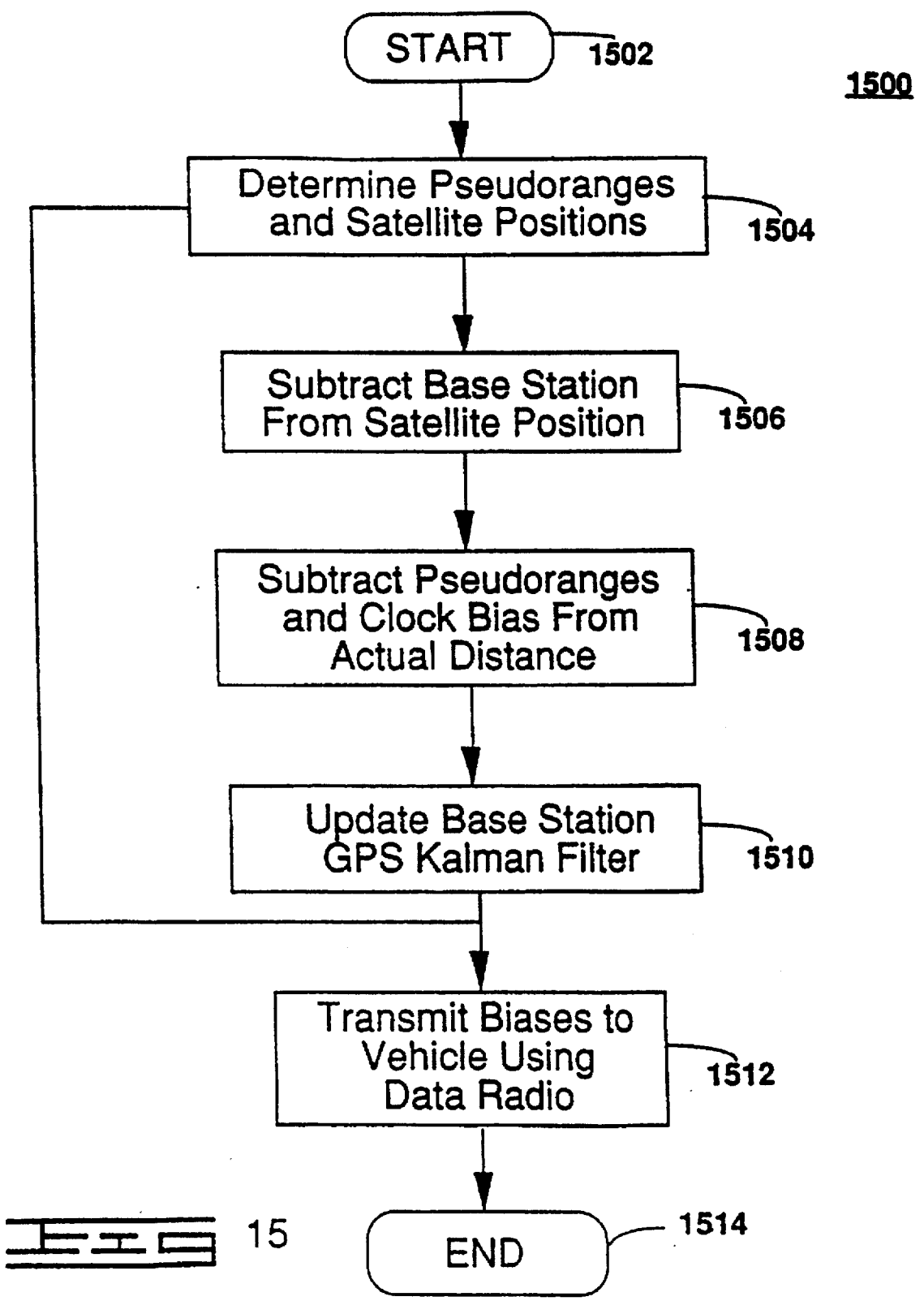
FIG. 15 is a flowchart of the original bias technique for Differential Corrections.

Referring now to FIG. 15, an original bias flowchart 1500 is depicted. As shown at a block 1502, the original bias flowchart computation begins. As shown at a block 1504, the pseudorange (PSR) for each satellite (i) in view of the GPS antenna 702 is computed. The pseudoranges are computed by the GPS receiver 706 located at the base station 314. The block 1504 also shows that the positions of each satellite (SV (i)) where SV indicates position, and (i) indicates a particular satellite for which this data is being computed, is determined.

The satellite positions are determined independently of the pseudorange computations made by the GPS receiver 706. The satellite positions are determined by decoding the GPS time data which is encoded in the navigation signal transmitted from each satellite. This time of transmission is the time the satellite actually transmitted the navigation sequence which was received by the GPS receiver 706.

Because the path of the satellites is known and recorded in the almanac as described above, the position of the satellite can be determined by correlating the GPS transmission time with the almanac data. Thus, for time T1 (i), the polar coordinates of the satellite (i) can be determined through a correlation table in the almanac.

After the steps in the block 1504 have been completed, the known base station 314 position is subtracted from each satellite position as shown in a block 1506. Because the position of the satellites and base station 314 are in polar coordinate form, a polar coordinate equation using the euclidean norm, which is well known in the art, must be used to make this subtraction. The actual equation subtracts the polar coordinates of the base station 314 from the polar coordinates of the satellite of which difference the euclidian norm is computed. The square root of the euclidian norm is then computed.

The steps shown in the block 1506 produce the actual range of the satellite from the GPS antenna 702 located on the base station 314. As shown in a block 1508, the pseudorange for each satellite (computed by the GPS receiver 706 using the GPS time) and the satellite's clock bias are subtracted from the actual range determined in the block 1506. This step produces the actual bias (error) of the pseudorange computation made by the GPS receiver 706. This error is caused by many different effects, such as atmospheric conditions, receiver error, etc.

Because the vehicle 310 is in close proximity to the base station 314, the error in pseudorange computation is assumed to be identical. Therefore, the pseudorange error which has been determined as shown in the blocks 1504, 1506 and 1508 can be used to modify the position estimates produced by the vehicle 310 GPS processing system 700. Of course, this error calculation could not be made at the vehicle 310 GPS processing system 700, because the actual position of the vehicle is not known, whereas the actual position of the base station 314 is known.

As shown at a block 1510, the base station 314 GPS kalman filter 802 is updated with the bias information. Finally, as shown as a block 1512, the base station 314 computed biases are transmitted to the vehicle 310 using the data radios 620 and 622.

The biases are then used by the vehicle 310 GPS processing system 700 to provide more accurate position determination by updating the vehicle 310 GPS kalman filter 802.

b. Parabolic Bias Technique

Figure 16:
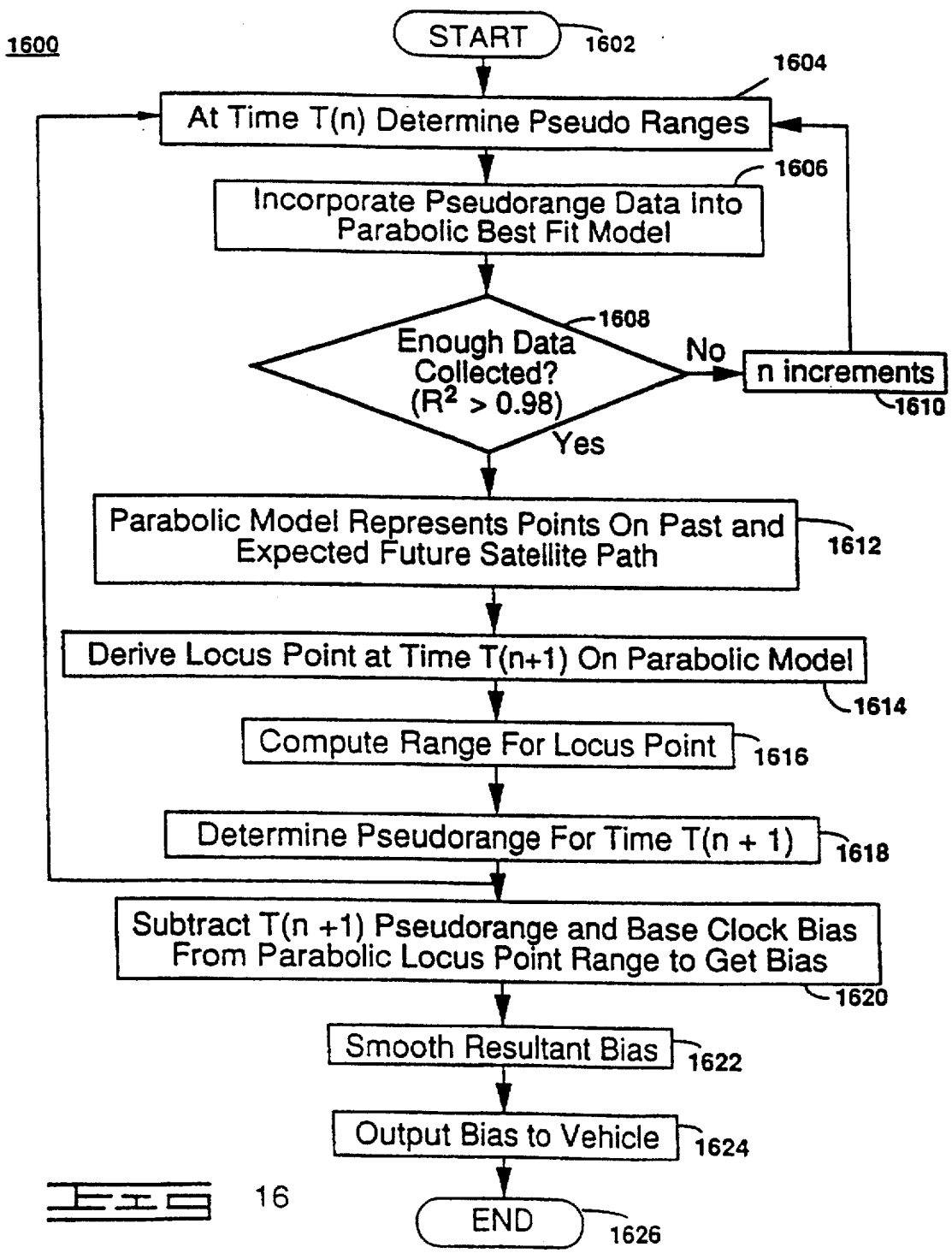
FIG. 16 is a flowchart of the Parabolic Bias Method for Differential Corrections.

As the GPS satellites rise and fall in the sky, the path formed by each satellite follows a parabola. Therefore, a parabolic function can be computed which represents the path of each satellite in the sky. Turning now to FIG. 16, part of the flowchart 1600 shown describes a method in which such a parabolic function (model) is computed for each satellite in the view of the base station 314 GPS antenna 702.

Referring now to FIG. 16, a block 1602 shows that the flowchart begins. As shown at a block 1604, at a time t(n), pseudoranges are determined for each satellite in view of the base station 314 GPS antenna 702, using the GPS receiver 706, as described above. As shown at a block 1606, the pseudoranges (for each satellite) are incorporated into parabolic best fit models for each satellite. Thus, one point on the parabolic model for each satellite is added.

As shown at a block 1608, a test is made as to whether enough points on the parabolic model have been determined to estimate a parabolic function which the satellite would conform to along the rest of its path. The number of points that have been collected will determine a particular statistical R squared value. As shown at the block 1608, if this R squared value is greater than 0.98, then the parabolic model is deemed to be accurate enough to estimate the future path of the satellite. If the R squared value is less than or equal to 0.98, then more points on the parabolic model must be computed. These points are computed by incorporating the pseudorange data which is continually being computed by the GPS receiver 706.

As shown at a block 1610, the N value increments to show that the time at which the pseudorange is computed, as shown in the block 1604, has increased. Because the GPS receiver 706 outputs pseudorange data for each satellite twice a second, each N increment should represent approximately one half second.

If enough data points have been collected such that the R squared value is greater than 0.98, then, as shown in a block 1612, the parabolic model is deemed accurate enough to represent each satellite's orbital path. As shown in the block 1612, the parabolic model represents points on the past and future satellite path. Now that the parabolic model is complete, future points on the model can be calculated as shown at a box 1614. As shown at the block 1614, for the time T(n) the locus point on the parabolic model is computed. Here the locus point is the expected location of the satellite at time T(n+1). Once this locus point is computed, the range for the locus point (distance between the GPS antenna 702 and the satellite) is computed, as shown at a block 1616.

As shown at a block 1618, the pseudorange is then computed for time T(n+1) (the current time). The pseudorange is computed by the GPS receiver 706 as described elsewhere in this application. This pseudorange is also incorporated into the parabolic best fit model, as indicated at an arrow 1626. As shown at a block 1620, the pseudorange computed at time T(n+1) and the base station 314 clock bias are subtracted from the parabolic locus point range to get the bias. The bias data are then smoothed in accordance with methods well known in the art, as shown at a block 1622. This bias is then transmitted to the vehicle 310 using the data radio 714, as shown at a block 1624.

c. Base Residuals as Bias Technique

Figure 17:
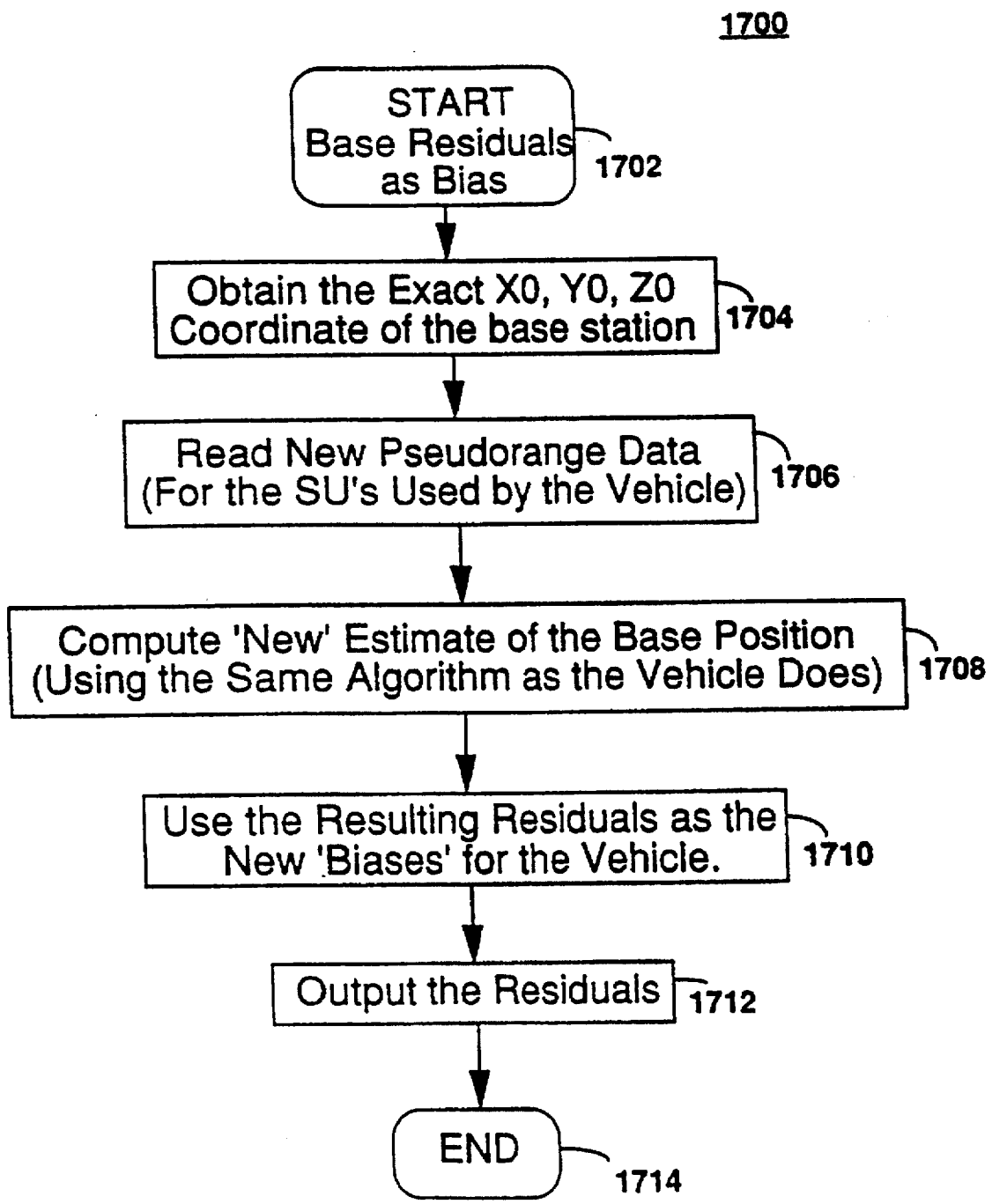
FIG. 17 is a flowchart of the BASE residuals as BIAS Method for Differential Corrections.

FIG. 17 uses base residuals to compute the bias. A base residual is the difference in the actual polar coordinate position of the base station 314 and the position which is computed by the GPS processing system 700 on the base station 314. To illustrate how this functions, assume the base station 314 is at the corner of Elm and Maple streets. Also assume the base station 314 GPS processing system 700 estimates the position of the base station 314 to be four miles due south of the actual known position of the base station (the corner of Elm and Maple). Then it is obvious that the bias is a distance equal to four miles in a due south direction.

Because the GPS processing system 700 on the vehicle 310 is identical to the GPS processing system 700 on the base station 314, the four mile error in computation can be deemed to be occurring at the vehicle 310 as well as the base station 314. The vehicle 310 can then use this information in its GPS processor 710. In effect, the GPS processor on the vehicle 310 will modify its position computations to account for a four mile due south error in the data. Thus, the position computed by the vehicle 310 GPS processor 710 will reflect a position which is four miles north of the position computed by the vehicle 310 GPS processor 710 which used the pseudorange computed by the vehicle 310 GPS receiver 706.

Turning now to FIG. 17, a block 1704 shows that the exact polar coordinates x0, y0, z0 of the base station must be obtained. The pseudoranges for the satellites which are in view of the GPS antenna 702 are then computed. If the GPS receiver 706 on the vehicle 310 is configured to read data from a particular constellation of satellites (not necessarily all which are in view), then the GPS receiver 706 at the base station 314 must also be configured to use the same constellation.

The location of the base station 314 is then computed by the GPS processor 710 located at the base station 314. If there is a difference in this computed base station 314 location and the actual known base station 314 location, (such as the four miles in the above example), then these differences, called residuals, as shown at a block 1710 represent the new biases for the vehicle 310. As shown at a block 1712, the residuals are then outputted to the vehicle 310 over the data radio 714 to be processed at the GPS processor 710.

G. Satellite Position Predictor

The present invention includes a method by which the future positions of GPS satellites can be predicted. By thus predicting the future positions of the satellites, the optimum satellite constellation for given site conditions can be determined well in advance. Thus, the present invention will provide for the prediction of satellite availability and unavailability in a systematic manner allowing for future planning, including vehicle operation service and maintenance.

Turning now to FIG. 18, the beginning of the satellite position predictor flowchart is shown at a block 1802. For a particular GPS satellite, the date and time for which the position of the satellite is desired to be known is obtained. For example, it may be desirable to plan maintenance periods for vehicles 310 during those periods when the least optimal constellations are available.

Once the date and time of the desired satellite position is determined, the latitude and longitude of the base station 314 must be determined as shown at a block 1806. As shown at a block 1808, the almanac data is then obtained. The satellite position in XYZ coordinates is then determined from the almanac data as shown at a block 1810. Finally, as shown at a block 1812, the latitude, longitude, elevation and azimuth is computed from the XYZ coordinates.

H. Weighted Path History

The weighted path history technique of the present invention improves the positioning capability of the present invention. The weighted path history technique depicted in FIG. 19, uses previous path positions to provide a estimation of future positions. Use of this technique results in a reduction of position "wandering" and enhanced immunities to spurious position computations. Wandering describes the tendency of the vehicle positioning system 1000 to determine positions that deviate from the actual path of the vehicle 310.

Figure 19:
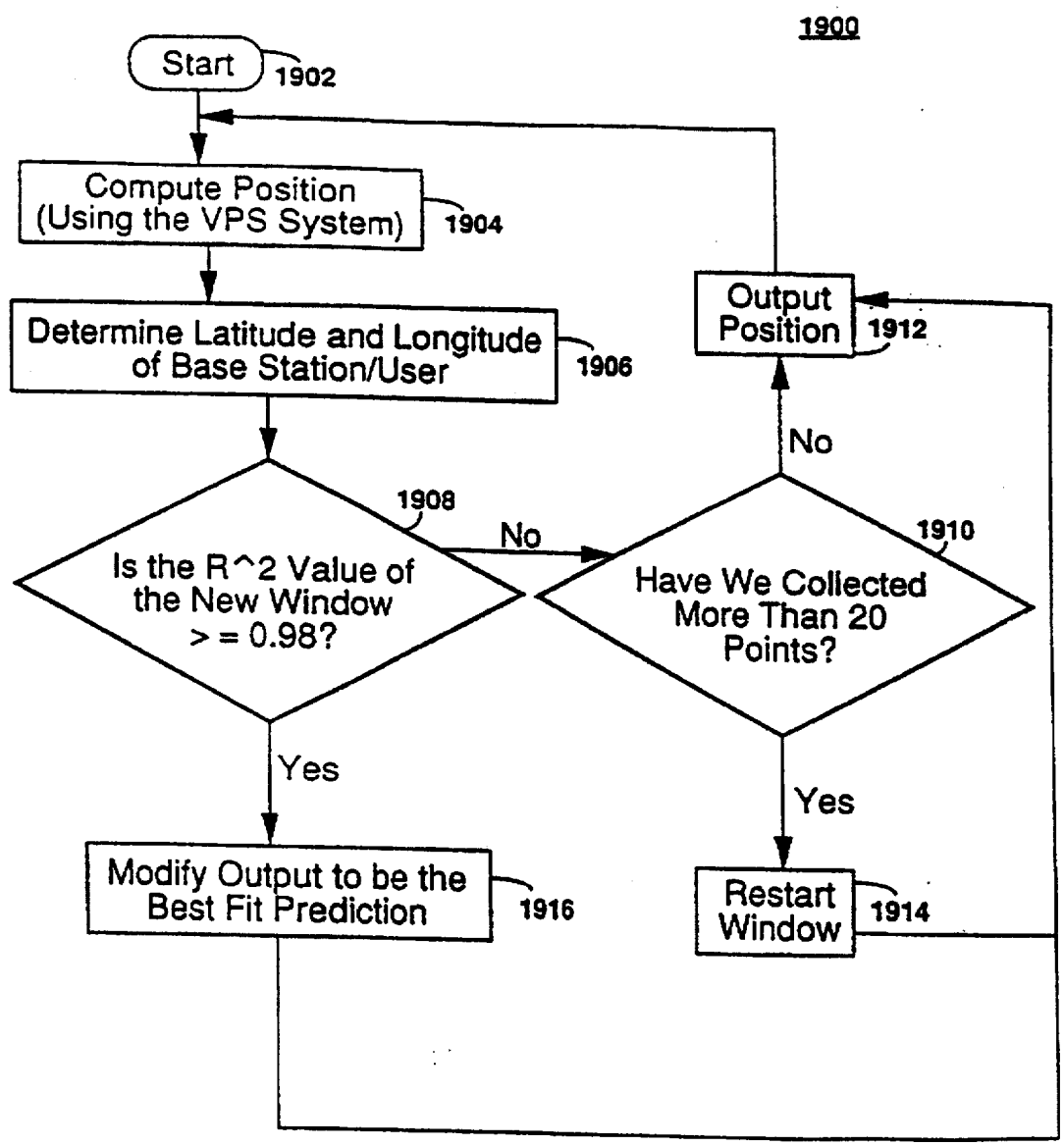
FIG. 19 is a flowchart of the Weighted Path History Method.
Figure 20:
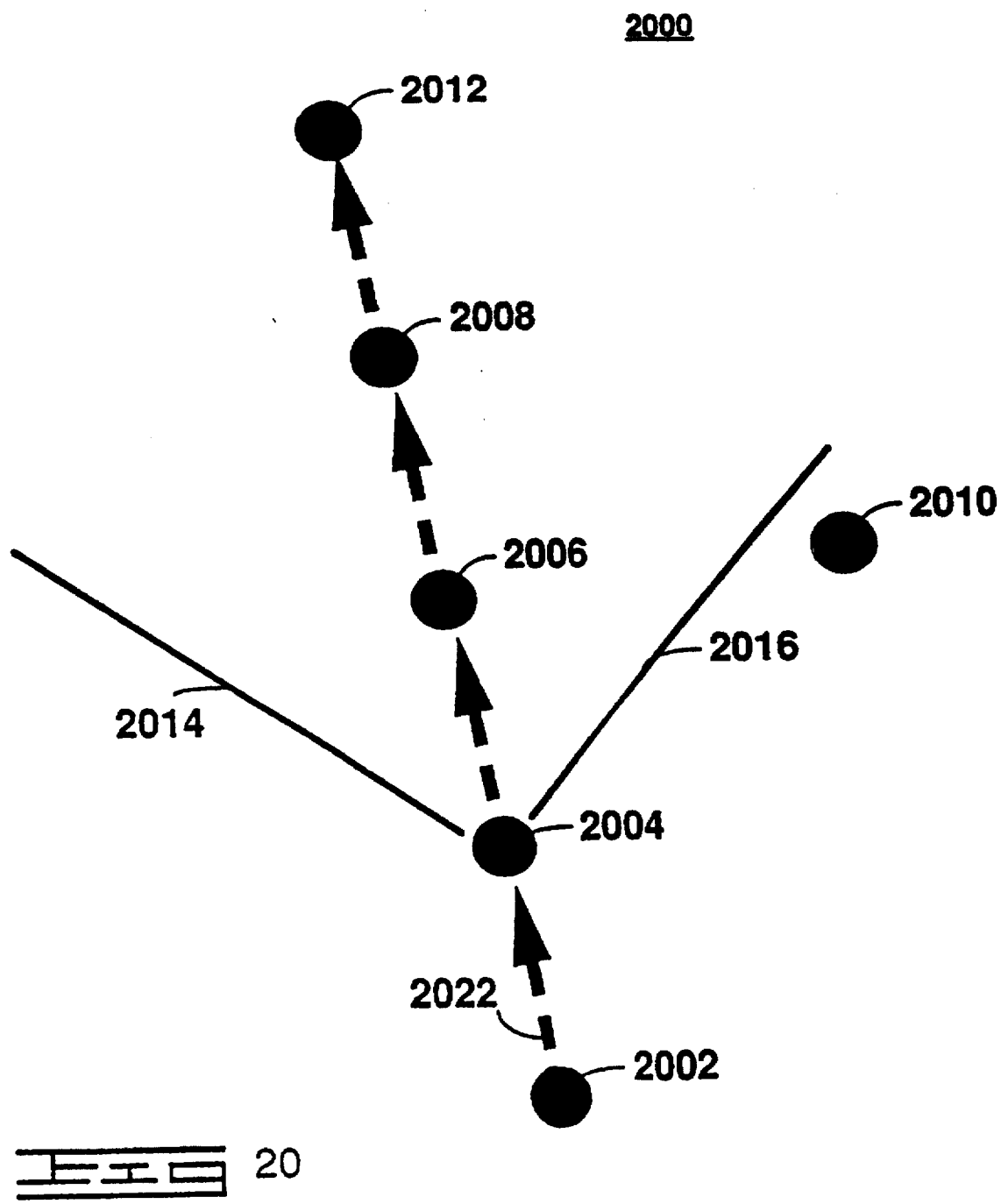
FIG. 20 is a diagrammatic representation of the Weighted Path History Method.

Turning now to FIGS. 19 and 20, the weighted path history technique is described. At a block 1902, the weighted path history flowchart begins. The position of the vehicle 310 is computed at a block 1904 by the vehicle positioning system 1000 as can be seen in FIG. 20, for vehicle positions, 2002, 2004, 2006, 2008, and 2012 are diagrammed. The vehicle 310 moves along the path 2022 which is created by the sequence of points just noted.

Turning back now to FIG. 19, at a block 1906, each new position computation is incorporated into the weighted path history best fit algorithm. At a block 1908, the R square value is shown to be compared against 0.98. This R squared value represents the number of position points that have been taken thus far, and therefore how statistically accurate a future estimation can be. The window referenced in the block 08 refers to the previous number of computed position points.

If the R squared value of the new window is not greater than or equal to 0.98, then a test is made at a block 1910 to see if more than 20 position points have been computed. If there have been more than 20 points collected, then the window is restarted as shown at a block 1914. The window is restarted in this case because, if the R squared value is less than 0.98 after more than 20 points have been collected, the collected points are deemed to be inaccurate and are therefore not relied upon. To restart the window means that all new data points will start being incorporated into the best fit algorithm.

If less than or equal to 20 position points have been calculated, then the window is not restarted. Rather, the raw position is outputted as shown at a block 1912. This raw position is simply the position that was computed as is shown in the block 1904. If there were not more than 20 points collected, then it is assumed that not enough points have yet been collected to produce a R squared value greater than or equal to 0.98. After the window is restarted as shown in a block 1914 the raw position is also output as shown in the block 1912.

If the R squared value of the new window is greater than or equal to 0.98, then as shown in a block 1916, the output position is modified to be the best fit prediction. This is depicted in FIG. 20 at a position point 2010. Position point 2010 represents the position point as computed by the vehicle positioning system 1000. According to the weighted path history technique, the position point 2010 is different from the expected position point 2006. Therefore, the actual position outputted is modified from the position point 2010 to become the position point 2006. This assumes that there were enough position points previously computed so that the R squared value of the new window was greater than or equal to 0.98 as required in the block 1998 of FIG. 19. Once the position point 2010 is modified, it is outputted to the navigation system 1022.

I. Anti-Spoofing

It is believed that the U.S. government (the operator of the GPS satellites) may at certain times introduce errors into the navigation data being transmitted from the GPS satellites by changing clock and ephemeris parameters. For example, during a national emergency such an action might take place. The government would still be able to use the GPS because the government uses a distinct type of pseudo random code transmission, called the P-code. Thus, the government could debilitate the C/A code and carrier transmissions, causing earth receivers to compute incorrect pseudoranges, and thus incorrect position determinations. The present invention includes methods to detect and compensate for such misleading data.

Figure 21:
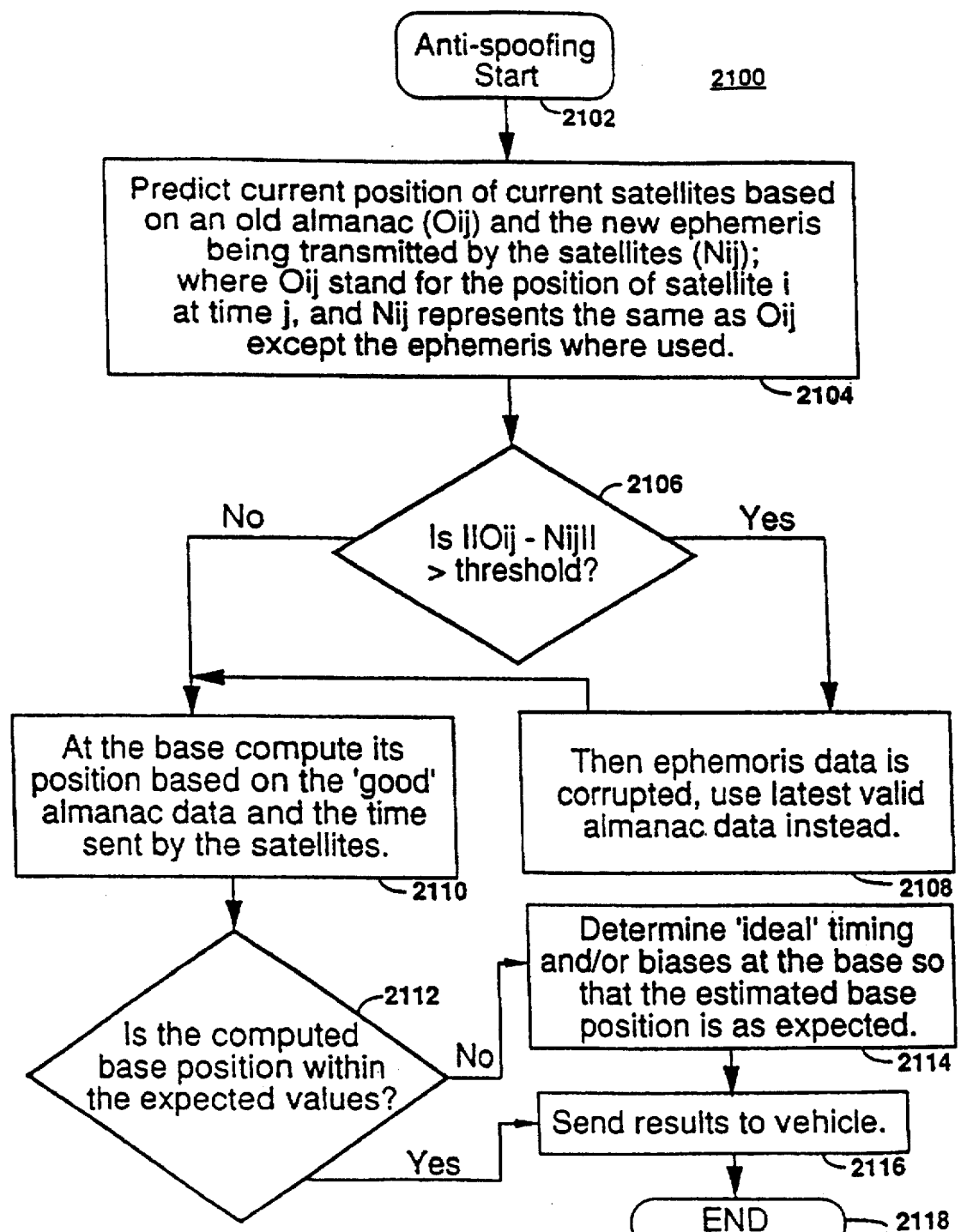
FIG. 21 is a flowchart of the Anti-Spoofing Method.

Turning now to FIG. 21, a flowchart of the anti-spoofing technique is depicted. The beginning of the flowchart is shown at a block 2102. At a block 2104 it is shown that the current position of satellites in view of the GPS antenna 702 is predicted by old almanac data. Old almanac data is data that has been previously recorded by the GPS receiver 706. The current position of the satellite is also computed using the current ephemeris data being transmitted by the GPS satellites. At a block 2106, the predicted position (using the almanac) and the computed position (using the latest ephemeris) are compared. As is shown in the block 2106, the euclidean norm of the two parameters is computed and tested against a preset threshold. If this value is larger than the threshold, then the ephemeris data would appear to be corrupted and the latest valid almanac data will be used instead, as is shown at a block 2108. Because the latest valid almanac data will be older than the new ephemeris data, it is always the preference to use the latest ephemeris data.

The position of the base station 314 is then computed based on the good almanac data and the GPS time sent by the satellites. This good almanac data will either consist of the latest valid almanac data in the case where the ephemeris data is corrupted, or the ephemeris data itself when the ephemeris data is not corrupted. As shown at a block 2112, the computed base position is tested against expected values. Because the location of the base station 314 is known, the accuracy of the computation using the almanac data is readily determined. If the accuracy is within an expected range, then the results are sent to the vehicle 310 as shown at a block 2116.

If the computed base station 314 is not within expected values, then clock time and/or biases at the base are manipulated so that the estimated base position is as expected, as is shown at a block 2114. These results are then sent to the vehicle as shown at the block 2116.

J. Surveying

In addition to position determination and navigation of vehicles 310, the present invention can be used in a separate embodiment to accomplish surveying in real time. Thus, the position of any point on the Earth can be computed using the techniques of the present invention.

K. Graphic Representations

The present invention includes the production of graphic images which allow users at the base station 314 to view the track of the various vehicles 310 which are being navigated with the present invention. These graphic images will be displayed on common video display devices and, in another embodiment on a hard copy type terminal.

III. Navigation

A. Overview

In considering implementation of an autonomous navigation system, there are some basic questions which any autonomous system must be able to answer in order to successfully navigate from point A to point B. The first question is "where are we (the vehicle) now?" This first question is answered by the positioning system portion of the present invention, as discussed above in section II.

The next or second question is "where do we go and how do we get there?" This second question falls within the domain of the navigation system portion of the present invention, discussed in this section (III).

A further (third) question, really a refinement of the second one, is "how do we actually physically move the vehicle, for example, what actuators are involved (steering, speed, braking, and so on), to get there?" This is in the domain of the vehicle controls subsystem of the navigation system, also discussed below.

In the preceding and following discussions of the present invention, recall that, "system(s)" may include apparatus and/or methods.

As has been discussed implicitly above, autonomous navigation, of a mining vehicle as an example, may provide certain significant advantages over conventional navigation. Among them is an increased productivity from round the clock, 24 hr. operation of the vehicles. The problems presented by dangerous work environments, or work environments where visibility is low, are particularly well suited to solution by an autonomous system.

There are, for instance, some mining sites where visibility is so poor that work is not possible 200 days of the year. There are other areas which may be hazardous to human life because of being contaminated by industrial or nuclear pollution. An area may be so remote or desolate that requiring humans to work there may pose severe hardships or be impractical. The application of the present invention could foreseeably include extraterrestrial operations, for example, mining on the Moon, provided that the necessary satellites were put in Moon orbit.

In a typical application of the present invention, as shown in FIG. 3, with regard to the navigation of a mining vehicle at a mining site, there are three basic work areas: the load site, the haul segment, and the dump site. At the load site, a hauling vehicle may be loaded with ore in any number of ways, by human operated shovels for instance, controlled either directly or by remote control, or by autonomous shovels. The hauling vehicle then must traverse an area called the haul segment which may be only a few hundred meters or may be several km's. At the end of the haul segment is the dump site, where the ore is dumped out of the hauling vehicle to be crushed, or otherwise refined, for instance. In the present invention, autonomous positioning and navigation may be used to control the hauling vehicle along the haul segment. Autonomously navigated refueling and maintenance vehicles are also envisioned.

Figure 4:
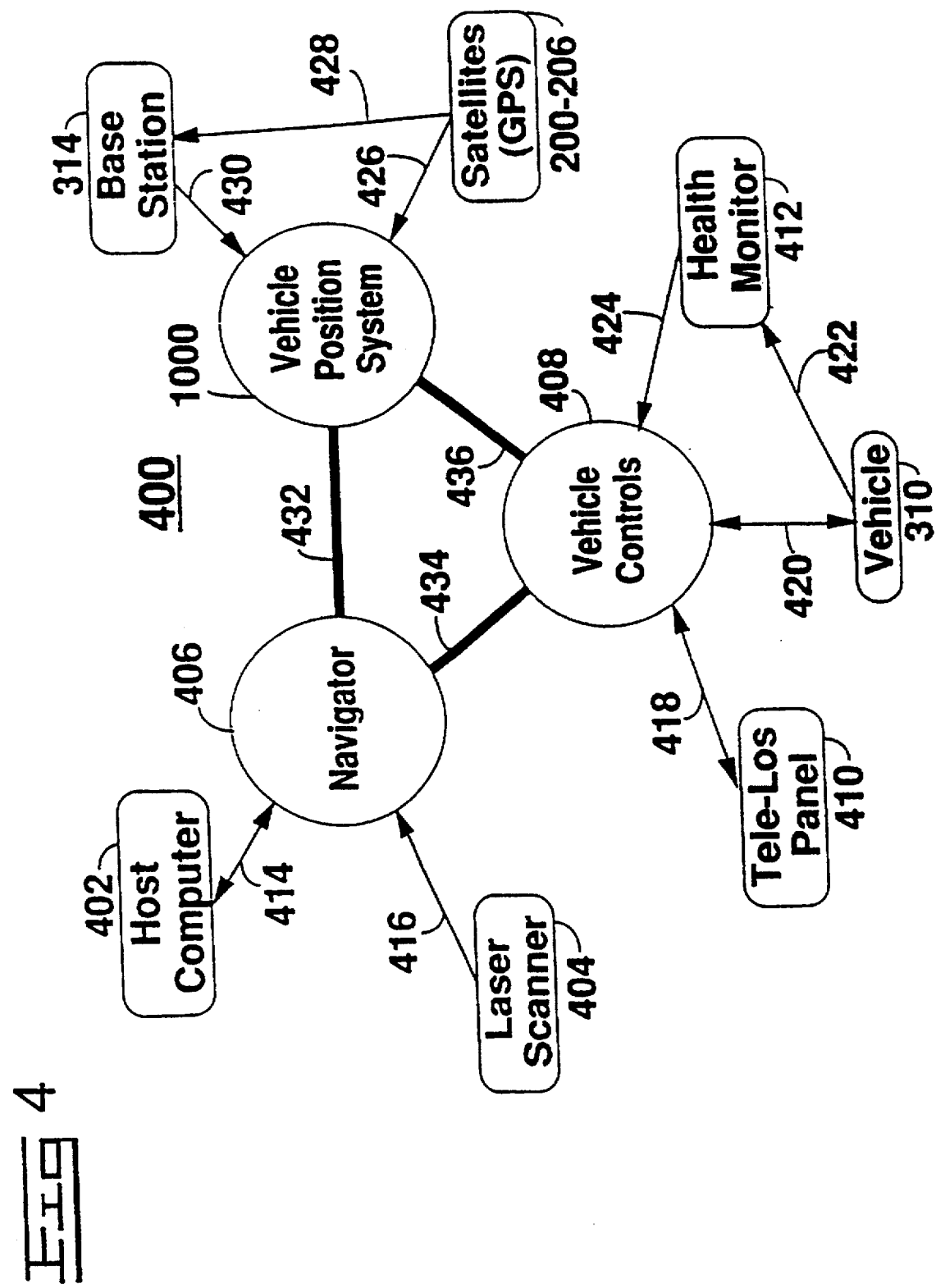
FIG. 4 is a diagrammatic representation of the interrelationships between the navigator, the vehicle positioning system (VPS), and the vehicle controls.
Figure 5:
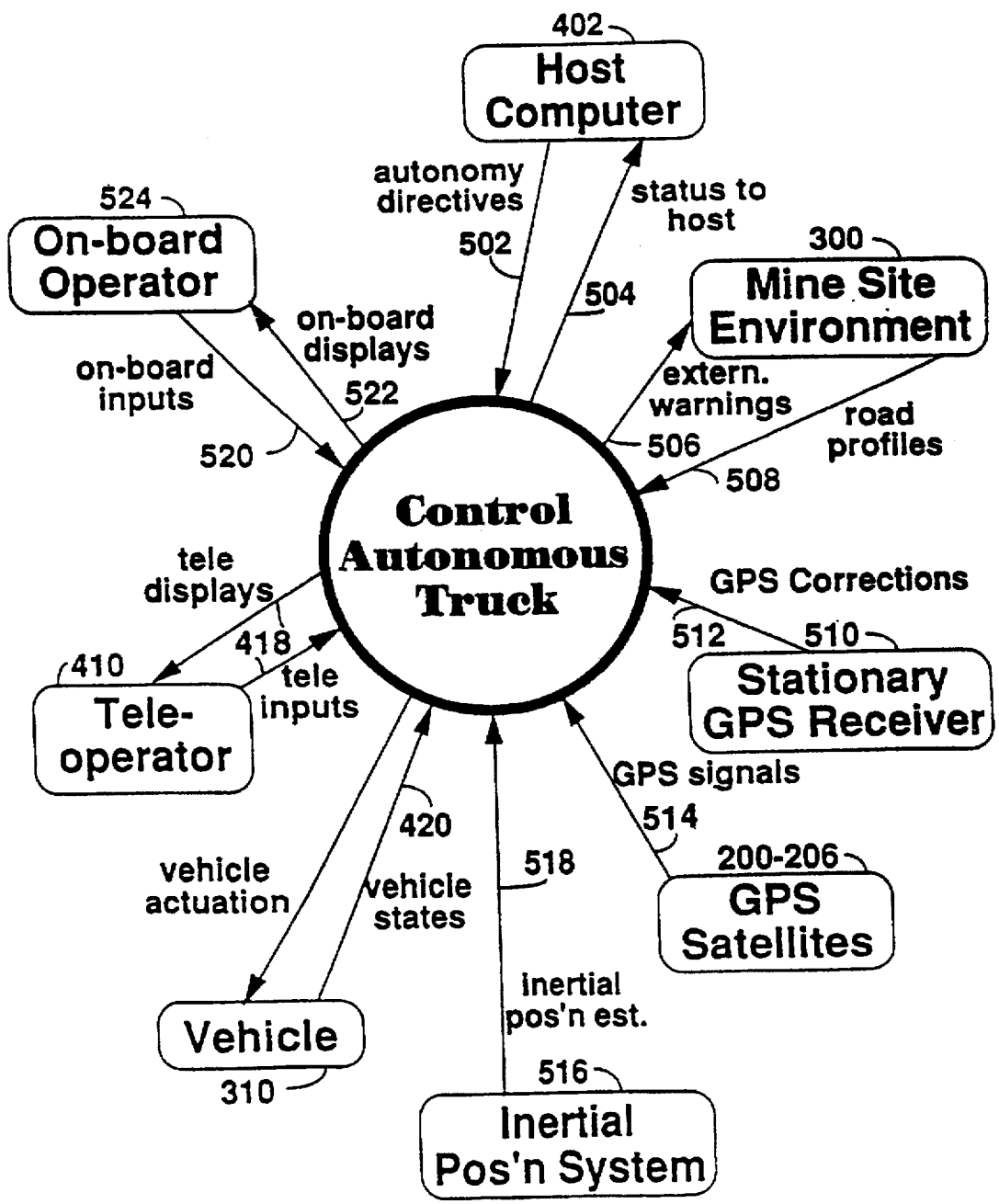
FIG. 5 is a context diagram, illustrating the various elements and their interrelationship in an autonomous control system according to the present invention.

Referring now to FIGS. 4 and 5, Navigation of the AMT (Autonomous Mining Truck) encompasses several systems, apparatus and/or functions. The VPS (Vehicle Positioning System) 1000 subsystem of the overall AMT system as described above, outputs position data that indicates where the vehicle is located, including, for example, a North and an East position.

Refering now to FIGS. 4 and 5, position data output from the VPS is received by a navigator 406. The navigator determines where the vehicle wants to go (from route data) and how to get there, and in turn outputs data composed of steer and speed commands to a vehicle controls functional block 408 to move the vehicle.

The vehicle controls block then outputs low level commands to the various vehicle systems, 310, such as the governor, brakes and transmission. As the vehicle is moving towards its destination, the vehicle controls block and the VPS receive feed-back information from the vehicle indicative of, for example, any fault conditions in the vehicle's systems, current speed, and so on.

Navigation also must include an obstacle handling (detection and avoidance) capability to deal with the unexpected. A scanning system 409 detects obstacles in the vehicle's projected trajectory, as well as obstacles which may be approaching from the sides and informs the navigator of these.

The navigator may be required to then decide if action is required to avoid the obstacle. If action is required, the navigator decides how to avoid the obstacle. And after avoiding the obstacle, the navigator decides how to get the vehicle back onto a path towards its destination.

Figure 35:
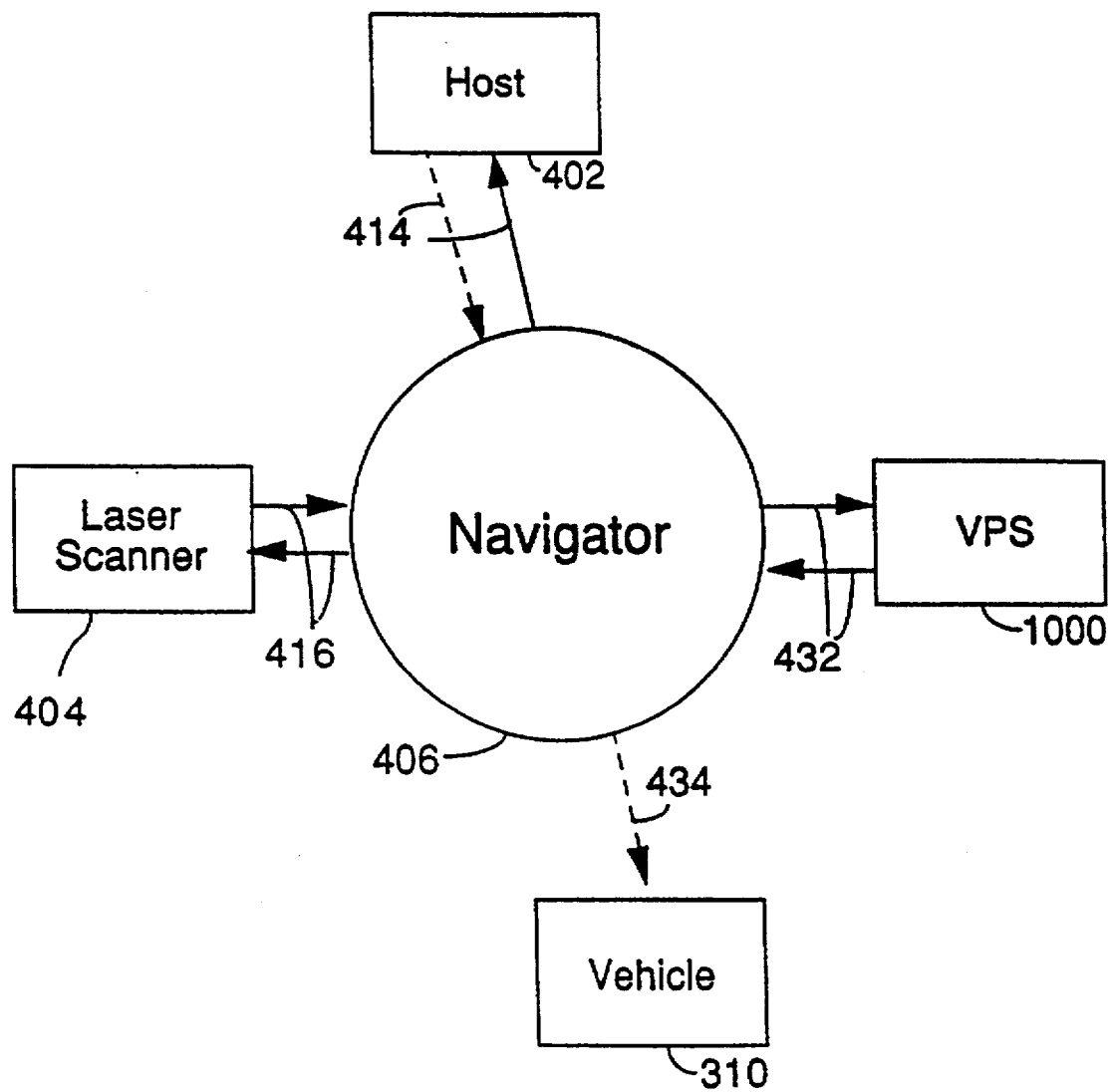
FIG. 35 is a context diagram of an embodiment of the navigator of the present invention.

Referring now to FIG. 35, titled the context diagram, and FIG. 37A–37D definitions of the communications, which are shown as circles with numbers in them, are provided below:

502. Host Commands & Queries

Commands given by the host to the vehicle manager. These commands could be of several types:

initiate/terminate;

supply parameters;

emergency actions; and directives.

Queries inquire about the status of various parts of the navigator.

504. Replies to Host

These are responses to the queries made by the host.

432. Position Data

This is streamed information provided by the VPS system.

416. Range Data

This is range data from the line laser scanner.

432. VPS Control

These are commands given to the VPS system to bring it up, shut it down and switch between modes.

416. Scanner Control

These are commands sent to the laser scanner to initiate motion and set follow velocity profile.

420. Steering & Speed Commands

These are commands given to the vehicle to control steering and speed. These commands are issued at the rate of 2–5 Hz.

Referring to FIG. 5, in a preferred embodiment of the present invention, as described above, both the VPS and the navigator are located on the vehicle and communicate with the base station 314 to receive high level GPS position information and directives from a host processing system, discussed below. The system gathers GPS position information from the satellites 200–206 at the base station and on-board the vehicle so that common-mode error can be removed and positioning accuracy enhanced.

In an alternate embodiment of the present invention, portions of the VPS and navigator may be located at the base station.

The host at the base station may tell the navigator to go from point A to point B, for instance, and may indicate one of a set of fixed routes to use. The host also handles other typical dispatching and scheduling activities, such as coordinating vehicles and equipment to maximize efficiency, avoid collisions, schedule maintenance, detect error conditions, and the like. The host also has an operations interface for a human manager.

It was found to be desirable to locate the host at the base station and the navigator on the vehicle to avoid a communications bottleneck, and a resultant degradation in performance and responsiveness. Since the host sends relatively high-level commands and simplified data to the navigator, it requires relatively little communication bandwidth. However, in situations where broad-band communication is available to the present invention, this may not be a factor.

Another factor in determining the particular location of elements of the system of the present invention, is the time-criticality of autonomous navigation. The navigation system must continually check its absolute and relative locations to avoid unacceptable inaccuracies in following a route. The required frequency of checking location increases with the speed of the vehicle, and communication speed may become a limiting factor even at a relatively moderate vehicle speed.

However, in applications where maximum vehicle speed is not a primary consideration and/or a high degree of route following accuracy is not critical, this communication factor may not be important. For example, in rapidly crossing large expanses of open, flat land, in a relatively straight path, it may not be necessary to check position as often in the journey as it would be in navigating a journey along a curvaceous mountain road.

Conceptually, the navigation aspects of the present invention can be arbitrarily divided into the following major functions:

route planning/path generation;
path tracking; and
obstacle handling.

The function of the present invention are discussed below.

B. Route Planning/Path Generation

1. Introduction

Autonomous vehicle navigation in accordance with the present invention, conceptually consists of two sub problems, path generation and path tracking, which are solved separately.

Path generation uses intermediate goals from a high level planner to generate a detailed path for the vehicle 310 to follow. There is a distinct trade-off between simplicity of representation of such plans and the ease with which they can be executed. For example, a simple scheme is to decompose a path into straight lines and circular curves. However, such paths cannot be tracked precisely simply because of discontinuities in curvature at transition points of segments that require instantaneous accelerations.

Following path generation, path tracking takes, as input, the detailed path generated and controls the vehicle 310 to follow the path as precisely as possible. It is not enough to simply follow a pre-made list of steering commands because failure to achieve the required steering motions exactly, results in steady state offset errors. The errors accumulate in the long run. Global position feedback 432 may be used to compensate for less than ideal actuators. Methods have been developed for the present invention which deviate from traditional vehicle control schemes in which a time history of position (a trajectory) is implicit in the plan specified to the vehicle 310.

These methods are appropriately labeled "path" tracking in that the steering motion is time decoupled; that is, steering motions are directly related to the geometric nature of the specified path, making speed of the vehicle 310 an independent parameter.

Referring now to FIG. 3, an autonomous vehicle 310 may be required to leave a load site 318, traverse a haul segment 320 to a dump site 322, and after dumping its load, traverse another haul segment to a service shop 324, under the direction of the host 402. The host 402 determines the vehicles' destinations, which is called "cycle planning." Once the work goals have been determined by "cycle planning", determination of which routes to take to get to a desired destination must be accomplished by "route planning."

"Route planning" is the determination of which path segments to take to get to a desired destination. In general, a route can be thought of as a high-level abstraction or representation of a set of points between two defined locations. Just as one can say to a human driver "take route 95 south from Lobster, Me., to Miami, Fla.," and the driver will translate the instruction into a series of operations (which may include starting the vehicle 310, releasing the brake 4406, engaging the transmission 4610, accelerating to the posted speed limit, turning the steering wheel 4910, avoiding obstacles 4002, and so on), the autonomous navigation system of the present invention performs similarly. As used in the system of the present invention, a "route" is a sequence of contiguous "segments" between the start and end of a trip.

An autonomous vehicle 310 may begin at any position in the sequence and traverse the route in either direction. A "segment" is the "path" between "nodes." A "node" is a "posture" on a path which requires a decision. Examples of nodes are load sites 3318, dump sites 322, and intersections 326.

There are various types of segments. For instance, there are linear and circular segments. Linear segments (lines) are defined by two nodes. Circular segments (arcs) are defined by three nodes.

"Postures" are used to model parts of a route, paths and nodes for instance. Postures may consist of position, heading, curvature, maximum velocity, and other information for a given point on the path.

A "path" is a sequence of contiguous postures.

A segment is, therefore, a sequence of contiguous postures between nodes. All segments have a speed associated with them, which specifies the maximum speed with which the vehicle 310 is to traverse that segment. The navigator 406 can command slower speeds, if necessary, to meet other requirements.

Determining which postures are required to define a path segment by analytical, experimental or a combination of both, is called "path planning" in accordance with the present invention. To bring the discussion full circle, a sequence of contiguous routes, as mentioned above, is referred to as a "cycle," and a vehicle's 310 work goals determine its "cycle."

Therefore, to define a route one must first define the nodes and segments. Next, the nodes and segments must be ordered. Finally the routes must be defined by specifying where in the ordered set a route is to begin, and in which direction the ordered set is to be traversed (See FIG. 22 which illustrates these concepts of the present invention).

The aforementioned method of defining routes was developed for memory efficiency in the present invention. It is also a convenient way to define many routes on a specific set of nodes and segments.

In a real world example of the present invention, picture a site where there are many intersecting roads 326. A route programmer would define nodes at the intersections, and segments to define the roads between the intersections. Routes would therefore be determined by the roads and intersections. There will however, be many ways to get from point A to point B (many routes) with a fixed set of intersections and roads.

The path-tracking method of the present invention (discussed below) uses route curvature to steer the vehicle. Methods of route definition using lines and arcs do not provide for continuous curvature. Clothoid curves are another way to define routes.

Another method of defining routes developed by the inventors, fits B-splines to the driven data. B-splines provide continuous curvature and therefore enhance tracking performances. In addition, since B-splines are free form curves, a route may be defined by a single B-spline curve. By using free form curves, a more robust method (semi-automatic) for fitting routes to data collected by driving the vehicle over the routes is produced by the presnent invention.

Figure 22:
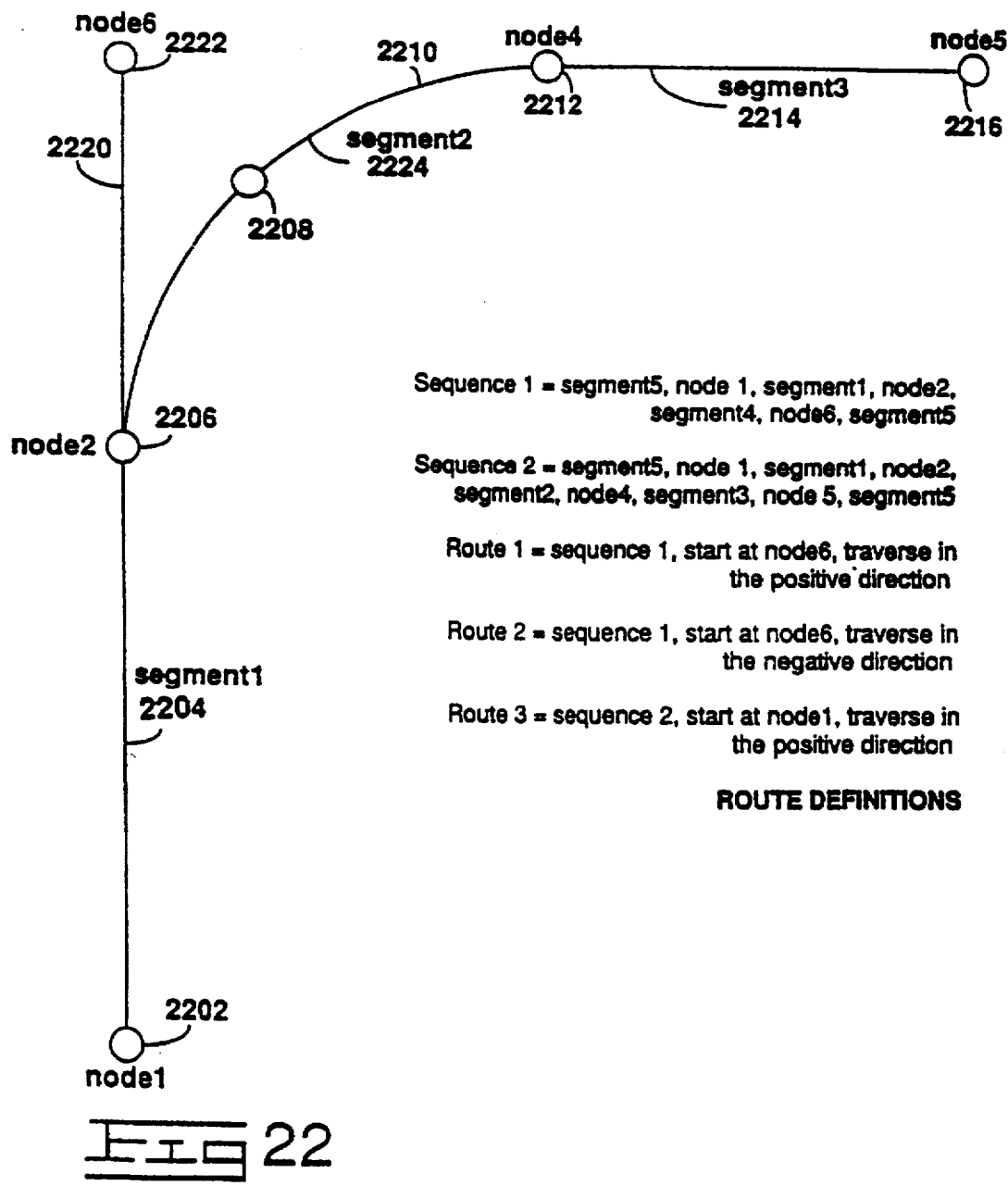
FIG. 22 is a diagram of route definitions using nodes and segments according to the present invention.

Referring to FIGS. 4 and 22, in operation, the host 402 from the base station 314 commands an identified vehicle 310 to take route N from its present location. The navigator 406 functions to generate a path by translating "route 1" into a series of segments, each of which may have a "posted" or associated maximum speed limit, which together form a generated path for the vehicle to attempt to follow. By specifying routes and commanding the autonomous vehicle 310 with high-level commands this way, enormous data requirements and inefficiencies are in the present invention avoided in giving directions.

The navigator 406 stores the routes as a linked-list of path segments, rather than the set or series of sets of individual points. These segments are also abstractions of the set of points between defined locations or nodes.

A LINKER then takes given path segments and generates a linked-list of control points, allowing for flexibility and efficiency. Path segments are shared by different routes, as is shown in FIG. 22.

The path segments are stored in a memory called the TARGA 5302 as a set of arcs, lines, and postures, for instance, in one embodiment of the present invention. An analytical generator function generates paths using these arcs, lines and postures. In another embodiment of the present invention, B-splines are used as a mathematical representation of a route, as mentioned above.

In another embodiment or the present invention, "clothoid" curves are used in generating path segments. These are discussed below.

a. Clothoid Path Segments

As discussed above, part of the navigation problem addressed and solved by the present invention is really two sub-problems: path planning and path generation. These are solved separately by the present invention.

Path planning proceeds from a set of sub-goals using some path optimization function and generates an ordered sequence of "objective" points that the vehicle 310 must attain.

The challenge of path generation is to produce from the objective points (of path planning), a continuous, collision-free path 3312, smooth enough to be followed easily by the autonomous vehicle 310. For example, a simple scheme is to decompose a path 3312 into straight lines and circular curves. The path 3312 is then converted into a sequence of explicit directives provided to the vehicle 310 actuators to keep the vehicle on the desired path 3312. It should be noted that there is a distinct trade-off between simplicity of representation of such plans and the ease with which they can be executed.

The ability of an autonomous vehicle 310 to track a specified path 3312 is dependant on the characteristics of the path. Continuity of curvature and the rate of change of curvature (sharpness) of the generated path 3312 are of particular importance since these parameters dictate steering motions required of a vehicle 310 for it to stay on the desired path 3312. Discontinuities in curvature are impossible to follow since they require an infinite acceleration. For some autonomous vehicle configurations, the extent to which the sharpness of a path is linear is the extent to which steering motions are likely to keep the vehicle on the desired path 3312, since linear sharpness of a path equates to approximately constant velocity of steering.

One method used by the present invention, is to compose paths as a sequence of straight lines and circular arcs. This method suffers from discontinuities in curvature where arcs meet. Another method of the present invention, is to use polynomial splines to fit paths between objective points. Splines assure continuity in curvature, but do not make any guarantees of linearity in sharpness.

Inability to track the requisite curvature results in steady state offset errors from the desired path 3312. These errors can be compensated for by closing a feedback loop on position 3314. This is sufficient in those scenarios where the response of the actuators is fast enough to guarantee negligible tracking errors and position sensing is accurate, such as on a factory floor. However, path tracking is simpler if the path is intrinsically easier to track.

The method of the present invention, generates explicit paths that pass through a sequence of objective points. A derivative method of the present invention, replans parts of the path dynamically in case the tracking error becomes large or the desired path is changed.

b. Modeling A Vehicle Path

Any path can be parameterized as a function of path length (s) by position coordinates (x(s), y(s)) 3304. That is, position coordinates x and y can be written as explicit functions of the path length s. Heading (0(s)) 3318 and curvature (c(s)) 3316 can be derived:

$$O(s) = \frac{dy(s)}{dx(s)} \quad \text{(EQ. 1)}$$

$$c(s) = \frac{dO(s)}{ds} \quad \text{(EQ. 2)}$$

The quadruple of these parameters, p=(x,y,0,c), is a posture 3314 that describes the state of an autonomous vehicle 310 at any point in time.

c. Clothoid Curves

Figure 26:
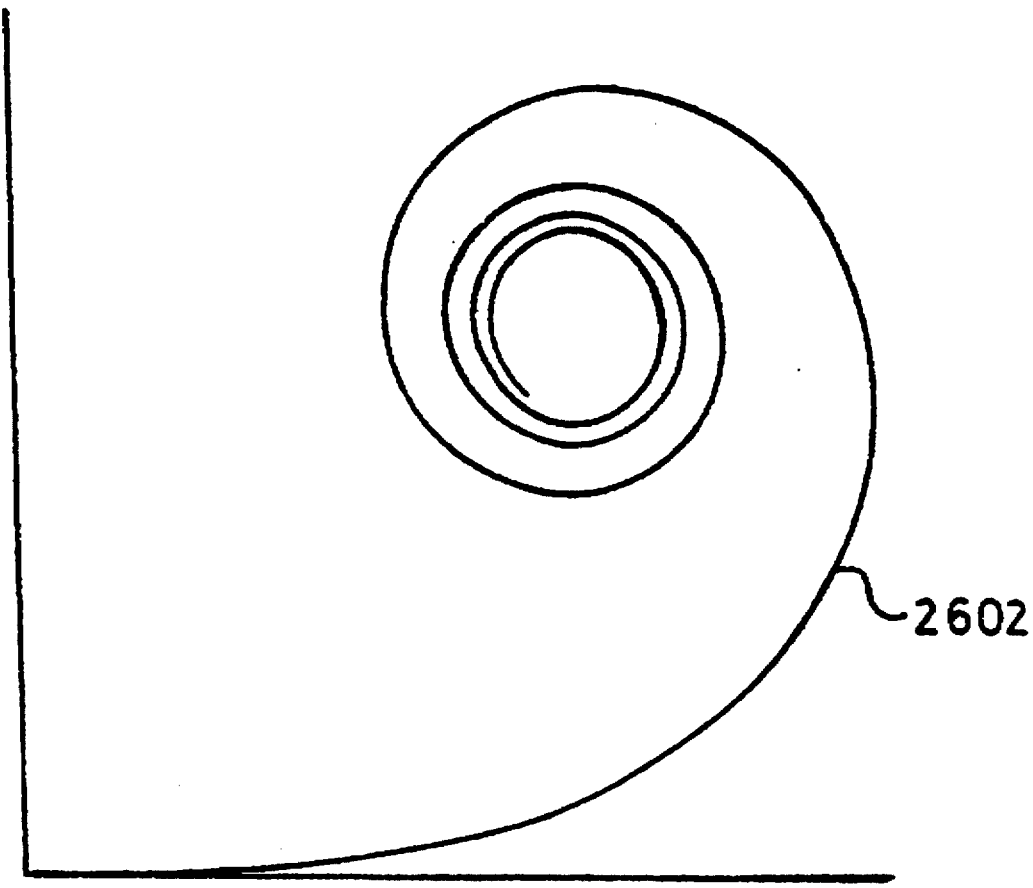
FIG. 26 is a graphical illustration of a clothoid curve.

Clothoid curves are used in an embodiment of the present invention. They are a family of curves that are posture-continuous, and are distinct in that their curvature varies linearly with the length of the curve:

$$c(s) = ks + C_i \quad \text{(EQ.3)}$$

where k is the rate of change of curvature (sharpness) of the curve and subscript i denotes the initial state. A clothoid curve segment 2002 is shown in FIG. 26.

Given an initial posture, sharpness of the clothoid segment and the distance along that segment, position, orientation and curvature at any point are calculated as follows:

$$\theta(s) = \theta_i + \int_0^s c(\xi)d\xi = \frac{k}{2} s^2 + c_i s + \theta_i \quad \text{(EQ. 4)}$$

$$x(s) = x_i + \int_0^s \cos\theta(\xi)d\xi = \int_0^s \cos\left\{\frac{k}{2}\xi^2 + c_i\xi + \theta_i\right\}d\xi + x_i \quad \text{(EQ. 5)}$$

$$y(s) = y_i + \int_0^s \sin\theta(\xi)d\xi = \int_0^s \sin\left\{\frac{k}{2}\xi^2 + c_i\xi + \theta_i\right\}d\xi + y_i \quad \text{(EQ. 6)}$$

d. Generation of a Posture-Continuous Path

Practical navigation problems require composite paths whose range and complexity cannot be satisfied by a single clothoid segment. Most paths require multiple segments that pass through a sequence of objective points.

(1) Existing Methods

Hongo et al., "An Automatic Guidance System of a Self-Controlled Vehicle—The Command System and Control Algorithm", *Proceedings IECON*, 1985, MIT Press, 1985. proposed a method to generate continuous paths composed of connected straight lines and circular arcs from a sequence of objective points. While paths comprised solely of arcs and straight lines are easy to compute, such a scheme leaves discontinuities at the transitions of the segments as discussed above.

Kanayama et al., "Trajectory Generation for Mobile Robots", *Robotics Research: The Third International Symposium*, ISIR, Gouvieux, France, 1986, makes use of paired clothoid curves with straight line transitions between postures. The constraint of straight line transitions is due to the integrals in Eqs. (7) and (8) which do not have closed form solutions. Kanayama simplified this problem by requiring $c_i$=0. Also, by rotating the reference frame by the amount of the initial orientation, $\theta_i$=0; only a straight forward approximation of $\int_0^s \sin(k\xi^2)d\xi$ is left.

Kanayama's method leads to paths that are sharper at some points and less compact than necessary, with adverse consequences to control. In addition, the requirement for straight-line transitions precludes the local replanning of paths because there are no guarantees that a segment to be replanned will include an uncurved section.

2. Path Generation from a Sequence of Points

A two-step method of the present invention, to generate a unique posture-continuous path from a sequence of points is now described.

Figure 23:
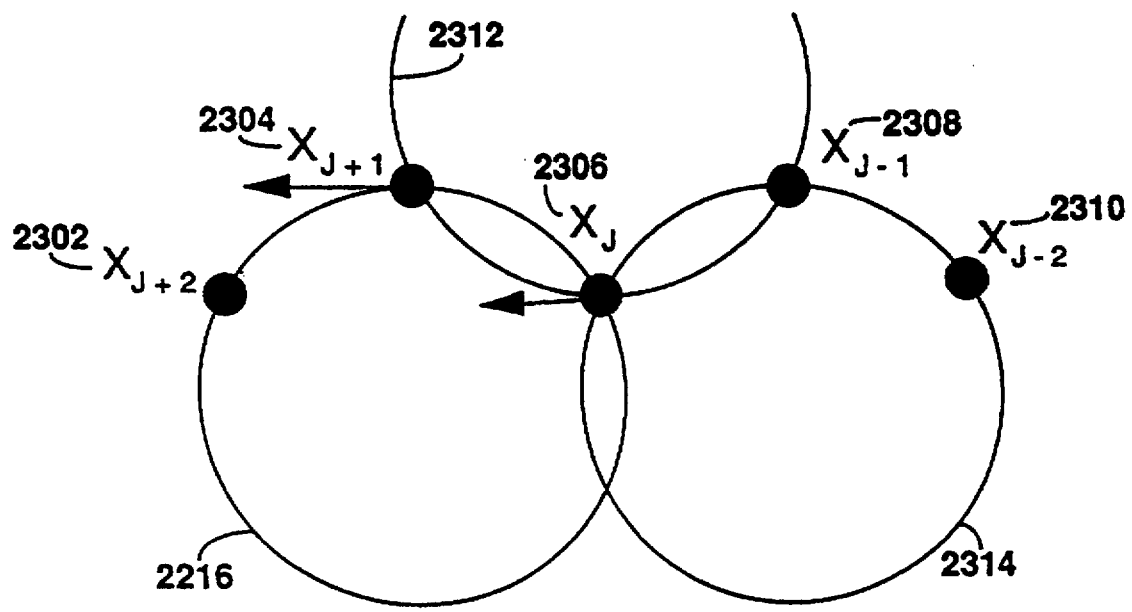
FIG. 23 is a diagrammatical representation of how postures and associated circles are obtained from objective points.
Figure 24:
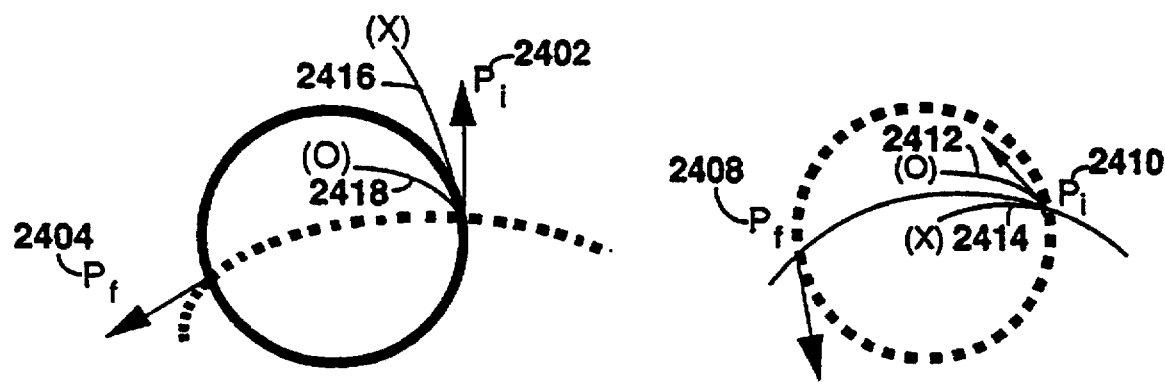
FIG. 24 is a diagrammatical representation of how the sign of the first clothoid segment is determined.

Referring now to FIGS. 23, 24 and 25), the first step is to derive a sequence of unique postures 2302, 2304, 2306, 2308, 2310 from the objective points. The second step is to interpolate between those postures with clothoid segments. Heading and curvature at the starting and ending positions 2402, 2404 are presumed. Let $P_i$, $P_f$ be the starting and ending postures 2402, 2404, respectively.

It is not always possible to connect two postures with one clothoid curve segment because four equations EQ.2, EQ.4, EQ.5, and EQ.6 cannot be satisfied simultaneously with only two parameters (sharpness k and length s) of a clothoid curve.

In order to satisfy the four equations EQ.2, EQ.4, EQ.5, and EQ.6 one needs at least two clothoid curve segments. However, the general problem cannot be solved with two clothoid segments because if $k_i$ and $k_f$ have the same sign, in most cases, a third segment is required in between. One adequate set of the clothoids connecting a pair of neighboring associated postures is the set of three clothoid segments $(k,s_1)$, $(-k,s_2)$, $(k,s_3)$. The subscripts denote the order of the clothoid segments from $P_i$. This combination is plausible for the following reasons:

1. The signs of k for the first and the last clothoid segments are the same.
2. k for the second clothoid segment is equal in magnitude and opposite in sign to that of the first and last segments. This enables the curve of three clothoid segments to satisfy the curvature variation between the starting and the ending curvatures by varying $s_1$, $s_2$, $s_3$, even though the sign of the first and the last clothoid segments satisfies the curve location requirement.
3. There are four variables in the combination: k, $s_1$, $s_2$, $s_3$. It is possible to find a unique solution satisfying the following four equations which describe the mathematical relationship between the starting and the ending postures.

$$c_f = c_i + k(s_1 - s_2 + s_3) \quad \text{(EQ. 7)}$$

$$\theta_f = \theta_i + c_i(s_1 + s_2 + s_3) + k(s_1s_2 - s_2s_3 + s_3s_1) + \frac{k}{2}(s_1^2 - s_2^2 + s_3^2) \quad \text{(EQ. 8)}$$

$$x_f = x_i + \int_0^s \cos\theta_1(\xi)d\xi + \int_0^s \cos\theta_2(\xi)d\xi + \int_0^s \cos\theta_3(\xi)d\xi \quad \text{(EQ. 9)}$$

$$y_f = y_i + \int_0^s \sin\theta_1(\xi)d\xi + \int_0^s \sin\theta_2(\xi)d\xi + \int_0^s \sin\theta_3(\xi)d\xi \quad \text{(EQ. 10)}$$

where $$\theta_1(\xi) = \theta_i + c_i\xi + \frac{k}{2}\xi^2$$

$$\theta_2(\xi) = \theta_i + c_is_1 + \frac{k}{2}s_1^2 + (c_i + ks_i)\xi - \frac{k}{2}\xi^2$$

$$\theta_3(\xi) = \theta_i + c_i(s_1 + s_2) + k(s_1s_2) + \frac{k}{2}(s_1^2 - s_2^2) + \{c_i + k(s_1 - s_2)\}\xi + \frac{k}{2}\xi^2$$

Figure 27:
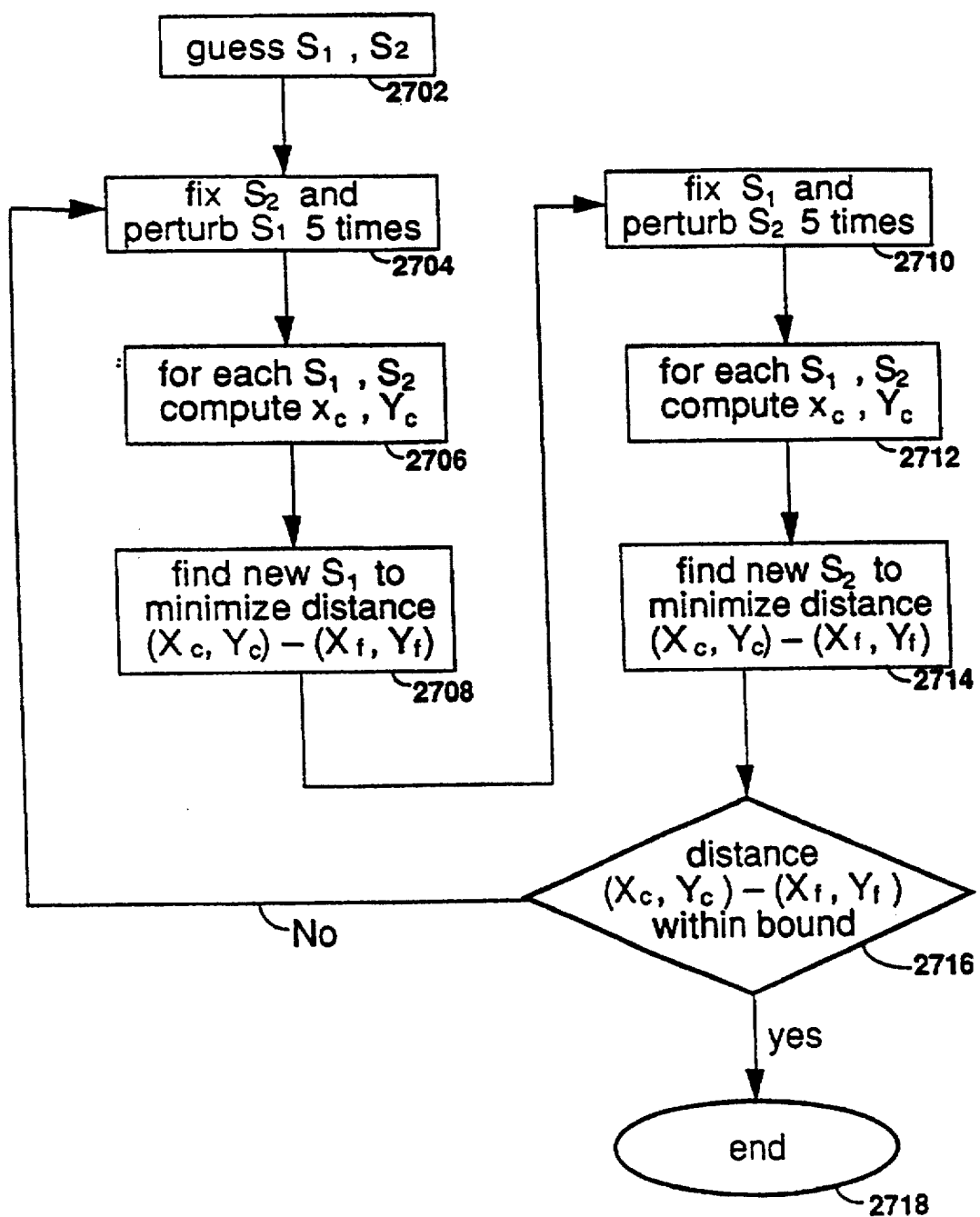
FIG. 27 is a flowchart of a numerical method for calculating approximate Fresnel integrals.

Referring now to the method shown in FIG. 27. Since equations 9 and 10 above contain Fresnel integrals, for which there is no closed form solution, the values of k,s1,s2, and s3 are computed.

Paths resulting from the method have the following advantages over other methods:

The method proceeds from an arbitrary sequence of points. Generation of postures is essential to exploratory planning where goals are commonly posed as an evolving string of points. Paths generated by the method pass through all the objective points whereas paths from Kanayama's method and the arc method are only proximate to many of the points because these methods start from a sequence of postures.

The method guarantees continuity of position, heading and curvature along the path. Further, sharpness is piecewise constant.

Paths generated by the method always sweep outside the acute angles formed by straight line connection of the way points. The resulting paths are especially useful for interpolating around obstacles that are commonly on the inside of angles. In contrast, Kanayama's paths are always inside the angles.

3. Clothoid Replanning Paths

Clothoid replanning is done either to aquire the path initially, or to guide the vehicle 310 back to the desired path 3312 through normal navigation according to the present invention.

To avoid abrupt accelerations in an attempt to make gross corrections in tracking a pre-specified path, a path replanner is used by the present invention to generate a new path which converges smoothly to the desired path 3312 from the current position. Replanning decomposes to two sub problems:

1. Determining the point of convergence to the intended path 3308.
2. Planning a path from the current position 3302 to the convergent point 3308.

Figure 28:
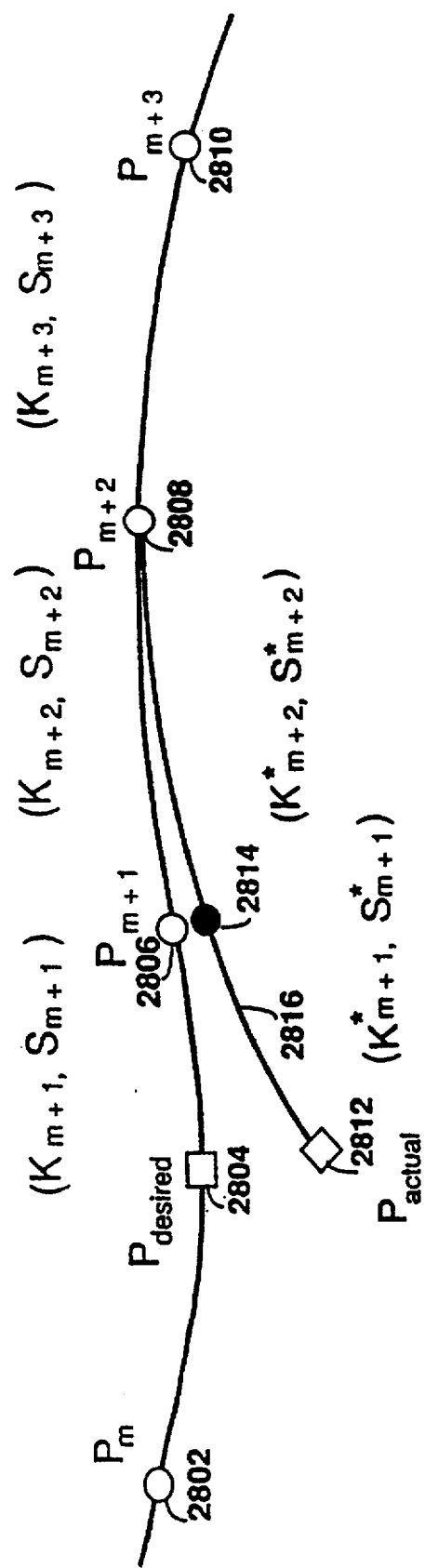
FIG. 28 is a diagram showing the replanning of a path.

Reference is made to FIG. 28, which graphically illustrates replanning a path in accordance with the present invention. A pre-specified path consists of interpolations 2804 between postures $(k,s)_m$ (m=1, ..., n) 2804–2810 and the postures $P_m$ (located at the end of segment $(k,s)_m$). Assuming that the vehicle 310 deviates from the path between $P_m$ and $P_m+1$, then $P_m+2$ is chosen as the posture 334 to which the replanned path 2816 converges. The distance to $P_m+2$ is variable.

A curve composed of two curve segments is fitted to the postures (the current posture and the one chosen as a convergence posture) to obtain a replanned path 2816, satisfying four governing posture equations EQ.7, EQ.8, EQ.9, EQ.10. If we assume that the threshold that determines whether a path is to be replanned or not is much smaller than the length of each clothoid curve segment $(k,s)_m$, we can find a new posture-continuous path $((k^*_k+1, s_k+1), (K^*_k+2, s^*_k+2))$ using a small perturbation from known $((k_k+1, s_k+1), (k_k+2, s_k+2))$. Since the replanned path 2816 is not likely to be very far from the original path 3312, two clothoid segments can be used.

4. Summary

In accordance with the present invention, generation of continuous paths for autonomous vehicles 310 can use clothoid segments to generate paths not only because the resulting path is posture continuous but also because linear curvature along the curve leads to steering angles that vary approximately linearly along the path, facilitating path tracking.

The approach of the present invention is as follows: first, a sequence of the postures is obtained using the objective points. Then, each of the adjacent postures is connected with three clothoid curve segments.

The present method accrues additional advantages in that preprocessing of the objective points is not necessary as with arcs and zero curvature clothoids. Further, the geometry of the paths generated always sweeps outside the acute angles formed by straight line connection of the way points. These are especially useful for interpolating around obstacles that are commonly on the inside of angles.

From the set of stored arcs, lines and postures, clothoid curves, B-splines, and so on, points along a path are generated with the VPS posture block.

Advantages of the present invention's handling routes in this way, besides reducing the bandwidth requirements between the host and the vehicle, effects data compression reducing data storage requirements, and functions to smooth-out paths.

5. B-Splines

B-splines are well known by mathematicians and those familiar with computer graphics (see "Mathematical Elements for Computer Graphics," by David F. Rogers and J. Alan Adams, McGraw-Hill Book Company, New York, N.Y., pages 144 to 155) as a means of describing the shape of a series of points by a specifying the coefficients of a polynomial equation. This curve fit function is an Nth order polynomial, where N is user specified and depends on the desired shape of the curve. The B-spline curve can be of any order and are continuous to the order of the curve fit function minus one.

B-splines are used in an embodiment of the present invention. B-splines lend themselves well to path generation in the present invention because an arbitrarily long path can be described by a low number of coefficients, thus reducing the amount of data storage. Provided that the order of the curve fit function is high enough (three or larger), then the generated path will be smooth in curvature, resulting in a path which is inherently easy to track with the aforementioned embodiments of the present invention.

Figure 29:
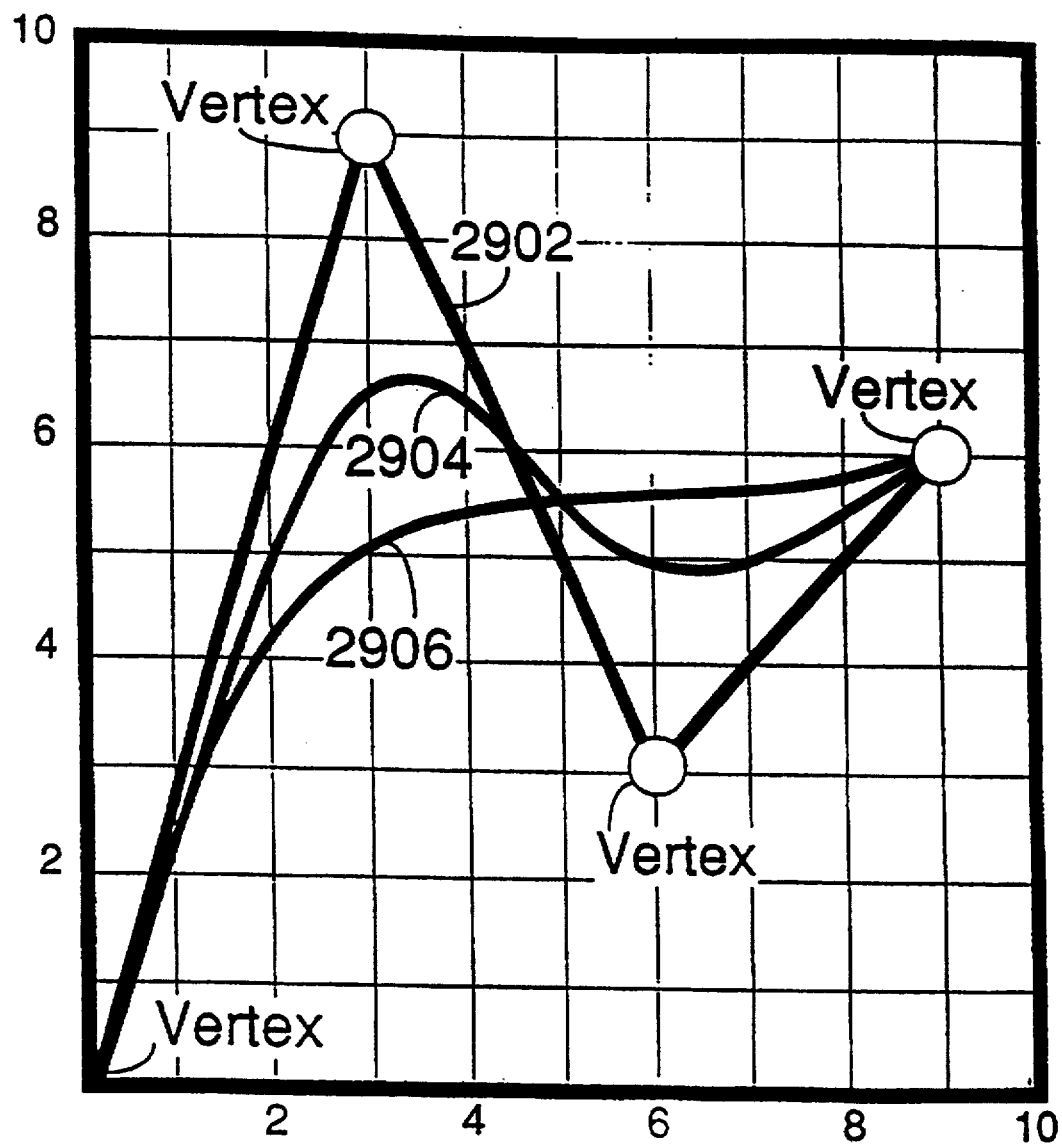
FIG. 29 is a graph of B-spline curves of second, third and fourth order.

FIGS. 29 shows an example of B-spline curves.

2. Route Creation and Storage a. Introduction

In one embodiment of the present invention, in order to create routes for a site 300, data is first collected from the VPS system 1000 and stored while a human drives the vehicle 310 over the road system of the work site 300. Nodes and segments are then fitted to the stored driven data, and organized into routes per the aforementioned procedure.

An application on an APOLLO computer (now HEWLETT-PACKARD Co. of Palo Alto, Calif.) work station (a graphics display system, not shown) was developed to graphically fit route data to the stored driven data and to further define routes (that is, speeds, sequences, starting point, traversal direction). Any graphics work stations equivalent to the APOLLO could be used.

Once the routes for a site are defined, the route data is written to a permanent storage device. In one embodiment of the present invention, the storage device used is a bubble memory cartridge 5302 with an associated reader/writer. The bubble memory device 5302 is durable and retains the data when power is disconnected. The APOLLO application is capable of writing data to a cartridge 5302 and reading data from a cartridge 5302.

As implied above, routes in the present invention may be predefined, or they may be generated dynamically.

In mining applications, generally a site 300 is surveyed and roads are pre-planned, carefully laid out and built. The routes used by the navigation system may then either be obtained from a manually created computer data base (created specifically to be used by the navigation system), or alternately, a vehicle may be physically driven over the actual routes on site to learn the routes as described above. In the learning method, several trips over a given route may be made. Then the variations in the data (due for instance to driver weaving) are averaged, and a smoothed-out best fit developed.

b. ROUTE DEFINITION

In one embodiment of the present invention, the following method is used for route definition.

1. Define the nodes and segments upon which the routes will be built. Place the node and segment data into an array called the "routeData" array. Each record in the array contains the following information:
   1. Type of item (that is, node, linear segment, circular segment, end of route marker).
   2. If node item, define the north and east coordinates of the node;
      else if linear segment item, define the speed along the segment;
      else if circular segment item, define the north and east coordinates of the center, the radius, the direction the circle is traversed (that is, clockwise, or counterclockwise), and the speed along the segment;

else if end of route marker, there is no other information.

2. Link the node and segment data together into sequences. The sequences are simply an array of indexes into the routeData array. Each sequence must begin with an end of route marker, followed by a node, then the remainder of the sequence alternate between segments and nodes until the sequence is terminated by another end of route marker. An example sequence would be, 1, 6, 3, 4, 7, 9, 10, 23, 78, 1 where the integers are indexes into the routeData array.

3. Finally define a route by specifying an index into the sequence array and whether to index through the sequence in the positive or negative direction. Place the index and index direction into an array called the "routeSpec" array. An item in the route spec array may look like the following:

6, 1 This specification defines a route which begins at node 6 and is indexed in the positive direction.

78, −1 This specification defines a route which begins at node 78 and is indexed in the negative direction.

A user simply tells the vehicle which item in the routeSpec array to use as a route.

4. The aforementioned data is stored onto the storage device in the order which it was defined in steps 1–3.

c. NAVIGATOR ROUTE USAGE

The following describes how the navigator 406 uses the defined routes from the above method of the present invention.

When the navigator 406 is powered on it reads the route information from the storage device 5302 and stores it in RAM in the syntax already presented.

Next the operator specifies a route for the vehicle 310 to follow. Again, the route is simply an index into the routeSpec array.

When the navigator 406 decides that all systems are ready for auto-operation, it sends a message to the vps_posture task 5324 telling it to engage.

The vps_posture task 5324 then determines the position, along the route which is closest to the vehicle's 310 present position 2812. The search for the closest position 284 on the route proceeds as follows:

1. A pointer is set to the first segment in the route.

2. The perpendicular distance from the vehicle position to the segment is determined.

3. The pointer is moved to the next segment in the route.

4. The perpendicular distance from the vehicle position to the next segment is determined.

5. Repeat steps 3 and 4 until the end of route marker 2218 is reached.

6. Determine the distance from the vehicle position to the end points 2218 of the route.

7. Set a pointer to the route segment which had the closest distance and store the coordinates of the closest distance.

The vps_posture task 5324 then uses the description of the route (lines, arcs and speeds) to generate posture at one meter intervals. The task 5324 generates a predefined distance of postures plus a safety margin and puts the postures into a buffer 3000. To generate a posture which is one meter from a given posture the vps_posture task 5324 uses the following procedure:

1. Determine the type of segment from which the given posture was generated.

2. Use the proper formula for the type of segment to determine the change in north and east per meter of segment length.

3. Add the change in north and east per meter to the last given posture.

4. If the generated posture is beyond the end of the current segment, set a pointer to the next segment and repeat steps 2 and 3. else, return the generated posture.

The vps_posture task 5324 then informs the executive 5316 that it is ready for tracking.

Figure 30:
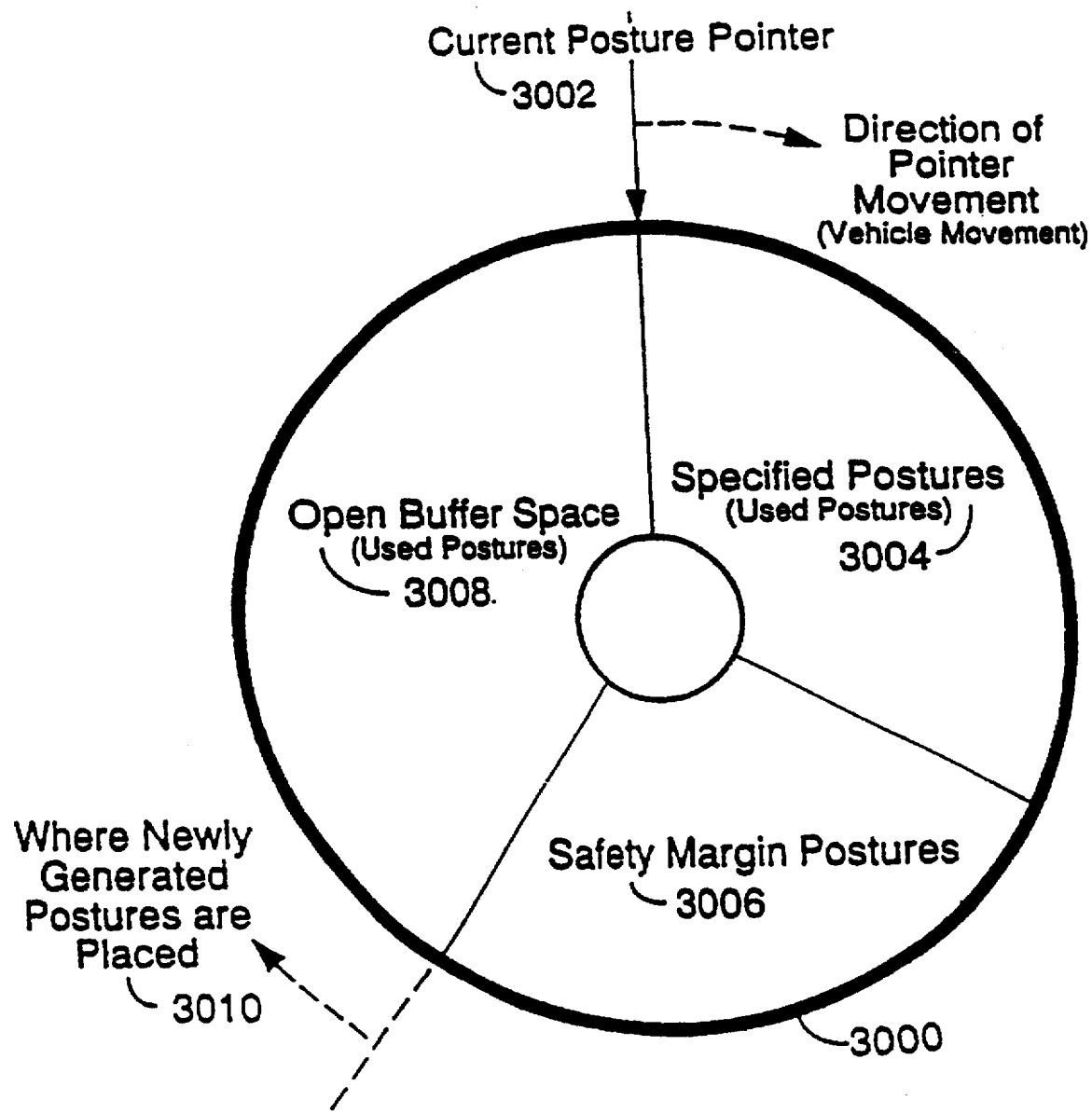
FIG. 30 is a diagram of an embodiment of the posture ring buffer of the present invention.

As the autonomous vehicle 310 moves along the posture in the buffer 3000, the safety margin 3006 is depleted. When the safety margin is below a specified amount, the vps_posture task 5324 generates another safety margin 3006 of postures and appends them to the current buffer 3000. The vps_posture task 5324 depletes the posture buffer 3000 by monitoring the current position 2812 of the vehicle 310 and moving a pointer 3002 in the buffer 3000 to the nearest posture. The posture buffer 3000 is constructed as a ring which is traversed in the clockwise direction (see FIG. 30, Posture Ring Buffer). That is, postures are placed in the ring such that the direction of vehicle travel corresponds to a clockwise traversal of the posture ring buffer 3000. Therefore, as the vehicle 310 moves the pointer 3002 to the nearest posture in the buffer 3000 will be moved in the clockwise direction. When the pointer 3002 will be moved in the clockwise direction, memory in the ring behind posture (counterclockwise of the pointer) is free to be over written.

Step 7 (in the search routine above) is registered until the end of route marker 2218 is reset at which time the vps_posture task 5324 ceases to generate posture and informs the executive 5316 that it has reached the end of the route.

As mentioned above, a path is as a series or sequence of contiguous "postures." A posture includes the speed and steering angle required to be on track. A posture may include latitude, longitude, heading, curvature (l/turning radius), maximum velocity and distance to next posture information.

3. Posture Generation

The tracking method of the present invention, requires certain information about the route it is tracking. The information is contained in a packet called a "posture" 3314. A single posture 3314 may contain position (that is, north and east coordinates), heading, and curvature data, for a specified location on the route. Therefore, a way of producing posture data from the route specification is required in accordance with the present invention.

Among the navigator tasks, (discussed below) is a task which reads the route information and produces postures at intervals (one meter for instance) along the route which are used by the tracking method. In one embodiment of the present invention, each posture requires 36 bytes of memory which translates to about 36 k of memory for each kilometer of route. To reduce the memory requirements, the navigator buffers posture data.

The task which produces the postures reads the current position of the vehicle 310, finds the nearest point on the route to the current position, then generates a specified number of postures ahead of the vehicle 310. The number of postures generated is dependent on the maximum stopping distance of the vehicle 310. That is, there should always be enough postures in the buffer 3000 to guide the vehicle 310 to a stopping point.

In the B-spline approach to route definition according to the present invention however, the need for a posture buffer is eliminated, since the tracking method is able to directly produce posture information from the B-spline curve.

C. Path Tracking

1. Introduction

Figure 36:
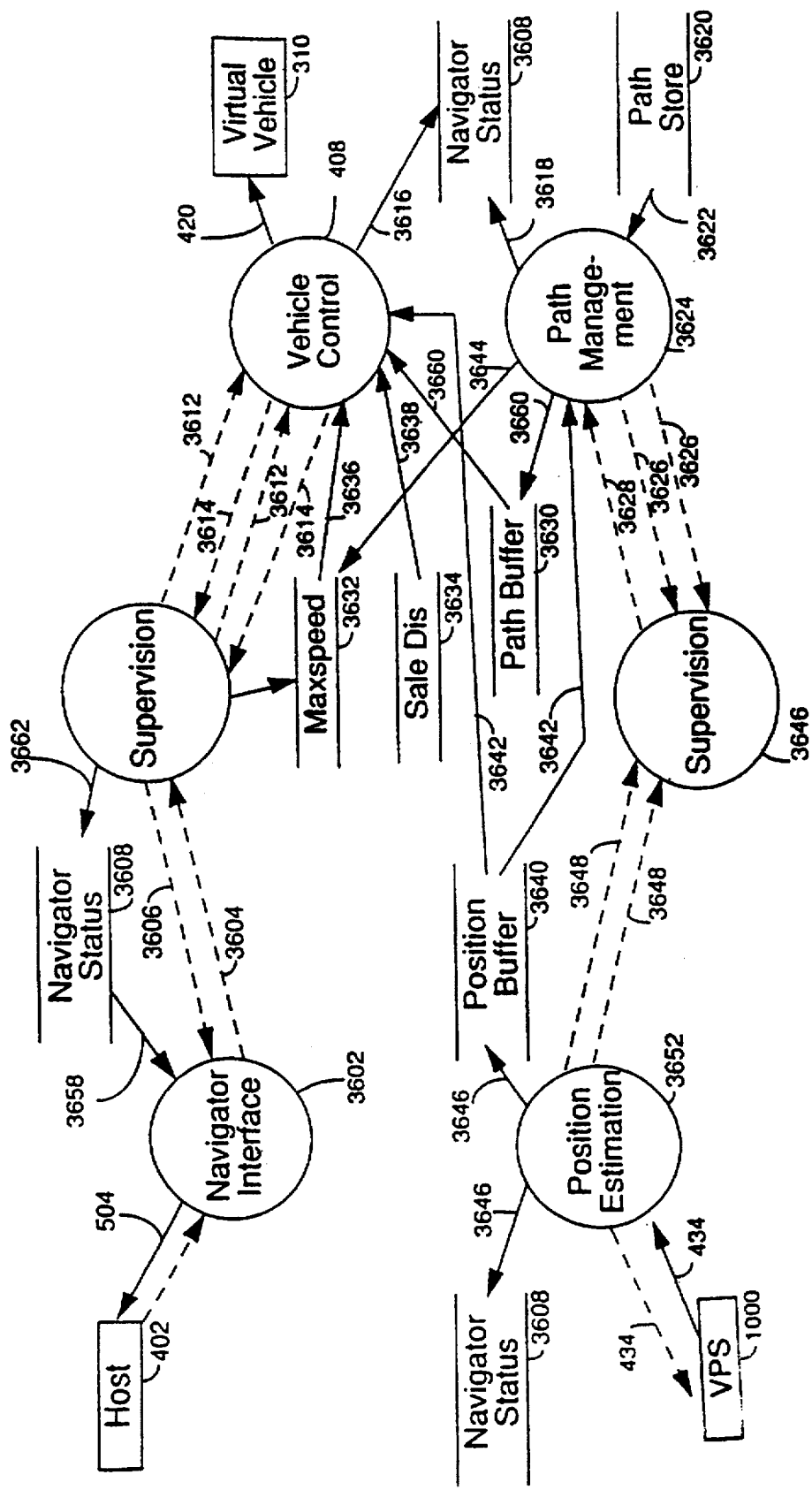
FIG. 36 is a context diagram of a path tracking structure of the present invention.

Path tracking or following is a critical aspect of vehicle navigation according to the present invention. The technique of the present invention uses position based navigation (rather than vision based navigation used in conventional navigation systems) to ensure that the correct autonomous vehicle path 3312 is followed. The present invention is also innovative in that it provides for separate control of steering angle 3116 and vehicle speed 3118. FIG. 36 graphically illustrates the path tracking system 3100 of the present invention.

For an autonomous vehicle 310 according to the present invention to track specified paths, it is necessary to generate referenced inputs for the vehicle servo-controllers. Thus, path tracking can be considered as a problem of obtaining a referenced steering angle and a reference speed for the next time interval in order to get back to the referenced path ahead from the current deviated position.

In general terms, path tracking is determining the autonomous vehicle commands (speed, steer angle) required to follow a given path. Given a pre-specified steering angle, driven wheel velocity values and error components, the command steering and driving inputs are computed in the present invention.

2. Considerations a. Global position feedback

The path to be tracked is specified in Cartesian coordinates. If the control scheme consists of only a servo-control to reference steering commands, vehicle position and heading errors accumulate. Position and heading result from integrating the whole history of steering and driving. Thus, it is necessary to feedback vehicle position 3304 and heading 3318 in Cartesian space.

Consequently, referenced inputs to the servo-controllers are generated in real time, based on positioned feedback 3114 (as shown in FIG. 36).

b. Separate steering and driving control

Steering and driving reference inputs are computed in the present invention, from the given path and vehicle speed, respectively. This enables easy integration of path tracking with other modules of the present invention, such as collision avoidance.

3. Embodiments a. TRACKING CONTROL STRUCTURE

One of the challenges of vehicle autonomy is to determine the steering inputs required to track a specified path. For conventionally steered vehicles, in the present invention the desired path and the desired speed along the path can be tracked separately reducing the problem to one of controlling the steering. (A path, for this discussion, being a geometric curve independent of time in contrast to a trajectory, which is a time history of positions.)

Steering angles are planned from the desired path 3312 and sensed vehicle positions. These angles are commanded to the vehicle via a steering controller 3104.

Figure 31:
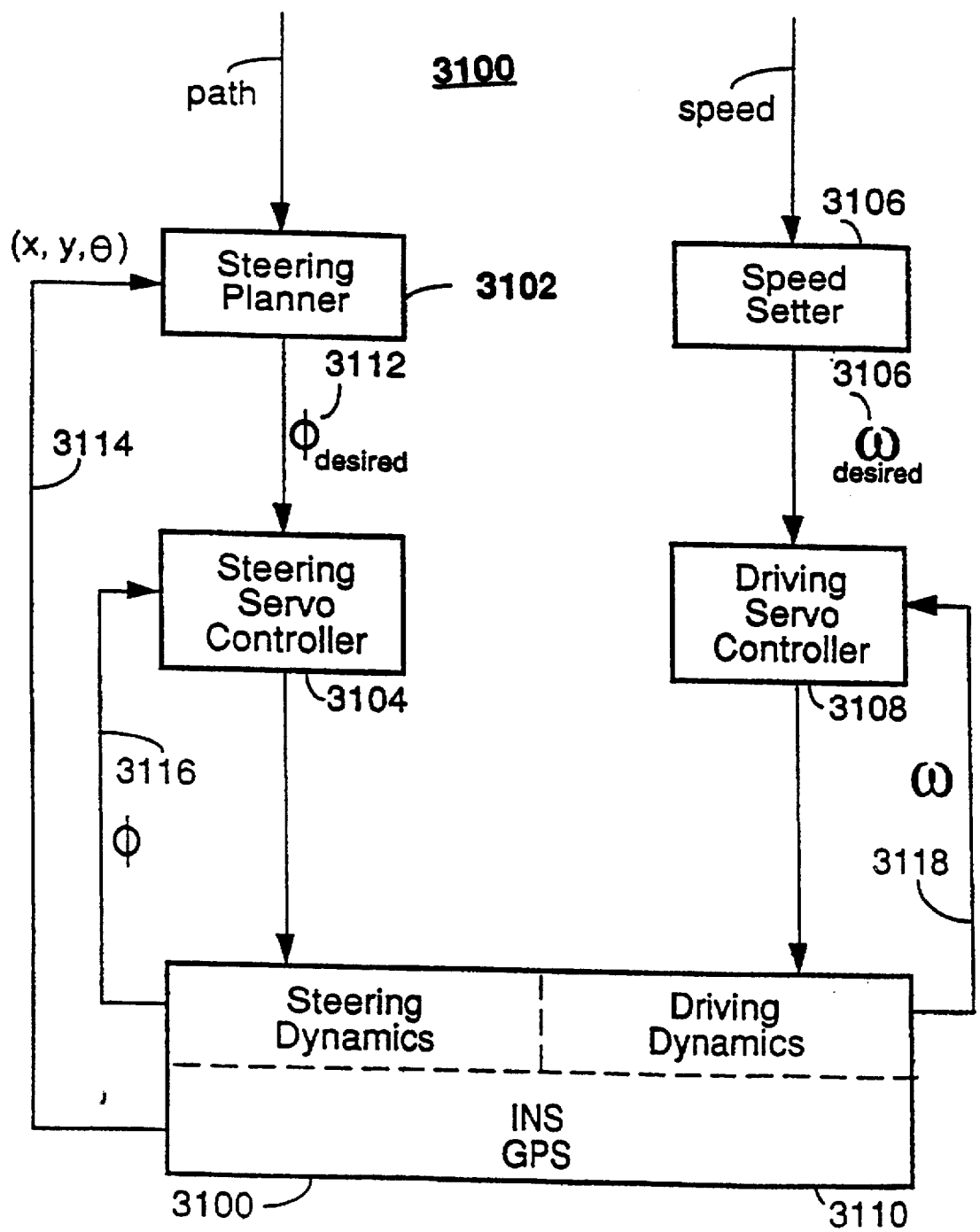
FIG. 31 is a diagram of a path tracking control structure of an embodiment of the present invention.
Figure 32:
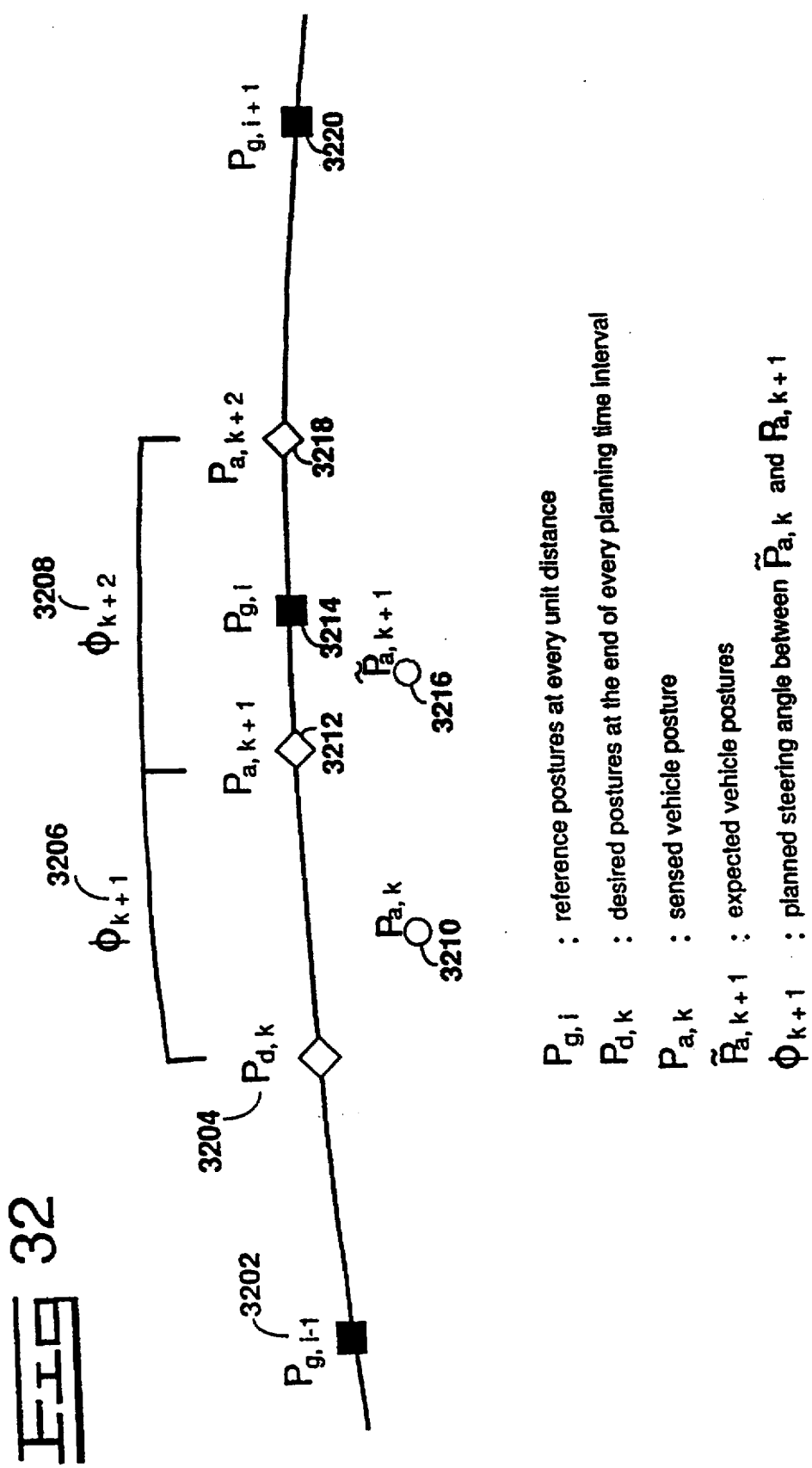
FIG. 32 is a diagram showing relevant postures in steering planning cycle.

The functional block diagram in FIG. 31, shows a tracking control structure according to the present invention.

In kinematic steering schemes, errors in position, heading and curvature are reduced based on the geometry of the errors without consideration of actuator saturation, compliance, any friction or mass terms. Tuning values, such as look-ahead distance and selection of curvature on the path, are selected through empirical trials and simulations in order to get good performance.

In a manually driven vehicle, the look-ahead distance is the distance 3310 in front of a vehicle that a driver looks during driving. The look-ahead distance in the present invention, is the distance by which the errors in position, heading and curvature are planned to be reduced to zero. It varies with the speed of the conventional or autonomous vehicle.

Varying the look-ahead distance varies the degree to which steering adjustments must be made to effect a change of course. Look-ahead distance is discussed in more detail in a following section.

However, real vehicles depart from kinematic idealization, and their control response departs accordingly. As vehicle speed, mass and path conditions change, actual vehicle response departs even further from kinematic idealization. Hence, kinematic idealization is generally valid only at low speeds with constant conditions.

An embodiment of the present invention uses a model which includes considerations of cornering stiffness, mass and slip angle. The control problem is formulated as a linear quadratic optimal tracking problem where the errors in position, heading and curvature are minimized based on the vehicle control model.

The optimal path and controls are computed from the desired path 3312 and the currently sensed vehicle position using the current errors as initial conditions to the optimal control problem. A few computed steering angles along the initial part of the optimal path are used as references to the low level steering controller for the next sensing time interval.

This preview optimal steering planning has the advantage of guaranteeing stability and optimality with respect to the given performance index. The optimal preview control method of the present invention, is central to the steering planning of an autonomous vehicle.

Turning again to FIG. 31, the inner loop 3116 of steering control 3104 is executed on the order of 10 milliseconds, while the outer loop 3114 is closed at the rate of 0.25–0.5 second.

The following procedure is used to close the loop on position. After sensing the current position ($Pa_k$) 3210, the posture at the end of the current time interval ($P_{a,k+1}$) 3216 is expected.

Then, the desired posture at the end of the next time interval ($P_{d,k+2}$) 3218 is computed in a referenced steering angle between ($P_{a,k+1}$) 3216 and ($P_{d,k+2}$) 3218 are determined.

Significantly, as mentioned above, these vehicle and path techniques of the present invention, decouple steering control from velocity control at the vehicle.

b. Quintic method

Shown in the navigator task diagram, FIG. 53, which is discussed in more detail below, is a functional block called the tracker 5306. The tracker 5306 operates to construct a smooth path back to the desired or correct path. In one embodiment of the present invention, as mentioned above, a quintic method is used. This involves a fifth order curve in error space for steering commands.

The quintic polynomial method of the present invention, replans a simple, continuous path that converges to a desired path in some look-ahead distance 3310 and computes a steering angle corresponding to the part of the replanned path 2816 to be followed for the next time interval.

If the desired path is considered as a continuous function of position and the vehicle is currently at Pa 3320, an error vector can be calculated (FIG. 33) that represents error in the distance transverse to the path (e0) 3322 relative to Po 3304, in heading (Bo) 3322, and in curvature (yo) 3404. If the vehicle is to be brought back onto the specified path within distance L 3310 (measured along the reference path), six boundary conditions can be stated corresponding to the initial errors and to zero errors at PL.

$$\epsilon(P_o)=\epsilon_o; \quad \epsilon(P_L)=0$$

$$\beta(P_o)=\beta_o; \quad \beta(P_L)=0$$

$$\gamma(P_o)=\gamma_o; \quad \gamma(P_L)=0 \tag{11}$$

A quintic polynomial can be constructed to describe the replanned path (in error space) as follows:

$$\epsilon(s)=\alpha_0+\alpha_1 s+\alpha_2 s^2+\alpha_3 s^3 \alpha_4 s^4+\alpha_5 s^5 \tag{12}$$

where $s_\epsilon^{[0,L]}$

The expression for e(s) gives the error along the o replanned path 2816 from Po 3304 to PL 3308. The second derivative describes path curvature, which can in turn, be used to calculate a steering command to guide the vehicle back to the desired path 3312. Variation in the steering angle 3116 from the replanned path 2816 (or in error space) is computed from the second derivative of error function e(s). Then, curvature along the new path can be computed as:

$$C_{new}(s) = C_{old}(s) + \frac{d^2\epsilon(s)}{ds^2} \tag{EQ. 13}$$

The reference steering angle 3112 along the new path can be converted from curvature. Since this procedure is executed at every planning interval, the entire new path back to the reference path 3312 is not required. Only the steering angle 3112 for the next time interval is computed from the curvature at the point on the new path that can be achieved in the next time interval.

The look-ahead distance, L 3310, is a parameter that can be used to adjust how rapidly the vehicle steers to converge to the desired path. Additionally, better performance is obtained if L 3310 is chosen proportional to the vehicle speed because for small values of L 3310, the vehicle oscillates around the path 3312, while for large values of L 3310 the variation introduced by the quintic polynomial is small enough that the tracking performance is poor.

Since there are six boundary conditions used: $e_{po}$—error in position at the current position (distance) and $e_{pl}$ (look-ahead), $e_{ho}$—error in heading and $e_{hl}$ (look-ahead), and $e_{co}$—error in curvature and $e_{cl}$ (look-ahead), a fifth order curve is required. This is used to generate a steering angle 3112.

Recall that path tracking schemes in general, perform better when the path specified is intrinsically easier to track. This is especially the case when the steering actuators are slow compared to the speed of the vehicle.

Other vehicle characteristics, like steering response, steering backlash, vehicle speed, sampling, and planning time intervals significantly affect vehicle performance. As expected, at higher vehicle speeds, faster and more accurate actuators are necessary, if sensing and planning time intervals are kept constant.

An advantage of the quintic polynomial method in general, is that it is simple, and reference steering angles can be computed very easily. However, since there is no consideration of vehicle characteristics (mass, inertia, time delays, vehicle ground interaction, and so on) in the control scheme, stability and convergence are not guaranteed.

The parameter L 3310 (look-ahead distance) can be adjusted to modify response to the vehicle, and the value of L 3310 can be chosen based on trial and error. This scheme has provided good results at speeds up to approximately 28 Km per hour at the time this application disclosure was prepared.

The method used by the tracker of the present invention is:

(1) estimate the next position by either averaging or evaluating the states of position;

(2) compensate for delays using either of the estimating methods (3) dynamic look-ahead changes at different speeds—the coefficients of the quintic: look-ahead distance.

c. Latency and slow system response

An additional path tracking embodiment of the present invention, uses various compensation techniques to improve vehicle response characteristics. This is used in conjunction with the quintic polynomial method to realize improved tracking performance.

Some vehicle response characteristics include latency of vehicle control commands, slow system response, and vehicle dynamic characteristics including vehicle-ground interaction (VGI), (slip angle and under/over steer).

The latency of vehicle commands was compensated in one embodiment of the present invention, by modifying the vehicle control hardware to reduce time delays, and by utilizing a method which sets control commands far enough in advance to compensate for the existing delays.

Decreasing the time lag between when the vehicle position is sensed and when the command is issued, reduces prediction errors, which is required to plan steering angles, and results in better tracking performance.

A varying look-ahead distance with speed also improves the tracking performance in comparison to the constant look-ahead distance.

A tracking method outputs steering and speed commands over a serial link to a vehicle control system. The vehicle control system is a multi-processor, multi-tasking system, relying on a mailbox queue for communication between tasks.

This mailbox queue is composed of two types of queues, a high performance queue and an overflow queue. During high data flow rates from the tracking task, the high performance queues spill into the overflow queue, degrading the performance of inter-task communication. This can result in total latency times between the tracking task and actual steering actuator commands which are on the order of seconds.

The steering dynamics may be modeled as a first order lag system. It takes a period equivalent to one time constant for a first order lag response to reach approximately 63% of the desired final value. As can be appreciated, for slow systems with large time constants, the response time can be significant.

To resolve the latency and response problems, hardware may be adjusted to be used in close conjunction with the tracking method to control vehicle steering, and a new control scheme devised to compensate for pure time delay and poor response.

The hardware may be adjusted, for example, to reside on the same back plane as the processor which executes the tracking method and controls the vehicle steering system directly. This serves to eliminate delays due to the serial link and queuing.

To compensate for the remaining delays (delays due to processing time of the tracking method and intertask communication within the tracking system), a method which sends speed and steering commands in advance to counteract any delays is used in accordance with the present invention. The method may be executed as follows:

sense the current position $P_actual$
(Initialization: $P_actual=P[0]=P[1]=\ldots=P[d\_index+1]$)
compute error between predicted and sensed position:
$P_e=P_actual-P[0]$ for i=0, d_index
$P[i]=P[i+1]+P_e$
compute the position on the path corresponding to the position of the beginning of the time interval: get _P on (P[d_index], $P_o$n)
get initial condition:errors(0)=P[d_index]-$P_o$n compute a quintic polynomial curve in error space [1]
  predict a position at the end of the planning time interval;
  get_despos($P_o$n,$^d$s,P+d_index+1)
  P[d+index+1]+=errors(ds)

For example, to compensate a system which has time delays on the order of two planning intervals (on the order of 250 mSec), the variable d_index is set to 2.0.

Tracking performance improves as the compensation index (d_index) is increased to match the delays inherent to the system.

d. Vehicle-ground interaction (VGI)

Reference commands for steering angle and vehicle speed result in varying angualr velocities and accelerations of the vehicle wheels.

VGI describes how the vehicle moves, given steered wheel angles and wheel angular velocities. The principal VGI phenomena are slip angle and under/oversteer characteristics which are based on the tire/road contact region geometry, and are affected by tire elastic deformation. These phenomena require a larger steering angle as compared to a kinematically computed one.

e. Sensing and actuation timing

Since actual path tracking is controlled by digital processors in the present invention, a discrete time interval is used. It is governed by the position sensing time interval (which may be on the order of 0.25 Sec) which is much longer than the computing time required for steering planning (which may be on the order of 16 mSec).

At times, especially when the discrete time interval is large, poor predictions of the vehicle position maybe made which degrade performance of the tracking method.

Figure 59:
FIG. 59 is a diagram illustrating an old sensing and actuation timing.

FIG. 59 is a diagram illustrating an old sensing and actuation timing. As shown in FIG. 59, the next vehicle position (k+1) is predicted along with the steering plan at the end of the position sensing time interval (250 msec).

A compensation method of the present invention, serves to reduce the error in predicting the next vehicle position by decreasing the discrete time interval. In this method, the vehicle position is predicted for the end of the computing interval (16 mSec) rather than at the end of the planning interval (250 mSec). The method is executed as follows:

sense the current position $P_actual$
  (Initialization: $P_actual=P[0]=$
  $P[1]=\ldots=P[dindex+1]=$
  $P_actual,k+1$
compute error between predicted and sensed position:
  Pe=Pactual-$P_actual$, k+1
for i=0, d_index
  $P[i]=P[i+1]+P_e$
compute the position on the path corresponding to the position of the beginning of the time interval: get_$P_o$n (P[d index], $P_o$n)
get initial condition: errors(0)=P[d_index]-$P_o$n
compute a quintic polynomial curve in error space
compute a quintic polynomial curve in error space[1]
predict a position at the end of the planning time interval:
  get_despos($P_o$n, $_d$s, P+d_index+1)
  P[d+index+1]+=errors(ds)
predict a position at the next sensing time:
  $P_actual$, k+1=P[0]+(P[1]-P[0])*(dt_plan-dt_comput)/dt_plan f. Look-ahead

Human operators use different look-ahead distances 3310 when driving. At slow speeds, a driver generally looks at a point on the road relatively close to the vehicle, while at higher speeds, this point is generally farther ahead of the vehicle. The higher the speed, the farther ahead the reference point is, resulting in smaller steering corrections.

Thus, in an autonomous application, a look-ahead distance which varies with speed, logically helps to improve tracking performance.

A desired steering angle may consist of a steering angle from the reference path 3312 and a steering angle 3112 which is computed with a quintic method to correct for tracking errors. These steering angles are summed to give the vehicle steering command as shown in equation (1) below:

$$\theta=\theta_{ref}+\theta_{error}$$

Note that look-ahead in the autonomous scheme affects only $\theta$error, even though look-ahead in manual driving affects both the reference and error compensating steering angles. Shorter look-ahead values result in large steering corrections; the look-ahead distance can therefore be interpreted as a gain in an error feedback system.

An arbitrary model for varying look-ahead distance (L) with speed (V) is expressed with three parameters, $V_ref$, $L_ref$, and slope, as shown in equation (2) below:

$$L=slope*(V-V_{ref})+L_{ref}$$

where V is the speed of a vehicle and L should be between $L_{min}=10$ and $L_{max}=30$. Tracking performance is improved with the varying look-ahead distance 3310 of the present invention.

g. Optimal Control Method

As mentioned above, an embodiment of the present invention uses a model which includes considerations of cornering stiffness, mass and slip angle.

The control problem is formulated as a linear quadratic optimal tracking problem where the errors in position, heading and curvature are minimized based on the vehicle control model. The optimal path and controls are computed from the desired path 3312 and the currently sensed vehicle position 3304 using the current errors as initial conditions to the optimal control problem.

A few computed steering angles along the initial part of the optimal path are used as references to the low level steering controller for the next sensing time interval. This preview optimal steering control has the advantage of guaranteeing stability and optimality with respect to the given performance index. The optimal preview control method according to the present invention, is applicable to the steering planning of an autonomous vehicle 310.

The model is derived from a standard telescoped, or bicycle model (not shown) or approximation of the vehicle. The equations describing the vehicle motion inculde terms which represent the VGI described earlier. These equations use the state variables:

$$x=[x, y, \theta, \dot{\theta}]$$

where x and y represent the global position fo the vehicle; 0 is the heading 3318 of the vehicle, and 0 is the rate of change of heading.

Using these variables, the equations are:

$$\dot{x}_1 = -x_3 \sin(x_4) + v_n \cos(x_4)$$

$$\dot{x}_2 = x_3 \cos(x_4) + v_n \sin(x_4)$$

$$\dot{x}_3 = -\frac{(C_{\alpha F} + C_{\alpha R})}{mV_n} + \left\{ \frac{(bC_{\alpha R} - aC_{\alpha F})}{V_n} - V_n \right\} x_5$$

$$\dot{x}_4 = x_5$$

$$\dot{x}_5 = \frac{(bC_{\alpha R} - aC_{\alpha F})}{IV_n} x_3 - \frac{(a^2C_{\alpha F} + b^2C_{\alpha R})}{IV_n} + \frac{aC_{\alpha F}}{I} u_1$$

$$u_1 = \delta$$

$$C = \left[ \frac{ML}{t} \right]$$

where:
$V_\zeta$: lateral Velocity
$V_\eta$: constant forward Velocity
$\delta$: steering angle
$\alpha_F$: slip angle
$V_F$: speed of the front wheel
$F_F$: lateral force between front wheel and ground
$F_R$: lateral force between rear wheel and ground
m: vehicle mass
I: vehicle moment of inertia
$\theta$=vehicle heading
$C_{\alpha F}$, $C_{\alpha R}$: front and rear tire cornering stiffness FIG. 60 is a diagram illustrating the relationship between a coordinate system 6010 and a new coordinate system 6020 for the vehicle. New coordinate system 6020 is comprised of an axis parallel to the direction the vehicle is heading and tangent to the path the vehicle is traveling (referred to as a forward direction 6030) and an axis perpendicular to the forward direction (referred to as a lateral direction 6040). New coordinate system 6020 is used to simplify control computations as discussed below.

It is well knonwn in the art of optimal control theory, that a cost function must be selected which is used to minimize selected parameters in the system. The cost funciton used in this problem was selected as:

$$J(t) = \frac{q_f}{2} [(x_1(t_f) - x_d(t_f))^2 + (x_2(t_f) - y_d(t_f))^2] + \quad \text{(EQ. 15)}$$

$$\frac{1}{2} \int_{t_0}^{t_f} [R_1(\dot{u}_1(t))^2 + (x_1(t) - x_d(t))^2 + (x_2(t) - y_d(t))^2] dt$$

There are several problems to solve the optimal control problem with the state equations (14) and the cost function (15);

1. The system is nonlinear. Usually, a two point boundary value problem which results from a nonlinear system does not have an analytic solution. Numerical solutions on the other hand take a long time to compute.

2. The resulting optimal control problem is a free final time problem. Generally fixed final time problems are simpler to solve than those with free final time.

3. The first term inside the integration (within the above xost function) is the time derivative of the control input, which is not usual in a quadratic cost function of an optimal control problem. However, the time rate change of steering is very important for smooth path following, because it is directly related to the time rate of change of centrifugal force (due to lateral accelerations of the vehicle).

Figure 51:
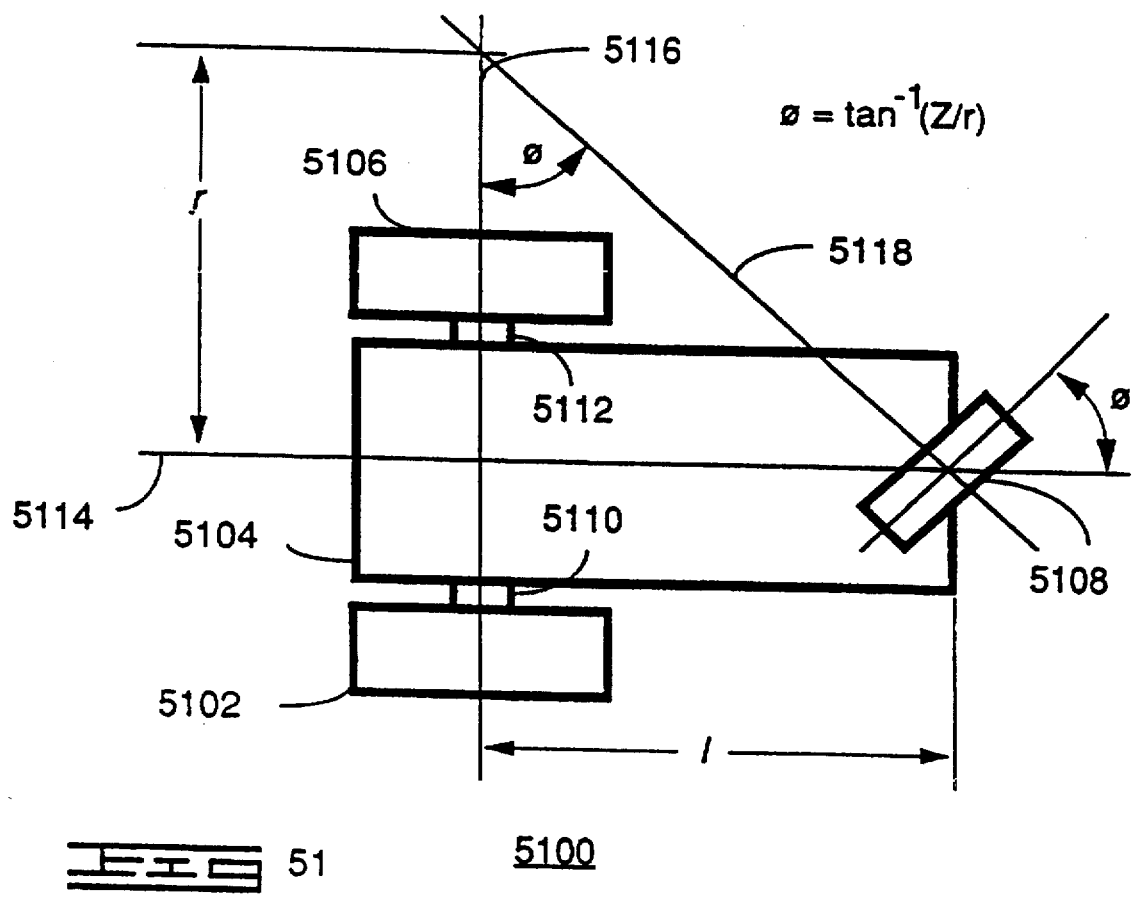
FIG. 51 is a diagram of a tricycle steering model used to develop navigation system of the present invention.

Note that the steering angle is dependent on the curvature of the path as in FIG. 51.

The following approaches are applied in order to overcome the above three problems and to make the resulting optimal control problem tractable:

1. Since the sinusoidal functions in the first and the second equations of (14) make the system nonlinear, a new coordinate system, an axis of which is parallel to the tangent direction of the corresponding point of the path to the current vehicle position, is used. The deviations only in the lateral direction are considered in the cost function. These two approximations not only eliminate the nonlinearity in the system equation but also reduce the number of equations to deal with; the first equation of (14) is not required now. (Refer to "Coordinate Systems.")

2. This problem with free final time, $t_f$, can be converted to the one with a fixed final value of the independent variable by writing the differentials in the equation of motion with respect to the forward distance. To this end, a non-dimensional independent variable, s, is defined as:

$$\bar{s} = \frac{s}{s_f} \quad \frac{d\bar{s}}{dt} = \frac{\dot{s}}{s} = \frac{\sqrt{\dot{V}^2 + V^2}}{s_f} \quad s = \text{accel}{f}$$

3. To solve the third problem pointed out above, a new state vector and a control input are defined as:

$$X_{new} = [X_{old}, U_{old}]^T, \quad U_{new} = \dot{U}_{old}$$

where Xnew satisfies:

$$A_{new} = \left[ \begin{array}{c|c} A_{old} & B_{old} \\ \hline 0 & 0 \end{array} \right]$$

$$B_{new} = \left[ \begin{array}{c} 0 \\ \hline 1 \end{array} \right]$$

y=Ax+B where Aold and bold denote the old system matrix and the old input matrix.

Then, the state variables and the control input are defined as:

$$Z = [\xi, v_\zeta, \theta, \dot{\theta}, \delta]^T, \quad u = \dot{\delta} \quad \text{(EQ. 16)}$$

which satisfies the system equations as the following:

$$\frac{d\xi}{ds} = z_1' = (z_2 + v_n z_3)\sigma \quad \text{(EQ. 17)}$$

$$\frac{dV_\zeta}{ds} = z_2' =$$

$$\left[ -\frac{C_{\alpha F} + C_{\alpha R}}{mV_n} z_2 + \left\{ \frac{bC_{\alpha R} - aC_{\alpha F}}{V_n} - V_n \right\} z_4 + \frac{C_{\alpha F}}{m} z_5 \right] \sigma$$

$$\frac{d\theta}{ds} = z_3' = z_4\sigma$$

$$\frac{d\dot{\theta}}{ds} =$$

$$z_4' = \left[ \frac{bC_{\alpha R} - aC_{\alpha F}}{IV_n} z_2 - \frac{a^2C_{\alpha F} + b^2C_{\alpha R}}{IV_n} z_4 + \frac{aC_{\alpha F}}{I} z_5 \right] \sigma$$

-continued $$\frac{d\delta}{ds} = z_3' = u\sigma$$

The new cost function becomes:

$$L(z,\bar{s}) = \frac{q_f}{2}[z_1(1) - \xi_d(1)]^2 + \frac{1}{2}\int_0^1 [R_1 u^2(\bar{s}) + \{z_1(\bar{s}) - \xi_d(\bar{s})\}^2]\, d\bar{s} \quad \text{(EQ. 18)}$$

The steering planning with resulting system equation (17) and the cost function (18) above, can be solved as a linear quadratic tracking problem as the following. Suppose the system equation and the cost function are described as $$\dot{X} = AX + BU, \ t > t_o \quad \text{(EQ. 19)}$$

$$L = \frac{1}{2}[x(t_f) - x_d(t_f)]^T Q_f[x(t_f) - x_d(t_f)] + \quad \text{(EQ. 20)}$$

$$\frac{1}{2}\int_{t_0}^{t_f}\{[x(t) - x_d(t)]^T Q(t)[x(t) - x_d(t)] + U^T(t)R(t)U(t)\}\, dt$$

and $Q_f \geq 0, Q \geq 0, R \geq 0$ are chosen all symmetric. Then the resulting equations are:

$$-\dot{P} = A^T P + PA - PBR^{-1}B^T P + Q, \ P(t_f) = Q_f \quad \text{(EQ. 21)}$$

$$k(t) = R^{-1}B^T P(t) \quad \text{(EQ. 22)}$$

$$-\dot{v} = (A - BK)^T v + Qx_d, \ V(t_f) = x_d(t_f) \quad \text{(EQ. 23)}$$

$$U = -Kx + R^{-1}B^T v \quad \text{(EQ. 24)}$$

Thus, the riccati equation (21) must be solved first and the gains are computed from the result of the riccati equation and then the forcing function driven by the desired path are computed by solving equation (23). Then, the control and states are obtained by solving equation (19) and (24).

The MacFarlane-Potter integration method was tried to solve the riccati equation. This method is known to be very effective for the steady-state solution of the time-invariant problem. Since the previewed distance is quite long and the initial parts of the solution are used, this method seems good to reduce the computation time.

Hence, equation (23) is changed as the following equation (25) and solved, because the previewed distance is long and only the inertial part of the solution is used.

$$(A - BK)^T v + QX_2 = 0 \quad \text{(EQ. 25)}$$

h. Conclusion

Tracking performance has been improved according to the present invention, by investigating and understanding vehicle and control system dynamics and by designing compensation methods given this understanding.

A degraded performance of a tracking method is attributable to latency of vehicle control commands, slow system response, and vehicle dynamic characteristics. It is possible to counteract each of these effects.

Latency of Vehicle commands, a dominant effect, can be successfully compensated by modifying the vehicle control hardware and by utilizing a method which set control commands far enough in advance to compensate the delays. Decreasing the time lag between when the vehicle position is sensed and when the command is issued reduces prediction errors. This is required to plan steering angles, and results in better tracking performance.

Varying look-ahead distance with speed also improves tracking performance in comparison to using a constant look-ahead distance.

In general terms then, path tracking is the function of staying on course. In path tracking in the present invention, as discussed, some of the considerations are errors in distance, heading and curvature, delays in the system including processing delays and delays in vehicle response to actuators, and so on, dynamic look ahead distance, weighted path history, and extrapolation.

D. Obstacle Handling

1. Introduction

Obstacle handling involves at least three major functions: detection of obstacles 4002, avoidance of obstacles 4002, and returning to path 3312. The returning to path function is similar to path generation and tracking, as described above.

In addition to path tracking (following), successful navigation of vehicle 310 requires that vehicle 310 be able to detect obstacles 4002 in its path, thus allowing the vehicle to stop or otherwise avoid such an obstacle before a collision occurs.

In one embodiment of the present invention, a single line infra-red laser scanner 404 (See FIG. 38) is used in a configuration where the scan is horizontal (not shown). The scan line 3810 does not contact the ground, so any discontinuities in the range data can be attributed to objects 4002 in the environment.

Since a reference path 3312 is available and the vehicle position is known relative to the reference path, only the range data and a region bounding the reference path 3312 is processed for threatening objects 4002. Objects outside of this region, or boundary zone, are ignored. The width of the boundary zone (not shown) is equal to the vehicle width plus some selected safety buffer to allow for tracking and positioning errors. This method is limited in its usefulness and is referred to as "clearance checking."

2. Detection of Obstacles a. Clearance checking

In the simplest case of the present invention, the laser 404 may be used in a single line scan mode with successive range measurements being made at regular angular intervals as the laser scans over the field of view. Again for simplicity, these scans can commence at regular time intervals. The term "clearance checking" has been used to describe this method. In this version of the present invention, the method has been limited to processing only two dimensional data.

This type of obstacle method is limited to checking to see if the path 3312 is clear using a single line scan mode with successive range measurements being made at regular angular intervals as the scanner 404 scans over the field of view. It does not include any methods to establish the existence of any obstacle 4002 or to create a path around it if the path is not clear. This type of method is not deemed to be a particularly useful obstacle detection method, except in very rigidly controlled environments, such as on a factory floor.

b. Filtering and edge detection scheme

A second obstacle detection embodiment of the present invention uses a multiple-line scanner 3804 (See FIG. 38), whose scan 3810 contacts the ground at some distance in front of the vehicle 310. Since the scan line contacts the ground, discontinuities in range data can no longer be attributed to threatening objects 4002. For example, profiles from natural objects such as hills and banked or crowned roads can cause discontinuities in range data. This technique of the present invention can discern discontinuities in range data between threatening objects 4002 and natural objects (not shown).

Figure 39:
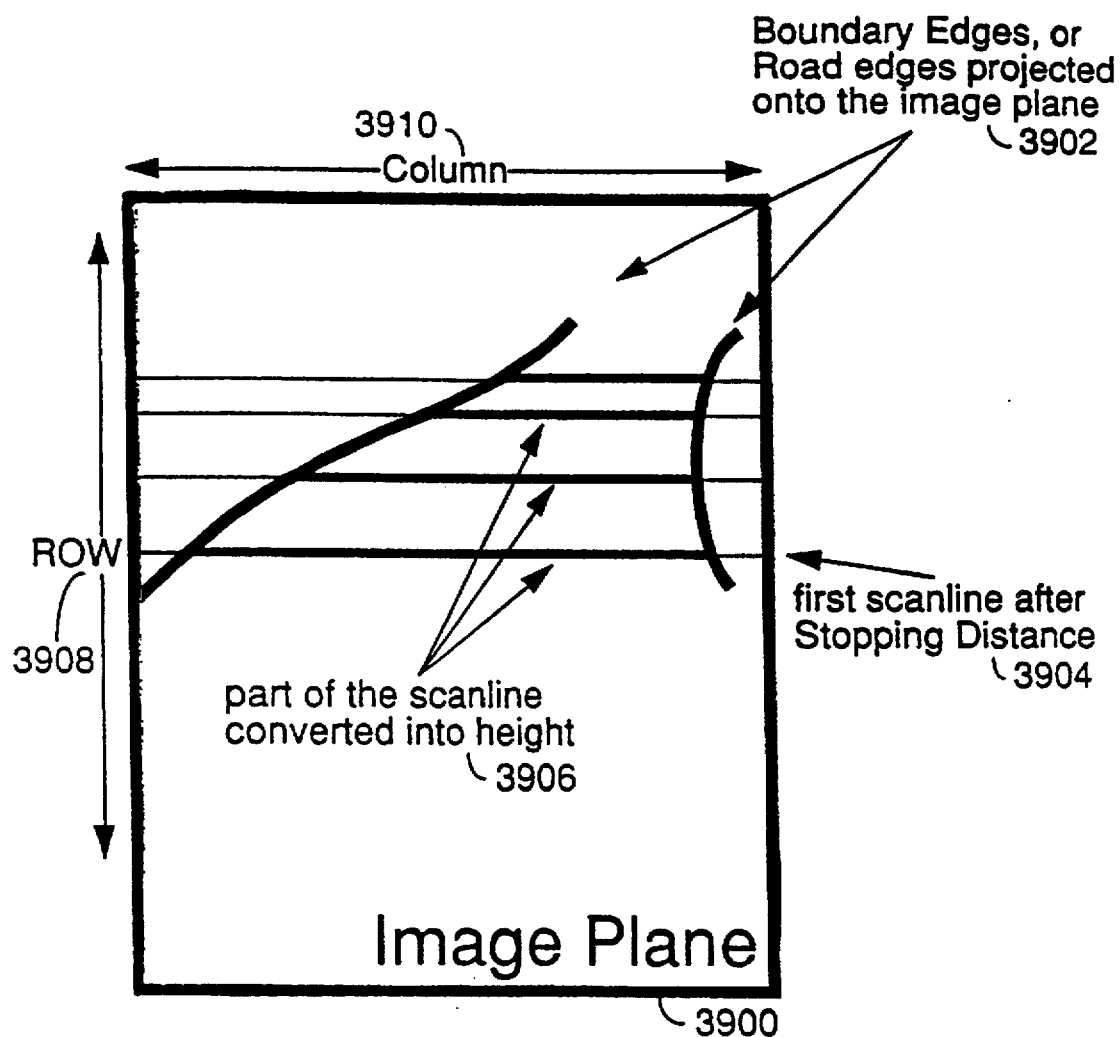
FIG. 39 is a diagram of selected scan lines in an embodiment of a laser scanner system of the present invention.

In this embodiment of the present invention, a filtering scheme is used to decrease the amount of data processed and is independent of the scanner configuration used. The edges of the boundary zone are found by transferring the range data to an image plane representation 3900 (See FIG. 39), where each range value is located by a row number 3908 and a column number 3910 (a matrix representation).

Processing load is minimized by selecting a relatively small number of the scan lines available in a range image 3900. The scan lines are selected by vehicle speed, and are concentrated at, and beyond, the vehicle stopping distance. The selected scan lines from successive frames of data can overlap.

In this method, if the vehicle 310 is moving fast, the selected scan lines 3906 are far in front of the vehicle (near the top of the range image 3900). In contrast, when the vehicle is traveling slowly, the selective scan lines 3906 are closer to the vehicle (near the bottom of the range image 3900).

Each scan line is made up of many pixels of data. Each pixel has two parameters associated with it. First, the actual value of the pixel is the range value returned by the scanner 3804. Second, the location of the pixel on the scan line gives an indication of the angle, relative to the vehicle centerline, at which the range value was recorded. This corresponds to a cylindrical coordinate frame (R,THETA,Z) description.

Given the cylindrical description and the known scanner location with respect to the vehicle 310, the range values can be coverted to a cartesian coordinate (X,Y,Z) system. The result is a road profile description which can be used by a novel filtering scheme to determine if threatening objects 4002 are present in the vehicle path 3812, while ignoring effects due to natural hills and valleys in a typical roadway.

After the scanner data is converted to cartesian coordinates, the data is processed to determine which part of the scan is actually on the road 3312 and which part of the scan line is outside of the vehicle path and therefore safely ignored. Given the vehicle position and the width of a boundary (which is equal to the vehicle width plus some safety margin), the coordinates of the boundary on either side of the vehicle path can be determined. The coordinates of the boundary can be compared to the coordinates of each pixel on the current scan line. The pixels which have coordinates outside of the boundary are ignored.

The filtering scheme builds an expectation of the road profile from previously sensed road profiles. This expectation is based on three parameters which were found to adequately describe typical paved roads. These three parameters are:

- o road crown: the curvature of the road cross section (perpendicular to the road centerline).
- o road bank: the 'tilt' of the road profile (perpendicular to the centerline).
- o road height: the height of the road centerline above a reference plane described by the location of the four tires of the vehicle 310.

Expected values of the road crown and the road bank are determined by performing a standared, least-squares Kalman filtering technique on previously sensed scanner data. The Kalman filter basically keeps a type of running average of the two parameters based on the values determined from the previous data.

In accordance with the present invention, the expected road height for a particular scan can be determined through one of two similar methods.

One is to average the road height at each pixel within the current scan line to determine a characteristic height of the scan line in question.

The second method is to filter the road height using the standard Kalman filter similar to that used when determining crown and bank expectations.

These three parameters can be used to determine a second order equation which describes the expected road profile. This expected profile is compared to the actual road profile. Any deviations between the two which exceed a preset threshold value are assumed to be threatening objects.

This scheme of the present invention is viable given the assumption that any detected objects 4002 are small in comparisson the width of the road. Then, when these averaging or least squares methods are used, the effects due to objects are negligible in comparisson to natural road data.

This filtering scheme also includes a very simple edge detection method which convolves the selected range data with a simple seven point weighing function.

c. Obstacle extraction

An additional technique of the present invention processes an entire range image 3900 from a multi-line scanner 3804 for objects. This method of the present invention accomplishes three goals:

1. Do not detect obstacles 4002 when none exists,
2. Detect obstacles 4002 when obstacles do exist, and
3. Detect the correct obstacles 4002 when obstacles exist.

Obstacle extraction is obstacle detection through the use of blob extraction. Blob extraction is well known in the art of computer graphics. Obstacles are found by clustering similar pixels into groups, called blobs. The goal of obstacle extraction is to store and process obstacles as units rather than as individual pixels.

The obstacle extraction of the present invention may be done by preforming the following steps in the image plane 3900:

1. Project the vehicle path into the image plane 3900,
2. Transform range data into height data,
3. Fit a curve to the height at the center of the road (this represents the expected road height at each row),
4. Threshold the actual road height against the height expectation, and
5. Extract the obstacles (indicated by differences in actual and expected road heights which exceed the threshold).

(1) Finding the road

In order to process all the available data, the images 3900 must be processed at the frame rate of the scanner 3804. For this reason, most of the computations in the obstacle extraction method are done in the image plane 3900. By projecting the path into the image, a large portion of the image can be ignored, and many needless computations avoided.

Assuming that the vehicle path 3812 is specified at regular intervals, the current vehicle position can be used to locate the path segment line 3902 in front of the scanner. This path 3812 is transformed from world coordinates into image coordinates by projecting the points corresponding to the road or boundary edges 3902 into the image plane 3900 (see FIG. 39).

A cubic spline is used to interpolate between the gaps. Thus, the center and edges of the row 3902 are found for each row 3908 in the image 3900. The pixels isolated between the road edges 3902 are converted (cylindrical to cartesian coordinates) from range to height data. The outlying pixels are discarded and not processed any further.

(2) Modeling road height

Once the center of the road is known for every row 3908 in the image 3900, the height for each of these points can be determined. A third order least squares curve is fit to these data.

This has the effect of modeling the general trend of the road (up and down hills) as well as filtering out the effects of noise and small objects lying in the center of the road.

(3) Thresholding

Obstacles may be located by using a height threshold. A straight height threshold would be meaningless since the surrounding terrain is not necessarily flat. Hence, the threshold is referenced against the expected height, as predicted by the third order fit, at the row number 3908 of the given pixel.

In this manner, a hill is not considered an obstacle since the height expectation and the actual height should match very closely. On the other hand, a real obstacle 4002 would barely reflect the expected road height (due to the least squares fit), and therefore is readily found by thresholding. The result of this thresholding is a binary image (not shown) suitable for a "blob extraction." The binary image only indicates where an object is or is not present in the image.

(4) Blob extraction

Blob extraction works by clustering adjacent set pixels (indicating an obstacle 4002 is present) together and treating them as a unit. Two pixels are adjacent if they are either:

1. In the same column 3910 and have consecutive row numbers 3908, or
2. In the same row 3908 and have consecutive column numbers 3910.

By grouping pixels together into blobs, the obstacles 4002 can be treated as a whole unit and are suitable for further processing.

(5) Applications

One way to use extracted blobs is to pipe them as input into another program. For example, the objects 4002 can be parsed into coordinates and used to accumulate a global object map 4004 (See FIG. 40). This map 4002 is then passed into another program, and used to do collision avoidance or path planning.

3. Avoidance of Obstacles

Once the present invention detects an obstacle 4002 in the path of the vehicle 310 (See FIG. 40), it must then avoid a collision with the object. Certain assumptions are made concerning the obstacle avoidance problem:

1. The obstacle environment is populated with obstacles 4002 that can be represented by convex-polygons or convex lines;
2. The navigation methods only have access to the local environment information in the form of a local map representing all of the visible faces of the obstacle from the position of the vehicle 310, which can be obtained from unprocessed laser range data or from data processed through blob-extraction;
3. The vehicle 310 is a conventionally steered type which has constraints on its speed and acceleration and constraints on its steering angle and the rate of change in the steering angle.

To deal with the obstacle avoidance problem, the present invention divides it into two sub-problems.

First, to decide if any obstacles are in the way, and if so, which side should the vehicle pass on. Then select a sub-goal 4006, which will lead the vehicle 310 around the obstacle 4002, leading towards a higher level goal 4008, which is to get back on the desired path.

Second, once a sub-goal 4006 is selected, make a steering decision which drives the vehicle 310 towards the sub-goal 4006, while steering clear of the obstacle 4002. A sub-goal selection method and a steering decision method of the present invention solve these two sub-problems.

The above enumerated assumptions are managed in the following process:

The obstacle locations are obtained from the laser range scanner 3804 or 404. The range data generated by the scanner 3804 or 404 are processed to produce a list of polygonal faces, modeling the visible portions of the obstacle 4002 from the vehicle position. Each time new range data become available, a sub-goal selection method is executed to generate a sub-goal 4006 and determine regions of safe navigation (free-space 4010) for the steering decision method. The frequency at which the sub-goal selection method can be executed depends on the rate at which the scanner 3804 or 404 can collect data. The achievable vehicle speed, in turn, depends on this frequency of execution.

For the steering decision method, a higher sampling rate is desirable in order to produce a smooth path. Therefore, the steering decision method is executed more frequently than the sub-goal method.

The basic flow of the sub-goal method is the following:

1 save last initial-subgoal, subgoal, and free-space, set goal_blocked flag to true;
2 if final goal is visible
   generate direct goal
   if direct goal is visible
     set goal_blocked flag to false;
3 otherwise
   generate an initial subgoal
   set subgoal to initial subgoal
   recursively generate subgoals until the latest one is visible. if subgoal not feasible, abort;
4 if goal_blocked flag is true
   restore old initial-subgoal, subgoal, and free_space;
5 otherwise
   generate free-space
   if free-space is not safe
     restore old initial-subgoal, subgoal, and free_space.

Sub-goal Method: First (step 1 above), the initial-subgoal, subgoal, and free-space generated from the previous iteration is saved. This assures that when the newly generated subgoal is not safe, the old subgoal can continue to be pursued.

Next (step 2 above), when the final goal is visible, attempt to generate a direct goal which is not associated with any obstacles 4002. Although the final goal is visible in the local map, it does not necessarily mean that no obstacle is blocking the final goal because obstacles outside the scanner range (both distance and angular wise) will not be represented in the local map. Therefore, when generating a direct goal, ensure that the goal is located in the cone area which is covered by the scanner 3804 or 404 to avoid placing a subgoal on or behind an obstacle 4002 that is not in the local map.

The next step (step 3 above) handles the situation where the final goal is blocked by an obstacle 4002 in the local map. In this case, the obstacle 4002 that blocks the line of sight to the final goal is first determined.

Given a blocking obstacle, there are two possible ways of going around it. If both edges of the obstacle are in the range of the scanner 3804 or 404, we may choose to go around the edge which gives the minimum sum of the distances from the vehicle 310 to edge and from the edge to the final distance. If only one edge of the obstacle 4002 is in the range, choose that edge to go around. If none of the edges is visible, always arbitrarily choose the left edged to go around. Once the edge to go around is determined, place the initial subgoal away from the edge at a distance that is proportional to the vehicle size.

Because of this displacement, the resulting subgoal may be blocked by other obstacles 4002. This calls for the recursive generation of subgoal on the obstacle, which blocks the line of sight to the subgoals just generated. This recursive process continues until a subgoal visible to the vehicle 310 is generated. Each subgoal so generated is checked for viability. By viability it is meant that the subgoal does not lead the vehicle 310 towards a gap between two obstacles 4002 which is too small for the vehicle to pass through. When such a condition is detected, the vehicle 310 will stop.

The direct subgoal generated in the second step (step 2 above) could possibly be obscured from the vehicle 310. If such is indeed the case, the old subgoals from the previous iteration is restored and used next (step 4 above).

In the final step (step 5 above), generate the free-space 4010 for the visible subgoal, which is a triangular region that contains no obstacles. Once the free-space 4010 is generated, the safeness of the subgoal and free-space 4010 can be determined. When the new subgoal and free-space 4010 is not safe, the old subgoal and free-space is again retained. Otherwise, the new subgoal and free-space is used.

The steering decision method of the present invention is composed of two major components: transferring state constraints to control constraints; and determination of the desired control vector.

Once the control constraints and the desired control vector are computed, the control vectors can be determined using optimization techniques well known in the art.

4. Return to Path

Figure 40:
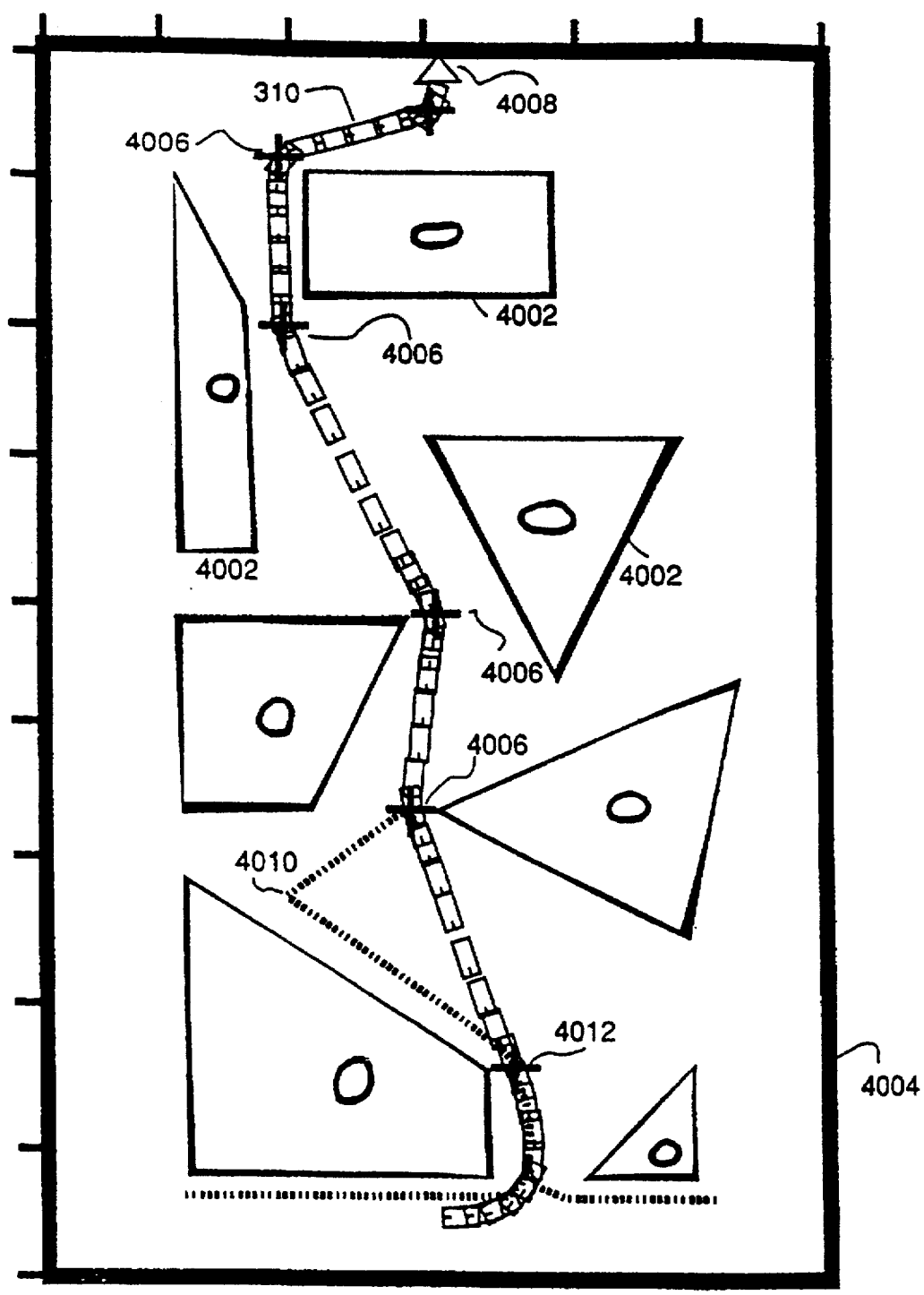
FIG. 40 is a diagram of an autonomous vehicle avoiding obstacles.
Figure 41:
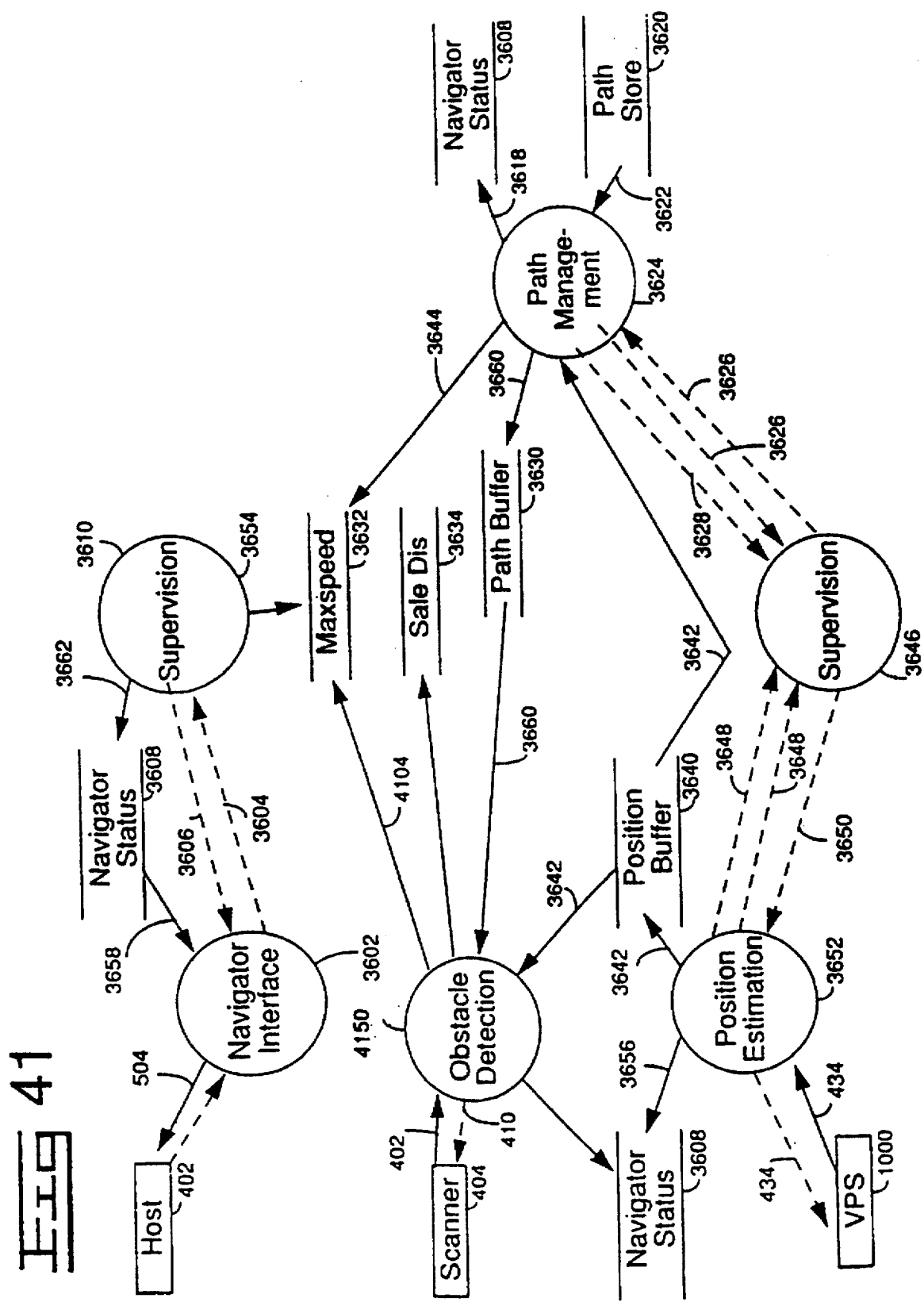
FIG. 41 is a diagram of obstacle handling according to an embodiment of the present invention.

The present invention includes a method, as shown diagramatically in FIG. 40, whereby a safe path around a detected object 4002 will be plotted and navigated so that the vehicle 310 will reacquire the reference path after avoiding the object 4002.

5. Scanner System a. Introduction

Figure 38A:
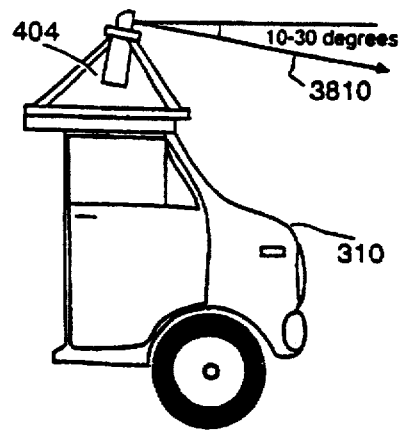
FIG. 38A is an illustration of a vehicle mounted scanner.
Figure 38B:
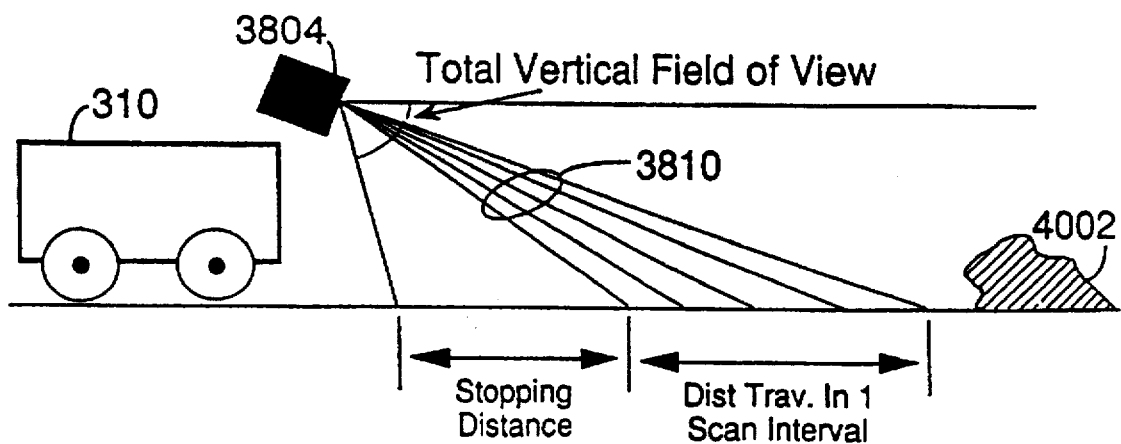
FIG. 38B is an illustration of an autonomous vehicle scanning for obstacles.
Figure 42:
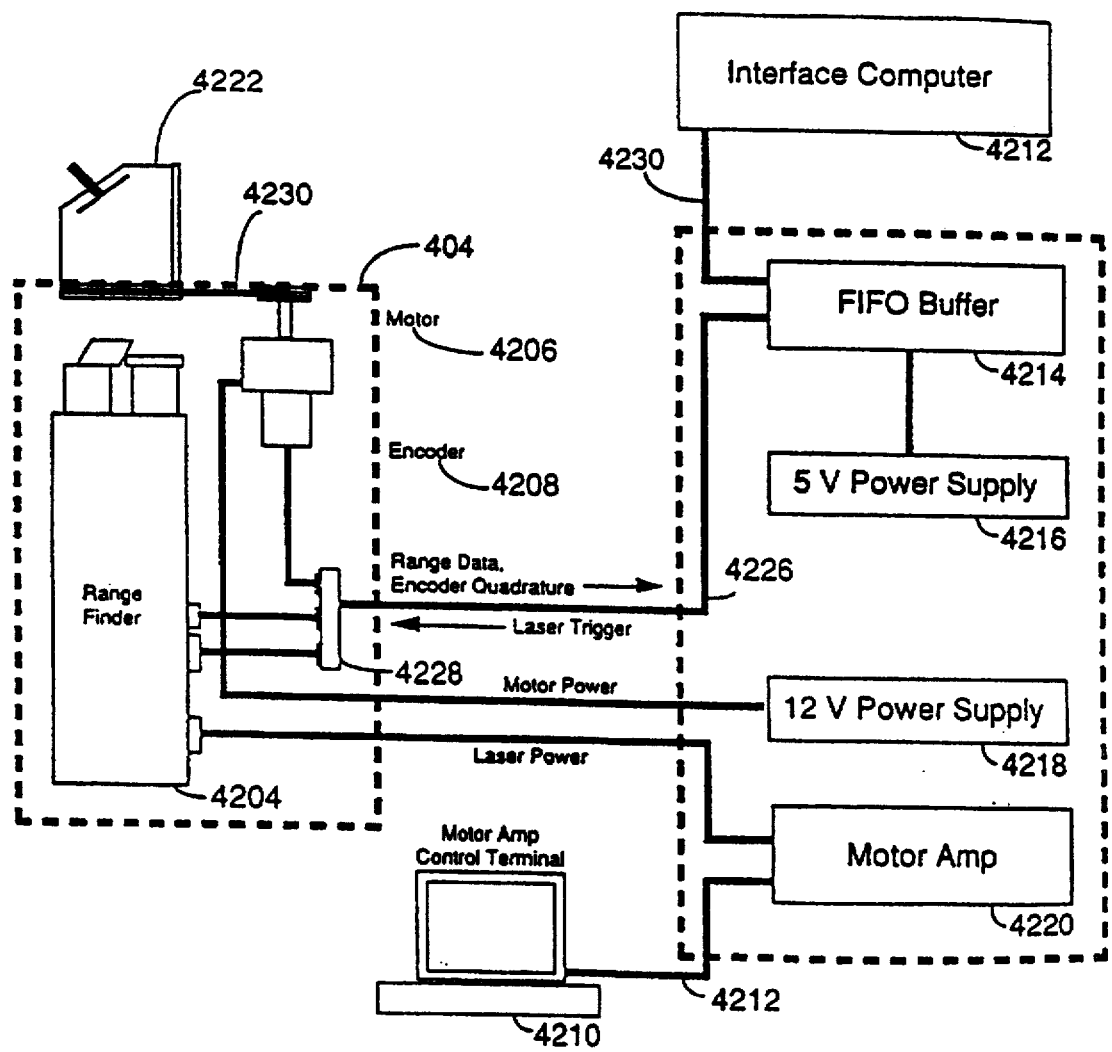
FIG. 42 is a schematic of a laser scanner system used for obstacle detection in an embodiment of the present invention.

Referring to FIGS. 38 and 42, the present invention also includes a laser scanner system 404. The scanner 404 is used to find obstructions 4002 (See FIG. 40) that randomly crop up in the vehicles 310 path, as previously discussed.

Sources of such obstructions 4002 may be varied and numerous depending on the particular work site. They may include fallen trees and branches, boulders, moving and parked vehicles, and people.

The scanner 404 gives the autonomous vehicle 310 the ability to detect and deal with the external world as conditions require.

b. LASER Scanner

The major components of the laser scanner system 404 are depicted in FIG. 42.

A laser range finder 3804 uses an infra-red beam 3810 to measure distances between the range finder unit 3804 and the nearest object 4002. A brief pulse is transmitted by the unit 3804 and the time for the beam 3810 to reflect off an object 4002 and return gives the distance.

The beam 3810 from the range finder 404 is reflected by a rotating mirror 4222 giving the range finder 404 a 360° view of the world. Mirror rotation is accomplished through a motor 4206. The motor speed is controlled via a terminal 4210, which communicates with a motor amplifier/controller 4220 through a standard RS232C serial link 4224. Synchronization between laser firings and mirror angular position is done with an encoder.

Distance data on a line 4226 from the laser range finder 404 is taken by an interface circuit 4228, which transmits the data differentially to a buffer circuit 4214. Individual pieces of data are collected by the buffer circuit 4214 until the mirror 4222 makes one full revolution. This set of data comprises one scan. When a scan is complete, the buffer circuit 4214 signals a processor 4212, whereupon data for the entire scan is transferred to the processor 4212 for processing.

c. Scanner System Interface

The interface circuit 4228 has three functions.

First, it acts as a safety monitor. A situation could occur where the mirror 4222 would stop rotating, as in the case of the drive belt 4230 between the motor 4206 and mirror 4222 breaking. Under this condition, the laser 4204 would continue to fire, and since the mirror 4222 is stationary, it would fire at a single point (dangerous for anyone looking directly into the laser beam). The interface circuit 4228, however, senses when the angular velocity of the mirror 4222 falls below half a revolution per second, and disables the laser 4204 if such a condition occurs.

The second function is to disable the laser 4204 from firing for part of the 360 degrees scan area. Typically, the laser scanner unit 404 will be mounted in front of a vehicle 310, and the field of interest is in the 180 degree area in front of the vehicle. The vehicle itself will block the back portion of the 360 degree scan area. In this case, the circuitry 4228 will prevent the laser 4204 from firing into the vehicle, extending the life of the laser diode while receiving range data for the area in front of the vehicle. The enabling and disabling of the laser range-finder 4204 is done through two sensors (not shown) mounted near the mirror housing 4222. For testing purposes, or for applications where a 360 degree scan is desirable, the disable feature can be turned off through a DIP switch.

The third function of the circuit 4228 is to convert signals between single ended and differential form. TTL signals from the laser unit 4204 are differentially transmitted to the buffer circuit 4214, and differentially transmitted signals from the buffer circuit 4214 are converted to TTL levels. This prevents noise contamination along the cable 4226 connecting the two circuits.

d. Scanner System Buffer Circuit

The function of the buffer circuit 4214 is to synchronize laser 404 firings with the angular position of the mirror 4222, to collect data for one complete scan, and to transmit the scan to computer 4214 for processing.

The angular position of the mirror 4222 can be determined through signals sent by the encoder 4208. The buffer circuit 4214 uses two signals from the encoder 4208: the Z and A channels.

The Z channel is the encoder index; it gets asserted once per revolution of the encoder 4208, and is used to signal the beginning of the scan area.

The A channel is one line of the two line quadrature output of the encoder 4208, and pulses 1000 times per revolution of the encoder. This channel is used to trigger laser firings.

One additional signal is needed to fully synchronize the scan field with the encoder signals. There is a gearing ratio of 2:1 between the encoder/motor 4206 and the mirror 4222. Two revolutions of the encoder 4208 rotates the mirror 4222 once. This translates to 2Z channel pluses and 2000 A channel pulses per revolution of the mirror 4222, and the inability to differentiate the beginning of the first half of the scan with the beginning of the second half.

To fully synchronize the scan field, the DB (dead band) signal generated by the interface circuit 4222 is used. The DB signal, used to disable the laser 4204 from firing in the back half of the scan, allows the differentiation of the front and back halves of the scan. The Z and DB signal together signal the beginning of the scan area.

The second task of the buffer circuit 4214, to collect data for one complete scan, is accomplished through the A channel of the encoder 4208. The 2000 pulses of the channel is divided by either 2, 4, 8, or 16, selected through DIP switches (not shown) on the circuit board 4228. This allows the number of data points per scan to be varied between 1000, 500, 250, and 125. The divided signal is used to trigger the laser range-finder 4204 at appropriate angular intervals, and to store the resulting range data in memory 4214.

The sequence of events is as follows. W (write) is asserted one clock cycle upon a rising edge on the divided A signal. At this point, data from a previous T (laser trigger) is available and is stored in memory 4214. T is asserted the following clock cycle, triggering the laser and putting the resulting range data onto the memory input bus 4226. This data is written on the next W pulse, repeating the cycle.

The final task of the buffer circuit 4214 is to transmit the scan data to a computer 4212 for processing. Completed scans are signaled by the Z and the DB signals (the beginning of a scan is also the end of a previous one). Upon a completed scan, an interrupt request line is asserted, and remains asserted until either the mirror 4222 has made half a revolution, or the processor 4212 acknowledges the interrupt. In the first case, the half revolution of the mirror 4222 is signaled by a subsequent Z pulse and indicates a timeout condition; the processor 4212 has failed to respond and the data is lost.

In the normal case, the interrupt is acknowledged. Upon receipt of the acknowledgement, STR (data strobe) is asserted and held until IBF (input buffer full) is received. During this time, data is put on the data bus 4230 and may be ready by the computer 4212. Data is valid on the bus 4230 until IBF is asserted, at which time STR is de-asserted and the data removed from the bus 4230. Once the processor 4212 detects the deassertion of STR, it de-asserts IBF. This causes STR to be asserted for the next piece of data, repeating the cycle.

Scan data is collected and stored in two memory banks 4214. This avoids shared memory and synchronization problems between scan storage and scan transmission. Data for a new scan is stored in one bank, while the previous scan is being transmitted from the other bank.

The buffer circuit 4214 removes from the processor 4212 the responsibility of synchronizing laser findings with mirror position and collecting individual pieces of data. It allows more efficient use of CPU time, as data is received in scan sized chunks. The processor 4212 spends its time processing the data, not in collecting it.

E. Vehicle Controlling Systems

1. Introduction

Figure 43:
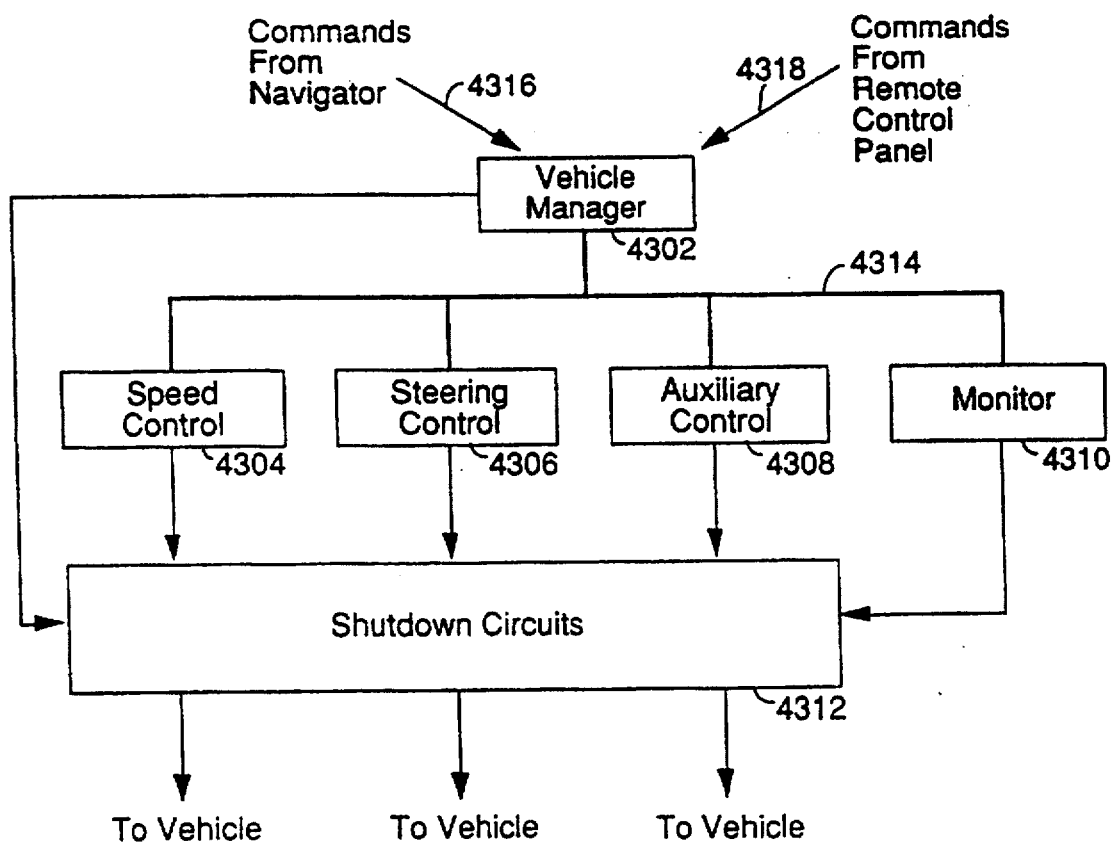
FIG. 43 is a block diagram of an autonomous mining truck vehicle controls system of the present invention.

Referring now to FIG. 43, the vehicle controls are comprised of four, low-level functional blocks.

One is called a "vehicle manager" 4302. A second is called a "speed control" 4304. The third is called a "steering control" 4306. The fourth is called a "monitor/auxiliary control" (depicted as two separate blocks 4310 and 4308. These are described in turn below.

They are all tied together with a high-speed serial data bus 4314. The bus 4314 is a data collision detection, packet passing system.

Each of these functional blocks have separate microprocessors, for instance of the Motorola 68000 16 bit series. Each of these microprocessors talks to and listens to the others over the bus 4314.

While each functional block has a more or less specific function, the vehicle manager 4302 functions as a communications hub. It sends to and receives messages from the navigator 406 via an RS-422, 9600 Baud serial link 4316. It is also listening to and sending to the remote control or "tele" panel 410 via an FM radio communications link 4318.

2. Vehicle Manager (modes)

As mentioned above, the vehicle manager 4302 receives commands from a remote control panel 410 and the navigator 406. It then decides which mode "A, M, T, or R" (for Autonomous, Manual, Tele, or Ready) the vehicle 310 should be in.

a. Ready Mode

Figure 44:
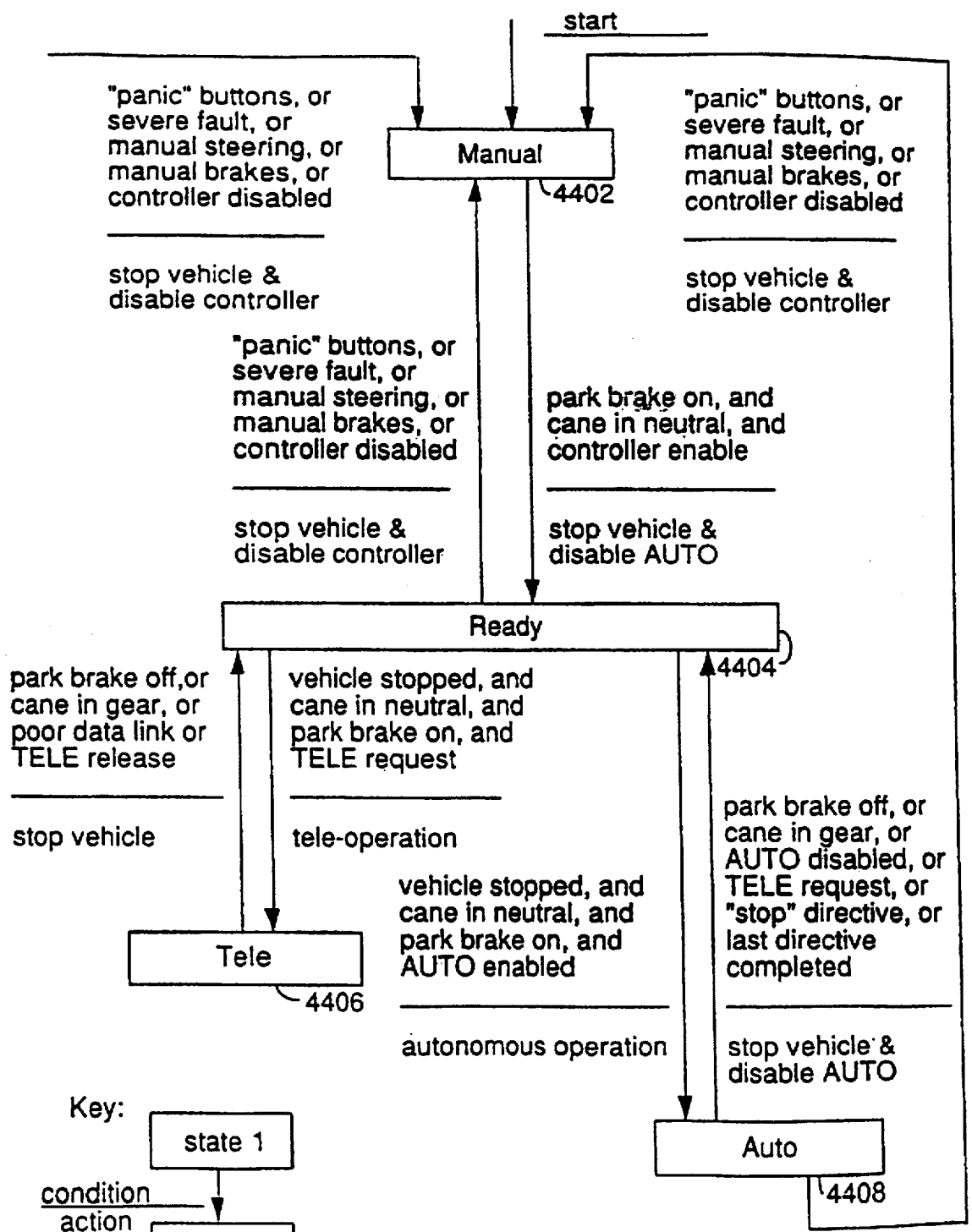
FIG. 44 is a state diagram showing the transitions between modes of operation.
Figure 45:
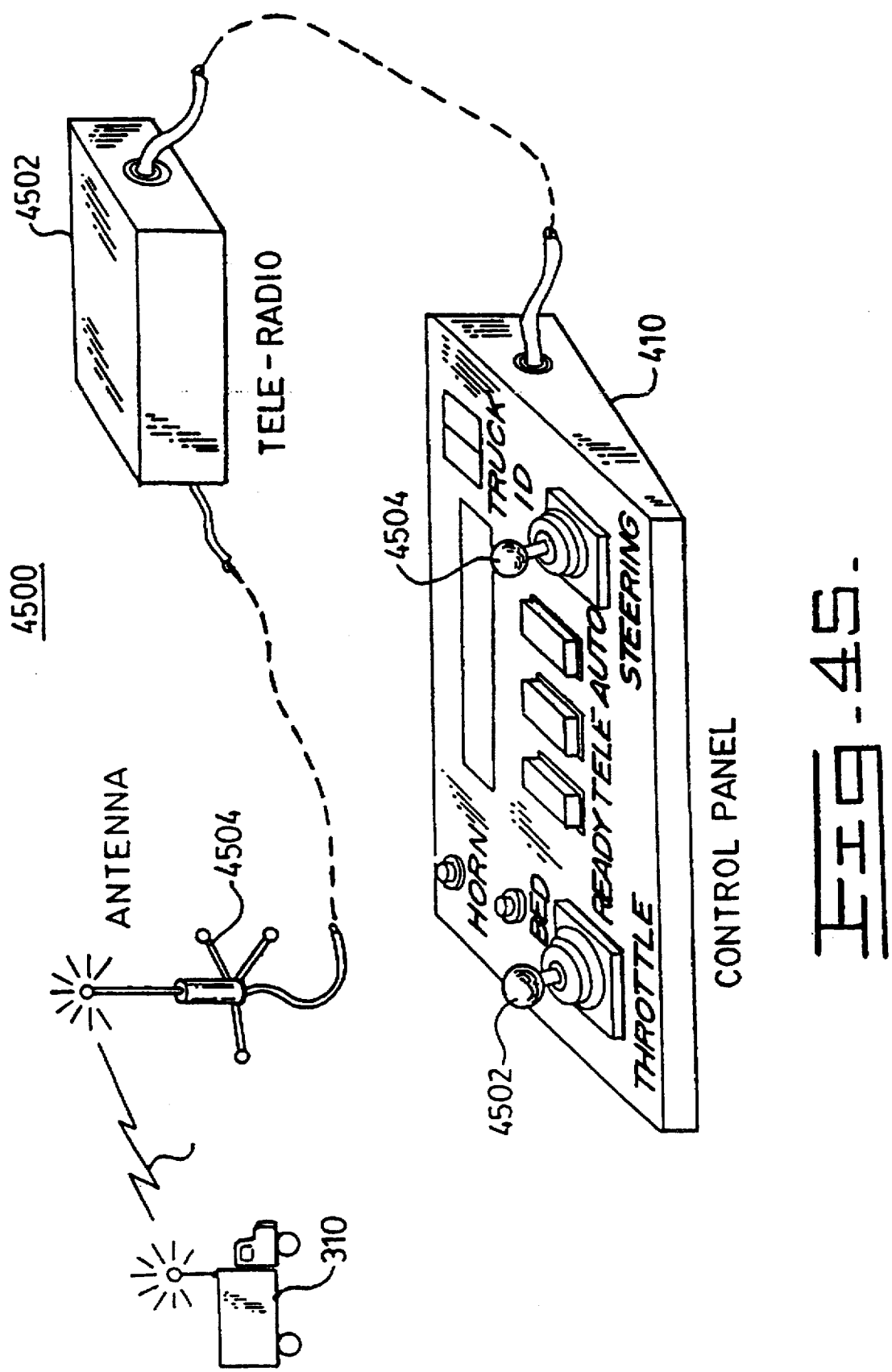
FIG. 45 is a diagram of an embodiment of a teleline of sight remote control system of the present invention.

Reference is now made to FIG. 44, which shows the states (modes) and how the vehicle 310 changes between states. The navigator 406 cannot set the mode itself. Notice that the vehicle 310 cannot change from tele to auto, for instance, directly. It must pass through the ready mode 4404 first in that case.

The ready mode 4404 brings the vehicle 310 to a stop in a known state. This is because it would be difficult to make a smooth transition, from, for instance, auto mode 4408 to tele mode 4406 while the vehicle 310 was moving. The tele control panel joy-stick 4502, 4504 would have to be in just the right position when control was switched.

Going from tele 4406 to auto 4408 mode, there is the consideration that the navigator 406 must initialize. For example, it must determine where it is with respect to a route before taking control, which takes some finite time, during which the vehicle 310 might otherwise drive off uncontrolled.

b. Tele Mode

Tele control mode 4406, also referred to as tele-operation, remote control or radio control mode, provides a way of controlling the vehicle 310 from a remote location while the vehicle 310 is kept in view.

Shop personnel would use the tele-operation mode 4406 to move the vehicle 310 in the yard, for example. Advantageously, this mode would also be used by a shovel or loader operator to maneuver the vehicle into position for loading or unloading, and moving the vehicle into a location where autonomous mode 4408 would resume control.

In tele-operation mode 4406, each vehicle 310 at an autonomous work site 300 would have its own unique identification code that would be selected on a radio control panel 410 to ensure communication with and control of the correct vehicle only. The vehicle 310 would only respond to tele-operation commands 4318 when its unique identification code is transmitted. Any conflict between modes, such as between manual 4402 and tele 4406, would be resolved in favor of manual mode 4402, for obvious safety reasons.

The navigator 406 keeps track of where the vehicle 310 is while being operated in the tele mode 4406, even though, in tele mode, the vehicle can be maneuvered far off of a known route.

c. Manual Mode

Manual control mode 4402 may be required when the vehicle 310 is being maneuvered in very close quarters, for example, at a repair shop, equipment yard, and so on, or when a control subsystem needs to be removed for repair or maintenance.

This control mode may be implemented to be invoked whenever a human operator activates any of the manual controls. The simple action of stepping on the brakes 4708, moving the shift lever from some predetermined, autonomous mode position, or grasping the steering wheel 4910, for example, would immediately signal the control system that manual control mode 4402 is desired and the system would immediately go to the manual mode.

While in manual mode, the autonomous system would continuously monitor vehicle motion and maintain an updated record of the vehicle position so that when and if autonomous mode 4408 was desired, a quicker and more efficient transition could be made.

When autonomous mode 4408 is again desired, the human operator would then affirmatively act to engage autonomous mode 4408, by physically moving a switch or lever, for instance, to the autonomous control mode. A time delay would preferably be built in so that the human operator would have the opportunity to leave the vehicle 310 if desired. At the end of the time delay, the system would then give several levels of warning, such as lights, horn, or the like, indicating autonomous takeover of the vehicle 310 was imminent.

d. Autonomous Mode

The autonomous mode 4408 is entered into from ready mode 4404. In the autonomous mode 4408, the vehicle 310 is under the control of the autonomous navigation system.

In this mode, the vehicle control system receives messages from the navigator 406 as discussed above, through the vehicle manager 4302. The vehicle manager 4302 is, as discussed, basically the communications and command hub for the rest of the controllers.

The vehicle manager 4302, and the other functional control blocks, all communicate with the shutdown circuits 4312 as well. The shutdown circuits 4312 are discussed in more detail below.

3. Speed Control

The speed control subsystem 4302 may be organized to contain a speed command analyzer, closed loop controls 4800 for the engine 4614, transmission and brakes 4700, 5000, a real time simulation model of the speed control system, and a monitor 4310 that is tied to an independent vehicle shutdown system 4312. It is designed to be placed in parallel to the production system on the vehicle 310.

The speed control functional block 4304 takes care of three basic functions. It controls the governor on the engine 4614. It controls the brake system 4606. And it controls the transmission 4610 via the production transmission control block 4616.

Figure 48:
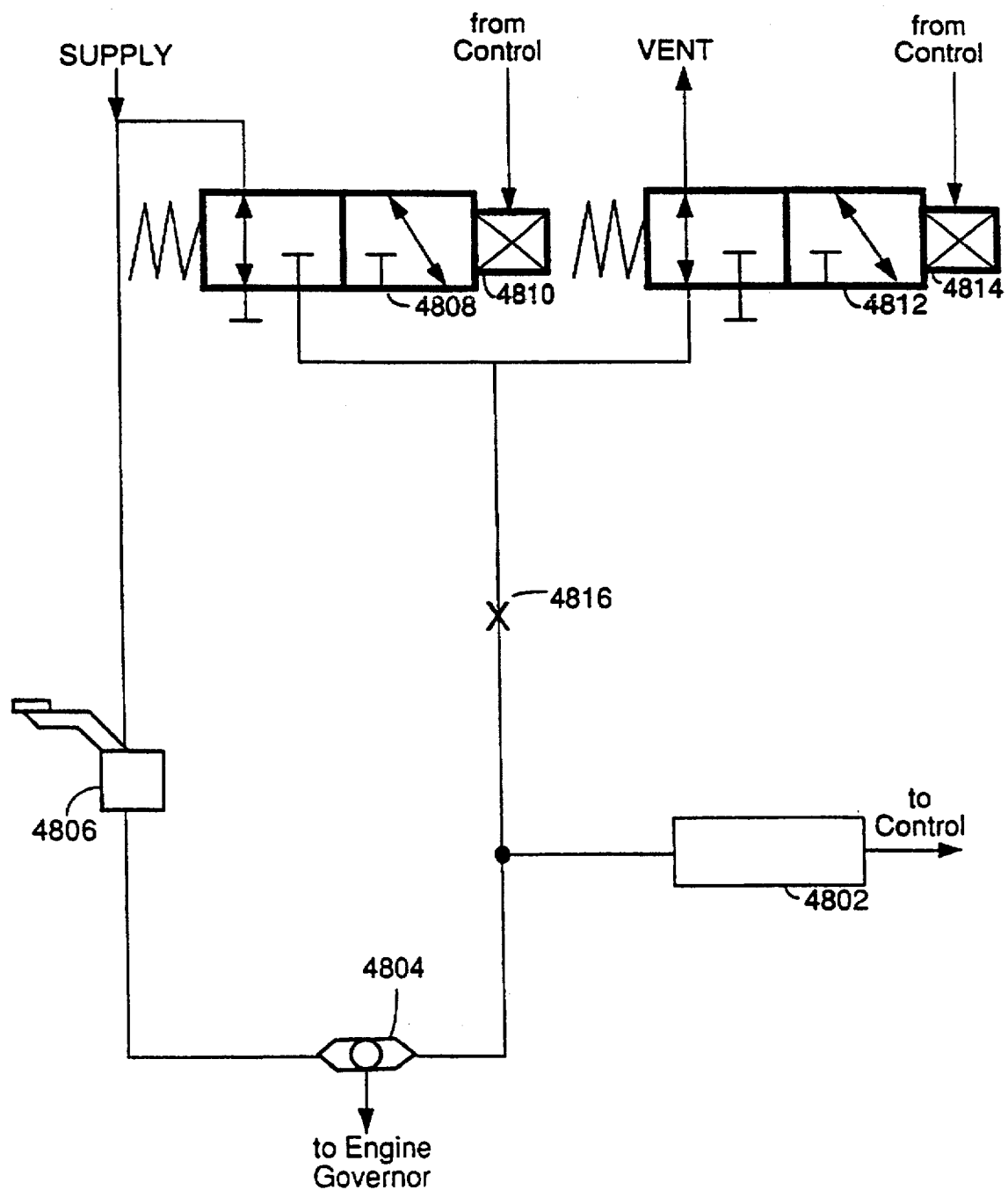
FIG. 48 is a diagram of an embodiment of the governor control circuit of the speed control system of the present invention.

The production transmission control block 4616 is interfaced with the speed control block 4304 in a parallel retro-fit of the autonomous system onto the production system as shown in FIG. 48. The production transmission control block 4616 is a microprocessor based system which primarily monitors speed and shifts gears accordingly.

The autonomous system speed control block 4304 feeds the transmission control block 4616 the maximum gear desired. For instance, if the vehicle 310 is to go 15 mph, the maximum gear might be third gear. The production transmission control block 4616 will control all the shifting necessary to get to that gear appropriately.

The governor 4626 (FIG. 46) controls the amount of fuel delivered to the engine 4616. Thus, it controls engine speed. The autonomous system is capable of being retro-fitted in parallel with the production governor control system, in a similar fashion as described with respect to the transmission system.

Figure 47:
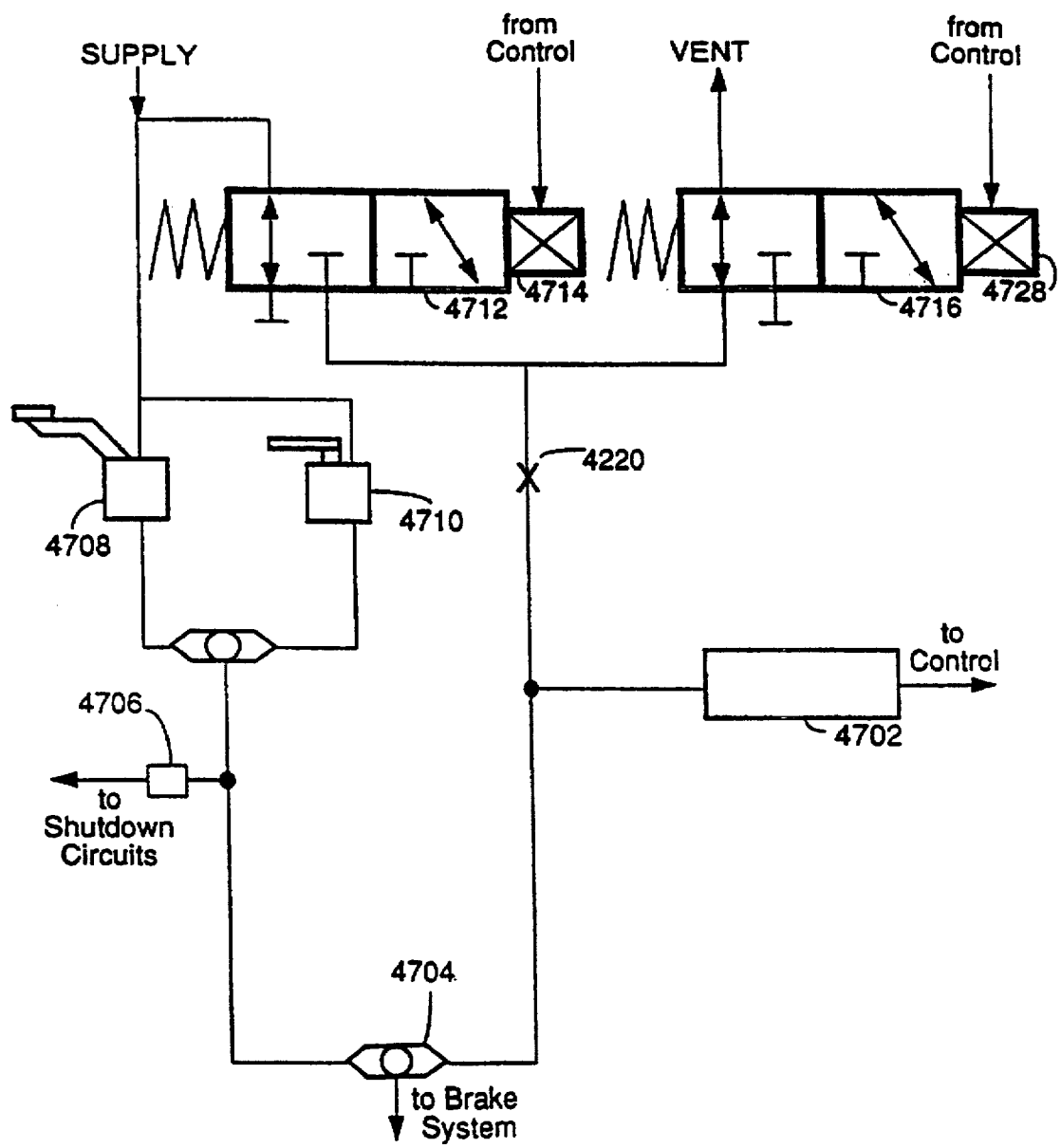
FIG. 47 is a diagram of an embodiment of the service brakes control circuit of the speed control system of the present invention.
Figure 50:
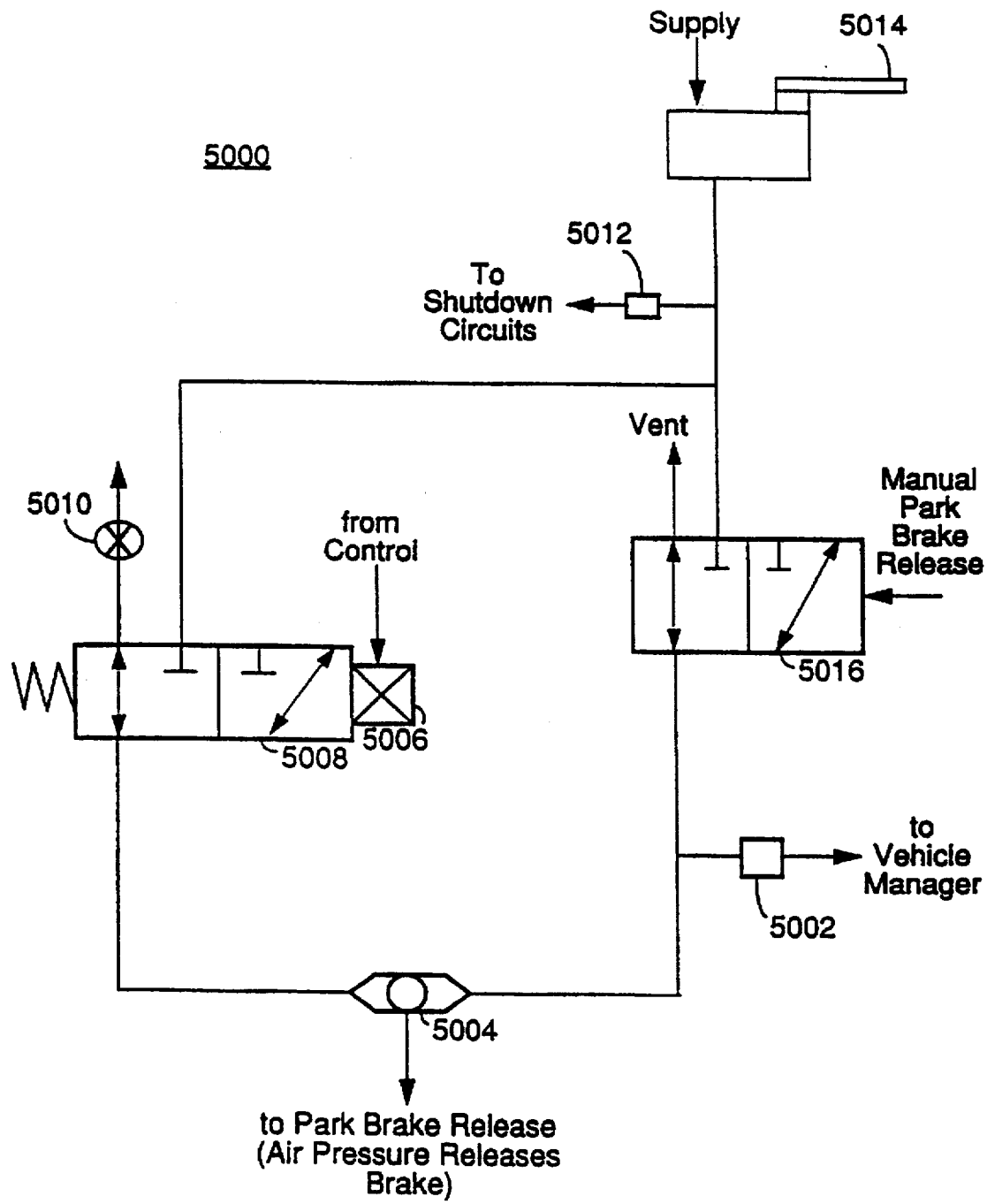
FIG. 50 is a diagram of an embodiment of a park brake control circuit in the speed control system of the present invention.

The brake system is shown in FIGS. 47 and 50. The autonomous system here is also capable of being retro-fitted to the production brake system.

The following discusses vehicle systems shown in FIGS. 46, 48, 47, 50 and 49. These systems relate to the vehicle drive train 4600 and steering 4900 systems.

Figure 46:
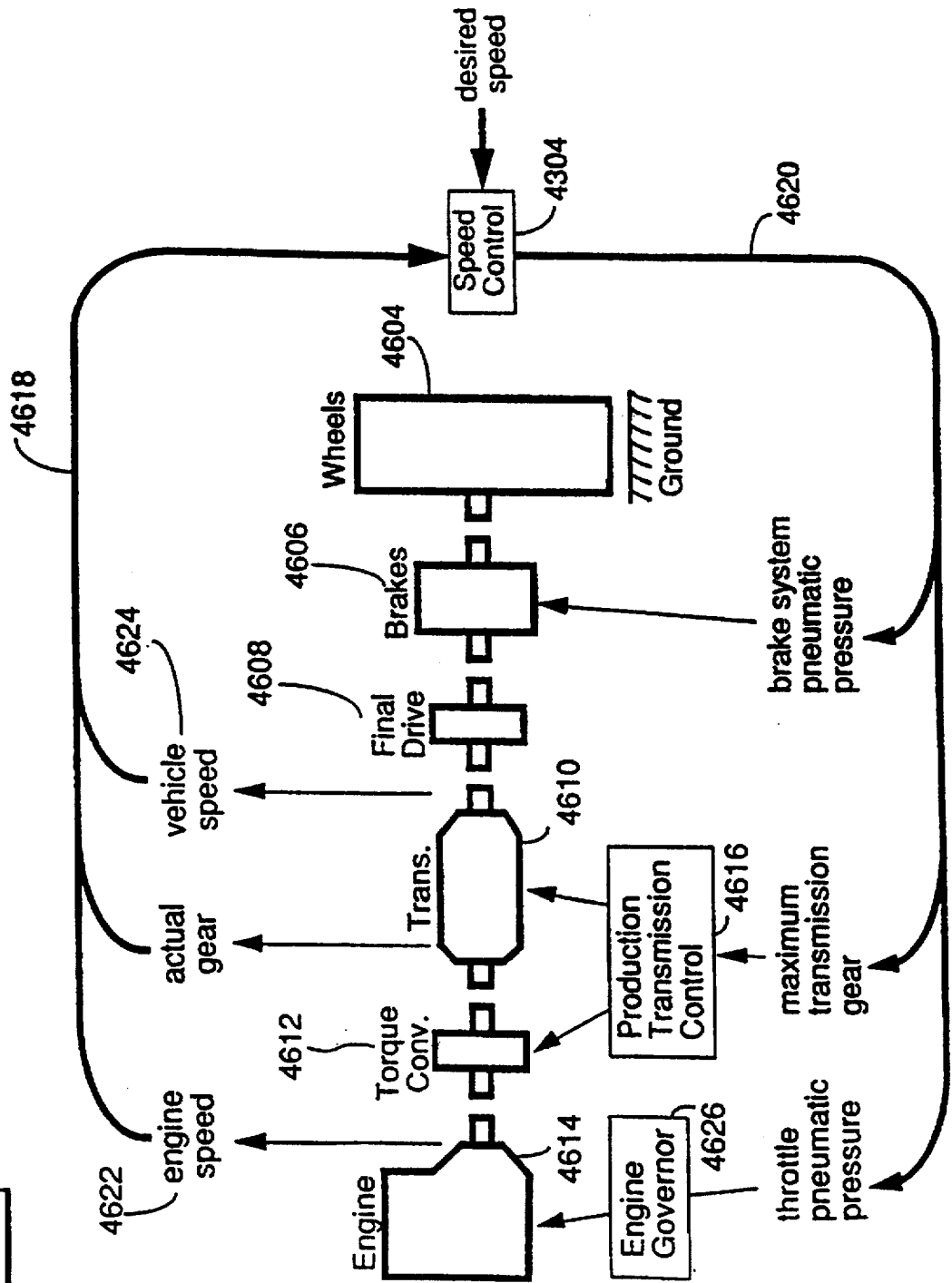
FIG. 46 is a representational diagram of an embodiment of the speed control system of the present invention.

Referring to FIG. 46 a governor 4626 controls engine speed 4222, which in turn controls vehicle speed 4624. The engine power is transferred to the drive wheels through the drive train 4600 which is comprised of:

torque converter 4612
transmission 4610
final drive 4608
brake system 4606
wheels 4604

The function of these systems is well known in the art.

Several key systems were modified in accordance with the present invention to effect autonomous control. The primary systems were the speed control (engine speed, transmission, vehicle speed, and brakes) and steering systems. Each key system is design with manual override capability as a safety measure. In all cases, manual control has priority so that if the vehicle is operating autonomously, and an operator takes control of any one of the vehicle functions, control automatically is returned to the operator.

The system also provides an emergency override button (not shown; also referred to as a 'panic' button) which, when activated, disables all electronicly controlled systems and returns the vehicle 310 to manual control 4402.

The system also provides for sensing the pneumatic pressure which is a key part for actuating some of the key systems. If this pressure falls below some preset threshold, it is assumed that there is a problem and the vehicle control system reverts to manual control 4402 and the vehicle 310 is stopped.

FIG. 48 depicts the system used to control engine speed. This system uses electronicly controlled valves 4808 and 4812 to regulate pneumatic pressure in parallel to a pedal 4806 which can be manually operated to override electronic control of the engine speed 4622. The pressure sensor 4802 and the engine speed sensor 4622 provide the necessary feedback for the electronic speed control system 4304.

Also required to control the vehicle speed is a transmission control 4616. The basic control system is readily available on the particular vehicle used for this purpose.

In addition to controlling the engine speed 4622 as a means of regulating vehicle speed, it is also necessary to control the vehicle service brakes 4606. This system is shown in FIG. 47 and is necessary to effect normal stoppage or slowing of the vehicle 310. This system uses electronicly controlled pneumatic valves 4712 and 4716 in parallel with a manually operated brake pedal 4708 and/or retarder lever 4710 to regulate the braking force. These two manual inputs can override the electronic control system when actuated. The pressure sensor 4702 and the vehicle speed sensor 4624 provide the necessary feedback to regulate the braking force.

Figure 49:
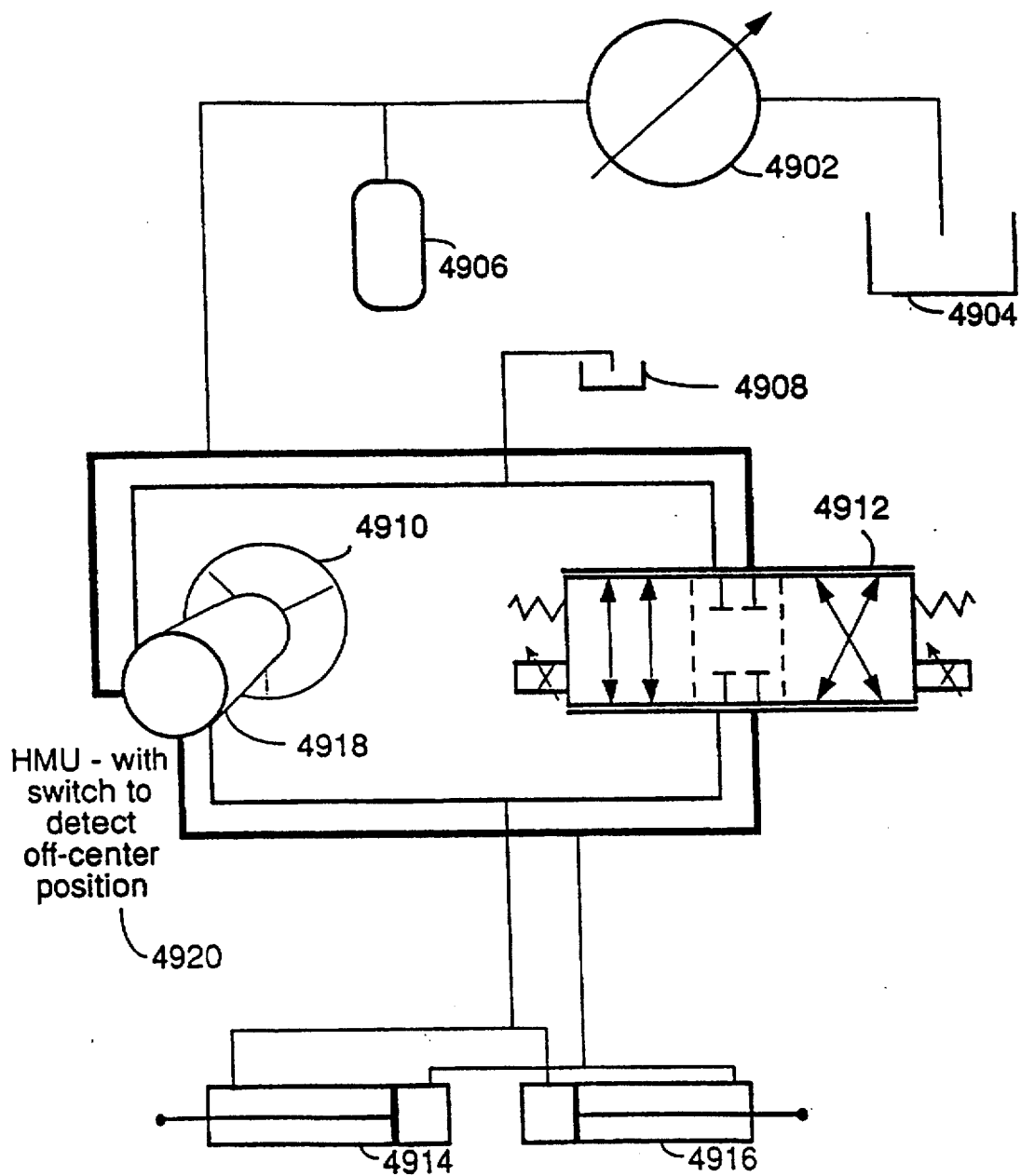
FIG. 49 is a diagram of an embodiment of a steering control circuit of the steering control system of the present invention.

Control of vehicle steering is also required for the vehicle to operate autonomously. The system which performs this function is shown in FIG. 49. The system consists of a Rexroth proportional hydraulic valve 4912 which can be actuated electronically to provide flow to hydraulic cylinders 4914 and 4916 attached to the vehicle steering linkage. The system also comprises a manually operable hand-metering unit, or HMU, 4918, which is in parallel to the electronicly controlled system. The manual system can override the electronic system, if required, as a safety measure. Also, the system provides a switch 4920 on the HMU to detect when the manual steering wheel 4910 is different from the centered position. When not centered, the autonomous system assumes that the system is being operated manually 4402 and disables autonomous control of the vehicle 310.

Electronic control of the vehicle parking brake is also included as an added safety feature. This system is shown in FIG. 50. For proper operation under autonomous control, the parking brake is manually placed in the 'ON' position. When the vehicle proceeds through the status modes (MANUAL 4402, READY 4404, and AUTO 4408), the parking brake is automatically released by electronically controlling the pneumatic valve 5008. This system is in parallel to the manual systems comprised of the brake lever release valve 5016 and the Emergency brake lever 5014.

When a problem is encountered, the vehicle 310 is automatically placed under manual control. Since the manual setting of the park brake is normally 'ON', this activates the parking brake, stopping the vehicle 310 as quickly as possible.

4. Steering Control

Referring again to FIG. 43, the steering control functional block 4306 is responsible for controlling the steer angle of the vehicle's wheels. It sends out commands to a valve 4912 to control the steer angle and receives information from a resolver (not shown) mounted on the tie rod system, so that it knows what the actual wheel angle is.

The steering angle can be controlled with an accuracy on the order of a half a degree, and the resolver is accurate to something less than that, on the order of an eighth of a degree.

At some point in the useful life of the vehicle 310 the resolver may go out of adjustment. If this happens, the vehicle will not be able to track the path 3312 properly.

However, the navigator 406 constantly monitors the vehicle 310 to determine how far the vehicle 310 is from the desired path 3312. (The vehicle 310 is always off the desired path 3312 to some extent, and the system is constantly correcting.) If the vehicle 310 is more than a certain distance, for example several meters, from the desired path 3312, the navigator 406 stops the vehicle as a safety precaution.

The steering control system 4306 itself is also always checking to make sure the resolver is accurate, and that steering commands 420 received have not been corrupted (not shown) by noise or other error sources. A steering simulation model may also be implemented as an additional check of the system.

The autonomous steering system 4900 may be designed to be implemented in parallel with a manual steering system, and can be retro-fitted on to the vehicle 310 in a similar manner as the speed control system.

As shown in FIG. 49, the existing or production manual steering system has a manual steering wheel 4910 which turns a hand metering unit, or HMU 4918. The HMU 4918 controls a valve 4912 which controls flow of hydraulic fluid to steering cylinders 4914, 4916, which turn the wheels (not shown).

A switch 4920 on the HMU 4918 detects off-center position of the steering wheel 4910 as an indication to change to manual control of steering. An operator riding in the cab can merely turn the steering wheel 4910 to disable autonomous steering control 4408.

Under autonomous steering control 4408, the manual steering wheel 4910 in the cab remains centered no matter what position the autonomous steering control has turned the wheels to. There is no mechanical linkage between the steering wheel 4910 and the wheels themselves.

Of course a vehicle 310 may be manufactured without any manual steering system at all on the vehicle if desired. To drive the vehicle manually, the tele-panel 410 could be used, or some sort of tele-panel might be plugged into the side of the vehicle 310 to control it without a radio link 4506 in close quarters, for instance. A jump seat might be provided for an operator in such situations.

Some discussion of the steering model developed may facilitate a better understanding of the present invention.

a. Steering Model

The basis for the steering planner is a tricycle steering model shown in FIG. 5.1. This model permits the calculation of the required steer angle independent of the velocity of the vehicle.

$$\theta = \tan^{-1} LC \text{ path}$$

To use this model, the desired path 3312 must contain the curvature of the path to be followed. The curvature is the inverse of the instantaneous radius of curvature at the point of the curve.

FIG. 61 is a diagram illustrating the relationship between the desired path 3312 and the curvature of the path. FIG. 61 shows desired path 3312, a point 6110 where an instantaneous radius of curvature 6120 is be determined, and a circle 6130 defined by instantaneous radius of curvature 6120. The curvature is the inverse of the instantaneous radius of curvature 6120 at the point 6110 of the desired path 3312.

This is also equal to the second path derivative at the point.

b. Path Representation

Referring to FIGS. 22–34, the response of autonomous vehicle 310 in tracking a path 3312 depends partly on the characteristics of the path 3312. In particular, continuity of the curvature and the rate of change of curvature (sharpness) of the path 3312 are of particular importance, since these parameters govern the idealized steering motions to keep the vehicle 310 on the desired path 3312. In the case where a path 3312 is specified as a sequence of arcs and lines, there are discontinuities of curvature at the point where two arcs of differing radii meet. Discontinuities in curvature are troublesome, since they require an infinite acceleration of the steering wheel. A vehicle travelling through such transition points with non-zero velocity will experience an offset error along the desired path 3312.

Figure 33:
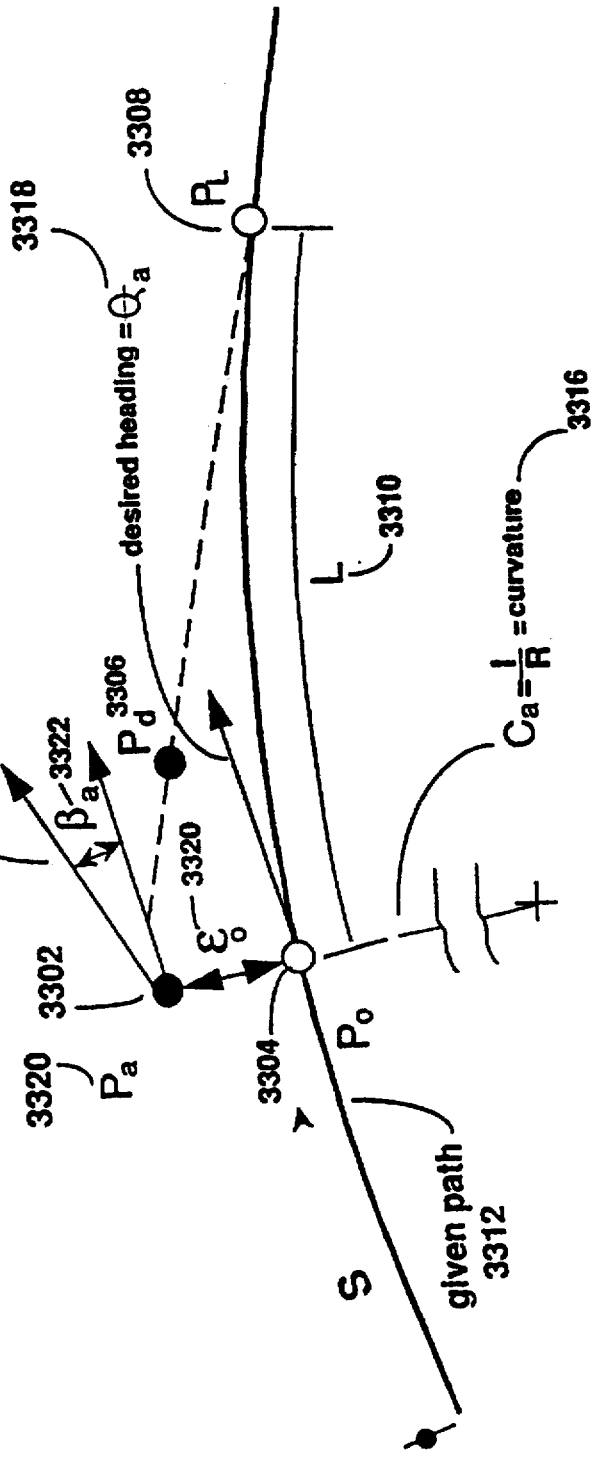
FIG. 33 is a diagram showing how an error vector including curvature is computed.
Figure 34:
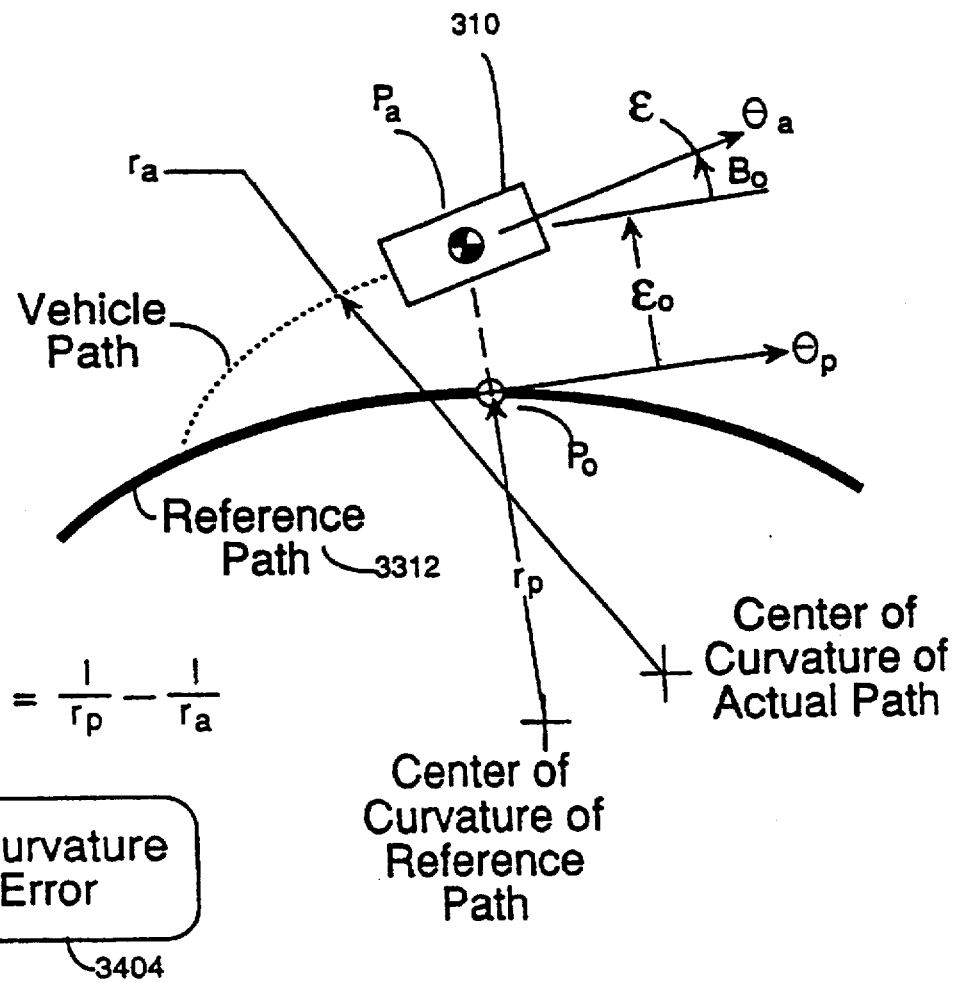
FIG. 34 is a diagram showing how an error vector including curvature is computed with the vehicle path included.

In general, and as shown in FIG. 33, if a posture 3314 is desired as the quadruple of parameters-position 3320, heading 3318, and curvature 3316 (x, y, θ, c), then it is required that the path 3812 be posture-continuous. In addition, the extent to which steering motions are likely to keep the vehicle 310 on the desired path 3312 correlates with the linearity of sharpness of the path, since linear curvature along a path means linear steering velocity while moving along the path.

Certain spline curves guarantee posture continuity. However, these spline curves do not guarantee linear gradients of curvature along curves. Clothoid curves 2602 have the "good" property that their curvature varies linearly with distance along the curve. Paths composed of (a) arcs and straight lines or (b) clothoid segments have been developed.

A path that has discontinuities in curvature results in larger steady state tracking errors. This is particularly the case when the actuators are slow.

The path representation must contain sufficient information to calculate the steer angle 3112 (See FIG. 31) needed to drive the desired path 3312, that is, it must consist of at least the position, heading, curvature and speed. A position on the desired path 3312 has been defined as a posture 3314, and the structure of a posture in the present invention is given by:

c. Posture Definition

North: desired north coordinate
East: desired east coordinate
Heading: desired heading
Curvature: desired curvature
Speed: desired ground speed Distance: distance between current posture and the previous posture.

d. Position Information

The position information 3322 is obtained from the vehicle positioning system (VPS) 1000 and is, for example, 71 bytes of data. The structure of the information used to track the desired path 3312 is a subset of the 71 byte VPS output and is given by the VPS short definition shown below.

e. VPS Short Definition

Time: gps time
North: wgs 84_northing
East: wgs 84_easting
Heading: compass direction vehicle is moving
Curvature: calculated from other variable
N_velocity: north velocity
E_velocity: east velocity
Yaw rate: rate of change of the heading
G_speed: ground speed
distance travelled f. Steering Method The steering planner calculates the steer angle needed to follow the desired path. If the vehicle 310 was on the desired path 3312, the steer angle is:

ON PATH $\emptyset$steer=f(Cdesired)=tan$^{-1}$ LC

If the vehicle 310 is off the desired path 3312, then the steer angle is:

OFF PATH $\emptyset$steer=f(Cdesired+Cerror).

The method of the present invention used to calculate Cerror is a quintic method. The quintic is a fifth degree polynomial in an error space that defines a smooth path back to the desired path 3312. The degree of the polynomial is defined by the needed data, that is, Cerror and the known end constraints.

FIG. 62 is a diagram illustrating an error curve 6210 between the smooth path of the quintic polynomial and the desired path 3312. The error curve 6210 shows that the vehicle will smoothly return to the desired path 3312 (or nearly so) within a lookahead distance (L) 6220.

Polynomial in error space is:

$$\text{error}(s)=a_0+a_1s+a_2s^2+a_3s^3+a_4s^4+a_5s^5|_0^L$$

$$\text{error}'(s)=a_1+2a_2s+3a_3s^2+4a_4s^3+5a_5s^4|_0^L$$

$$\text{error}''(s)=2a_2+6a_3s+12a_4s^2+20a_5s^3|_0^L.$$

error (0) position=current desired position−current actual position error"(0) heading: current desired heading−current actual heading error"(0) curvature=current desired curvature−current actual curvature at s=L (L=lookahead distance):

error (L) position=0
error (L) heading=0
error (L) curvature=0

The coefficients of the polynomial error(s) are functions of L, the distance at which the errors go to zero:

$$\text{error }(0)=a_0$$

$$\text{error}'(0)=a_1$$

$$\text{error}''(0)=2a_2$$

$$\text{error }(L)=a_0+a_1L+a_2L^2+a_3L^3+a_4L^4+a_5L^5$$

$$\text{error}'(L)=a_1+2a_2L+3a_3L^2+4a_4L^3+5a_5L^4$$

$$\text{error}''(L)=2a_2+6a_3L+12a_4L^2+20a_5L^3$$

These five equations are solved symbolically for the coefficients $a_0, a_1 \ldots a_5$. Then, each coefficient can be easily determined for any reasonable set of boundary conditions.

Once the coefficients of the polynomial are obtained, the error"(s) can be evaluated for some picked_s, which corresponds to a distance along desired path from s=0 and is presently defined as:

$S_{picked}$=ground speed * planning interval to obtain the correction term:

Cerror=error"(spicked)curvature to calculate the new steer angle:

$\emptyset$steer=tan$^{-1}$[(Cdesired+Cerror$_{@spicked}$)L]

This calculation is done at each planning interval which is presently 0.25 sec. (dt_plan).

5. Monitor/Auxiliary

Referring now to FIG. 43, the monitor/auxiliary functional block(s) 4308 and 4310 take care of some miscellaneous functions not performed by the other blocks of the vehicle control system. For instance, start or kill the engine 4616, honk the horn, raise or lower the bed, setting the parking brake on or off, turning the lights on or off, are some of its functions.

The monitor block 4310 also checks the commands that are being sent by or to the other functional blocks on the bus 4314 to see if they are valid. If error is detected, it will signal the shutdown circuits block 4312 and the system will shutdown as discussed below.

6. Safety System (Shutdown)

a. Introduction

The safety system, including shutdown circuits 4312, (see FIGS. 43 and 52) operates to stop the vehicle 310 on detection of a variety of error conditions by setting the parking brake on. This results in the vehicle 310 coming to a safe stop in the shortest distance possible.

Since the parking brake is designed to be normally "set" or "on," and the electronic circuits operate to release it, upon a failure of the electronic controlling system(s) the power 5216 is turned off to the actuators 5006, so that there is no power to actuate valves, and the parking brake returns to its normal position, called "set."

Whenever several erroneous commands are received, or whenever the speed and/or steering simulation models disagree beyond an acceptable tolerance with vehicle sensor outputs 4622 and 4624, are examples of conditions which could result in shutdown of the system. The shutdown system 4312 is an independent and separate subsystem from the other autonomous control subsystems (see FIGS. 43 and 52).

b. Shutdown Control

Figure 52:
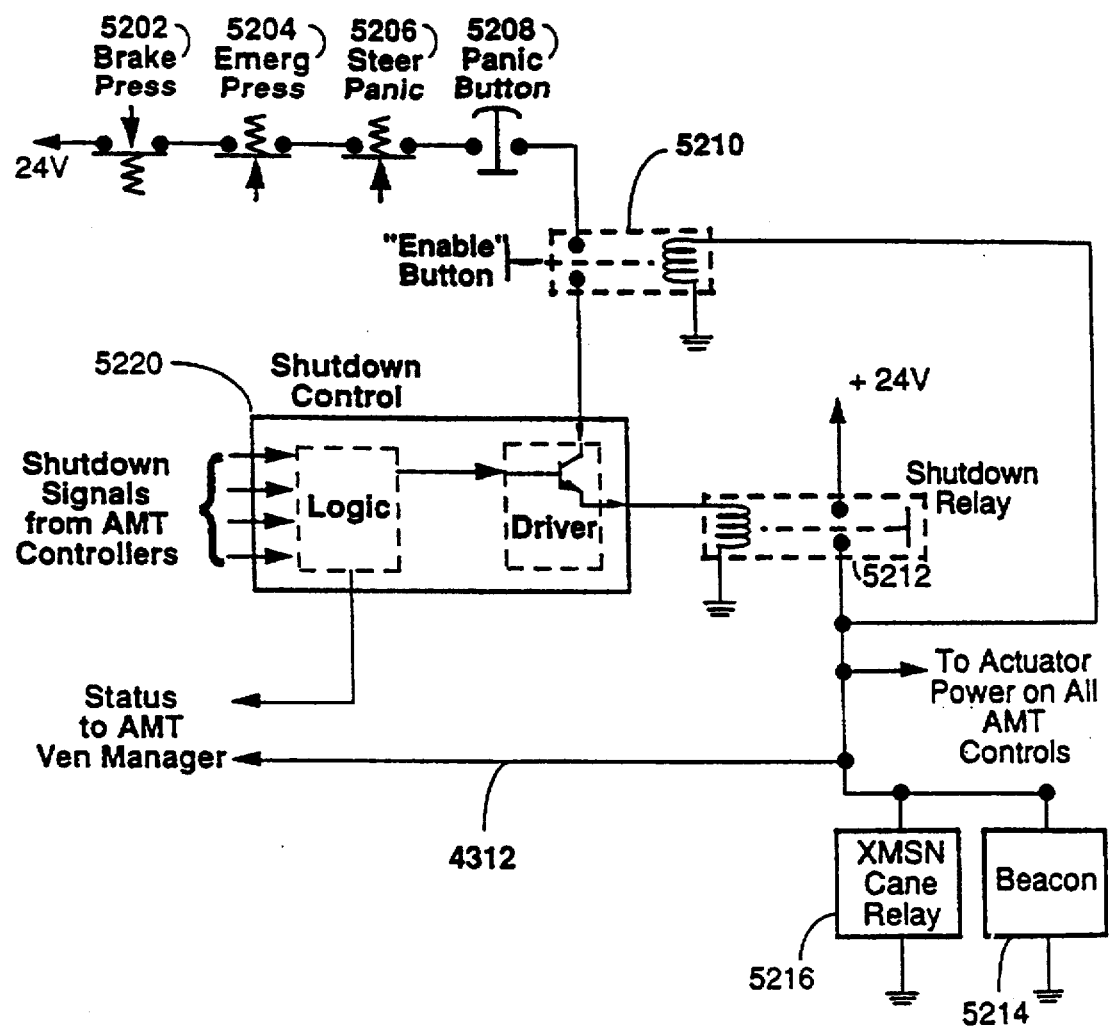
FIG. 52 is a diagram showing an embodiment of a shutdown circuit of the present invention.

The safety system shutdown circuits 4312 shown in FIG. 43 connected to receive the outputs of the other vehicle control system functional blocks is shown in more detail in FIG. 52.

It is a fail-safe type design. It contains no microprocessor at all. It is all hard-wired, discrete logic.

A feature of the vehicle control system 4312 design is that all functional blocks are capable of detecting errors in the output of the others on the serial bus 4314. So if one of them senses that another is not functioning correctly, it can send a signal to the shutdown circuits 4312 to shut the system down.

For example, the speed and steering blocks each look at their received commands (received via the vehicle manager 4302) to make sure they are valid. They also make sure that what they are told to execute, that is, what they are requested to command, is within predetermined bounds. If not, they will act to shut the system down.

The safety system may also be monitoring oil, hydraulic and pneumatic pressures, and temperatures, for instance, making sure they are sufficient to safely operate and control the vehicle.

The safety system includes switches for manual override, including a panic stop 5208, switches on the brake pedal 5202 and steering wheel 5206.

7. Bus Architecture

The bus 4314 that inter-connects the vehicle control system functional units 4302, 4304, 4306, 4308, and 4310 is a serial data type common bus implemented in a ring structure using a data packet collision detection scheme.

F. Functional Descriptions/Methods

1. The NAVIGATOR

Figure 53:
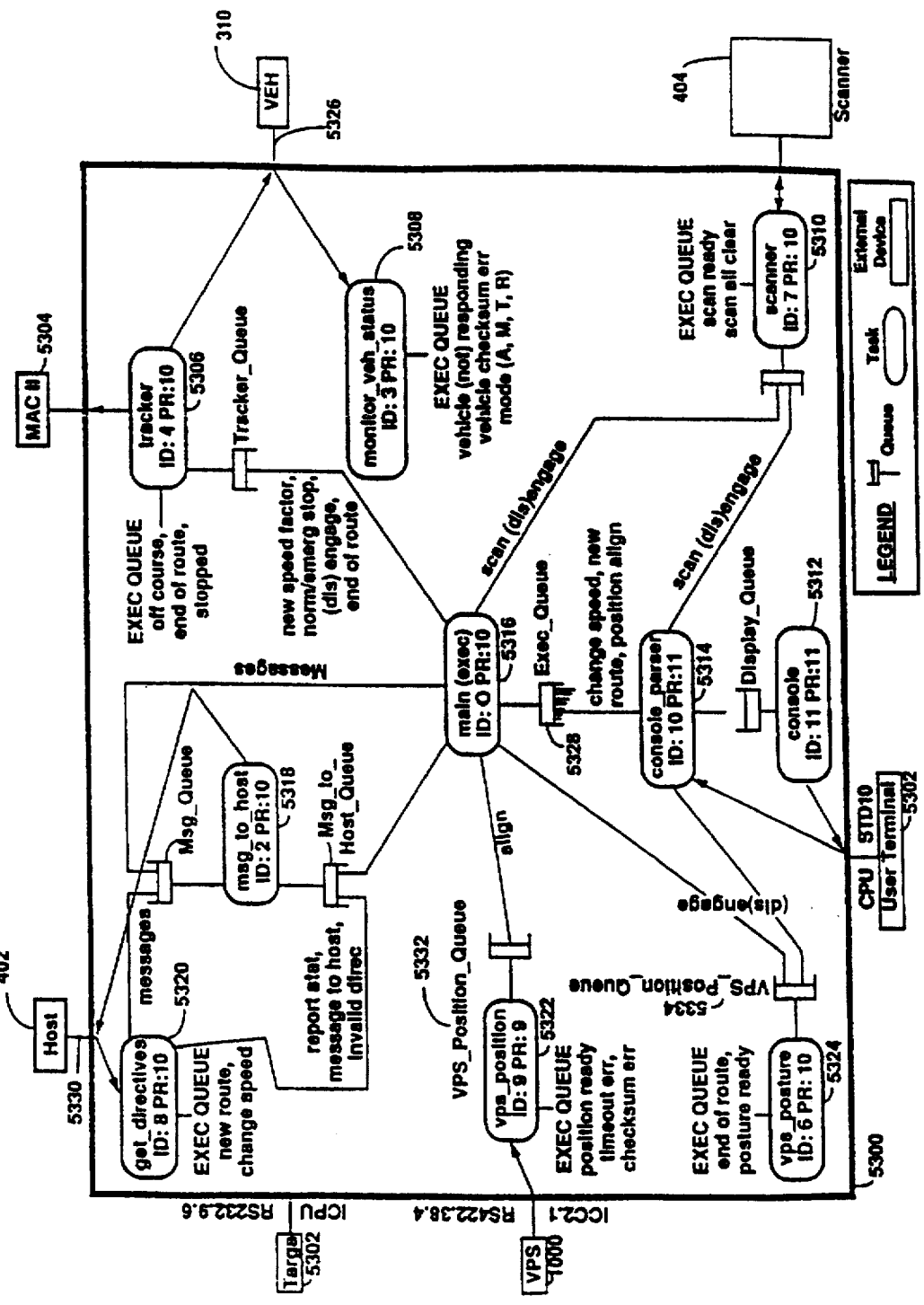
FIG. 53 is a diagram showing navigator tasks.

The following is a description of the navigator 406, shown in FIG. 53, titled TASK DIAGRAM. Each of the tasks diagrammed is discussed below.

a. MAIN (executive)

In the center of FIG. 53 is a task labelled "main (exec)" 5316. This task 5316 coordinates inter-task communications and performs high level decision making for the navigator 406. One of the primary decisions the task 5316 makes is when to (dis)engage the tracker 5306, based on messages received from the other tasks in the system.

b. MONITOR VEH STATUS

This task 5308 is shown above and to the right of the "main" task 5316. It functions to read the vehicle port 5326, and report vehicle mode changes and navigator-to-vehicle communication state to the "main" 5316 via the EXEC QUEUE 5328. Additionally, the status of the vehicle 310 is written to a global memory structure 5400 (see FIG. 54).

c. SCANNER

Shown in the lower right-hand corner of the task diagram FIG. 53 is the scanner task 5310, which provides for communication to the "main" 5316 of data from the obstacle detection system 404.

d. CONSOLE AND CONSOLE PARSER

The console 5312 and the console-parser 5314 are shown just below the "main" task 5316 in the task diagram FIG. 53. These tasks were developed as a debugging tool during the development of the system. They display and manipulate navigator 406 states according to user input from a terminal 5302. The console_parser task 5314 also is used to set tracker parameters.

e. GET DIRECTIVES

This task 5320 is shown in the upper left-hand corner of the task diagram FIG. 53. It is part of the host-navigator interface 5330. Messages from the host 402 are received and decoded by this task 5320. Then, depending on the message, the message is either communicated to the "main" task 5316, or to another task. This other task would then formulate an appropriate response from the navigator 406 to the host 402.

f. MSG TO HOST

This task 5318, shown just above and to the left of the "main" task 5316, formulates messages from the navigator 406 to the host 402 and communicates them to the host 402.

g. VPS POSITION

This task 5322 is shown at the left side of the task diagram FIG. 53. The vps_position task 5322 reads the (20 Hz) output from the VPS system 1000. The data is checked for correctness (for example, "checksum") and if correct, it is put into a global memory structure 5400, the position buffer (VPS_POSITION_QUEUE) 5332. The task sends a message to the "main" 5316 whenever a position fault occurs.

h. VPS POSTURE

This task 5324 is shown at the lower left-hand corner of the task diagram. When the vehicle is tracking, this task maintains the posture buffer (VPS_POSTURE_QUEUE) 5334. The task (5324) monitors the vehicle's position and maintains approximately 50 postures, from the current vehicle position in the direction of travel, in the posture buffer (3000).

i. TRACKER

Shown in the upper right-hand corner of the task diagram FIG. 53, the task 5306 reads the current position 5332 and posture buffers 5334. Based on the information read, task 5306 calculates steer and speed corrections 420. It sends them to the vehicle 310, thereby controlling the vehicle's course.

j. NAVIGATOR SHARED (GLOBAL) MEMORY

As mentioned above with regard to the navigator tasks 5300, the navigator 406 has a global memory structure 5400 which the various tasks read/write. This memory structure 5400 is illustrated in FIG. 54.

Figure 54:
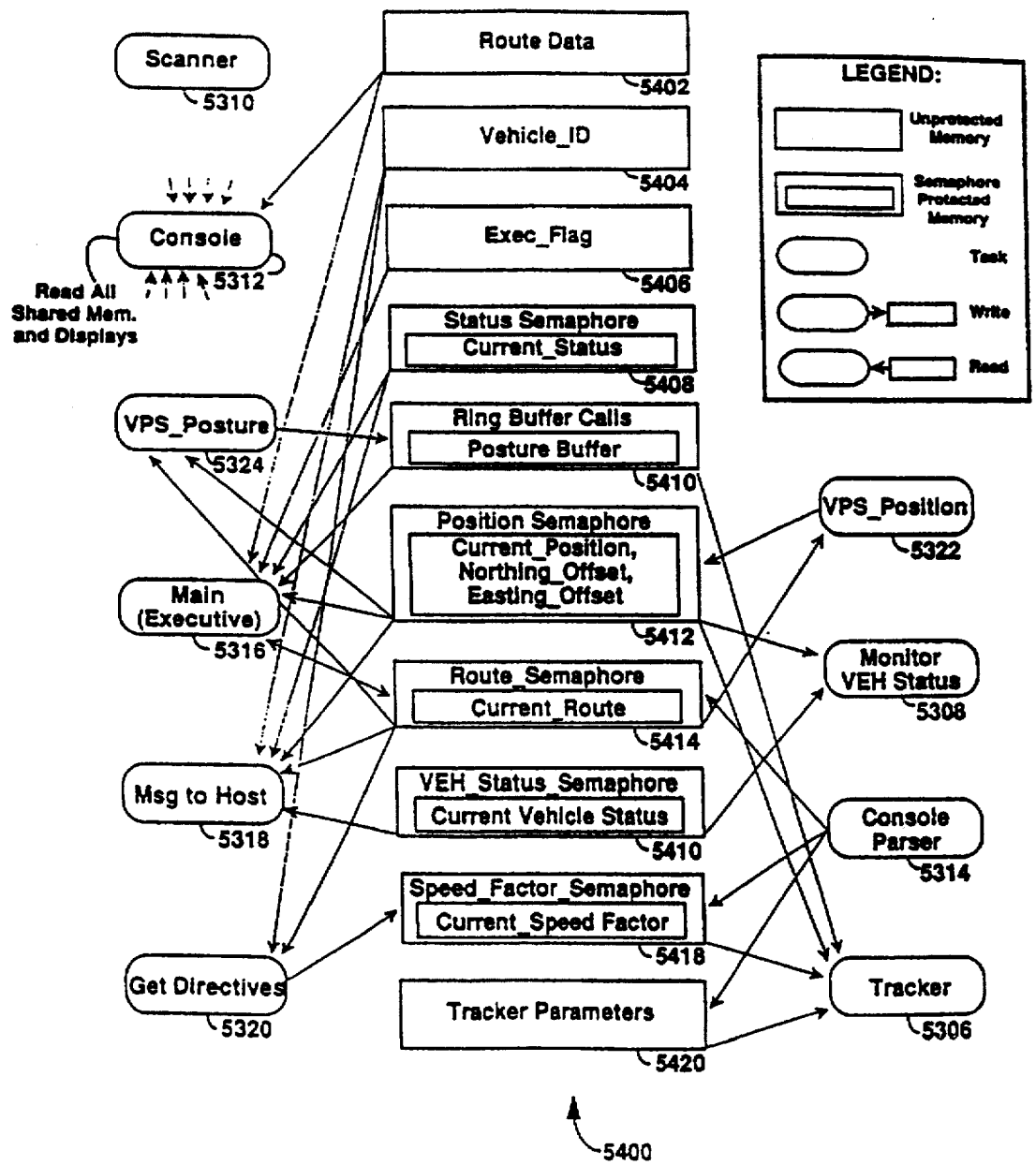
FIG. 54 is a diagram showing an embodiment of navigator shared memory.

Referring now to FIG. 54, the tasks are depicted as ellipsoids, with the particular task written inside. The memory 5400 is depicted in the center section of FIG. 54 as a stack of boxes. Unprotected memory is depicted as a single box in the stack of boxes. Semaphore protected memory is depicted as a box within a box in the stack.

An arrow points in the direction of data transfer between tasks and memory. Therefore, a write to memory from a task is shown as a line with an arrow pointing towards the memory in question from the task. Likewise, a read from memory by a task is depicted by a line with an arrow pointing towards the task in question from the memory. Where two-way data transfer between task and memory exists, a line with an arrow at both ends is shown.

k. MAIN (EXEC) FLOW CHARTS

FIGS. 55 and 56A–56D are flow charts of the navigator main or executive task 5316.

Figure 55:
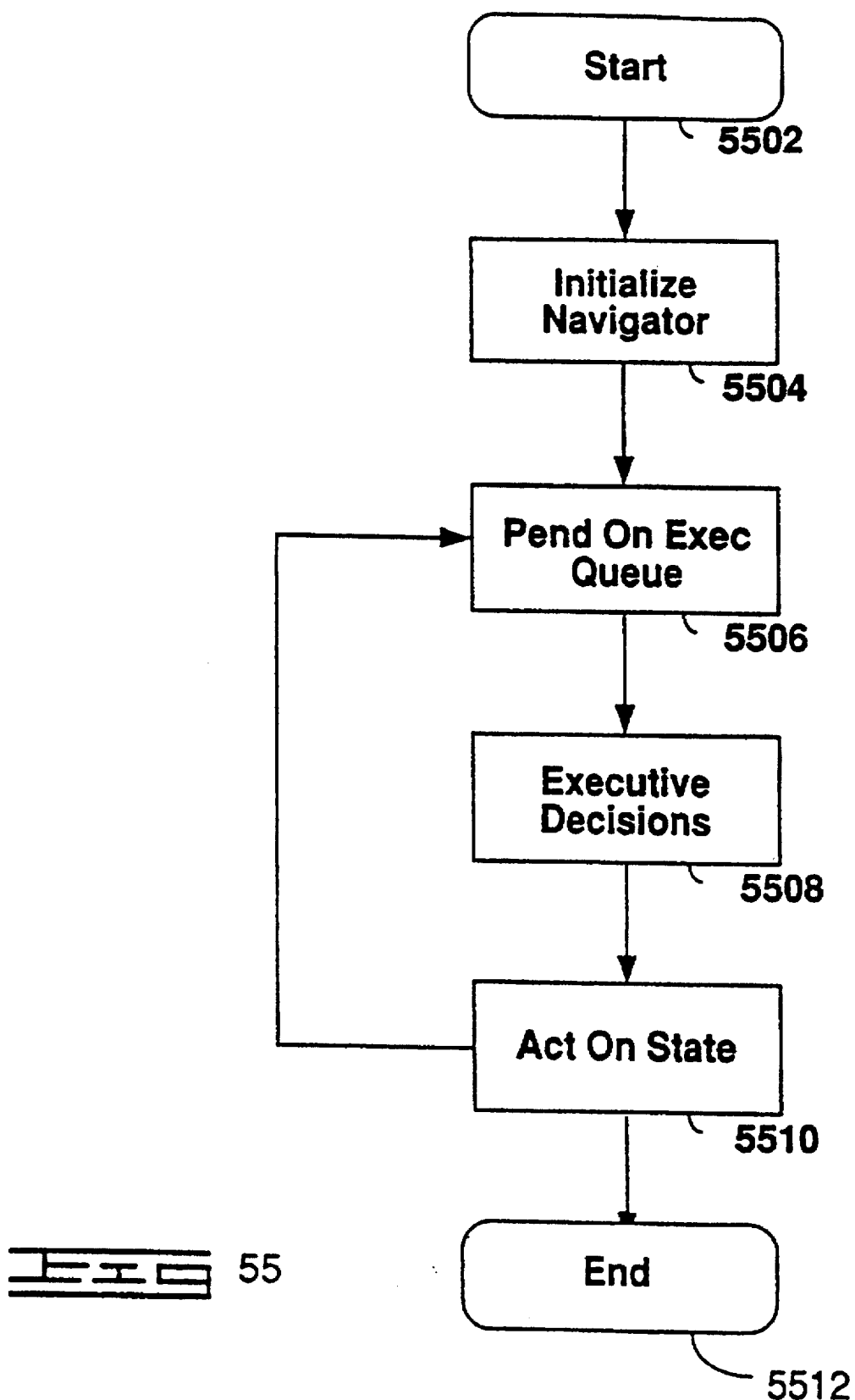
FIG. 55 is an executive flowchart.

Referring first to FIG. 55, it is a diagram of the general structure of the main or executive task flow. The following describes several flowcharts associated with the navigator executive task 5316.

Referring to FIG. 55, which is the executive flowchart, it shows of five blocks: block 5502 which is the Start block; block 5504 which is the initialize navigator; block 5506, which is the Pend on Exec Queue; block 5506, which is the executive decisions; and block 5510, which is the act on state.

Flowchart FIG. 55 describes how the executive task 5316 executes its functions beginning at power up (switching on electrical power) of the navigator 406. Upon powerup, the executive task 5316 (or Executive) begins at the start block 5502 and proceeds immediately to initialize navigator 5504, where the executive 5316 puts the navigator 406 in a known initial state. The executive then proceeds to the Pend on exec que 5506 and waits for a message from a number of sources to arrive in its message que 5328. For example, a typical message could be a query for information from the host computer 402.

Upon receipt of a message in the Exec Que 5328, the executive 5316 proceeds to the executive decisions block 5508. In this block, the executive 5316 sets a series of status flags in a known manner. These flags put the navigator 406 in a known state, particular to the message received.

Once the status flags have been properly set, the executive 5316 then proceeds to the Act on State 5510, where the necessary action is carried out according to the type of instruction received.

Referring now to FIGS. 56A-56D, they show the flow of the "executive decisions" block 5508 of the general structure diagram FIG. 55.

The various responses which the executive task 5316 can initiate are now described in more detail. There are a known set of messages which are expected within the Exec Que 5328. These messages are shown in detail in FIGS. 56A-56D.

Figure 56:
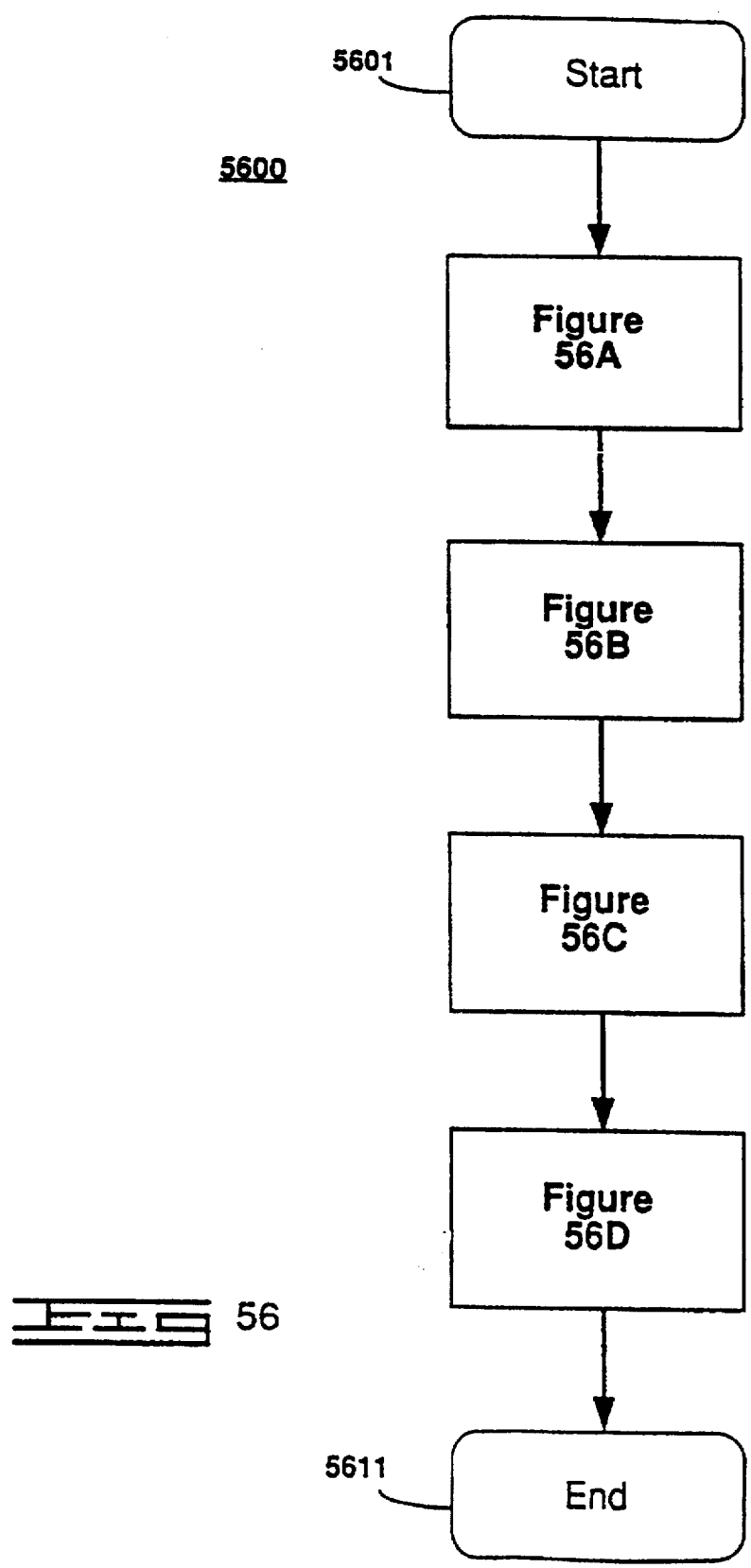
FIG. 56 is an illustration of how FIGS. 56(a)-(d) relate.
Figure 56A:
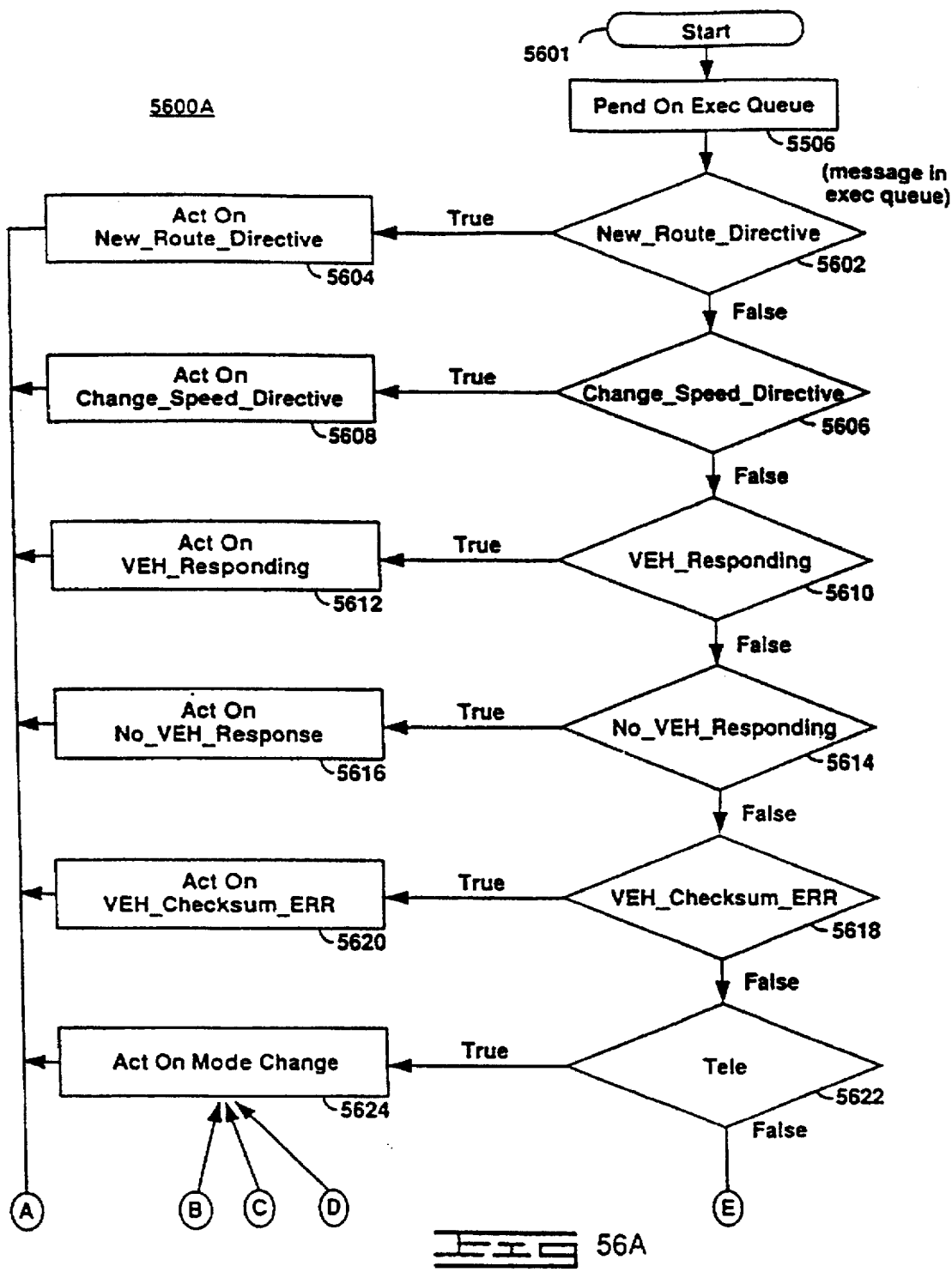

FIG. 56A diagrams the organization of FIGS. 56A-56D. FIGS. 56A-56D describe in detail the procedure which the executive 5316 uses to respond to various messages.

Referring to FIG. 56A, the action of the executive 5316 to particular messages is described. Upon receipt of a message to the Exec Que 5328, the program flow leaves block 5506 and proceeds to block 5602, where the executive 5316 determines if the message is 'NEW_ROUTE_DIRECTIVE'. If the message is 'NEW_ROUTE_DIRECTIVE', then the executive 5316 proceeds to the Act On "NEW_ROUTE_DIRECTIVE' block 5604. Once the action particular to the 'NEW_ROUTE_DIRECTIVE' message has been completed successfully, the executive 5316 then proceeds to the Act on State block 5510. Once the action has been completed, the executive 5316 returns to the Pend on Exec Que block 5506 to await another message. If the initial message in block 5602 is not 'NEW_ROUTE_DIRECTIVE', then the executive 5316 proceeds to block 5606 to determine if the message is 'CHANGE_SPEED_DIRECTIVE'.

The response to messages such as 'CHANGE_SPEED_DIRECTIVE', 'VEH_RESPONDING', NO_VEH_RESPONSE', and VEH_CHECKSUM_ERR', follow a procedure similar to that described for the message 'NEW_ROUTE_DIRECTIVE'. However, the actions performed in the Act On '...' blocks 5604 through 5620 are different for the different possible messages. The various types of valid messages and a brief description of each are:

NEW_ROUTE_DIRECTIVE: set the route number for the vehicle to follow.

CHANGE_SPEED_DIRECTIVE: command a maximum possible speed for which the vehicle can traverse a particular part of the route.

VEH_RESPONDING: the vehicle is responding to commands properly, set Navigator status flags to Healthy.

NO_VEH_RESPONSE: the vehicle is not responding to commands, stop the vehicle.

VEH_CHECKSUM_ERR: the vehicle is not receiving/ sensing data correctly, stop the vehicle.

TELE, MANUAL, READY, or AUTO: set the mode of the vehicle IN THE PROPER ORDER.

VPS_TIMOUT: VPS is not sending data, stop the vehicle.

VPS_CHECKSUM_ERROR: the VPS is sending garbled data, stop the vehicle.

VPS_POSTURE_READY: ready to generate path postures.

VPS_POSITION_READY: VPS data is available.

VPS_POSITION_ALIGN: the VPS system is initializing, do not move the vehicle.

END_OF_ROUTE: the vehicle is approaching the end of the current route, has been reached inform the host computer.

SCAN_READY: the scanning system is ready look for objects in the path.

SCAN_ALL_CLEAR: no objects have been detected in the vehicle path, continue normally.

SCAN_OBSTACLE: an object has been detected on the vehicle path, stop the vehicle.

TRACKER_OFF_COURSE: the vehicle is not following the desired path within tolerance, stop the vehicle.

TRACKER_END_OF_ROUTE: tracker has reached the end of the path, stop the vehicle.

TRACKER_STOPPED: notify the Navigator that the tracking task has stopped the vehicle.

The responses to the messages 'TELE', 'MANUAL', 'AUTO', and 'READY' are somewhat different because these messages are related and must be acted upon in a specific order. This has been described above. The program flow for these messages is shown in FIGS. 56A and 56B with respect to block 5622-5630.

Figure 56C:
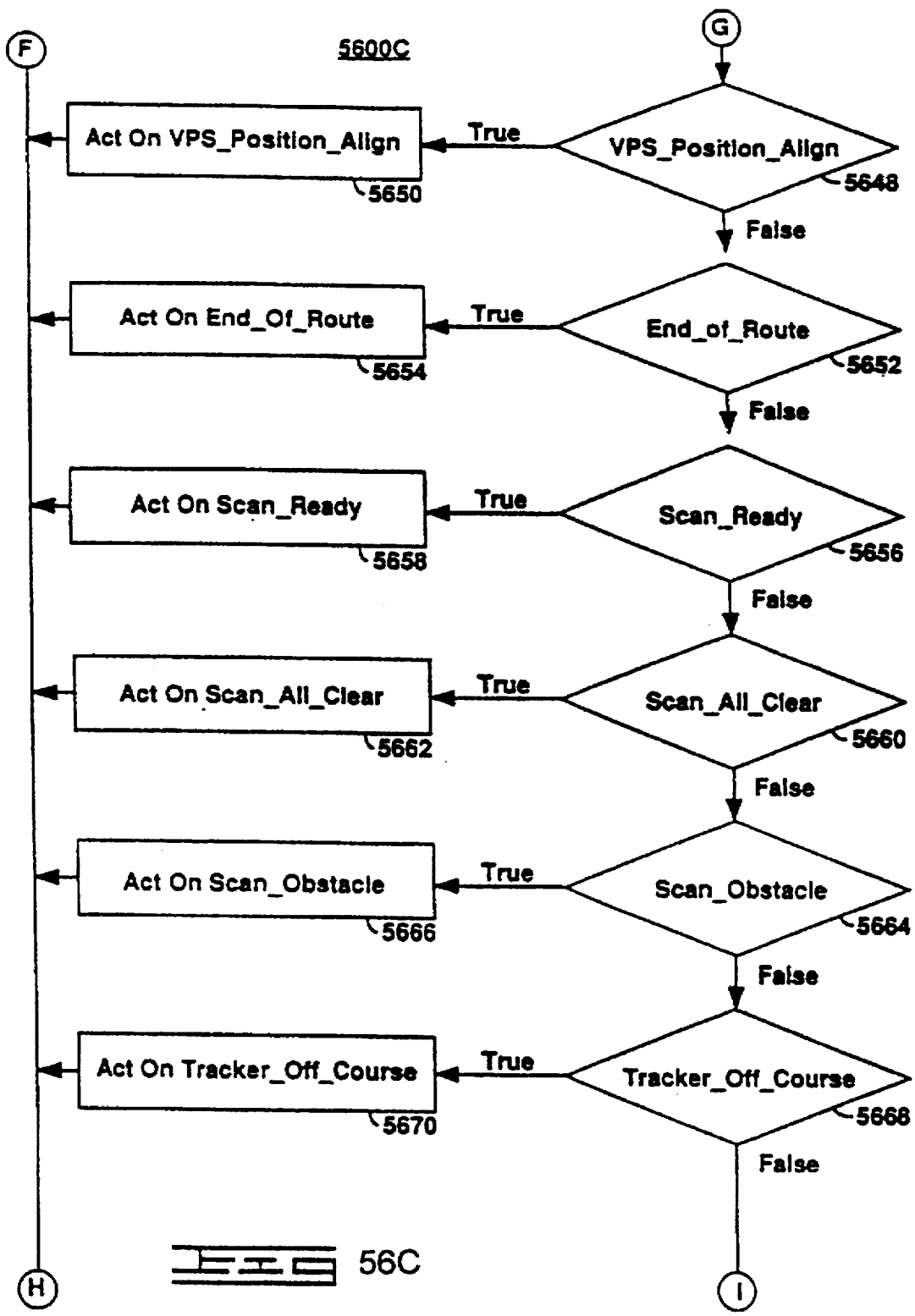
Figure 56D:
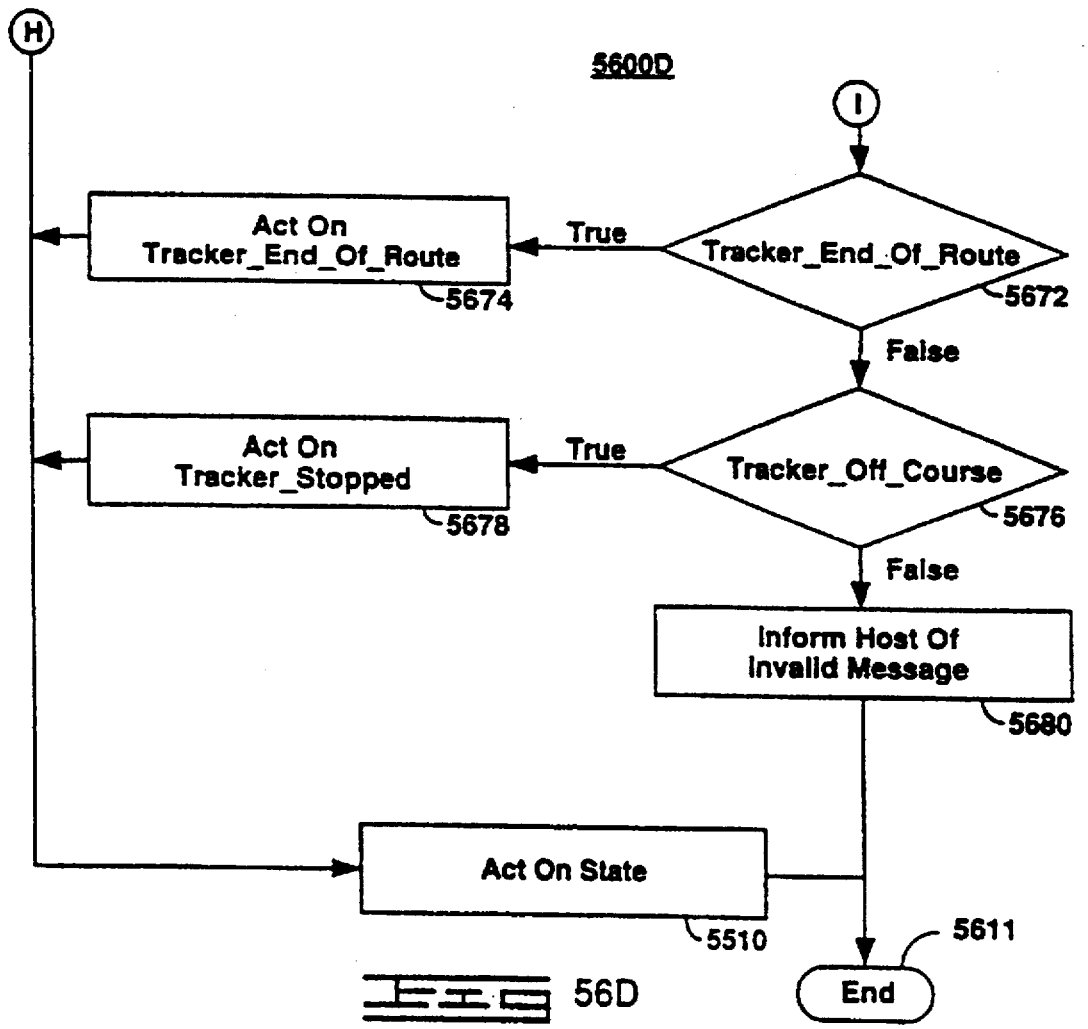

The response to subsequent message possibilities are depicted by blocks 5632 through 5678 in FIGS. 56B through 56D. These responses are similar to those described for the message 'NEW_ROUTE_DIRECTIVE'.

If the received message is not one of the expected messages, or if the message is garbled, then the executive 5316 is directed to block 5680, where the host computer 402 is informed of the problem. The executive 5316 then returns to the Exec Que 5506 to respond to the next message in the queue.

Figure 57A:
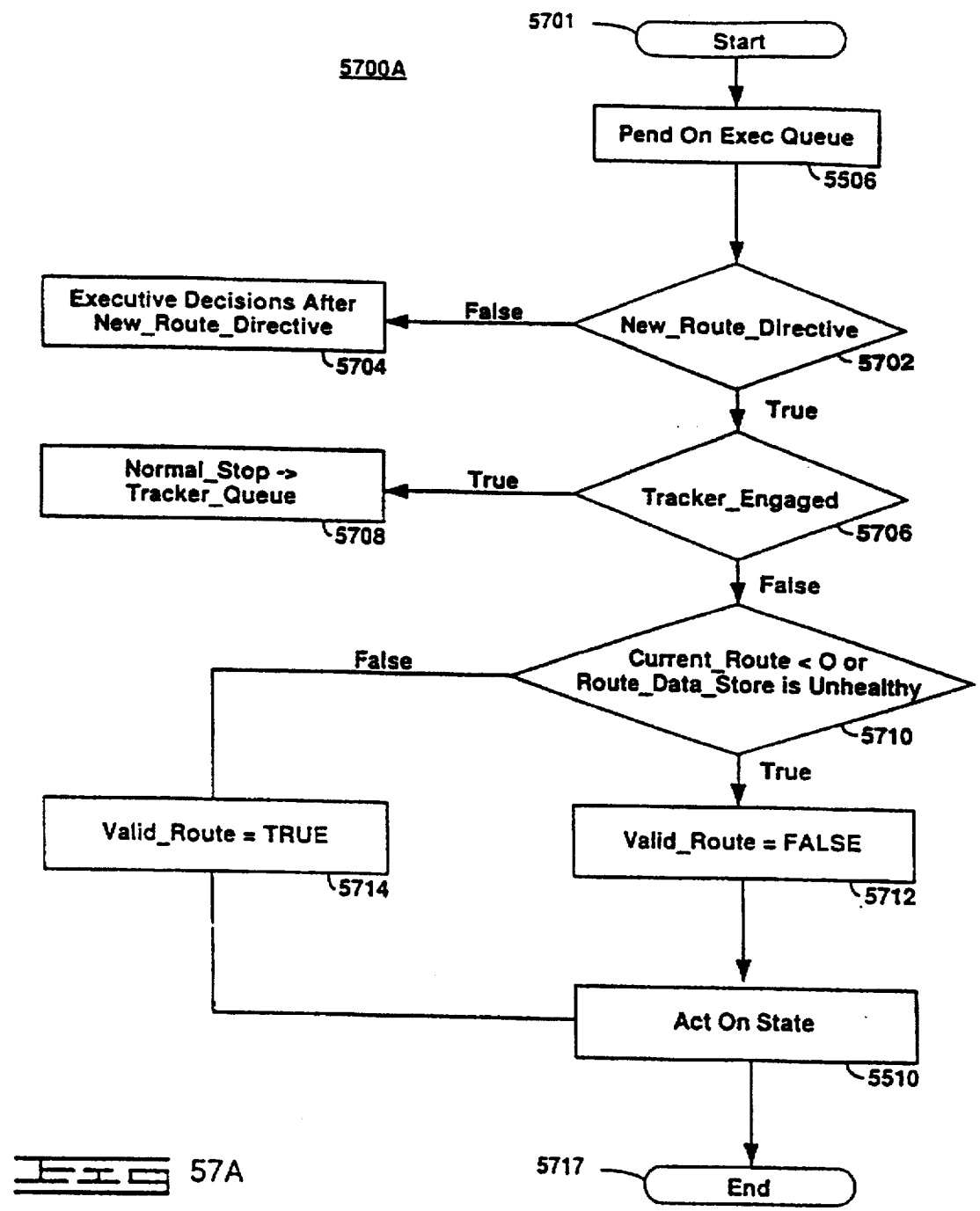
FIGS. 57(A)-(R) are flowcharts each showing an "act on" block of the executive decisions flowchart in detail.
Figure 57B:
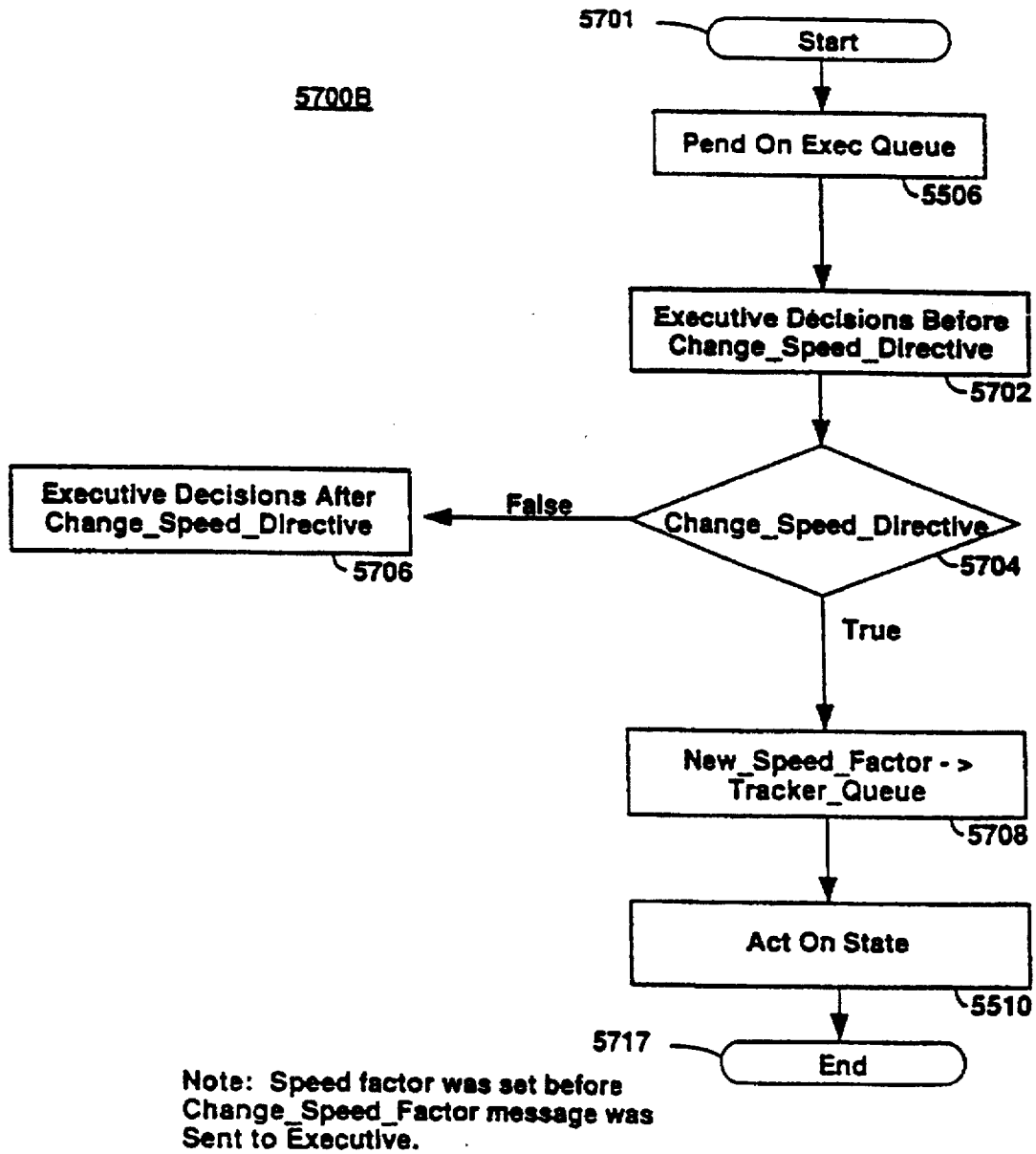
Figure 57C:
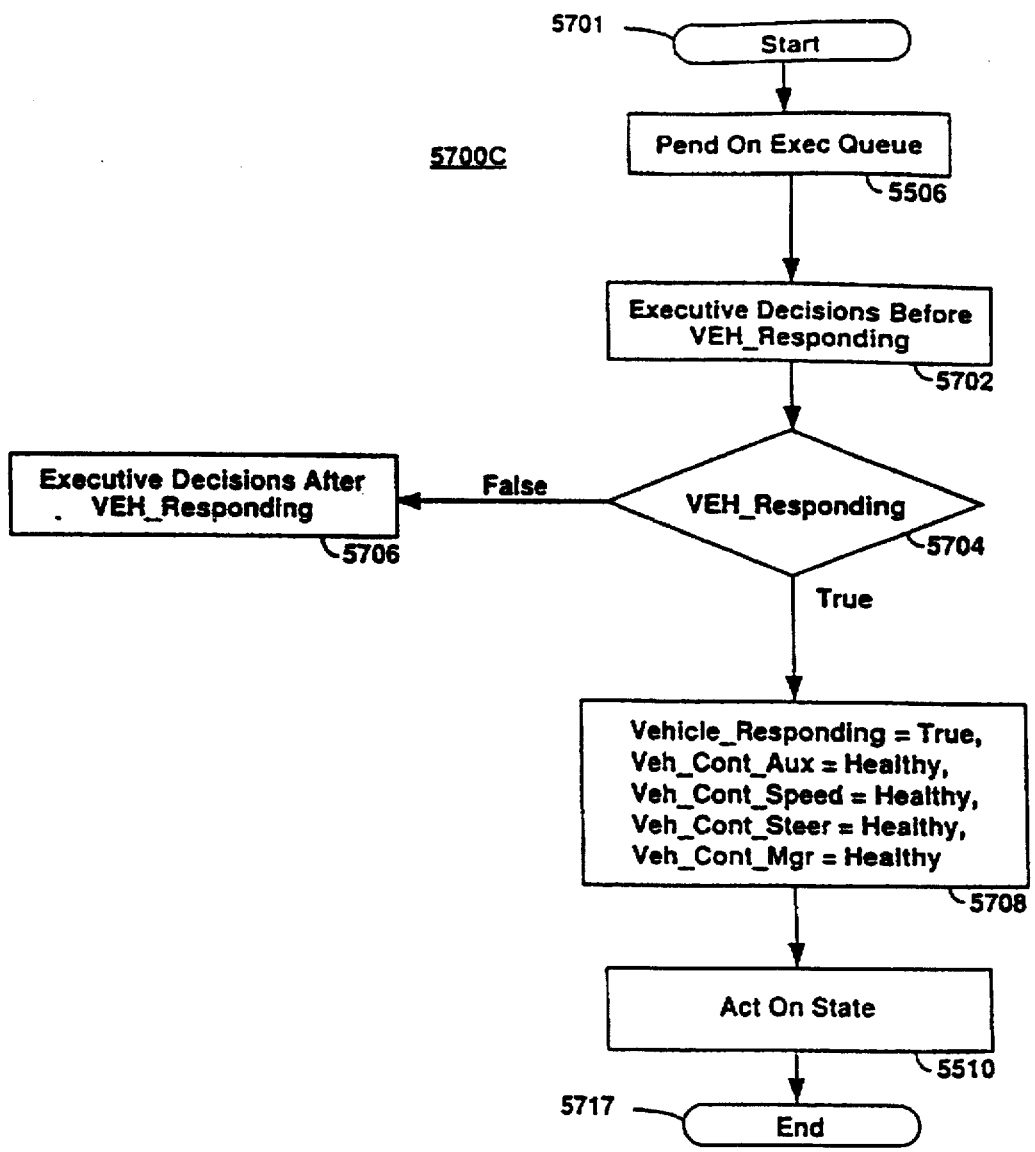
Figure 57D:
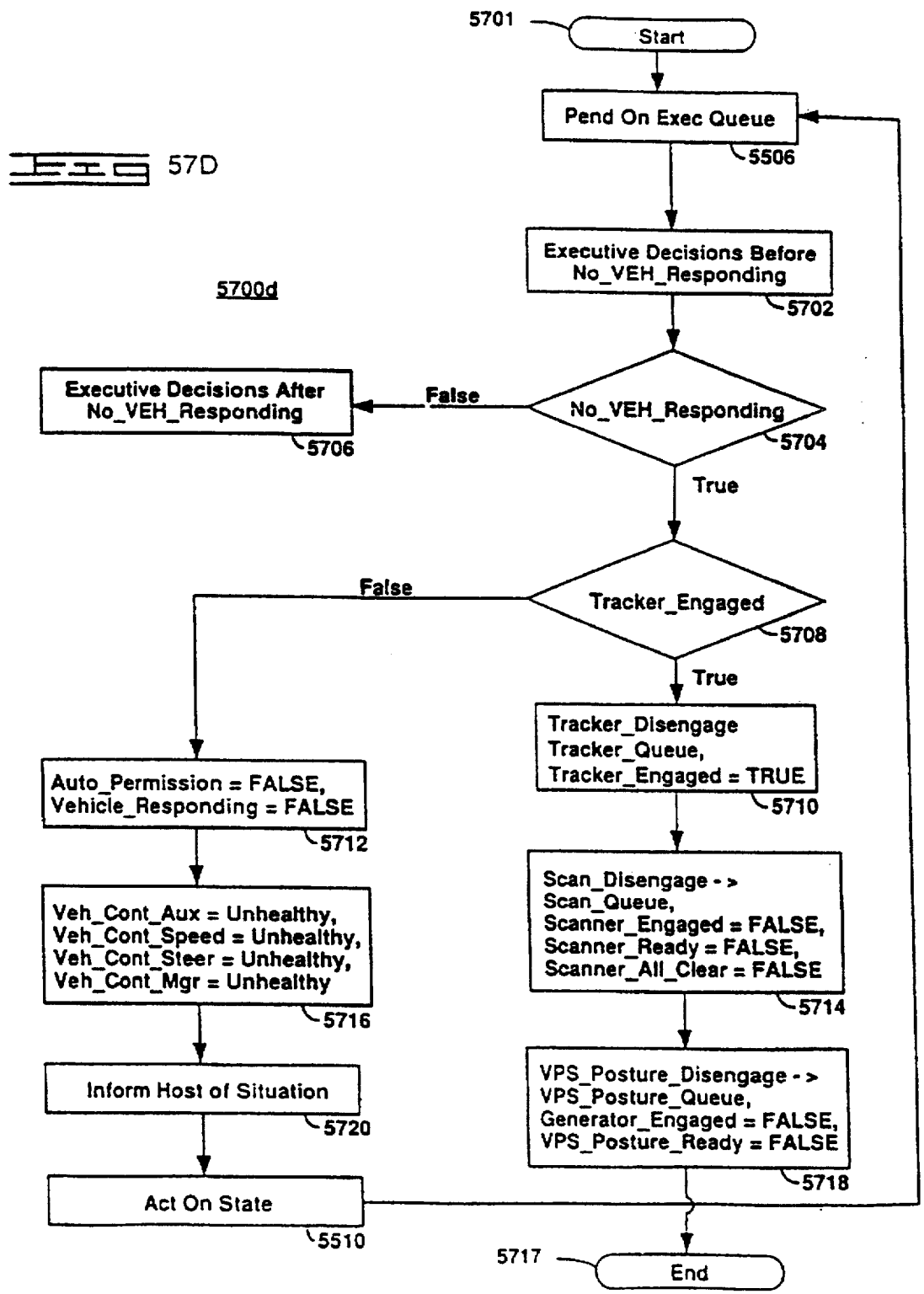
Figure 57E:
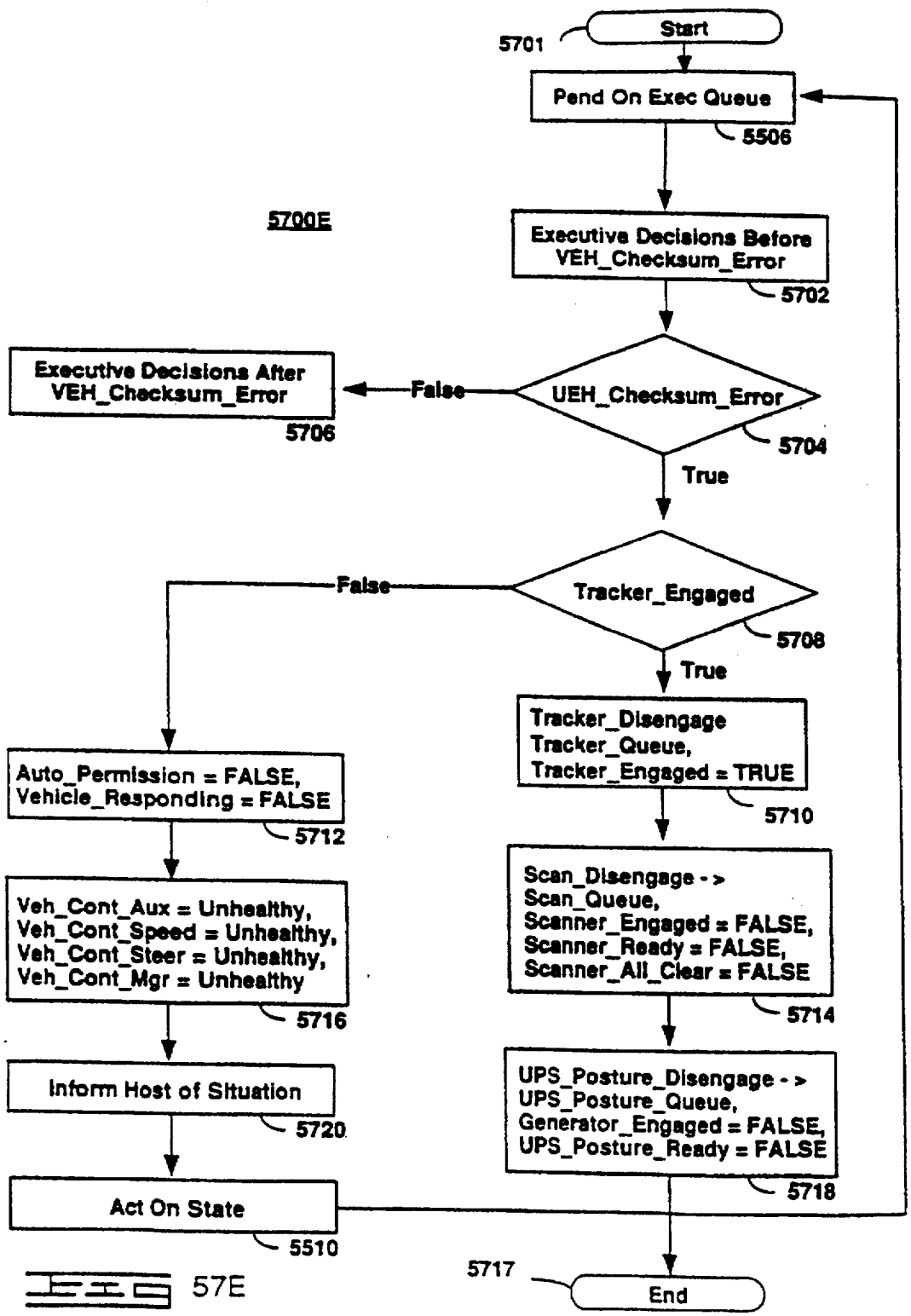
Figure 57F:
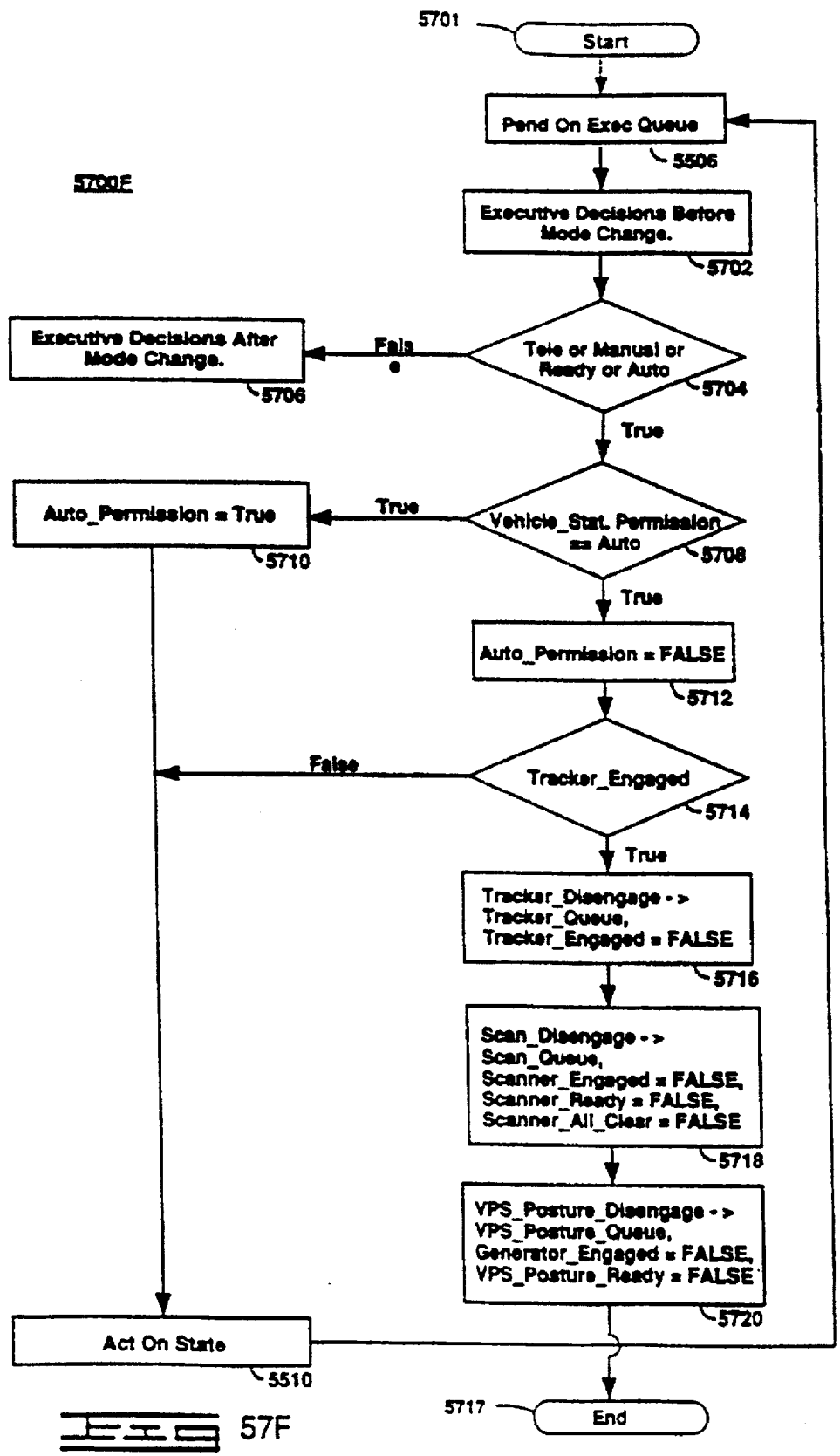
Figure 57H:
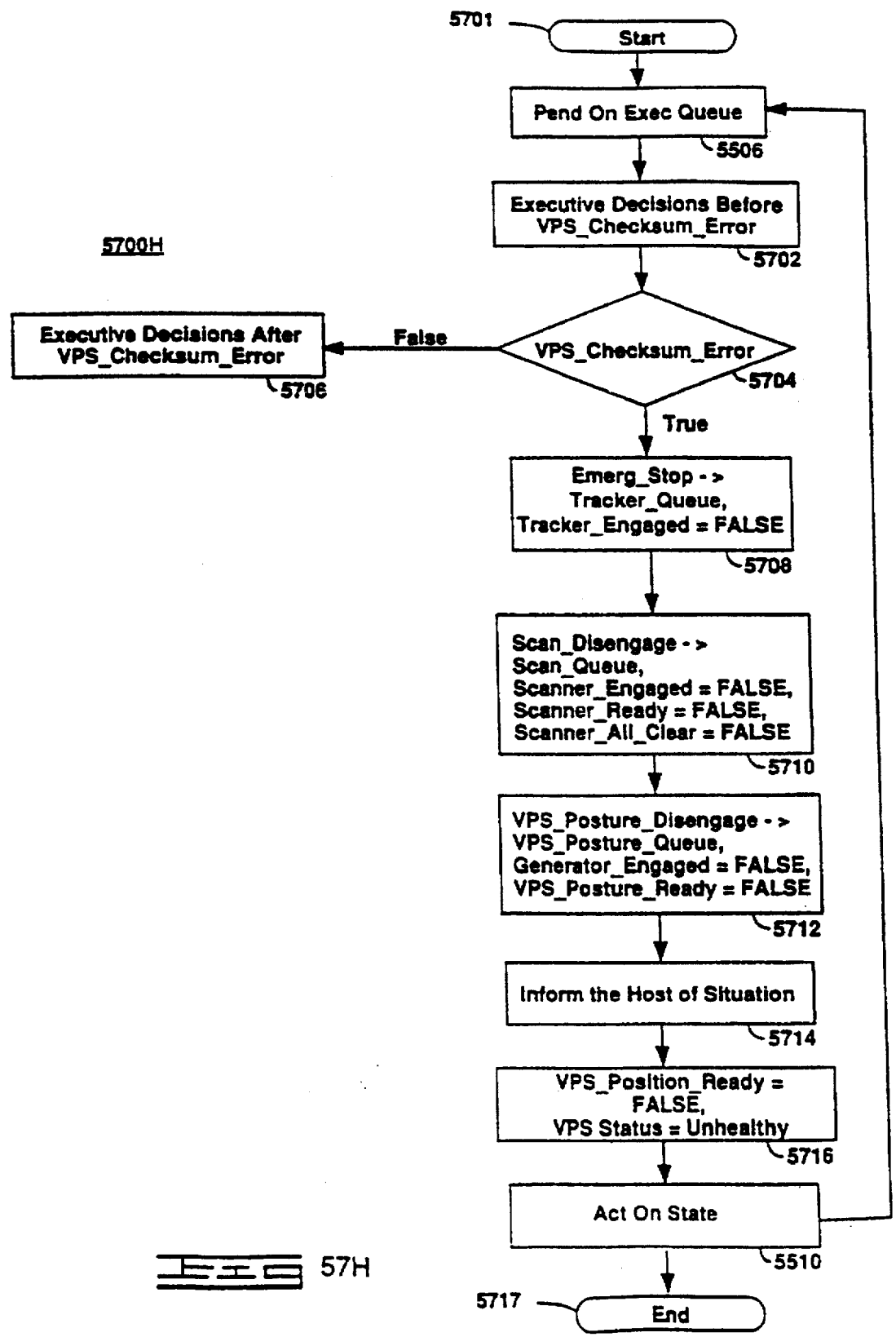
Figure 57N:
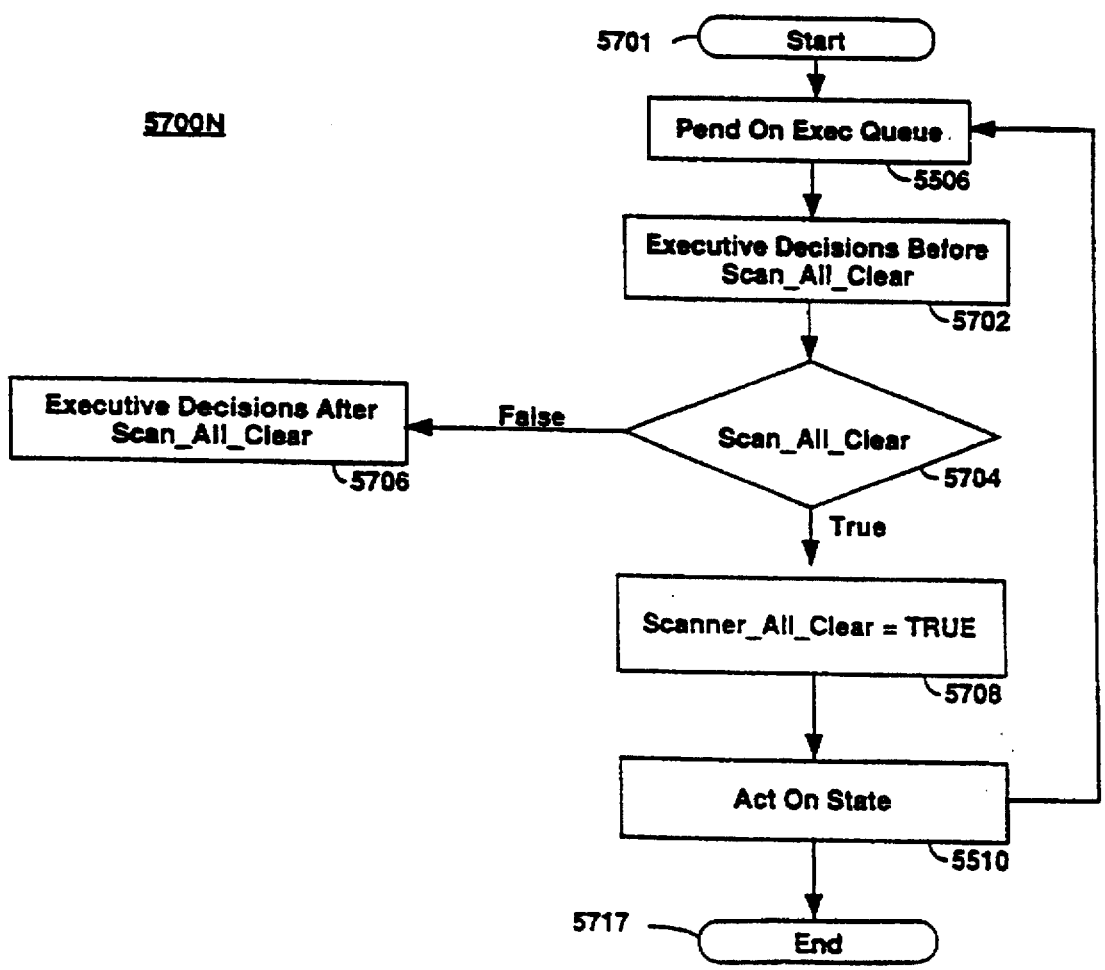
Figure 570:
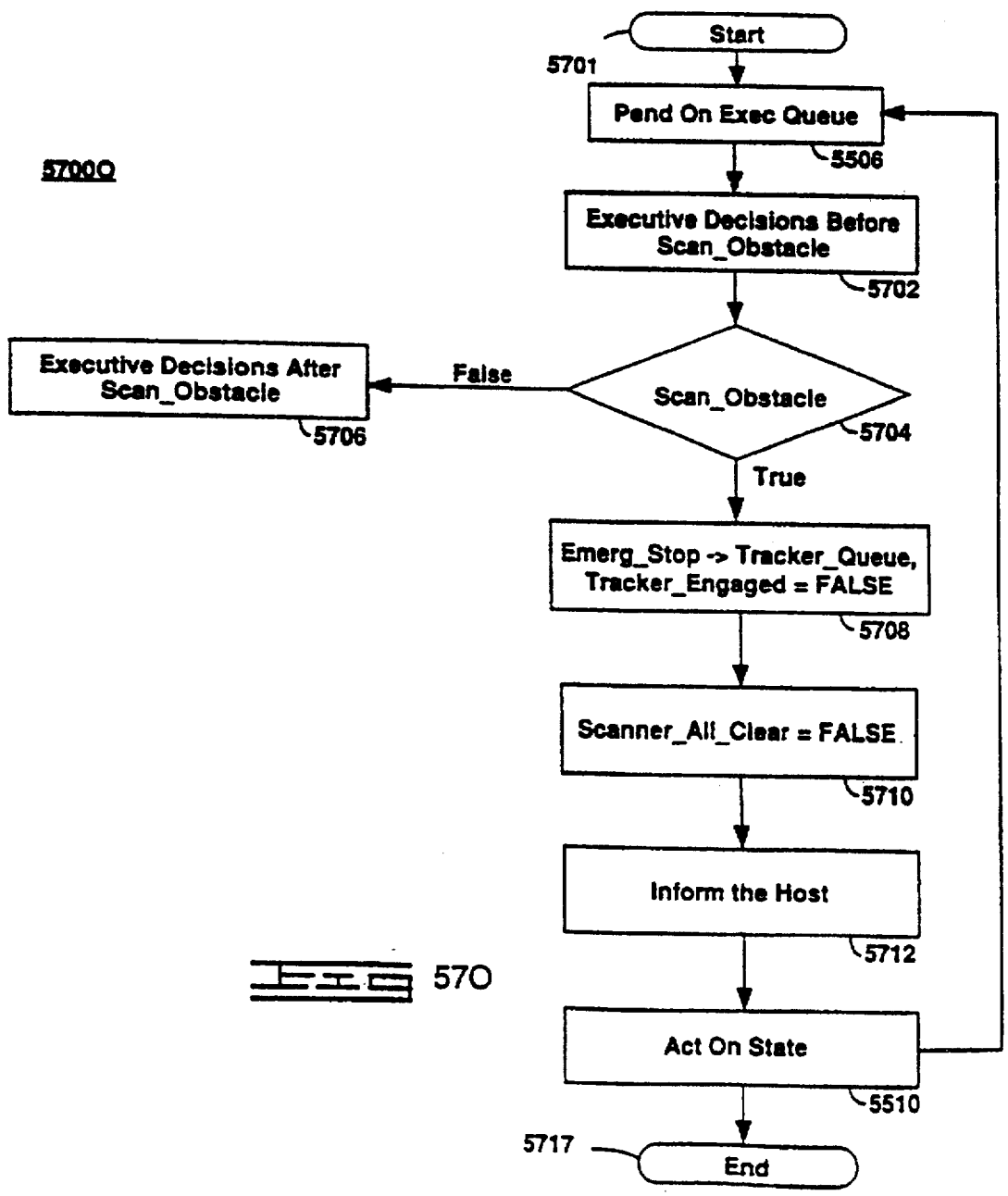
Figure 57P:
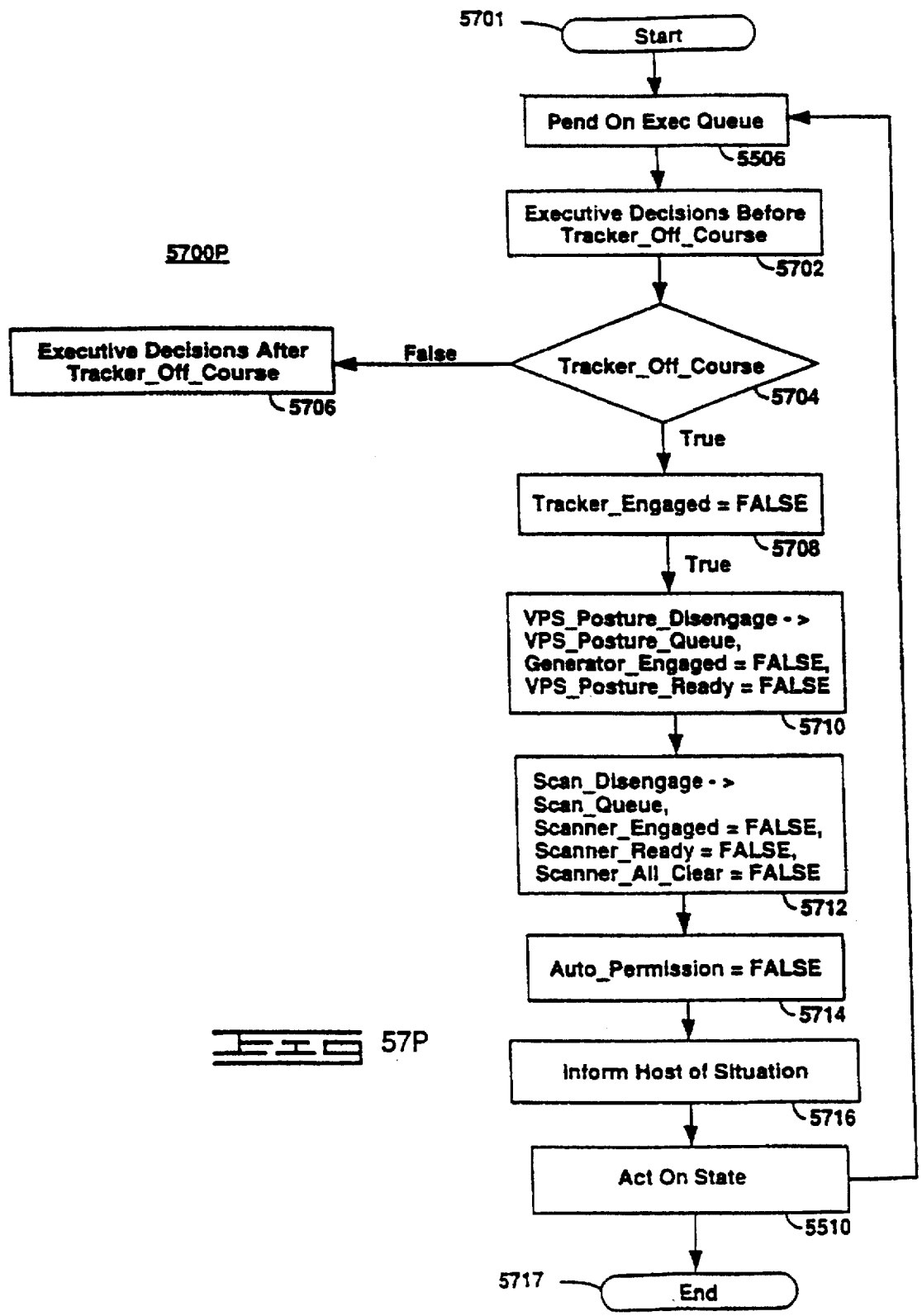
Figure 57Q:
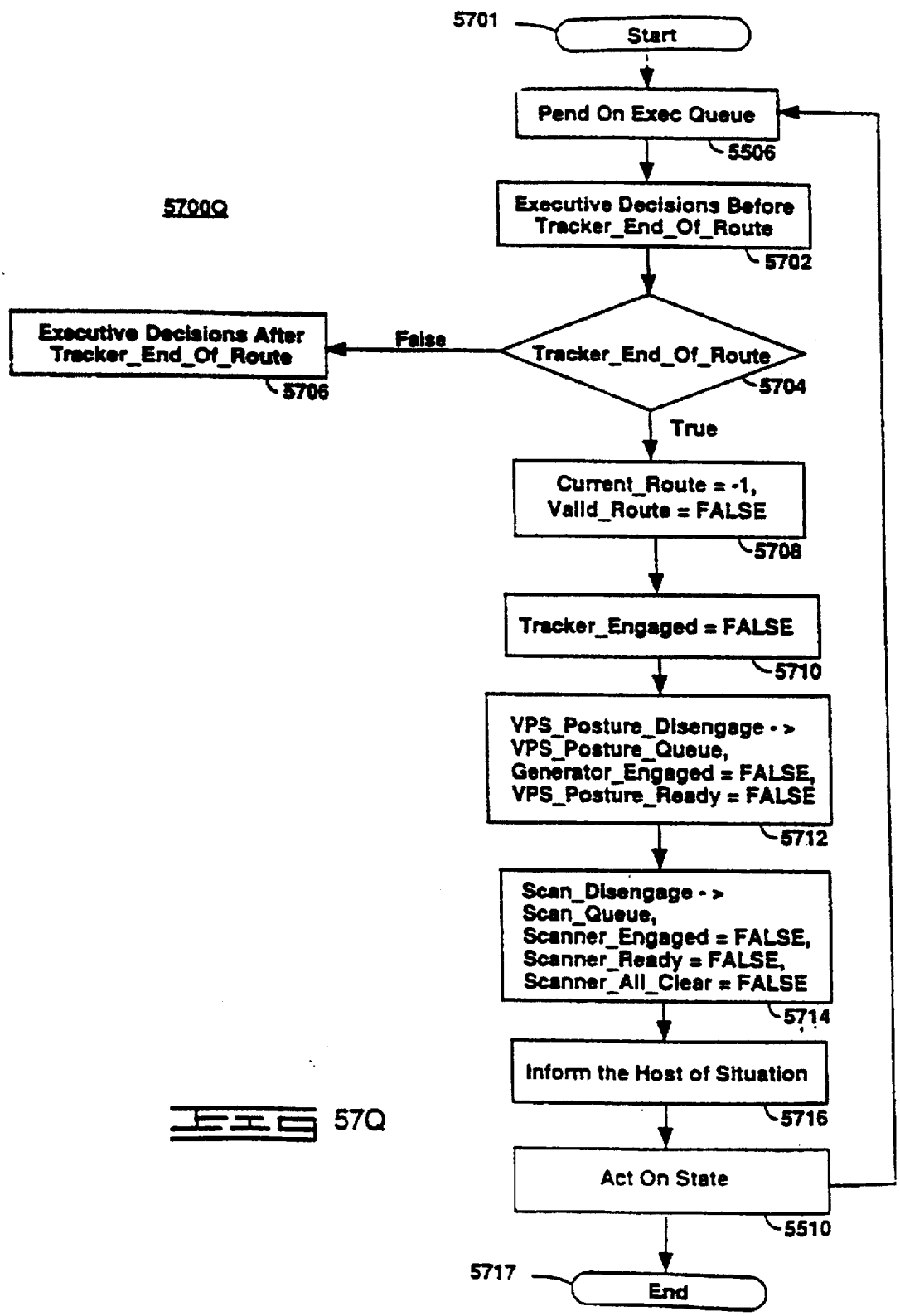

FIGS. 57A through 57R show the specific procedures which the executive 5316 uses to respond to a particular message. For example, FIG. 57A details how the executive 5316 responds to a 'NEW_ROUTE_DIRECTIVE' message. Once this message arrives in the Exec Que 5328, the executive 5316 then proceeds to a block 5702 to determine what the message is: in this case, 'NEW_ROUTE_DIRECTIVE'. If the message is 'NEW_ROUTE_DIRECTIVE', the executive 5316 then proceeds to a block 5705 to respond to the message. Otherwise, it proceeds on to a block 5704 to determine if it is valid (one of the other possible messages) or invalid.

Given that the message is a 'NEW_ROUTE_DIRECTIVE', then the executive 5316 follows the process described in FIG. 57A to respond to the message. This process is depicted by blocks 5706 through 5714. In this procedure (and in responses to other directives), the executive 5316 checks the states of different tasks within the navigator 406 and reacts to these states in a known, predetermined manner.

The effect of this response is to set a series of status flags, which effect subsequent responses by other tasks in the navigator 406 when the executive 5316 reaches the Act On State 5510. The actual procedures implemented in block 5510 is shown in FIG. 58.

The responses of the executive 5316 to other valid messages are similar to that described for the 'NEW_ROUTE_DIRECTIVE'. The effect of each response to directives first changes a set of flags, which in turn affect the state of the navigator 406. The particular flags set depend on the particular directive. The navigator 406 responds to the changes in these flags when the executive 5316 moves to the Act On State block 5510.

Figure 58A:
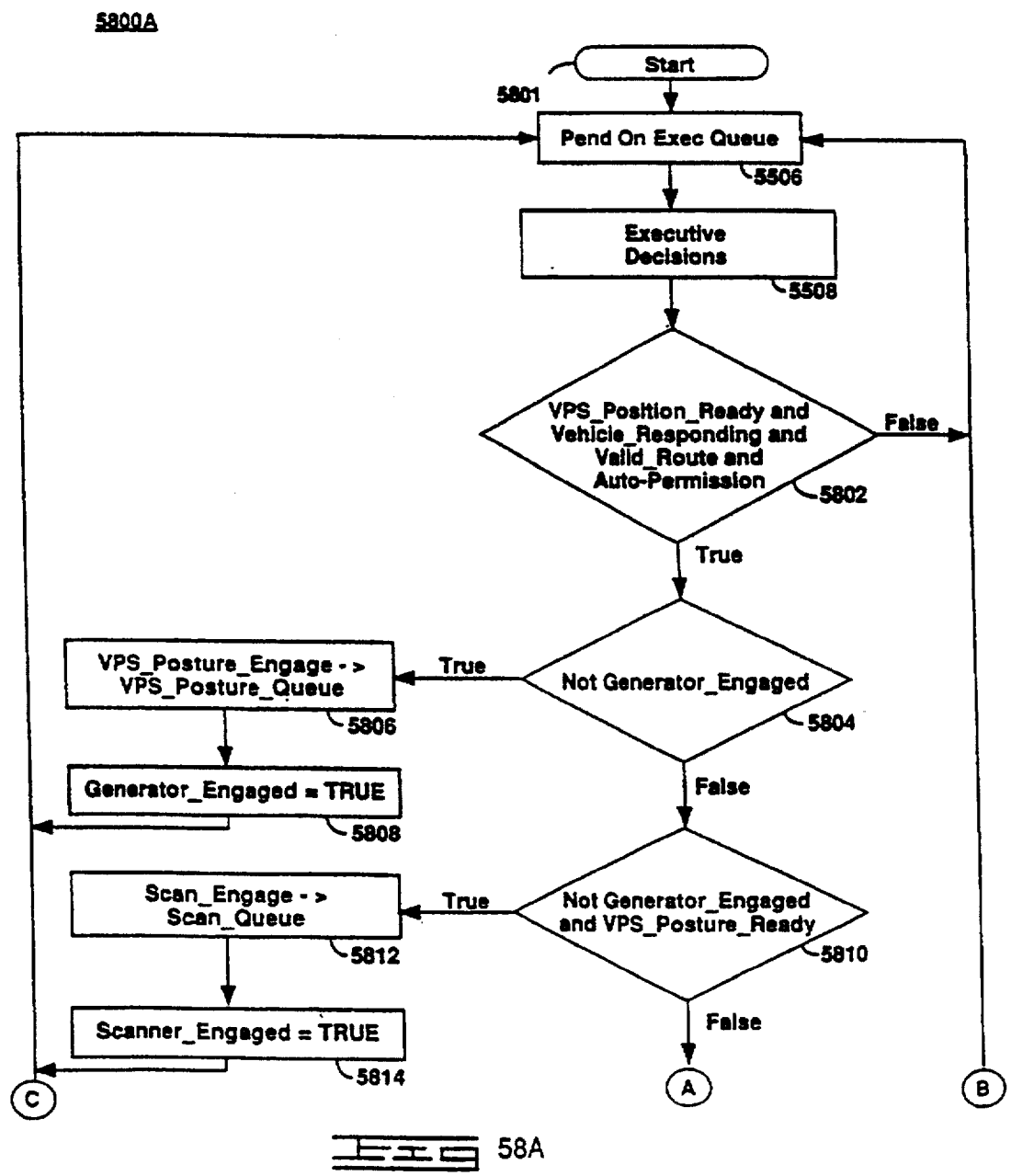

FIGS. 58A-58C illustrate the flow of the "act on state" block 5510.

The act on state block 5510 is shown in FIGS. 58A-58C. FIG. 58 shows the interrelationship of FIGS. 58A-58C, where each of these three figures depict a portion of the Act On State block 5510.

Once the executive task 5316 has set the appropriate flags in response to a particular Exec message, the executive 5316 then proceeds to send messages to the appropriate tasks or entities which must be informed of changes to the navigator 406 system as a result of the Exec message.

For example, when the executive task 5316 leaves the executive decisions 5508, and first enters the act on state block 5510, it checks to see that the status is set such that the vehicle is ready for autonomous mode (for example—VPS is ready, vehicle is communicating properly, a proper route has been commanded, and the vehicle is ready for auto mode). See block 5802. If one or more of these conditions is not met, then the Exec returns to wait for another valid message. If all of these conditions are met, then the executive 5316 checks to see that the path generator 5804 is operating. If so, then the executive 5316 proceeds to start the other systems required for autonomous operation.

If the path generation system is not operating, then the executive 5316 task sends the message 'VPS_POSTURE_ENGAGE' to the Vps Posture Queue 5334, in order to start the path generator. The executive task will then return to the Pend on Exec Queue 5506, to wait for another directive so that proper operation of the vehicle 310 is ensured.

What is claimed is:

1. A system for use with an autonomous vehicle for enabling the vehicle to track a desired vehicle path, the system comprising:

means for providing the desired vehicle path to the vehicle;

means for executing a vehicle command that causes the vehicle to attempt to follow the desired vehicle path;

means for determining an actual vehicle position;

means for determining an error between said actual vehicle position and the desired vehicle path; and means for reducing said error between said actual vehicle position and the desired vehicle path including means for planning a continuous path from said actual vehicle position to the desired vehicle path based on said error so that said continuous path converges to the desired vehicle path at a lookahead distance, wherein said continuous path is a quintic polynomial based on said actual vehicle position, the desired vehicle path, and said lookahead distance, and means for compensating for vehicle response characteristics of the vehicle using feedback compensation to cause the vehicle to follow said continuous path.

2. The system of claim 1, wherein said means for executing a vehicle command comprises:

means for executing a speed control command; and means for executing a steering control command.

3. The system of claim 1, wherein said means for reducing said error between said actual vehicle position and the desired vehicle path further includes:

means for compensating for latency in said vehicle response characteristics using feedforward compensation to cause the vehicle to follow said continuous path.

4. The system of claim 3, wherein said means for executing a vehicle command comprises:

means for executing a speed control command; and means for executing a steering control command.

5. The system of claim 4, wherein said means for compensating for latency comprises:

means for feeding forward an early steering command.

6. The system of claim 5, wherein said means for feeding forward an early steering command includes:

means for using a preselected number of time constants associated with said latency in said vehicle response characteristics to advance said early steering command.

7. The system of claim 1, wherein said means for planning a continuous path comprises:

means for varying said lookahead distance based on a vehicle speed.

8. A method for use in an autonomous vehicle that enables the vehicle to track a desired vehicle path, the method comprising the steps of:

providing the desired vehicle path to the vehicle;

executing a vehicle command that causes the vehicle to attempt to follow the desired vehicle path;

determining an actual vehicle position;

determining an error between said actual vehicle position and the desired vehicle path; and reducing said error between said actual vehicle position and the desired vehicle path including the steps of planning a continuous path from said actual vehicle position to the desired vehicle path based on said error so that said continuous path converges to the desired vehicle path at a lookahead distance, wherein said continuous path is a quintic polynomial based on said actual vehicle position, the desired vehicle path, and said lookahead distance, and compensating for vehicle response characteristics of the vehicle using feedback compensation to cause the vehicle to follow said continuous path.

9. The method of claim 8, wherein said step of executing a vehicle command comprises the steps of:

executing a speed control command; and executing a steering control command.

10. The method of claim 8, wherein said step of reducing said error between said actual vehicle position and the desired vehicle path further includes the step of:

compensating for latency in said vehicle response characteristics using feedforward compensation to cause the vehicle to follow said continuous path.

11. The method of claim 10, wherein said step of executing a vehicle command comprises the steps of:

executing a speed control command; and executing a steering control command.

12. The method of claim 11, wherein said step of compensating for latency comprises the step of:

feeding forward an early steering command.

13. The method of claim 12, wherein said step of feeding forward an early steering command includes the step of:

using a preselected number of time constants associated with said latency in said vehicle response characteristics to advance said early steering command.

14. The method of claim 8, wherein said step of planning a continuous path comprises the step of:

means for varying said lookahead distance based on a vehicle speed.

15. A system for use with an autonomous vehicle for enabling the vehicle to track a desired vehicle path, the system comprising:

means for providing the desired vehicle path to the vehicle;

means for executing a vehicle command that causes the vehicle to attempt to follow the desired vehicle path;

means for determining an actual vehicle position;

means for determining an error between said actual vehicle position and the desired vehicle path; and means for reducing said error between said actual vehicle position and the desired vehicle path including means for planning a continuous path from said actual vehicle position to the desired vehicle path based on said error so that said continuous path converges to the desired vehicle path at a lookahead distance, wherein said continuous path is based on said actual vehicle position, the desired vehicle path, and said lookahead distance, and means for varying said lookahead distance based on a vehicle speed.

16. The system of claim 15, wherein said means for reducing error further comprises:

means for compensating for vehicle response characteristics of the vehicle using feedback compensation to cause the vehicle to follow said continuous path.

17. The system of claim 15, wherein said means for planning comprises:

means for planning a continuous path from said actual vehicle position to the desired vehicle path based on said error so that said continuous path converges to the desired vehicle path at a lookahead distance, wherein said continuous path is a quintic polynomial based on said actual vehicle position, the desired vehicle path, and said lookahead distance.

18. The system of claim 15, wherein said means for reducing said error between said actual vehicle position and the desired vehicle path further includes:

means for compensating for latency in said vehicle response characteristics using feedforward compensation to cause the vehicle to follow said continuous path.

19. The system of claim 18, wherein said means for executing a vehicle command comprises:

means for executing a speed control command; and means for executing a steering control command.

20. The system of claim 19, wherein said means for compensating for latency comprises:

means for feeding forward an early steering command.

21. The system of claim 20, wherein said means for feeding forward an early steering command includes:

means for using a preselected number of time constants associated with said latency in said vehicle response characteristics to advance said early steering command.

* * * * *